United States Patent
Deering et al.

(10) Patent No.: US 9,858,901 B2
(45) Date of Patent: Jan. 2, 2018

(54) EYE MOUNTED DISPLAYS AND SYSTEMS, WITH EYE TRACKER AND HEAD TRACKER

(71) Applicant: Spy Eye, LLC, Los Gatos, CA (US)

(72) Inventors: Michael Frank Deering, Los Altos, CA (US); Alan Huang, Menlo Park, CA (US)

(73) Assignee: Spy Eye, LLC, Los Gatos, CA (US)

( * ) Notice: Subject to any disclaimer, the term of this patent is extended or adjusted under 35 U.S.C. 154(b) by 0 days.

(21) Appl. No.: 15/281,654

(22) Filed: Sep. 30, 2016

(65) Prior Publication Data

US 2017/0019661 A1 Jan. 19, 2017

Related U.S. Application Data

(63) Continuation of application No. 14/494,327, filed on Sep. 23, 2014, which is a continuation-in-part of (Continued)

(51) Int. Cl.
*G09G 5/391* (2006.01)
*G02B 27/01* (2006.01)
(Continued)

(52) U.S. Cl.
CPC ......... *G09G 5/391* (2013.01); *G02B 27/0093* (2013.01); *G02B 27/017* (2013.01);
(Continued)

(58) Field of Classification Search
CPC . G09G 3/02; G02C 7/04; H04N 13/02; H04N 13/04; H04N 13/044; G02B 27/017;
(Continued)

(56) References Cited

U.S. PATENT DOCUMENTS

| 4,871,247 A | 10/1989 | Haynes |
| 5,446,834 A | 8/1995 | Deering |

(Continued)

FOREIGN PATENT DOCUMENTS

| JP | H7-121114 A | 5/1995 |
| WO | WO 2016/014118 A1 | 1/2016 |
| WO | WO 2016/022665 A1 | 2/2016 |

OTHER PUBLICATIONS

Jones, R.J.M., "Direct Retinal Imaging and Virtual Displays," RTO HFM Specialists' Meeting on "Human Factors in the 21$^{st}$ Century," Paris France, Jun. 11-13, 2001, 8 pages.
(Continued)

*Primary Examiner* — Kenneth Bukowski
(74) *Attorney, Agent, or Firm* — Fenwick & West LLP

(57) ABSTRACT

A display device is mounted on and/or inside the eye. The eye mounted display contains multiple sub-displays, each of which projects light to different retinal positions within a portion of the retina corresponding to the sub-display. The projected light propagates through the pupil but does not fill the entire pupil. In this way, multiple sub-displays can project their light onto the relevant portion of the retina. Moving from the pupil to the cornea, the projection of the pupil onto the cornea will be referred to as the corneal aperture. The projected light propagates through less than the full corneal aperture. The sub-displays use spatial multiplexing at the corneal surface. Various electronic devices interface to the eye mounted display.

20 Claims, 92 Drawing Sheets

5700 Perspective view of exit pupil envelope femto projectors

5710 Unfolded length of femto projectors

Related U.S. Application Data application No. 14/226,211, filed on Mar. 26, 2014, now abandoned, which is a continuation-in-part of application No. 12/359,951, filed on Jan. 26, 2009, now Pat. No. 8,786,675, said application No. 14/494,327 is a continuation-in-part of application No. 12/359,211, filed on Jan. 23, 2009, now abandoned.

(60) Provisional application No. 61/023,833, filed on Jan. 26, 2008, provisional application No. 61/023,073, filed on Jan. 23, 2008.

(51) Int. Cl.
| | |
|---|---|
| *G02C 7/04* | (2006.01) |
| *G09G 3/02* | (2006.01) |
| *H04N 13/04* | (2006.01) |
| *G02B 27/00* | (2006.01) |
| *H04N 7/01* | (2006.01) |
| *G06T 7/60* | (2017.01) |
| *G09G 5/00* | (2006.01) |
| *H04N 9/31* | (2006.01) |
| *H04N 19/70* | (2014.01) |
| *G02C 11/00* | (2006.01) |
| *G06T 3/40* | (2006.01) |

(52) U.S. Cl.
CPC ........... *G02B 27/0172* (2013.01); *G02C 7/04* (2013.01); *G02C 11/10* (2013.01); *G06T 3/40* (2013.01); *G06T 7/60* (2013.01); *G09G 3/02* (2013.01); *G09G 5/003* (2013.01); *H04N 7/0117* (2013.01); *H04N 7/0127* (2013.01); *H04N 9/31* (2013.01); *H04N 9/3188* (2013.01); *H04N 9/3191* (2013.01); *H04N 13/044* (2013.01); *H04N 13/0484* (2013.01); *H04N 19/70* (2014.11); *G02B 2027/014* (2013.01); *G02B 2027/0118* (2013.01); *G02B 2027/0123* (2013.01); *G02B 2027/0134* (2013.01); *G02B 2027/0138* (2013.01); *G02B 2027/0147* (2013.01); *G02B 2027/0178* (2013.01); *G02B 2027/0187* (2013.01); *G09G 2340/0407* (2013.01); *G09G 2340/0435* (2013.01); *G09G 2354/00* (2013.01)

(58) Field of Classification Search
CPC ............ G02B 27/0093; G02B 27/0172; G02B 2027/0134; G02B 2027/0147; G02B 2027/0138; G02B 2027/0187
See application file for complete search history.

(56) References Cited

U.S. PATENT DOCUMENTS

| | | |
|---|---|---|
| 5,467,104 A | 11/1995 | Furness, III et al. |
| 5,510,832 A | 4/1996 | Garcia |
| 5,621,424 A | 4/1997 | Shimada et al. |
| 5,680,231 A | 10/1997 | Grinberg et al. |
| 5,682,210 A | 10/1997 | Weirich |
| 5,712,721 A | 1/1998 | Large |
| 5,808,589 A | 9/1998 | Fergason |
| 6,050,717 A | 4/2000 | Kosugi et al. |
| 6,120,460 A | 9/2000 | Abreu et al. |
| 6,215,593 B1 | 4/2001 | Bruce |
| 6,243,055 B1 | 6/2001 | Fergason |
| 6,307,589 B1 | 10/2001 | Maquire |
| 6,312,393 B1 | 11/2001 | Abreu |
| 6,313,864 B1 | 11/2001 | Tabata et al. |
| 6,343,146 B1 | 1/2002 | Tsuruoka et al. |
| 6,480,174 B1 | 11/2002 | Kaufmann et al. |
| 6,525,723 B1 | 2/2003 | Deering |
| 6,529,331 B2 | 3/2003 | Massof et al. |
| 6,570,386 B2 | 5/2003 | Goldstein |
| 6,614,408 B1 | 9/2003 | Mann |
| 6,851,805 B2 | 2/2005 | Blum et al. |
| 6,920,283 B2 | 7/2005 | Goldstein |
| 7,137,952 B2 | 11/2006 | Leonardi et al. |
| 7,375,701 B2 | 5/2008 | Covannon et al. |
| 7,522,344 B1 | 4/2009 | Curatu et al. |
| 7,542,210 B2 | 6/2009 | Chirieleison |
| 7,626,562 B2 | 12/2009 | Iwasaki |
| 7,724,278 B2 | 5/2010 | Maguire, Jr. |
| 7,758,187 B2 | 7/2010 | Amirparviz |
| 8,087,777 B2 | 1/2012 | Rosenthal |
| 8,096,654 B2 | 1/2012 | Amirparviz et al. |
| 8,373,618 B2 | 2/2013 | Friedrich et al. |
| 8,430,310 B1 | 4/2013 | Ho et al. |
| 8,441,731 B2 | 5/2013 | Sprague |
| 8,446,341 B2 | 5/2013 | Amirparviz et al. |
| 8,482,858 B2 | 7/2013 | Sprague |
| 8,579,434 B2 | 11/2013 | Amirparviz et al. |
| 8,582,209 B1 | 11/2013 | Amirparviz |
| 8,608,310 B2 | 12/2013 | Otis et al. |
| 8,721,074 B2 | 5/2014 | Pugh et al. |
| 8,764,185 B1 | 7/2014 | Biederman et al. |
| 8,786,675 B2 | 7/2014 | Deering |
| 8,798,332 B2 | 8/2014 | Otis et al. |
| 8,827,445 B1 | 9/2014 | Wiser et al. |
| 8,870,370 B1 | 10/2014 | Otis et al. |
| 8,874,182 B2 | 10/2014 | Etzkorn et al. |
| 8,911,078 B2 | 12/2014 | Meyers |
| 8,922,898 B2 | 12/2014 | Legerton et al. |
| 8,960,898 B1 | 2/2015 | Etzkorn et al. |
| 8,971,978 B2 | 3/2015 | Ho et al. |
| 8,985,763 B1 | 3/2015 | Etzkorn et al. |
| 8,989,834 B2 | 3/2015 | Ho et al. |
| 9,039,171 B2 | 5/2015 | Groisman |
| 9,040,923 B2 | 5/2015 | Sprague et al. |
| 9,047,512 B2 | 6/2015 | Otis et al. |
| 9,054,079 B2 | 6/2015 | Etzkorn |
| 9,063,351 B1 | 6/2015 | Ho et al. |
| 9,111,473 B1 | 8/2015 | Ho et al. |
| 9,134,546 B2 | 9/2015 | Pugh et al. |
| 9,158,133 B1 | 10/2015 | Pletcher et al. |
| 9,161,712 B2 | 10/2015 | Etzkorn |
| 9,192,298 B2 | 11/2015 | Bouwstra et al. |
| 9,195,075 B2 | 11/2015 | Pugh et al. |
| 9,215,293 B2 | 12/2015 | Miller |
| 9,217,881 B2 | 12/2015 | Pugh et al. |
| 9,244,285 B2 | 1/2016 | Chen et al. |
| 9,271,677 B2 | 3/2016 | Leonardi |
| 9,282,920 B2 | 3/2016 | Ho et al. |
| 9,289,123 B2 | 3/2016 | Weibel et al. |
| 9,289,954 B2 | 3/2016 | Linhardt et al. |
| 9,298,002 B2 | 3/2016 | Border et al. |
| 9,298,020 B1 | 3/2016 | Etzkorn et al. |
| D754,861 S | 4/2016 | O'Driscoll et al. |
| 9,310,626 B2 | 4/2016 | Pugh et al. |
| 9,316,848 B2 | 4/2016 | Pugh et al. |
| 9,326,710 B1 | 5/2016 | Liu et al. |
| 9,332,935 B2 | 5/2016 | Etzkorn et al. |
| 9,341,843 B2 | 5/2016 | Border et al. |
| 9,366,872 B2 | 6/2016 | Honea et al. |
| 9,366,881 B2 | 6/2016 | Pugh et al. |
| 9,389,433 B2 | 7/2016 | Pugh et al. |
| 9,442,307 B2 | 9/2016 | Meyers |
| 2001/0035845 A1 | 11/2001 | Zwern |
| 2002/0039085 A1 | 4/2002 | Ebersole et al. |
| 2002/0089469 A1 | 7/2002 | Cone et al. |
| 2002/0113756 A1 | 8/2002 | Tuceryan et al. |
| 2002/0154214 A1 | 10/2002 | Scallie et al. |
| 2003/0020477 A1 | 1/2003 | Goldstein |
| 2004/0046711 A1 | 3/2004 | Triebfuerst |
| 2004/0061663 A1 | 4/2004 | Reynolds et al. |
| 2004/0246588 A1 | 12/2004 | Grego |
| 2004/0252191 A1 | 12/2004 | Davis et al. |
| 2005/0024586 A1 | 2/2005 | Teiwes et al. |
| 2005/0264527 A1 | 12/2005 | Lin |
| 2005/0280603 A1 | 12/2005 | Aughey et al. |
| 2006/0007056 A1 | 1/2006 | Ou |
| 2006/0033879 A1 | 2/2006 | Covannon |

(56) References Cited

U.S. PATENT DOCUMENTS

| | | |
|---|---|---|
| 2006/0038881 A1 | 2/2006 | Starkweather et al. |
| 2006/0044265 A1 | 3/2006 | Min |
| 2006/0167670 A1 | 7/2006 | Deering |
| 2006/0227067 A1 | 10/2006 | Iwasaki |
| 2006/0290882 A1 | 12/2006 | Meyers et al. |
| 2007/0188407 A1 | 8/2007 | Nishi |
| 2007/0205084 A1 | 9/2007 | Kobayashi et al. |
| 2007/0229397 A1 | 10/2007 | Sefton |
| 2008/0002262 A1 | 1/2008 | Chirieleison |
| 2008/0024392 A1 | 1/2008 | Gustafsson et al. |
| 2008/0309586 A1 | 12/2008 | Vitale |
| 2009/0163898 A1 | 6/2009 | Gertner et al. |
| 2009/0283780 A1 | 11/2009 | Ansems et al. |
| 2009/0303159 A1 | 12/2009 | Gustafsson et al. |
| 2010/0001926 A1 | 1/2010 | Amirparviz et al. |
| 2010/0085462 A1 | 4/2010 | Sako et al. |
| 2010/0149073 A1 | 6/2010 | Chaum et al. |
| 2010/0234717 A1 | 9/2010 | Wismer |
| 2010/0302356 A1 | 12/2010 | Sinivaara |
| 2011/0043436 A1 | 2/2011 | Yamamoto |
| 2011/0102558 A1 | 5/2011 | Moliton et al. |
| 2014/0016097 A1 | 1/2014 | Leonardi et al. |
| 2014/0192311 A1 | 7/2014 | Pletcher et al. |
| 2014/0240665 A1 | 8/2014 | Pugh et al. |
| 2015/0088253 A1 | 3/2015 | Doll et al. |
| 2015/0150510 A1 | 6/2015 | Leonardi et al. |
| 2015/0261294 A1 | 9/2015 | Urbach |
| 2015/0281411 A1 | 10/2015 | Markus et al. |
| 2015/0339857 A1 | 11/2015 | O'Connor et al. |
| 2015/0362750 A1 | 12/2015 | Yeager et al. |
| 2015/0362752 A1 | 12/2015 | Linhardt et al. |
| 2016/0030160 A1 | 2/2016 | Markus et al. |
| 2016/0066825 A1 | 3/2016 | Barrows et al. |
| 2016/0091737 A1 | 3/2016 | Kim et al. |
| 2016/0113760 A1 | 4/2016 | Conrad |

OTHER PUBLICATIONS

Leonardi, M. et al., "Wireless Contact Lens Sensor for Intraocular Pressure Monitoring: Assessment on Enucleated Pig Eyes," Acta Ophthamologica, 2009, pp. 433-437, vol. 87.

PCT International Search Report and Written Opinion, PCT/US2009/032024, dated Apr. 27, 2009, 9 Pages.

PCT International Search Report and Written Opinion, PCT/US2009/031902, dated Mar. 6, 2009, 8 Pages.

Sather, K., "Potential platform for superhuman vision in development at UW," KINGS.com, Jan. 17, 2008, 2 Pages, [online] [Retrieved on Jun. 13, 2008] Retrieved from the internet http://www.kingS.com/health/stories/NW01_1708WAB_electronic_contacts_KS.2fdcdeaa . . . >.

United States Office Action, U.S. Appl. No. 12/359,211, dated Aug. 27, 2013, 9 pages.

United States Office Action, U.S. Appl. No. 12/359,211, dated Jan. 4, 2013, 10 pages.

United States Office Action, U.S. Appl. No. 12/359,211, dated Feb. 24, 2012, 8 pages.

United States Office Action, U.S. Appl. No. 12/359,951, dated Sep. 12, 2013, 22 pages.

United States Office Action, U.S. Appl. No. 12/359,951, dated Jul. 20, 2012, 12 pages.

United States Office Action, U.S. Appl. No. 12/359,951, dated Dec. 22, 2011, 13 pages.

United States Office Action, U.S. Appl. No. 12/359,211, dated Mar. 25, 2014, 33 pages.

United States Office Action, U.S. Appl. No. 14/226,211, dated Apr. 28, 2014, 11 pages.

United States Office Action, U.S. Appl. No. 14/494,327, dated Oct. 19, 2016, 14 pages.

United States Office Action, U.S. Appl. No. 14/494,327, dated Jan. 4, 2016, 10 pages.

United States Office Action, U.S. Appl. No. 14/494,327, dated Apr. 21, 2017, 15 pages.

4400 Head on rotated view of references from figure 42

3500 Point source

3900 Corneal aperture

1430 Pupil 4200 3D envelope

5200 Overhead view of display and curved mirror

5500 Overhead mirror bounce 5900 zmax2

6200 First layer of contact lens

6300 Second layer of contact lens

6400 Contact lens mounted display 3D perspective view from below

6500 Eye blink

6510 Open eye     6520 Half closed eye     6530 Closed eye

6540 Quarter open eye     6550 Half open eye     6560 Open eye

6600 The figure shows a horizontal slice view of a contact lens based display placed on top of the cornea 6610
Contact lens display 6700 Horizontal slice view of an eye mounted display placed within the cornea 6710
Cornea display capsule 6800 Horizontal slice view of an eye mounted display placed on the posterior of the cornea 6810
Behind cornea display capsule 6900 Horizontal slice view of an intraocular lens based eye mounted display implanted within the eye between the cornea and the lens 6910
Intraocular display capsule 7000 Horizontal slice view of an eye mounted display attached to the front of the lens 7010
Front of lens display capsule 7100 Horizontal slice view of an eye mounted display attached within the lens 7110
Lens based display element 7200 Horizontal slice view of an eye mounted display attached to the posterior of the lens 7210
Lens surface placed display capsule 7400 Horizontal slice view of an eye mounted display attached to the retinal surface 7410 Retina based display surface 8500 Display capsule overhead view 8510 Femto display exit apperature

EYE MOUNTED DISPLAYS AND SYSTEMS, WITH EYE TRACKER AND HEAD TRACKER

CROSS-REFERENCE TO RELATED APPLICATION(S)

This application is a continuation of U.S. patent application Ser. No. 14/494,327, "Eye Mounted Displays and Systems Using Eye Mounted Displays," filed Sep. 23, 2014. U.S. patent application Ser. No. 14/494,327 is a continuation-in-part of U.S. patent application Ser. No. 14/226,211, "Systems Using Eye Mounted Displays," filed Mar. 26, 2014, now abandoned; which is a continuation of U.S. patent application Ser. No. 12/359,951, "Systems Using Eye Mounted Displays," filed Jan. 26, 2009, now U.S. Pat. No. 8,786,675, which claims priority under 35 U.S.C. §119(e) to U.S. Provisional Patent Application Ser. No. 61/023,073, "Eye Mounted Displays," filed Jan. 23, 2008 and to Provisional Patent Application Ser. No. 61/023,833, "Systems using Eye Mounted Displays," filed Jan. 26, 2008. U.S. patent application Ser. No. 14/494,327 is also a continuation-in-part of U.S. patent application Ser. No. 12/359,211, "Eye Mounted Displays," filed Jan. 23, 2009, now abandoned, which claims priority under 35 U.S.C. §119(e) to U.S. Provisional Patent Application Ser. No. 61/023,073, "Eye Mounted Displays," filed Jan. 23, 2008. The subject matter of all of the foregoing is incorporated herein by reference in their entirety.

BACKGROUND OF THE INVENTION

1. Field of the Invention

This invention relates generally to visual display devices, and electronics devices coupled to visual display devices. More particularly, it relates to eye mounted displays, electronics devices coupled to eye mounted displays, and corresponding applications and optimizations for such devices and displays.

2. Description of Related Art

More and more our technological society relies on visual display technology for work, home internet and email use, and entertainment applications: HDTV, video games, portable electronic devices, etc. There is a need for improvements in display technologies with respect to spatial resolution, quality, field of view, portability (both size and power consumption), cost, etc.

However, the current crop of display technologies makes a number of tradeoffs between these goals in order to satisfy a particular market segment. For example, direct view color CRTs do not allow direct addressing of individual pixels. Instead, a Gaussian spread out over several phosphor dots (pixels) both vertically and horizontally (depending on spot size) results. Direct view LCD panels have generally replaced CRTs in most computer display and large segments of the TV display markets, but at the trade-offs of higher cost, temporal lag in sequences of images, lower color quality, lower contrast, and limitations on viewing angles. Display devices with resolutions higher than the 1920×1024 HDTV standards are now available, but at substantially higher cost. The same is true for displays with higher dynamic range or high frame rates. Projection display devices can now produce large, bright images, but at substantial costs in lamps and power consumption. Displays for cell phones, PDAs, handheld games, small still and video cameras, etc., must currently seriously compromise resolution and field of view. Within the specialized market where head mounted display are used, there are still serious limitations in resolution, field of view, undo warping distortion of images, weight, portability, and cost.

The existing technologies for providing direct view visual displays include CRTs, LCDs, OLEDs, LEDs, plasma, SEDs, liquid paper, etc. The existing technologies for providing front or rear projection visual displays include CRTs, LCDs, DLP™, LCOS, linear MEMs devices, scanning laser, etc. All these approaches have much higher costs when higher light output is desired, as is necessary when larger display surfaces are desired, when wider useable viewing angles are desired, for stereo display support, etc.

Another general problem with current direct view display technology is that they are all inherently limited in the perceivable resolution and field of view that they can provide when embedded in small portable electronics products. Only in laptop computers (which are quite bulky compared to cell phones, PDAs, hand held game systems, or small still and/or video cameras) can one obtain higher resolution and field of view in exchange for size, weight, cost, battery weight and life time between charges. Larger, higher resolution direct view displays are bulky enough that they must remain in the same physical location day to day (e.g., large plasma or LCD display devices).

One problem with current rear projection display technologies is that they tend to come in very heavy bulky cases to hold folding mirrors. And to compromise on power requirement and lamp cost most use display screen technology that preferentially passes most of the light over a narrow range of viewing angles.

One problem with current front projection display technology is that they take time to set up, usually need a large external screen, and while some are small enough to be considered portable, the weight savings comes at the price of color quality, resolution, and maximum brightness. Many also have substantial noise generated by their cooling fans.

Current head mounted display technology have limitations with respect to resolution, field of view, image linearity, weight, portability, and cost. They either must make use of display devices designed for other larger markets (e.g., LCD devices for video projection), and put up with their limitations; or custom display technologies must be developed for what is still a very small market. While there have been many innovative optical designs for head mounted displays, controlling the light from the native display to the device's exit pupil can be result in bulky, heavy optical designs, and rarely can see-through capabilities (for augmented reality applications, etc.) be achieved. While head mounted displays require lower display brightness than direct view or projection technologies, they still require relatively high display brightness because head mounted displays must support a large exit pupil to cover rotations of the eye, and larger stand-off requirements, for example to allow the wearing of prescription glasses under the head mounted display.

Thus, there is a need for new display technologies to overcome the resolution, field of view, power requirements, bulk and weight, lack of stereo support, frame rate limitations, image linearity, and/or cost drawbacks of present display technologies. Eye mounted displays (EMDs) as described below are a possible solution. Furthermore, it is in many cases advantageous to make the device "eye mounted display system aware," in order to allow optimization of the device (and possibly the EMD also) and additionally to provide greatly expanded features over what might be possible prior to EMDs.

SUMMARY OF THE INVENTION

The present invention overcomes various limitations of the prior art by mounting the display device on and/or inside the eye, and by coupling other devices to such display devices mounted on and/or inside the eye. The eye mounted display contains multiple sub-displays, each of which projects light to different targeted portions of the retinal surface, in the aggregate forming a virtual display image. These sub-displays utilize optical properties of the eye to avoid or reduce interference between different sub-displays and, in many cases, also to avoid or reduce interference with the natural vision through the eye.

It is known that retinal receptive fields do not have anything close to constant area or density across the retina. The receptive fields are much more densely packed towards the fovea, and become progressively less densely packed as you travel away from the fovea. In another aspect of the invention, the sub-displays generate the "pixel" resolution required by their corresponding targeted retinal regions. Thus, the entire display, made up of all the sub-displays, is a variable resolution display that generates only the resolution that each region of the eye can actually see, vastly reducing the total number of individual "display pixels" required compared to displays of equal resolution and field of view that are not eye mounted. For displays that are not eye mounted, in order to match the eye's resolution, each pixel on the display must have a resolution sufficient to match the highest foveal resolution since the viewer may, at some point, view that display pixel using his fovea. In contrast, pixels in an eye mounted display that are viewed by lower resolution off-foveal regions of the retina will always be viewed by those lower resolution regions and, therefore, can have larger pixels while still matching the eye's resolution. As a result, a 400,000 pixel eye mounted display using variable resolution can cover the same field of view as a fixed external display containing tens of millions of discrete pixels.

Nature produces images on the human eye through interaction of visible light wavefronts from the sun with physical objects. Man made displays produce images on the human eye either through the direct generation of visible light wavefronts (Plasma, CRT, LED, SED, etc.), front or rear projection onto screens (DMD™, LCOS, LCD, CRT, laser, etc.), or reflection of light (LCD, liquid paper, etc.). However, these displays all have defects as previously noted. Mounting the display on the head of the viewer (Head Mounted Displays: HMDs) reduces the required brightness, but introduces limits on linearity of optics, resolution, field of view, abilities for "see-through", weight, cost, etc.

Many of these defects can be cured by mounting a display to and/or within the eye itself. For example, FIG. 57, reference 5700, shows a representation of a large number of "femto projector" sub-displays placed on the surface of the cornea. Because each display resolution is matched to the corresponding receptor field resolution, a much lower number of pixels (~400,000) is sufficient to match the field of view of an equivalent resolution external display (tens of millions of pixels). However, a direct physical implementation of the geometry of FIG. 57 is impractical. The viewer cannot blink, or rotate his eyes much.

FIGS. 62 and 63 show one solution to this drawback. The projectors of FIG. 57 have had their optical paths folded such that they lie in a volume thin enough to be contained within a conventional sclera contact lens. The result is a new type of visual display—an Eye Mounted Display (EMD). Together with external free space pixel data transmitters, eye trackers, power supplies, audio support, etc. which can be mounted in a headpiece (which can take the form of a pair of glasses), and additional electronics to couple with image generators and head tracker sub-systems, the result is an Eye Mounted Display System (EMDS), as will be described in more detail below.

In one embodiment, the eye mounted display is based on a sclera contact lens that is mountable on the eye. The center of the sclera contact lens is occupied by a display capsule that has an anterior shell, a posterior shell and an interior. The display capsule is mounted in the sclera contact lens so that the anterior shell of the display capsule is flush to an anterior surface of the sclera contact lens. The sub-displays are femto projectors located in the interior of the display capsule. The femto projectors project light through underfilled corneal apertures that are substantially non-overlapping. The apertures are underfilled in the sense that the projected light does not fill the entire pupil. This allows all of the femto projectors to project their light through the common pupil. After the posterior shell of the display there is a slight air-gap before a prescription hard contact lens (optional) is present.

In addition to the eye mounted display, an exemplary eye mounted display system also includes an eye tracker and a scaler. The eye tracker tracks the orientation (and possibly also slight positional shifts) of the eye. The digital pixel processing scaler is coupled to the eye mounted display and to the eye tracker. It receives video input and converts it, based in part on the orientation of the eye received from the eye tracker, to a format suitable for projection by the eye mounted display.

In one implementation, the user wears a headpiece. On the headpiece are mounted part of a head tracker, part of an eye tracker and a data link component. The other part of the head tracker is positioned in an external physical frame of reference, and the two parts of the head tracker cooperate to track the position and orientation of the user's head. The eye mounted display contains the other part of the eye tracker, e.g., fiducial or other marks tracked by a camera mounted on the headpiece. The combination of the head and eye tracking data can be used to form an absolute transform from the external physical reference and the position of points of interest on the eye: the cornea, cones on the retina, etc.

The scaler performs conversion of video from standard or non-standard video sources to a retinal based raster based on the absolute transform. The data link component receives the converted video from the scaler and wirelessly transmits it to the headpiece which will pass it on to the eye mounted display. The (usually) planar video inputs may be mapped to planar virtual displays generated by the eye mounted display, or they may be mapped to a cylindrical display or to displays of more complex shape.

There are many advantages of eye mounted displays. Depending on the embodiment, some of the advantages can include variable resolution displays where the number of pixels in the display is significantly less than prior art non-eye mounted displays for the same effective resolution; very low brightness required of the display (literally as low as a few thousand photons per retinal cone, approximately one million times less photons than a 2,000 lumen video projector); extremely small size and inherent portability (e.g. worn as a contact lens, and/or implanted within the eye, etc.); extremely high resolution and wide field of view; and potentially lower cost compared to the set of multiple displays that can be replaced by one eye mounted display.

Other aspects of the invention include methods corresponding to the devices and systems described above, and applications for all of the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Outline
I. Overview
II. Some Definitions and Descriptions
   II.A. Types of Eye Mounted Displays
   II.B. Further Descriptions of Eye Mounted Displays
   II.C. Components of an Eye Mounted Display System
III. Making Electronics Devices Eye Mounted Display "Aware"
   III.A. Simple Example: An Eye Mounted Display Aware Digital Still Camera
   III.B. Modifying the EMDS Scaler Hardware
   III.C. Eliminating the Head-Tracker
   III.D. EMD Awareness: Resolution
   III.E. EMD Awareness: Wide Field of View Aware
   III.F. EMD Awareness: Stereo
   III.G. EMD Awareness: Head Tracking
   III.H. EMD Awareness: Augmented Reality
   III.I. EMD Awareness: Virtual Reality
   III.J. EMD Awareness: Eye Tracker
   III.K EMD Awareness: Additional Object Tracking
   III.L. EMD Awareness: Pseudo Cone Pixel Data Stream
IV. Product Classes Combining Electronics Devices and EMDSs
   IV.A. EMD Aware Digital and Film Still and Motion Cameras
   IV.B. EMD Aware Stereo and Multi-Channel Stereo Still and Motion Cameras
   IV.C. EMD Aware Cell Phones and PDAs.
   IV.D. EMD Aware Heads Up Display
   IV.E. EMD Aware Video Kiosks and Digital Signage
   IV.F. EMD Aware Laptop and Palm-top Computer
   IV.G. EMD Aware Wearable Computer
   IV.H. EMD Aware HDTV Display
   IV.I. EMD Aware Day of Release Motion Picture Display
   IV.J. EMD Aware 3D HDTV Display
   IV.K. EMD Aware Large Screen Format Display, and 3D Display
   IV.L. EMD Aware Sports Display
   IV.M. EMD Aware Immersive Virtual Reality Display
   IV.N. EMD Aware Augmented Reality Display IV.O. EMD Aware Video Game Software Running on an EMD Non-Aware Video Game Platform IV.P. EMD Aware Hardware and Software Video Games on Various Platforms: Hand Held Portable, Portable, Console, Deskside PC IV.Q. EMD Aware Simulation Systems: Flight, Tank, Dismounted Infantry, Homeland Defense, Firefighting, etc.

IV.R. EMD Aware Real World Systems: Flight, Tank, Dismounted Infantry, Homeland Defense, Firefighting, etc.

IV.S. EMD Aware Real World Systems: Command, Control, and Communications (CCC) center.

IV.T. EMD Aware Full Scale Industrial Design Display

IV.U. EMD Aware Industrial Design Display

IV.V. EMD Aware Telepresence Display for Remote Teleconferencing

IV.W. EMD Aware Augmented Display for Equipment Repair

IV.X. EMD Aware Industrial Virtual Reality Display for Software Development in a Cubicle IV.Y. EMD Aware Telepresence Display for Remote Medicine, Remote Land, Sea, and Air Vehicles, Space, Planetary Explorations (Moon, Mars, etc.)

V. Eye mounted Displays and Eye mounted Display Systems

V.A. Optical Basis for Eye mounted Displays

V.B A New Approach for Display Technologies

V.C Sub-Displays

V.D Embodiments of Contact Lens Mounted Displays

V.E Internal Electronics of Eye Mounted Display Systems

V.F Systems Aspects for Image Generators and Eye Mounted Displays

V.G Meta-Window Systems for Eye Mounted Displays

V.H Advantages of Eye Mounted Display Systems

I. Overview

Figure 1:
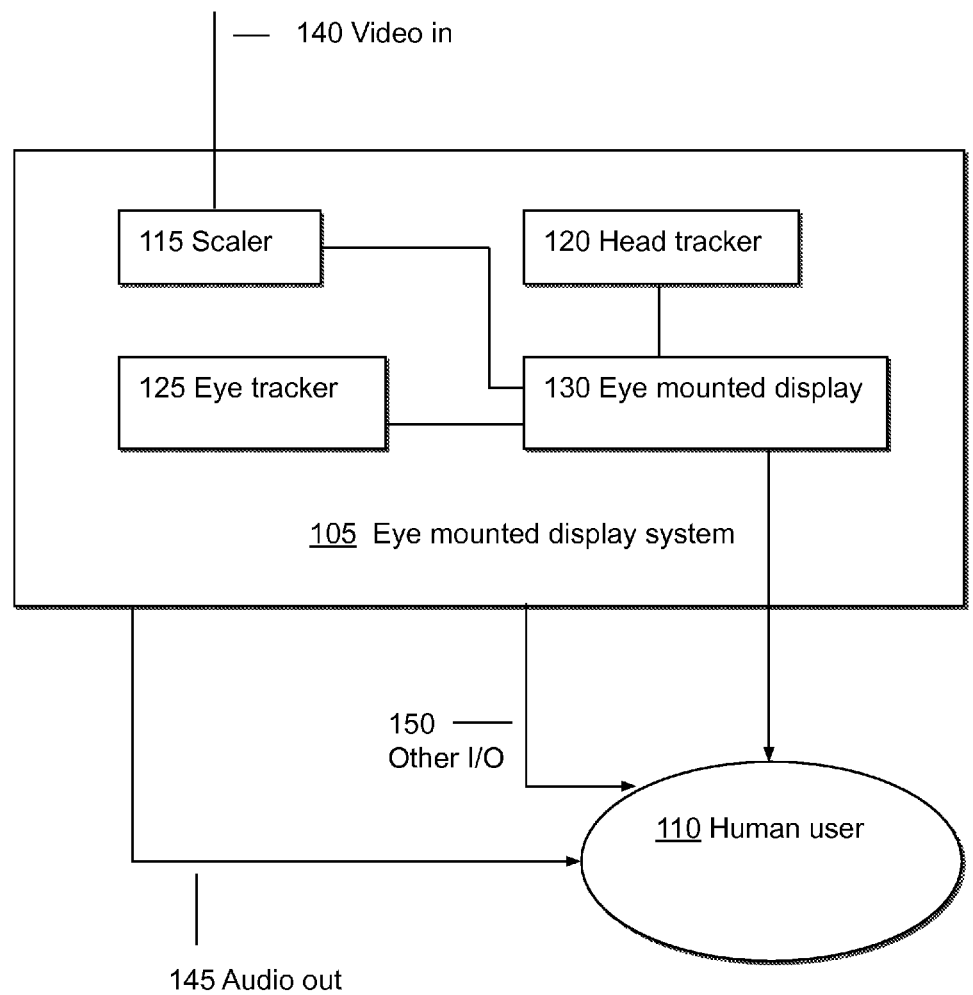
FIG. 1 shows one embodiment of a logical partitioning of an eye mounted display system.

FIG. 1 shows an example logical partitioning of an eye mounted display system (EMDS) 105 according to the invention. In this partitioning, there are four elements: the scaler 115, the head tracker 120, the eye tracker 125, and the left and right eye mounted displays (EMDs) 130. For simplicity, only one EMD 130 is shown in FIG. 1. Two EMDs are generally preferred but not required. The human user 110, the logical video inputs 140, the logical audio outputs 145, and the other I/O 150 are not part of the partitioning.

The EMD system 105 operates as follows. It receives logical video inputs 140 as its input, which is to be displayed to the human user 110 via the EMDs 130. In one approach, the EMDs 130 use "femto projectors" (not shown) to project the video on the human retina, thus creating a virtual display image. The scaler 115 receives the video inputs 140 and produces the appropriate data and commands to drive the EMDs 130. The head tracker 120 and eye tracker 125 provide information about head movement/position and eye movement/position, so that the information provided to the EMDs 130 can be compensated for these factors. Audio outputs 145 (optional) can also be provided from the logical video inputs 140. Additional I/O (optional) can also be provided from the logical I/O 150.

There are many ways in which sub-systems can be configured with an eye mounted display(s) to create embodiments of eye mounted display systems. Which is optimal depends on the application for the EMDS 105, changes in technology, etc. This disclosure will describe several embodiments, specifically including the one shown in FIG. 2. In this example, portions of the EMDS 105 are worn by a human 110. The overall EMDS 105 includes the following subsystems: a daisy-chainable video input re-sampler subsystem (scalers) 202 through 210, which accept the video inputs 205 through 208, and 212 through 215, respectively, and additional I/O (optional) can also be provided from the logical I/O 218 through 220; a head tracker subsystem comprised of two parts, 230 and 232; an eye tracker subsystem also comprised of two parts, 235 and 238, and a subsystem to transmit in free-space the display information from the headpiece to the two EMDs 245 and 248 (left and right eyes).

Portions of these subsystems may be external to the human 110, while other portions may be worn by the human 110. In this example, the human 110 wears a headpiece 222. Much of the data transferred between the sequential scalers 202 through 210 and the headpiece 222, and the headpiece to the EMDs 245 and 248 is the pseudo cone pixel data stream (PCPDS) 225, to be described in more detail later. The transfer of PCPDS from the last scaler 210 to the headpiece 222 can be wired or wireless. If wireless (e.g., the user is un-tethered), then an optional element, the PSPDST pseudo cone pixel data stream transceiver 228 is present.

The head tracker element 120 is partition into two physical components 230 and 232, one of which 232 is mounted on the headpiece 222. The other head tracker component 230 can be located elsewhere, typically in a known reference frame so that head movement/position is tracked relative to the reference frame. This component will be referred to as the tracker frame. The eye tracker element 125 is partitioned into two physical components 235 and 238. In this example, one of the components 238 (not shown) is mounted on the contacts 245 and/or 248, and the other component 235 is mounted on the headpiece 222 to be able to track movement of the eye mounted component 238. In this way, eye movement/position can be tracked relative to the head. The EMDs 130 and 135 are implemented as contact lens displays 245 and 248, one worn on each eye. The audio output an audio output 145 is implemented as an audio element 250 (e.g., headphone or earbud) that is an optional part of the headpiece 222.

In some cases (to be described later) the head tracker subsystem may not be required. Each of these subsystems will be described in greater detail in the following sections.

Figure 3:
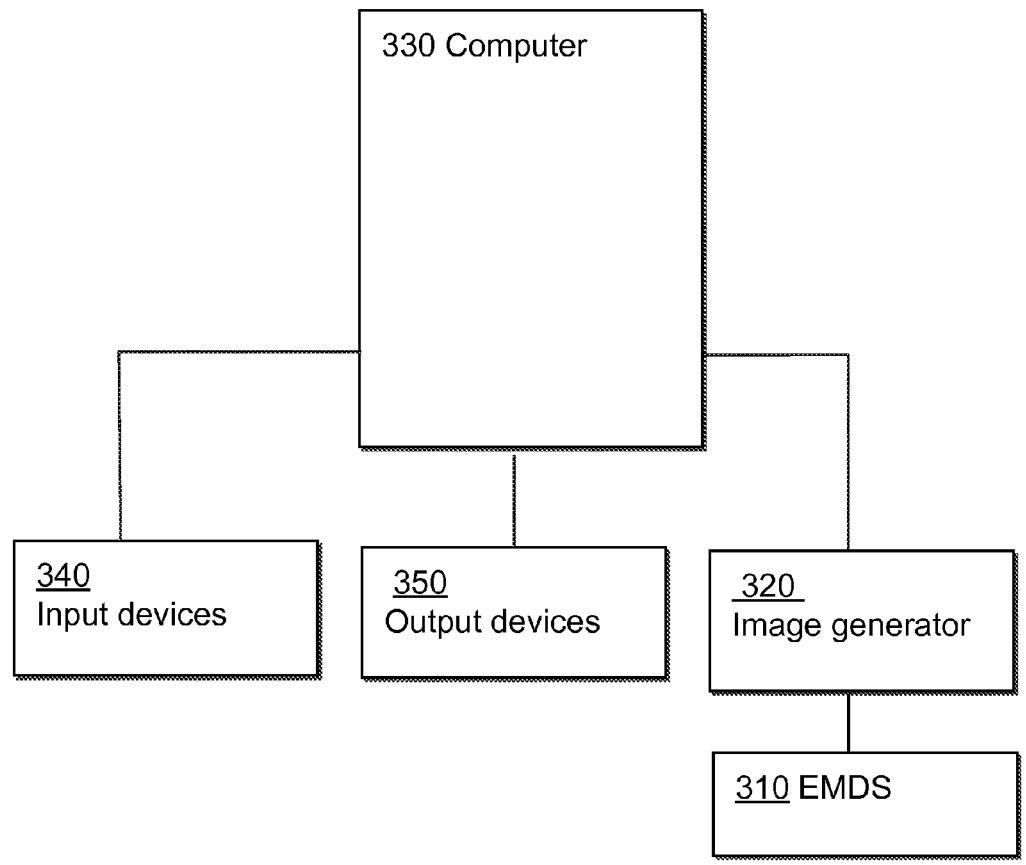
FIG. 3 shows one embodiment of additional electronics in an eye mounted display system.

An EMDS can be the display portion of a larger electronics system. FIG. 3 reference 300 shows the EMDS 310 and other portions of this larger electronic system that are present. The image generator 320 produces the logical video inputs 140. This video input could be a still or motion video camera, or television receiver or PVR or video disc player (HDTV or otherwise), or a general purpose computer, or a computer game system. This last device, a computer game system could be a general purpose computer running a video game or 3D simulator, or a video game console, of a handheld video game player, or a cell phone that is running a video game, etc. The phrase image generator will be used as a higher level of abstraction phrase for all such devices. Note that traditional definitions of image generator do not always include simple video receiver or playback devices. Here, the phrase image generator explicitly does include such devices.

Also included in the generic larger electronic system are human input devices 340 and non-video output devices 350: audio, vibration, tactile, motion, temperature, olfactory, etc. An important subclass of input devices 340 are three dimensional input devices. These can range from a simple 3D (6 degree of freedom) mouse, to a data glove, to a full body suit. In many cases, much of the support hardware for such devices is similar to and potentially shared with the head tracker sub-system 120, thus lowering the cost of supporting these additional human input devices.

The phrase scaler, when used in the context of conventional video processing, usually means a processing unit that can convert a video input in the format of a rectangular raster of a given height and width number of pixels, with each pixel of a fixed sized, to a video output of a different format of a rectangular raster of a given height and width number of pixels, with each pixel of a fixed sized. A common example is the up-conversion of an input NTSC interlaced video stream of 720 by 480 (non-square) pixels to an output HDTV 1080i interlaced video stream of 1920 by 1080 pixels. However in this disclosure, the term scaler, unless stated otherwise, will refer to a much more complicated processing unit that converts incoming video formats, typically of fixed size pixel rasters, to a format suitable for use with the EMDs 130. One example format is a re-sampled and re-filtered non-uniform density video format which will be referred to as the pseudo cone pixel video format, and the sequence of pseudo pixel data will be referred to as the pseudo cone pixel data stream. This video format will be described in more detail in a later section. Scalers usually require working storage for the frames of video in. This will be defined as the attached memory sub-system. The scalers in FIG. 2 implicitly include such memory at this high block level.

Figure 4:
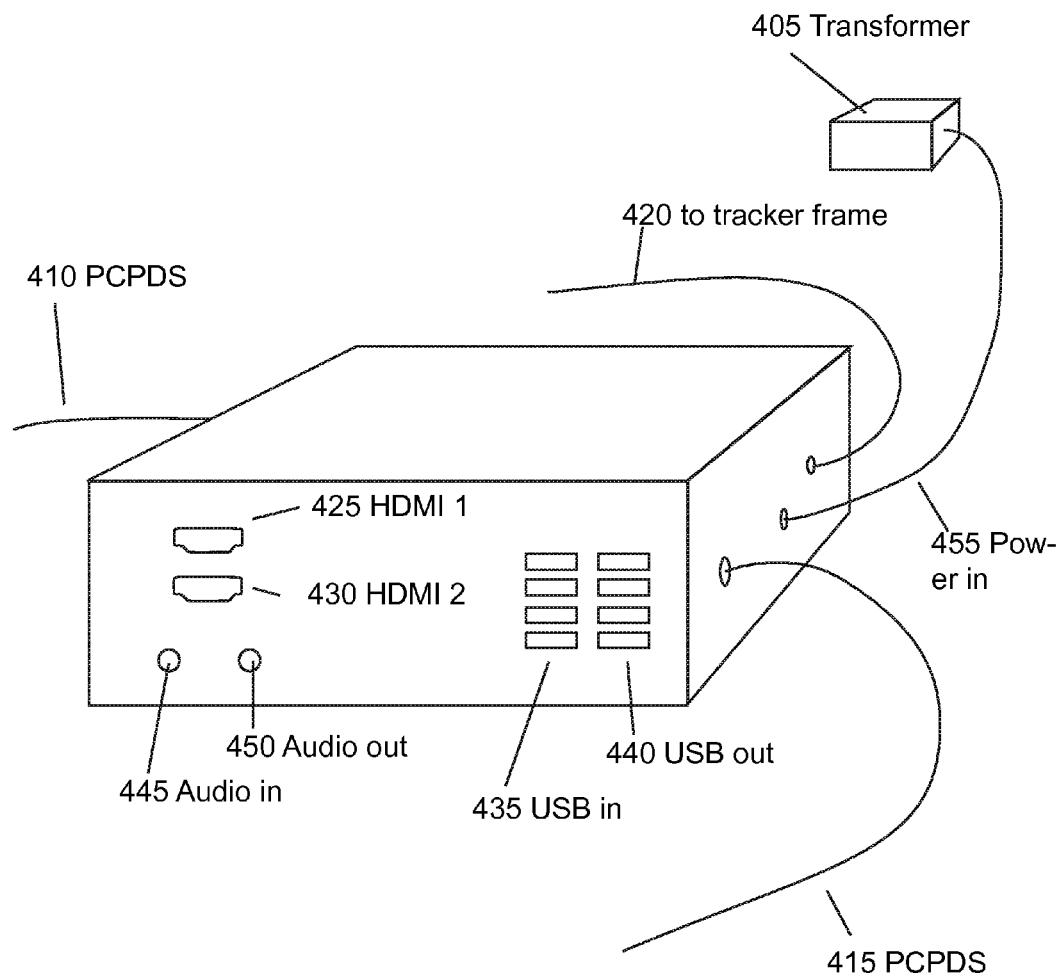
FIG. 4 shows example inputs and outputs for a scaler black box.

FIG. 4, reference 400, shows a particular example scaler "black box" with a specific set of inputs and outputs. The power in is through an AC to DC transformer 405 and DC cable 455, or internal re-chargeable batteries (not shown) when the scaler is being used in a portable application, or power over one or more of the USB connections 435. The logical video inputs 205 through 208 are realized through two physical HDMI inputs 425 and 430. CAT6 physical cables are used to pass the Pseudo Cone Pixel Data Stream (PCPDS) from one scaler to another: one side to/from 410, on the other side from/to 415. Note that while the PCPDS flows only in one direction, the signals carried on the CAT6 cables are bi-directional. Other classes of data flow in the opposite or both directions.

In this example configuration, each scaler box has an input 420 for the head tracker sub-system, even though typically only one head tracker per system will be employed. This avoids having to have a separate headtracker only black-box. Also, while most configurations will have only a single physical head tracker reference frame, for coverage over a larger virtual space multiple head tracker units can be used in a cellular fashion.

The box supports four USB inputs 435 and four USB outputs 440. These can be used for supporting keyboard and mice. The system is capable of performing KM (keyboard mouse) switching mapping the same keyboard and mouse inputs to any one of a number of computers connected in the video chain. As many modern displays support USB hubs, if the EMDS system is to replace them, it should support the same hub functionality.

Finally, the scaler supports digital optical fiber TOSLINK audio in 445 and out 450. This way, the audio from each of several computers attached can either have just their audio output switch in or all or some subset mixed together (remember that audio is also carried by the HDMI links). If a wireless transport of the PCPDS is supported, this functionality could be provided via a separate industry standard box, attached to the output CAT6 410 of the last scaler in the line. The scaler may be using only the lower layers of the Ethernet data transmission protocol for the transport of the PCPDS and other data, but it preferably follows the specifications far enough to allow use of common Ethernet switchers and free space transceivers. The scaler black box shown in FIG. 4 is merely an example, representing specific I/O choices for sake of providing a concrete example.

Figure 5:
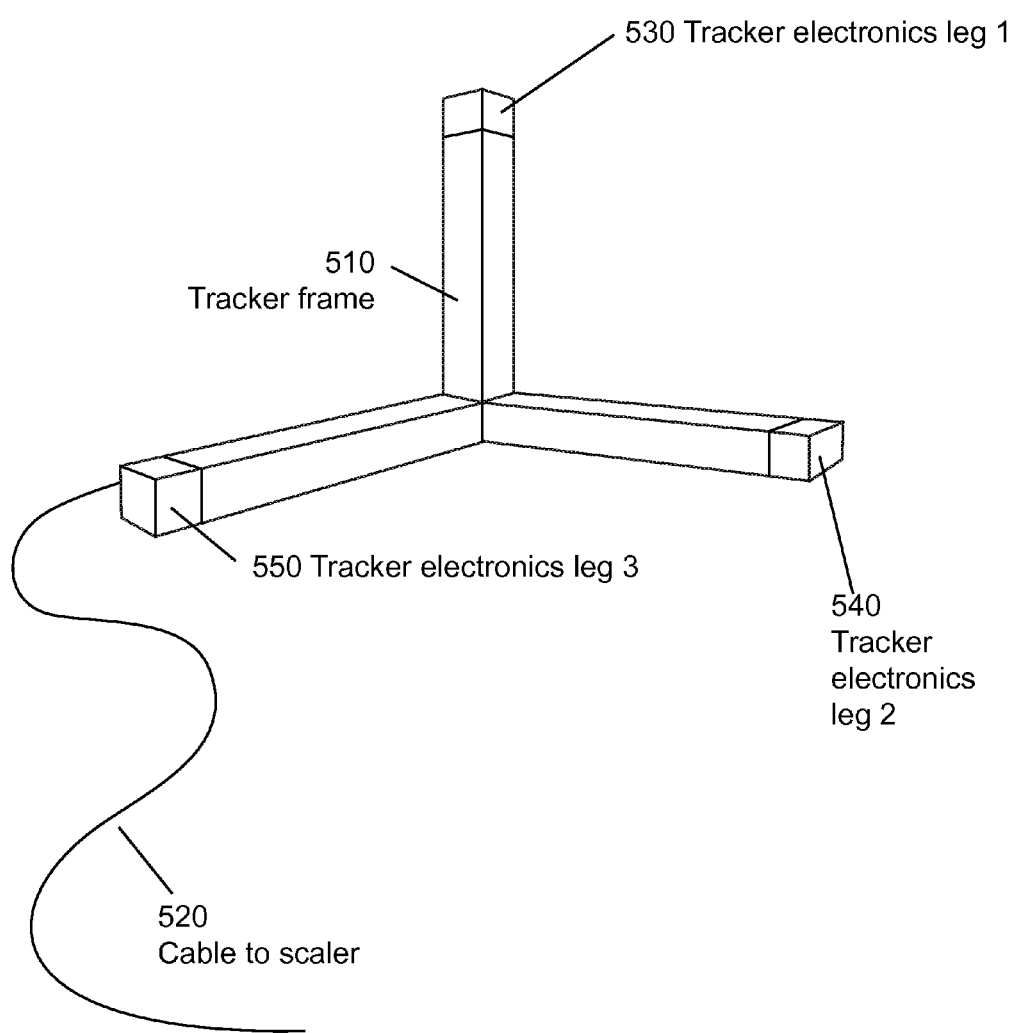
FIG. 5 shows an example portion of a head tracker system: the tracker fame.

One example of the head tracker component 230, the tracker frame, is shown in detail in FIG. 5, reference 500. Reference 510 is the physical tracker body, which may be in the form of a x-y-z set of sticks, but not always. At each of the three ends of this tracker frame, there are active electronics 530, 540, and 550. The active electronics might only include the simplest of timing and sensor I/O capabilities. The computation to turn the sensed signals into transform matrices typically would not be included in the tracker frame. Instead, the nearly raw sensor inputs would be passed down the data link, via cable 520 in this example. The number crunching on the data will be performed elsewhere in the EMDS. For example, this computation could take place within one or more of the embedded DSP elements on the headpiece electronics chip.

To put all this and what follows in context, two examples of pre-EMDS displays and the EMDSs that replace are described below.

Figure 6:
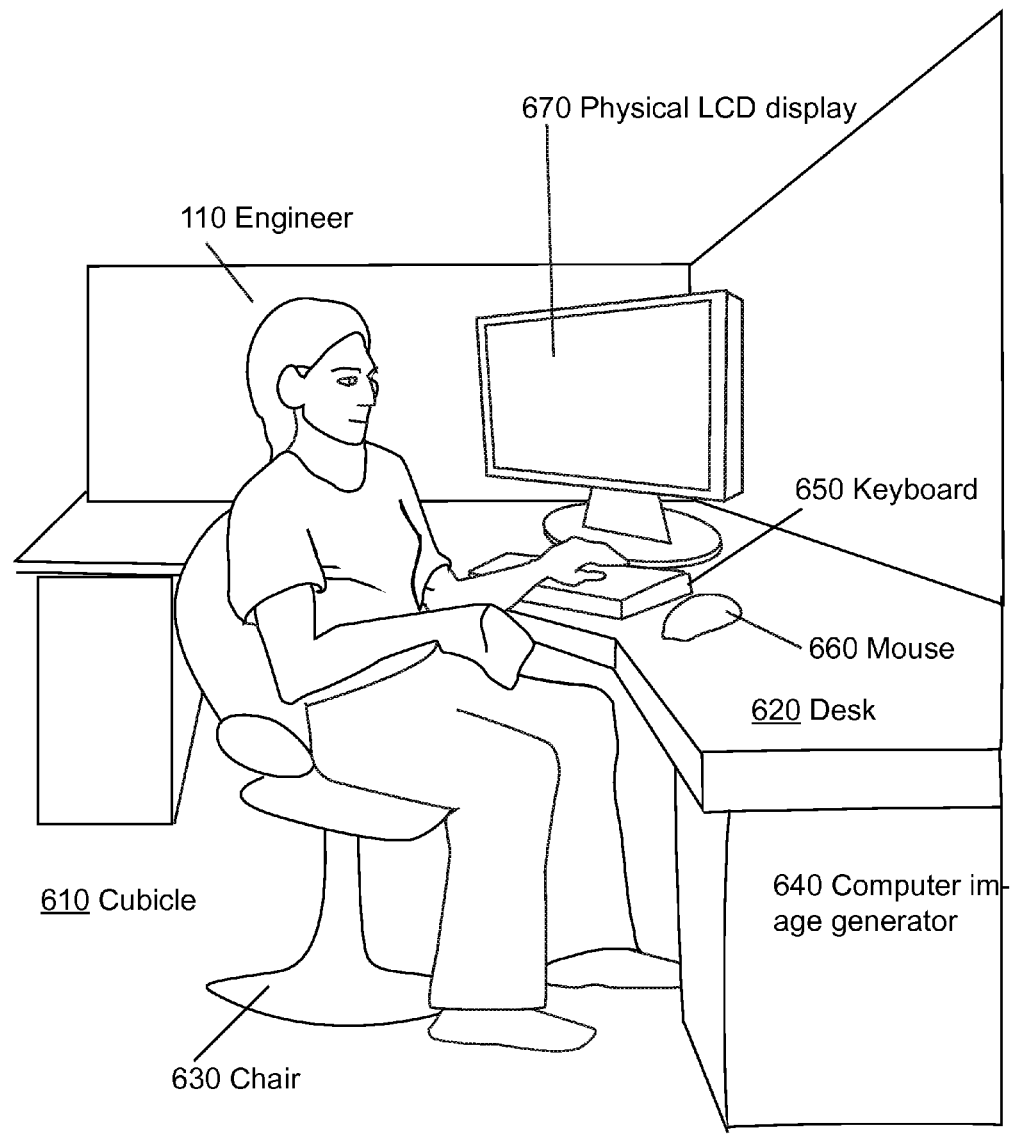
FIG. 6 (prior art) shows a computer workstation with a single direct view physical LCD display.
Figure 7:
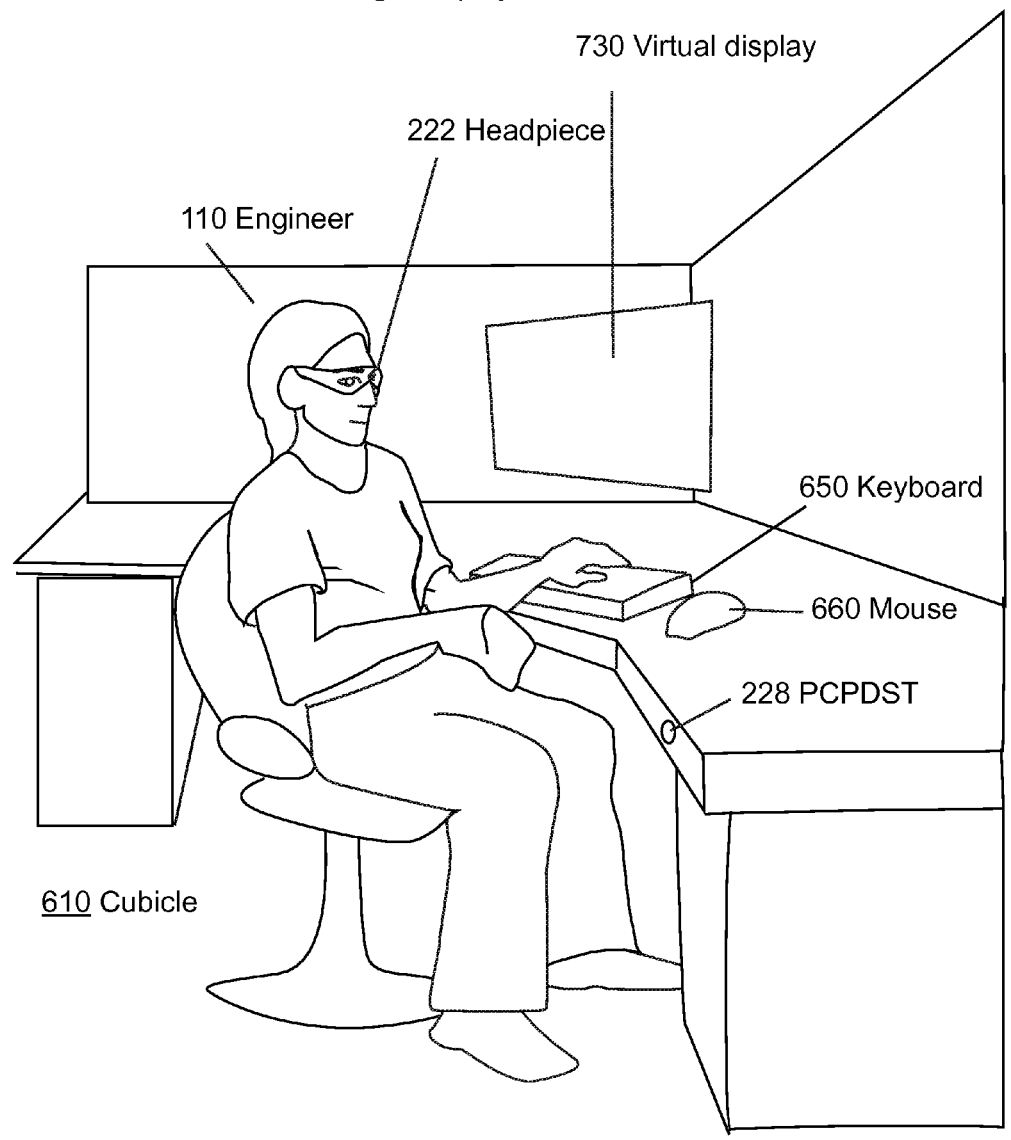
FIG. 7 shows an example of a computer work station with a single virtual display that has the same spatial position, orientation, and size as the physical display of FIG. 6.

FIG. 6, reference 600, shows a typical work cubicle 610 with a desk 620, chair 630, computer with integral image generator (e.g., a graphics card) 640, keyboard 650, mouse 660, and a traditional direct view LCD display 670. The next figure shows what an Eye Mounted Display System can do. In FIG. 7, reference 700, everything is the same as in FIG. 6 except the user is wearing an EMDS headpiece 222, a wireless video transceiver the PCPDST 710 has been added, and the physical LCD display 670 is replaced by a virtual display 730 of otherwise the same characteristics. One other change is the fabric walls of the cubicle 610 are preferably a dark black fabric and the top of the desktop is also preferably made of a black material. This will increase the contrast of the virtual images against the physical world, without the need for overly low ambient lighting or overly dark shades on the headpiece.

Figure 8:
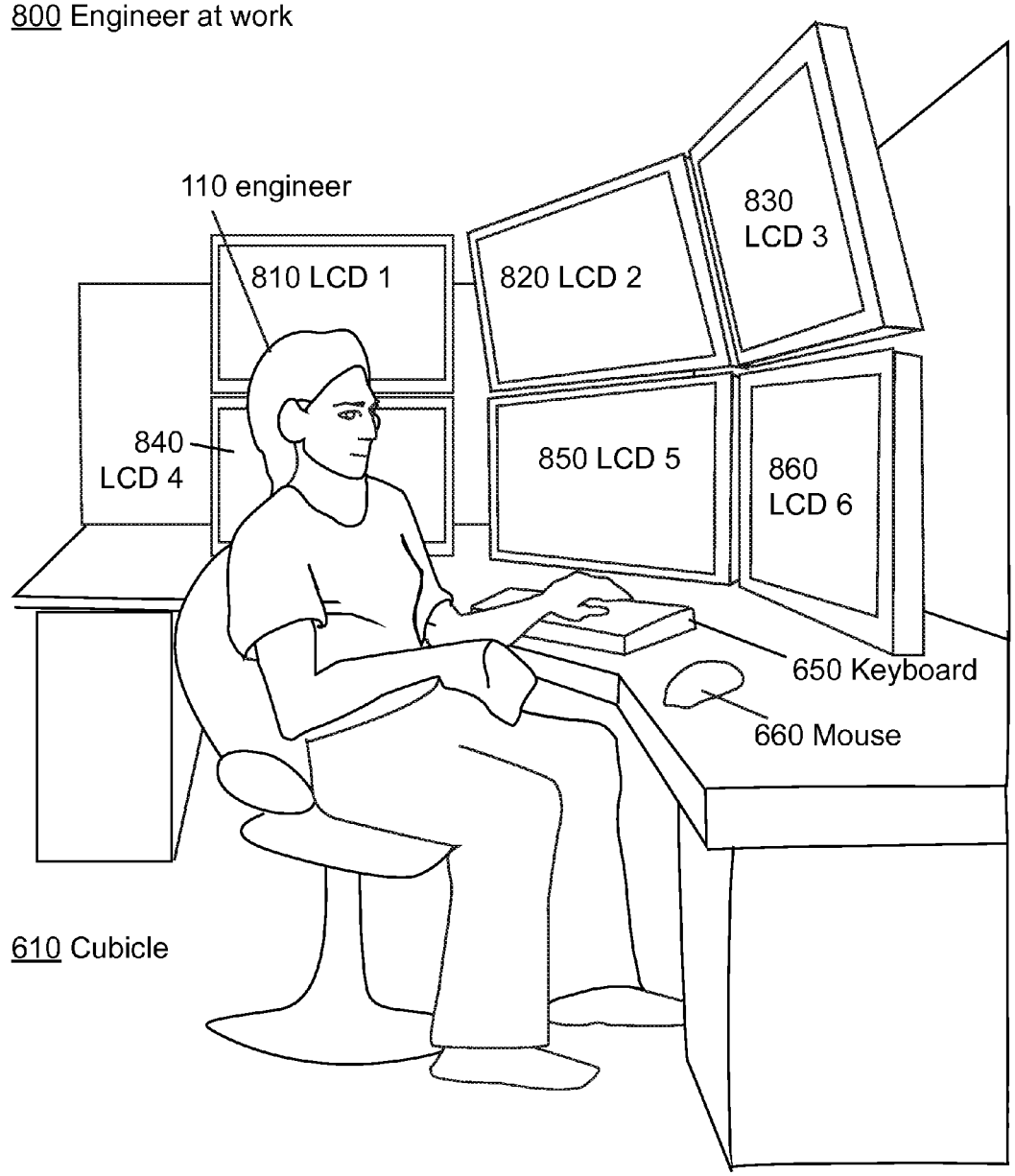
FIG. 8 (prior art) shows an example of a computer workstation with six direct view physical LCD displays.
Figure 9:
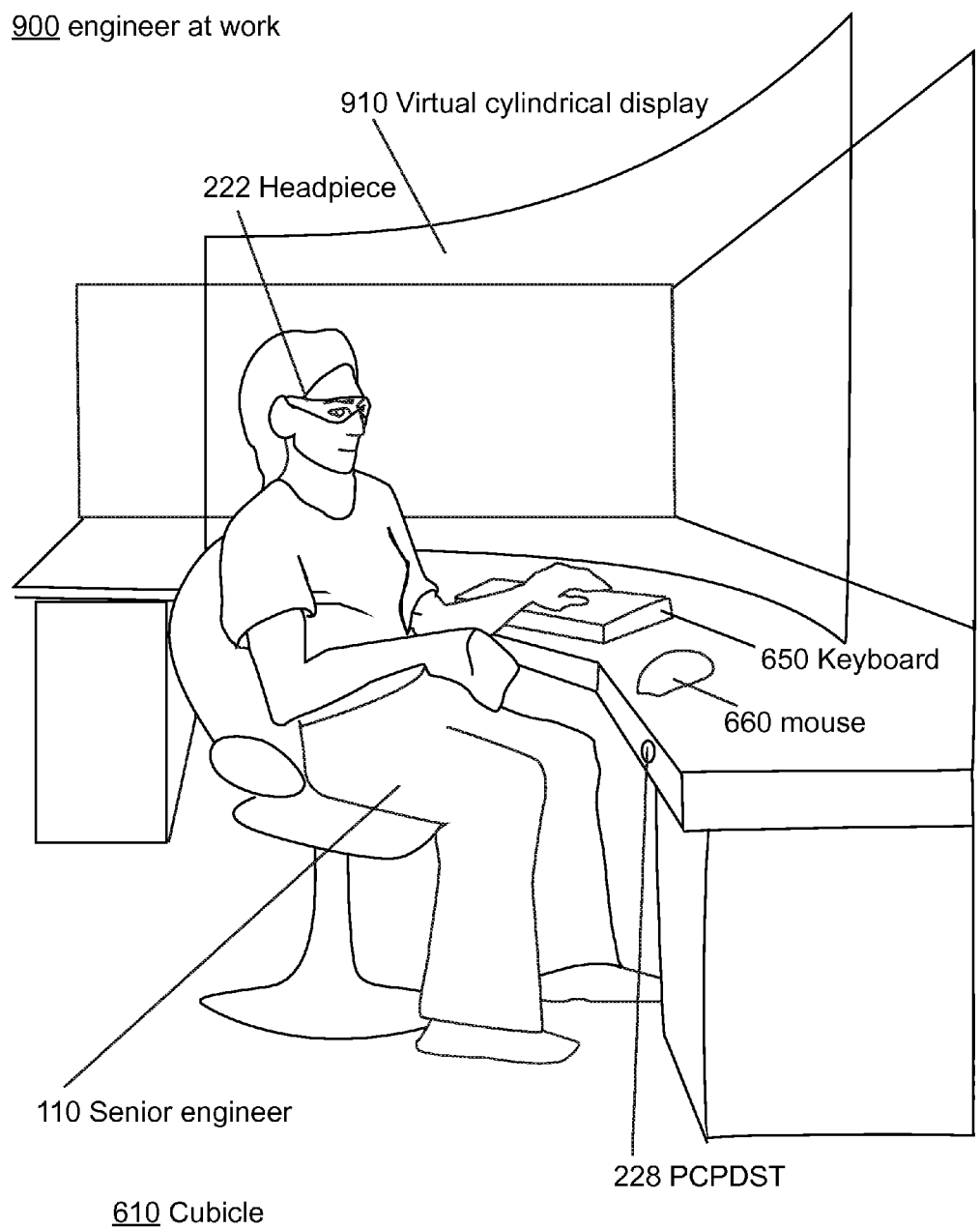
FIG. 9 shows an example of a computer work station with a single cylindrical virtual display that has substantially the same spatial position, orientation, and size as the array of physical displays shown in FIG. 8.

A more interesting example is when more money has been invested in LCD displays. FIG. 8, reference 800, shows a work cubicle 610 with not one, but six physical LCD displays: 810, 820, 830, 840, 850, and 860. Now the (almost) same EMDS of FIG. 7 can take in the six video outputs that in FIG. 8 were connected to the six physical LCD displays, and instead they are connected to six "scaler" virtual video inputs. FIG. 9, reference 900, shows the results: six virtual screens placed on a continuous cylindrical display 910, otherwise delivering the same visual information as the set-up in FIG. 8 does, but much more flexibly, and potentially at a lower cost. Note: rather than just projecting to a cylinder, the projected surface can be a more general elispse.

Figure 10:
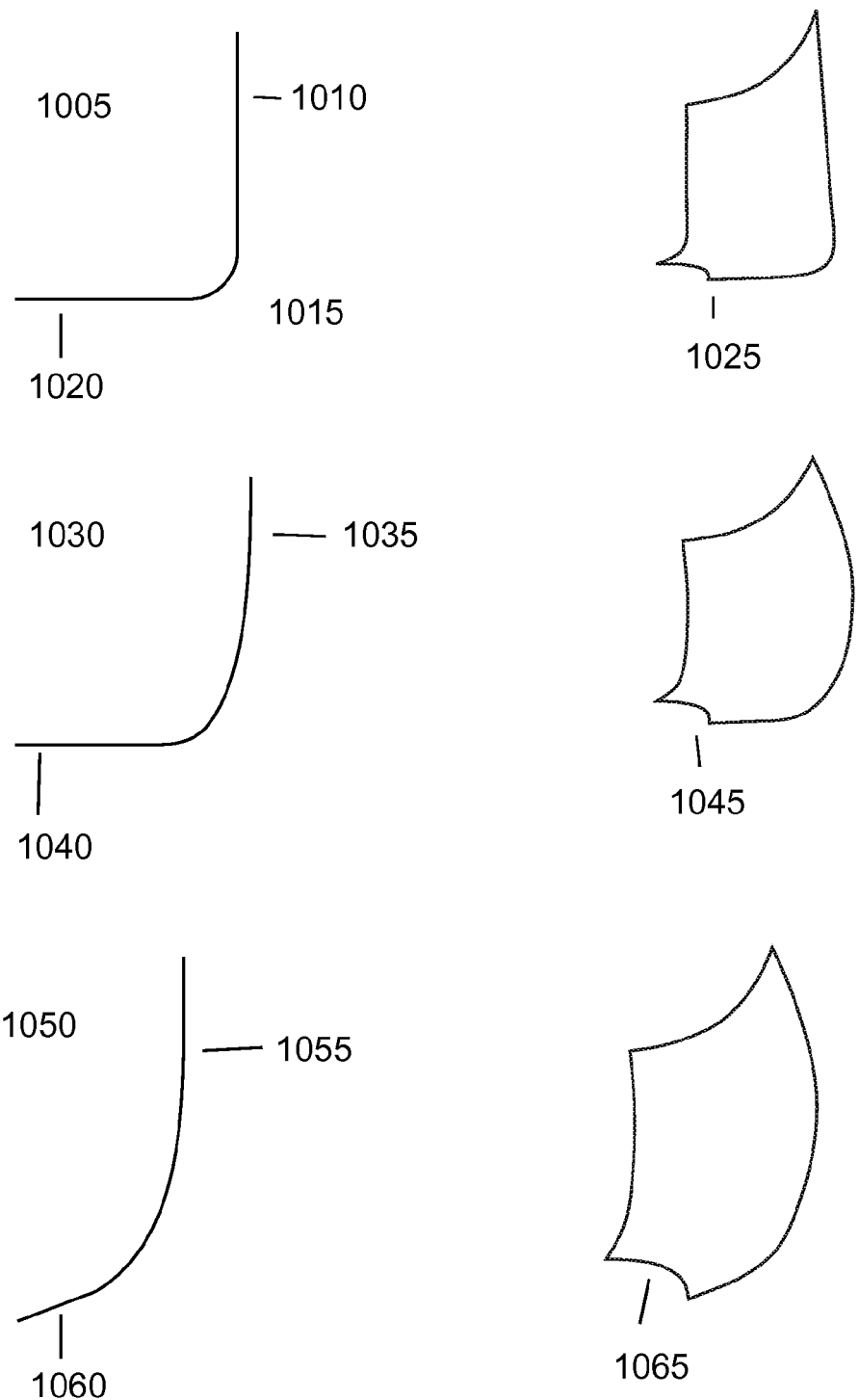
FIG. 10 shows three example virtual desk screen configurations.

More complex virtual display surfaces are possible and contemplated. FIG. 10 shows such additional types. The display 1005 has a flat desk surface 1020 as well as a flat (in the vertical) portion of the virtual display 1010, connected via a ninety degree circular section 1015 of the virtual display. Assuming circular curving, a three dimensional perspective view of this display is shown as reference 1025. The display 1030 has a flat desk surface 1040 as well as a parabolic (in the vertical) portion of the virtual display 1035, directly connected. Assuming circular curving, a three dimensional perspective view of this display is shown as reference 1045. The display 1050 is more appropriate for standing rather than seated use; it has a small tilted desk surface 1060 as well as a parabolic (in the vertical) portion of the virtual display 1055, directly connected. Assuming circular curving, a three dimensional perspective view of this display is shown as reference 1065. Three of the many ways in which such complex compound surfaces can be supported will be described. One method is for the scaler to directly support such compound surfaces. Another method is to dedicate a scaler to each one of the compound surfaces (e.g., 3 or 2 dedicated scalers). Another method is for such surfaces to be directly supported by the external image generator.

While the primary application of an EMD is to the human eye, and most of this disclosure will assume this as the target user base, an EMD can be made to work with animals.

II. Some Definitions and Descriptions

II.A. Types of Eye Mounted Displays

An eye mounted display (EMD) is a device that is mounted on the eye (e.g., directly in contact with or embedded within the eye) and projects light along the optical path of the eye onto the retina to form the visual sensation of images and/or video. In most eye mounted displays, as the eye makes natural movements, the display's output is locked to, or approximately locked to, the (changing) orientation of the physical eye. In this way, the projected images will appear to be stationary with respect to the surrounding environment even if the user turns his head or looks in a different direction. For example, an image that appears to be four feet directly in front of the user will appear to be four feet to the user's left if the user looks to the right. An example of an EMD is described in further detail in Section V.

An eye mounted display system (EMDS) is a system containing at least one eye mounted display and that performs any additional sensing and/or processing to enable the eye mounted display(s) to present visual data to the eye(s) emulating aspects of the natural visual world, and/or aspects of virtual worlds. An eye mounted display system may also allow existing standard or custom video formats to be directly accepted for display. Significantly, in some implementations multiple such video inputs can be simultaneously accepted and displayed.

One example is the emulation of most present external direct view display devices (such as CRTs, LCDs, plasma panels, OLEDs, etc.) and front and rear view projection display devices (such as DLP™, LCD, LCOS, scanning laser, etc.) In this case, an EMDS 105 could take "standard" video data streams, and process them for display on a pair of eye mounted displays (one for each eye) to produce a virtual display surface that appears fixed in space. Just as with most present external display devices, an industry standard cable, carrying video frames in some industry standard video format, is physically plugged into an industry standard input socket on some portion of the EMDS 105, resulting in the user perceiving a display (controlled emission of photons) of the video frames at a particular (changeable) physical position in space.

One advantage of eye mounted display systems compared to existing devices is that there is no bulky external physical device emitting the photons. In addition, a large number of separate video inputs can be displayed at the same time on the same device. Also, EMDS 105 can be constructed with inherent variable resolution matching that of the eye, resulting in a significant reduction in the number of display elements, and also potentially external to the EMDS computation of display elements. Furthermore, in embodiments of eye mounted display systems that are implemented with high accuracy, they can produce imagery at the human eye's native resolution limits.

Not only can eye mounted display systems potentially replace existing display devices, because multiple video feeds can be accepted and displayed simultaneously (in different or overlapping regions of space), a single eye mounted display system could conceivably simultaneously replace several display devices. Furthermore, because eye mounted display systems are inherently portable; a person wearing a single eye mounted display system could use that system to replace display devices at a number of different fixed locations (home, office, train, etc.).

Eye mounted displays can be further classified as follows.

Cornea Mounted Displays (CMDs). Within this class, the display could be mounted just above the cornea, allowing an air interface between the display and the cornea. Alternately, the display could be mounted on top of the tear layer of the cornea, much as current contact lenses are. For example, see FIG. 63. In yet another approach, the display could be mounted directly on top of the cornea (but then would have to address the issue of providing the biological materials to maintain the cornea cells). In yet other approaches, the display could be mounted inside of or in place of the cornea (e.g., FIG. 64), or to or on the back of the cornea (e.g., FIG. 65).

Figure 58:
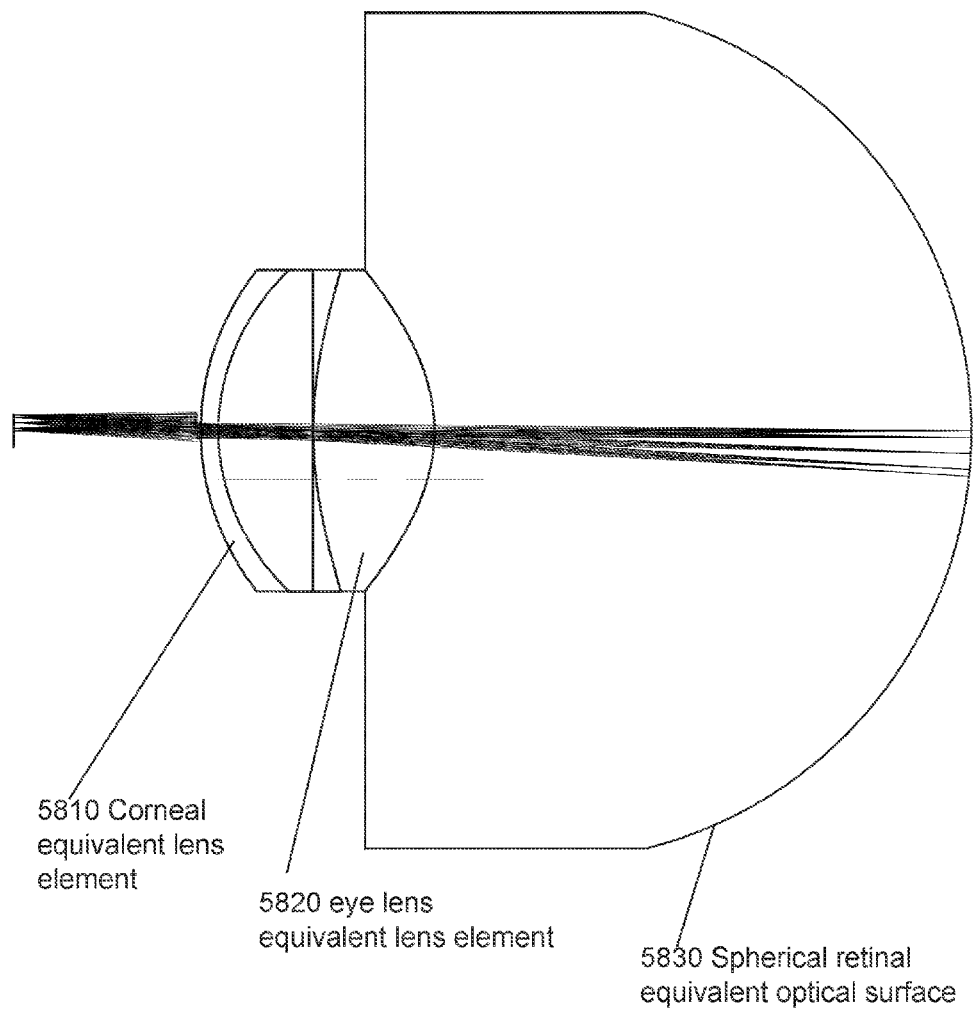
FIG. 58 shows a human eye optically modeled in the commercial optical package ZMAX.
Figure 59:
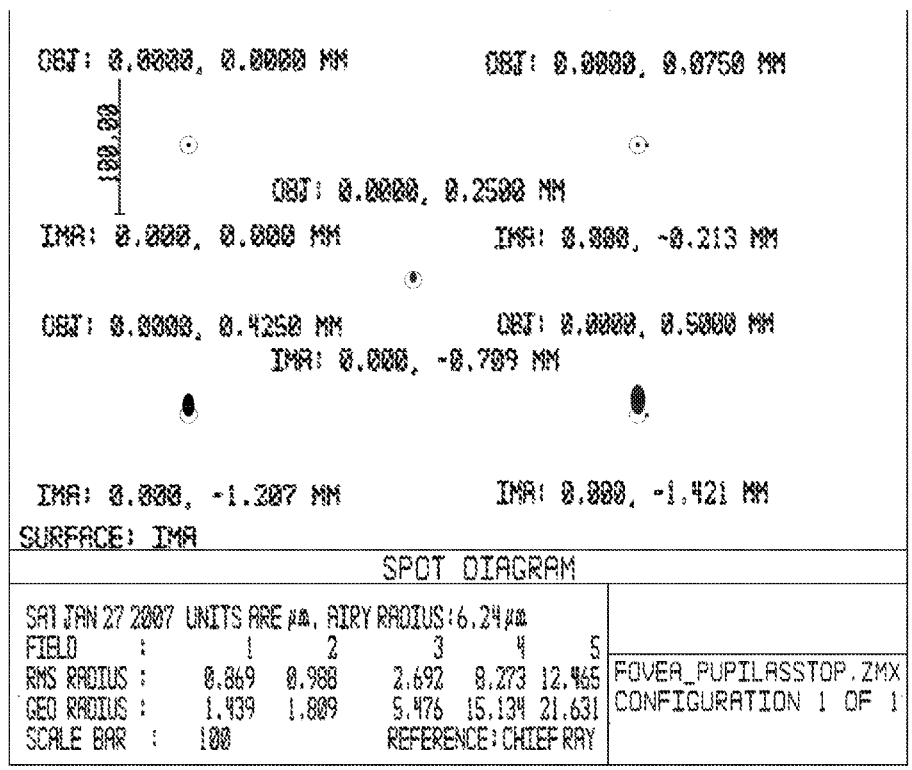
FIG. 59 shows spot diagrams of the divergence of the optical beams from different portions of the femto-display surface as produced by ZMAX

Contact Lens Mounted Displays (CLMDs). In this class of Cornea Mounted Displays, the display structure would include any of the many different current and future types of contact lenses, with appropriate modifications to include the display. Examples are shown in FIGS. 58 and 59.

Inter-Ocular Mounted Displays (IOMDs). In this class, the eye mounted display could be mounted within the aqueous humor, between the cornea and the crystalline lens, just as present "inter-ocular" lenses are (e.g., FIG. 66).

Lens Mounted Displays (LMDs). Just as an eye mounted display could be mounted in front, inside, behind, or in place of the cornea, instead these options could be applied to the lens, creating several more classes of embodiments. See FIGS. 67, 68, and 69. Replacing the lens with a LMD would likely be surgically very similar to current cataract solutions.

Figure 70:
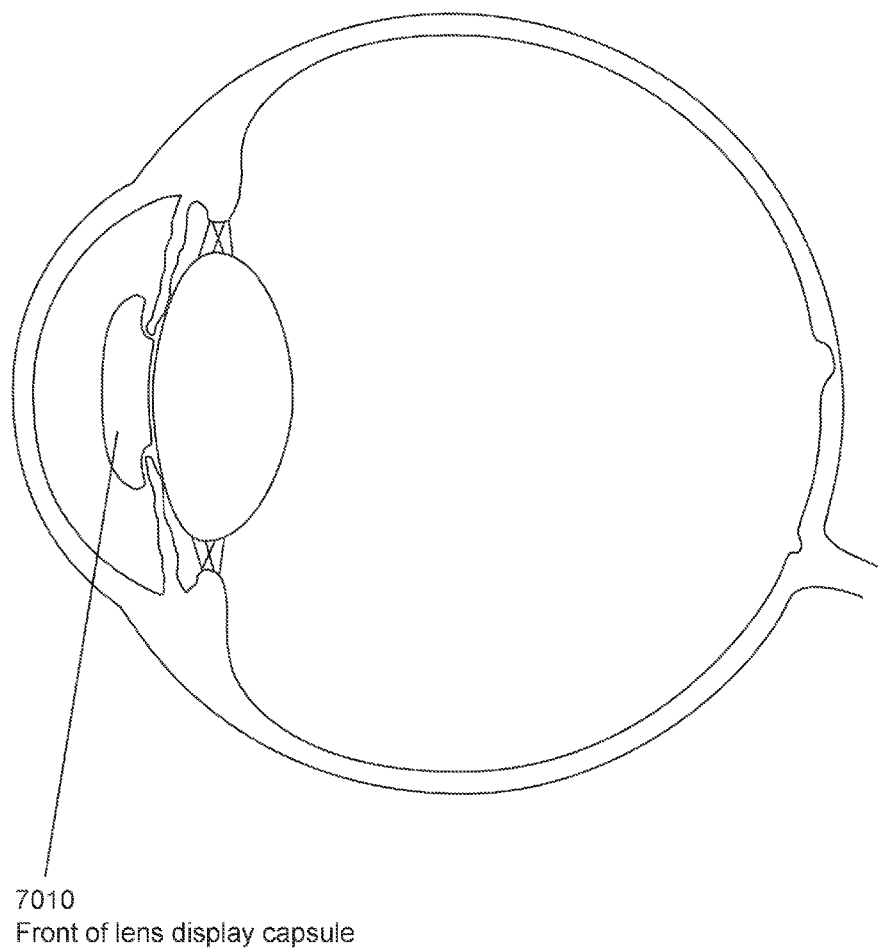
FIG. 70 shows a horizontal slice view of an eye mounted display attached to the front of the lens.

Posterior Chamber Displays. FIG. 70 shows a display which has been placed within the posterior chamber 1345, between the lens and the retina 1360.

Retina Mounted Displays (RMDs). In this class, the eye mounted display could be mounted on the surface of the retina itself (e.g., FIG. 71). In this particular case, fewer optical components typically are required. The display pixels (or similar objects) could be placed right above the cones (and/or rods) to be displayed to. However, the display must be able to be fabricated as a doubly curved object (e.g. a portion of a sphere).

Relative Size of the Eye. Like other parts of the human body, the diameter of the human eye varies between individuals. Specifically for adults, the variance is a Gaussian distribution with a standard deviation of ±1 mm about 24 mm, and most other anatomical parts of the eye generally scale with the diameter. Most of the literature implicitly or explicitly assumes an eye diameter of 24 mm, though sometimes a different diameter is given. Some types of data, such as angular measurements, are implicitly relative, and thus the size of the eye does not matter. But other measurements, such as feature sizes on the retinal surface, or the size of the cornea, or the size of the pupil, do depend on the size of the eye in question. So while this document for simplicity follows the convention of a default 24 mm diameter eye, eye mounted displays could be made available in a range of sizes in order to accomplish better fit and function for the majority of the populace.

II.B. Further Descriptions of Eye Mounted Displays

EMDs in Both Eyes. In the general case, for a particular user, eye mounted displays would be mounted on or in both eyes. This eliminates (or greatly reduces) binocular rivalry, increases perceptual resolution, and allows for display of stereo images. There also is a physical redundancy factor. That does not mean that just a single eye mounted display might be used in special cases: people with only one functional eye, some patients with strabismus and in certain special applications where display in only one eye is sufficient. The discussion below is generally focused on how to couple a display to a single eye. This is just for simplicity of exposition. Nothing in that description should be construed to mean that the most typical application would not be coupling displays to both eyes.

Femto Projectors. There are many different ways that the light generating component of an eye mounted display can control the emission of photon waterfronts that will focus on or about a particular photoreceptor of the eye (rods or cones). Many of these, if looked at in a certain way, roughly resemble various forms of video projectors, although at a vastly smaller scale. Also, such photon emitting sub-systems usually will not be able to address the entire retina. Many instances of them may be present in a single eye mounted display. To have a generic and consistent name for this entire class of photon emitters, the term "femto projectors" will be used. Femto, in this case, is not meant to indicate femto-technology, which is defined as having individual components in the femto-meter size range. Rather, the term femto projector is meant to differentiate such tiny projectors from small projectors currently called "pico projectors," "nano projectors"; the large "micro projectors"; and their larger cousins—just projectors.

Pseudo Cone Pixels. An EMD contains internal light emitting regions that will be defined here as pseudo-cone pixels. Each pseudo cone pixel, when emitting light, will cause a spot of light to excite some specific (after calibration) (possibly extended) point on the user's 110 physical retina. In general these pseudo cone pixels do not correspond exactly to the position and size of specific physical cones on the user's retina, but can be thought of as approximately doing that. Specifically, pseudo cone pixels projecting into the highest resolution central foveal portion of the retina may be somewhat larger than the actual cone cells. The lattice of the pseudo cone pixels (for example, an irregular hexagonal lattice) will not exactly match that of the physical cones, and in the periphery of the retina, pseudo cone pixels are sized to resemble the locked together sets of cones that make up the central portion of peripheral visual receptive fields.

However, for the computational task of converting "standard" video input into video data for non-uniformly spaced and sized pseudo cone pixels on an EMD, we can concentrate on the pseudo cone pixels as the target "pixels," and ignore the actual physical retinal cones (or rods). It is likely that future versions of the technology will allow pseudo cone pixels to be manufactured or configured to more exactly match a particular individual's retinal cone and receptive field lattice. While such systems should provide some incremental additional improvement in user 110 perceived resolution, such enhanced systems otherwise will be constructed quite similar to the systems described here.

Pseudo-Cone Pixel Shape. On the femto projectors on the EMD, one embodiment of the pseudo cone pixels could be hexagonal in shape. Hexagons are already more closely approximated as circles than as squares (in contrast to more traditional "square" pixels). However the hexagon spread function of light by the time that the pixels is imaged on the retina will be close to both the optical blur limit, as well as the diffraction limit (at least near the fovea). The end effect is that the hexagons will be distorted into very nearly circular shapes. This is important, because as various graphics and image processing functions are considered, they must usually think of pseudo cone pixels as circular, rather than square.

One must also take care with phrases like "imaged onto the surface of the retina." In the periphery, shapes imaged onto a theoretical sphere representing the surface of the retina will be quite distorted (due to the high angle of incidence), but the cones (and rods) of the retina "fix" this problem by tilting by quite a number of degrees to point at the output pupil of the lens. Thus the "real" imaging surface of the retina is quite different than a simple spherical approximation. Within the art described here, these more accurate effects are understood, and taken into account where appropriate. Thus, phrases like "the surface of the retina" are to be understood as meaning the more complex "real" imaging surface defined by the orientations of the light sensors on the retina.

One could also take into account the effect that as pixels are presented to higher and higher eccentricities, the light enters the cornea at higher and higher angles tilted away from the local normal to the surface of the cornea (as described in greater detail elsewhere in this document). While in general this extra tilt will help to keep pseudo cone pixels imaged onto the retina close to uniformly circular in shape, pseudo cone pixels at the extreme ends of the femto projector can become slightly elliptical when imaged onto the surface of the retina. While slight distortions usually can be ignored, at some point the retinal shape of pseudo cone pixels should be modeled as elliptical (or other distorted shapes). Fortunately the elliptical ratio is constant, and can be computed beforehand, or in some cases is a simple function of lens focus (which can be indirectly determined by the relative vergence in the orientations of the two eyes). In some of the processing steps to be described in following passages, this complication will at first be ignored, and then addressed once the full concept has been developed.

Pseudo Cone Pixel Data Steam, Frame of Pseudo Cone Pixel Data. The sequence of pseudo cone pixel data that is transmitted between scaler units and between the last scalar and the headpiece is referred to as the pseudo cone pixel data stream. Pseudo cone pixel data streams are split up temporally into separate video frame of pseudo cone pixel data. All the pseudo cone pixel data contained in a single video frame of such data being sent to the headpiece for display on the EMD is referred to as one frame of pseudo cone pixel data.

Pseudo Cone Pixel Video Frame Format, Pseudo Cone Pixel Descriptors. A frame of pseudo cone pixel data has a pre-defined fixed sequence of pseudo cone pixel targets on the set of femto projectors that actually display the data. Because all the (on the order of 40 to 80) femto projectors will be operating in parallel, the pseudo cone pixel video format cannot sequentially send the entire pseudo cone pixel data contents for one femto projector before sending any data to any other femto projectors. The constraints mean that pseudo cone pixel data for different femto projectors must be interleaved together in the pseudo cone pixel video format. This interleaving does not have to be on an individual femto projector basis, but it can. There is enough FIFO storage within the various processing elements that various forms of re-ordering are possible.

All the scalers fetch from their attached storage a video frame worth sequence of pseudo cone pixel descriptors. Each descriptor contains the geometric and other data that defines them: normal vector to its center, its normalized radius, its color, normalization gain and offset of the particular femto projector pixel it is targeted to, its femto pixel projector, and any femto projector edge feathering for seaming together with another neighboring femto projector. This is only one example collection of the contents of pseudo cone pixel descriptors; other collections and ordering within the video stream are contemplated and possible.

Each scalar will accept a stream of pseudo pixel data from the scaler behind it, except for the first, which will generate such a stream internally based on the pseudo cone pixel descriptors fetched from the attached storage, and send it on to the next. Depending on the physical world relative position and orientation associated with the frame of video input to a particular scalar, the scalar will contribute data only to a sub-set of all of the pseudo cone that pass through it. For this active subset, and given the internally fetched pseudo cone pixel descriptor, the scaler will generate a pseudo cone pixel value from contents its frame of input video. This data may replace the corresponding data for the same pseudo cone pixel destine for the same femto projector pixel, or let the input override the internally generated pseudo cone pixel data, or a more complex merge of the two values. In some simple cases of the edges of the rectangle that is the output virtual video screen, the merge function may be simple addition. If multiple layers of virtual video screens allowed to obscure portions of others, then an even more complex merge function must take place when, for example, one screen partially obscures another. In its most general form, merges between different pseudo cone pixels with same target cannot be performed until all of such pseudo cone pixels are present. One way to accomplish this is to leave in the stream both pseudo cone pixels, plus any partial pixel coverage information. This will require inserting into the pseudo cone pixel data stream more than one data frame for a single femto projector pixel pseudo cone pixel target; the number of pseudo cone pixels data frames that have to be taken up by these two will be at least two, and possibly more. In fact, as this un-resolved data merge propagates though the scalers, additional active pseudo cone pixels addressing the same target may be encountered, and the result will be a further enlarging of the data frames dedicated to the same target.

Will this enlarging of the data stream result in possible data under-runs to the EMD? Because of the FIFOs all over the EMDS 105, and because the scalars have 10% or more processing power available than otherwise needed, and because an upper limit on doubled and more pseudo cone pixels that may partially cover another can be computed, the "surge" in data for one target can be absorbed without compromising the data rate to the pseudo cone pixels. The computation to be performed is to sort out all the partial pixel coverage claimed on this pixel, and then merge together, in proportion to its coverage, all such than have not been totally obscured by another. This operation is the same or very similar to the operation of computing the continuation of various polygons in know sort order for antialiasing in the computer graphics literature. While many other methods are possible, one convent one is to let the last scalar in the chain perform this merging operation. Then the output from the last scalar to the headpiece will be free of any duplicate (or more) pseudo cone pixels. NOTE: each pseudo cone descriptor included a gain and offset for its target femto projector pixel. The question is, where should the normalization process occur? The most bandwidth preserving place is within the scalar as the rest of the pixel value is computed. Another place is in the last scaler in the chain; this might result in slightly improved numeric output values.

II.C. Components of an Eye Mounted Display System

Eye Mounted Display System. An eye mounted display system (EMDS) 105 usually will include at least three components: the eye mounted display (EMD) itself, an eye tracking component that provides accurate real-time data on the current orientation and direction of motion of the eye, and a head tracking component that provides accurate real-time data on the current orientation and direction of motion of the head (or technically, the headpiece attached to the head) relative to some physical world reference coordinate frame 230. There are some practical applications of EMDs that do not require the head tracking component. However, there are very few applications of an EMD that will work well without the eye tracking component. The eye mounted display system may also include other components, including possibly some or all of the following:

Eye Tracker. Typically, an EMDS 105 will know to high accuracy the orientation of the eye(s) relative to the head at all times. Several types of devices can provide such tracking. For the special case of cornea mounted displays fixed in position relative to the cornea, the problem devolves to the much simpler problem of tracking the orientation (and movement direction and velocity) of the cornea display. Special fiducial marks on the surface of the cornea mounted display can make this a relatively simple problem to solve. Other types of eye mounted displays may be amenable to different solutions to the problem of tracking the orientation of the eye to sufficient accuracy.

To generate the proper image to be displayed by an eye mounted display, the image formation preferably takes into account the current position and/or orientation of the eye relative to the head and/or the outside environment. Technically, eye orientation sensors typically will tell you where the eye was, not where it is now, let alone where it will be by the time the image is displayed to it. Thus it is desirable to track the eye's orientation at a rate several times faster than the display update rate, to allow accurate computation of the recent past rotational direction and velocity of the eye. This can be used as a predictor of where the eye will have rotated to by the time the image is displayed to it.

This same high sample rate time sequence orientation information about the eye can also be used to determine which of several different types of eye motion is in progress: saccades, drifts, micro saccades, tracking motion, vergence motion (by combining the rotation information from the other eye), etc. Tremor motion during drifts is likely fine enough to not be sense-able or to make much difference in the display contents. However, if it can be sensed, it can be used in determining fine orientation of the eye, if needed. While not technically an eye motion, many eye trackers 125 can usually also correctly detect eye blinks. As during saccades, the eye is "blind" during many of these motions, and in these cases no image need be computed or displayed. After any motion that shuts down visual input to the brain ends, there is an approximately 100 millisecond additional period in which visual input is still not processed. This allows EMDS 105 that have their own latency time to determine where the eye is now (e.g., that the motion or blink has finished), start computing the correct image to be displayed, and transfer that image to the EMD and display (emit photons) before the eye starts seeing again.

The eye, as a sphere, has three independent degrees of freedom relative to its socket, requiring its orientation to be described by three independent numbers. In many cases, using an appropriate representation of orientation, the eye only uses two of these degrees of freedom, as described by "Listing's Law" but the law varies with vergence. Also, during pursuit motions, the eye ignores Listing's Law to keep the target centered in sight. Thus in general, an eye tracker 125 preferably would sense all three possible independent dimensions of orientations of the eye, not just two. However, the orientational deviations from Listing's Law are known to be within a specific small range, and an eye tracker system can take advantage of these limits.

The eye motion information is also needed to correctly simulate retinal motion blur, if such blur would have occurred when viewing a physical object under similar circumstances. This computation is effected by the duty cycle of "lag" time of the physical display elements, as well as the current eye motion over the native display "frame" time and head/body motion over the same period. More details on the required computation will be described later.

Most eye mounted display applications will require the displayed image to appear stabilized with respect to the physical space around the user. In such cases, in addition to the rotational position and velocity of the eye relative to the head, the position and orientation of the user's head (and thus body) relative to the physical space around the user should be known, along with computed temporal derivatives of these values to allow prediction. Some types of eye trackers 125 can give both eye and head tracking 120 information, but usually it is simpler and more accurate to separate the two functions: an eye orientation tracker, and a head position and orientation tracker, as described in the next section.

When trying to determine the orientation of the eye within the angle formed by one foveal cone or less, an accuracy of plus or minus one arc minute or less is preferred in each dimension. Eye mounted displays potentially allow new inexpensive accurate techniques to be employed to achieve this accuracy.

Head Tracker. Head trackers 120 usually accurately sense six independent spatial degrees of freedom of the human head relative to the physical space around the user. One common partitioning of these degrees of freedom is three independent dimensions of position and three independent dimensions of orientation. To keep the terminology simple, the discussion that follows will use this common convention, with the understanding that there are many other ways to represent spatial information about the human head, some of which may have advantages over others depending on the specific embodiment of the head tracker 120.

Just as with eye trackers 125, most sensed information about the head usually tells one about the past, and so the same sort of super display frame rate sampling can be employed to compute temporal derivatives of the head tracker 120 data (or other data computed from it), which in turn can be used to predict where the future orientation and position of the head will be, good for the time frame in which the next image frame will be displayed.

By calibrating the positional and orientation offset from the native coordinates of the device attached to the head relative to the center of the two (or one) eye(s) of the user, the combined head tracker 120 and eye tracker 125 information describes in physical space the narrow view frustum for each cone (or rod) of the retina, within a certain degree of error. The frustum can be more simply represented by a vector in the viewing direction of the cone (rod), and a subtended half angle of a conical viewing frustum, describing the cone's (rod's) field of view. This information can be used to form the image presented by the eye mounted display(s).

Most existing head tracking technologies do not directly sense orientations, but use three (or more) separate positional measurements to three (or more) separate points on the headpiece, and then triangulate (or higher order fit) that data to produce the desired orientational information. Even the positional measurements are usually not made directly. Usually the same target on the headpiece is sensed from three (or more) different physical positioned sensors, and this data is triangulated (or higher order fit) to produce the desired positional information. What is actually sensed varies by device. Some sense the distance between two sub-devices, some sense the orientation between two sub-devices, etc. Some devices attempt to sense head orientation directly, but such devices suffer from rapid calibration drift (on the order of tenths of seconds), and typically are re-calibrated by a more traditional six degree of freedom head tracker 120.

Because of the way the final information is put together (a common example is multiple stacked triangulations, not always with very long base lines), the final accuracy of the head position and orientation data will usually be less than the native accuracy of the various sensors used to generate the raw data. How much accuracy is lost (and therefore how much accuracy is left) can be estimated by performing a numerical analysis of the initial raw accuracy as it propagates through to the final results. This can also be checked by measuring the actual information produced by the head tracker 120 in operation against known physical locations and orientations. It is useful to distinguish between relative and absolute (and repeatable) accuracy. Some head trackers 120 may give highly accurate position and orientation data relative to the data it gives for nearby positions and orientations, but the absolute accuracy could be off by a much larger amount.

For eye mounted display applications, the orientational accuracy of a head tracker 120 preferably should be close to the orientational accuracy of the eye tracker 125: approximately one arc minute or less. The positional accuracy of the head tracker preferably will be good enough to not induce shifts in the display image of any more than the angular accuracy. Given that a single foveal cone is on the order of two microns across, for a (virtual) object six feet away, a positional error of not much more than 100 microns is needed to keep the error comparable to a one minute of arc orientational error.

Headpiece. Technically, most head trackers 120 do not track the position of the head, but rather the position of some device firmly fixed to the user's head. So long as this device keeps to the same position and orientation with respect to the head to within specified limits, knowing the position and orientation of the device attached to the head gives accurate position and orientation information about the head itself. While there are several different possible ways to have devices physically attached to the head, for the purposes of exposition and simplicity, the EMDS 105 described in this document will usually assume an embodiment of a single physical device worn on the head of the user, called the headpiece, upon which many different things may be mounted. The headpiece in most cases does not include the two (one) eye mounted display device(s) mounted to the eye(s), or implanted elsewhere within the eye's optical path. Again, this is only one example used for simplicity of exposition. The same results can be achieved by multiple devices not all attached to each other, or in some cases, just marks painted on the user's head, or nothing at all.

The headpiece could take on many forms. It could look like a traditional pair of eye glasses (but without any "glass" in the frames), or something more minimal, or more complex, or just more stylish.

The devices likely to be attached to the headpiece include the following: elements of the head tracking system (active or passive), elements of the eye tracking system, the device that transmits the image data wired or through free space to the EMD proper, the device that receives wired or through free space back channel information from the EMD proper, possibly devices that transmit power wired or through free space to the EMD proper, corded or cordless devices to transmit the image data from other portions of the EMDS 105 to the device that forwards the data to the EMD proper. Devices that could be placed elsewhere, but in many cases might be attached to the headpiece include the following: the computational device that processes raw eye tracking, the computational device that processes raw head tracking data, the computational device that processes eye and head track data into combined positional estimates, orientational estimates, and estimates of their first temporal derivatives. Depending on the larger system design, the image data may have one or more of the following operations performed on it: decryption, decompression, compression, and encryption. Also, as most new digital video standards also carry high quality digital audio data on the same signal, the headpiece could have provisions to output analog or digital forms of this data through an audio output jack. Alternately, the headpiece could have some form of audio output (earbuds, headphones, etc) directly built into it.

Transmission of Signals Between Components. An eye mounted display system will include a number of sub-systems, which will communicate with each other. Depending on how the sub-systems are partitioned and constructed, different methods of communicating data between them are appropriate. In many cases free space communication is not necessary, and physical interconnects (electrical, optical, etc.) are sufficient. In general, wherever possible, industry standard physical layers that meet the bandwidth and latency requirements between two sub-systems should be used, and the use of corresponding industry standard protocol layers again where possible. One good example is the use of the 10 mega-bit, or higher, Ethernet standard. In other cases, sub-systems may be located so physically close that direct wiring between them is possible (e.g., on the same PC board).

Finally, when linking one or more components of the EMDS 105 that are not located on the user, e.g., not being worn, to some part that is being worn, it is desirable that a short free space connection be utilized, so that the user does not have to be "tethered." Current spread-spectrum short distance wireless interconnects utilizing standard Ethernet protocols are one example of existing hardware that meets the un-tethered requirements. In other applications, such as game systems, tethering may be less of a nuisance, worth the cost reduction, and/or tethering of other devices was already required.

Video Input Raster. The physical electrical (or optical or other) transport level of the video to the EMDS 105 may be any of many different standard or proprietary video formats. The most common consumer digital video formats today are from the related family of DVI-I, DVI-D, HDMI, and soon UDI and the new VESA standard. HDMI and UDI also contain digital audio data, which an EMDS with headphones, earbuds, or other audio output may wish to use. There are also a number of industrial digital video formats, including D1 and SDI. The older analog video formats include: RGB, YUV, VGA, S-video, NTSC, RS-170, etc. Devices are commonly available to convert the older analog formats into the newer digital ones. So while a particular EMDS product may have additional circuitry for performing some or all of these conversions for the user, for the purposes of this discussion we will concentrate on what happens after the video raster has been converted to, and presented to the EMDS, as an un-encrypted digital pixel stream. Specifically conventional issues such as de-interlacing, 2-3 pull-down reversal, and some forms of video re-sizing and video scaling will also be assumed to have been performed prior to presentation to the EMDS, or in additional EMDS pre-processing circuitry that will not be discussed further here.

Different video formats employ different color spaces and representations. A given EMDS 105 component may also employ its own specific, and thus not necessarily standard, color space and format. So in addition to any "standard" color space conversions that may have been applied in earlier stages (including brightness, contrast, color temperature, etc.), an EMDS will usually have to perform an additional color space transform to its native space. In many cases this transform can simply be folded into a combination transform that already had to exist for conversion of video input from various standard color spaces. Specifically, because of the nature of the computations that will be performed on the input video data, in the preferred environment the internal color space for most of the processing will be a linear color space. Any non-linearities in the actual pixel display elements are converted after most of the rest of the processing has been performed. Now, on the one hand, converting to a linear color space requires more bits of representation of pixel color components than non-linear color spaces. On the other hand, once inside the EMDS, we know the maximum number of linear bits that each pixel of the EMD is capable of displaying, and what, if any, dithering is going on. Thus the internal linear color space representation of pixel color components can be safely truncated at some known maximum.

Eye Tracking, Dual Eye Support. In addition to the head tracking component, an EMDS 105 typically also includes an eye tracking component. Note than in some cases, such as a cornea mounted display (CMD), the "eye" tracker 125 may not need to track the eye directly, but can instead track something directly physically attached to the eye (e.g., the CMD device). Also, while we will focus on the processing needed to provide data to one eye's EMD, an EMDS will usually support parallel computation of slightly different data for the EMD in each of the two eyes supported. Such stereo display support is important even when viewing mono video sources. Among many other advantages, this will keep eye fatigue and possible nausea to a minimum. While it is the goal of one embodiment that a single scaler component (described below) will be able to process and generate output for both eyes in the most complex input case, so long as provisions are made to deliver input video data to two scaler components in parallel, each handling a single eye each, a doubling of the maximum processing obtainable by a single scaler component is easily achieved (at the price of approximately doubling the cost of the scaler element).

Scaler Element, Scaler Component, Scaler Black-Box. In the logical partitioning of an eye mounted display into four elements, presented in FIG. 1, one of the logical elements was named the scaler 115. Computations related to the conversion of normal raster video data to the special display needs of an EMD are performed by this unit. Physically, the scaler element might be physically implemented as a single integrated circuit chip, perhaps with some DRAM attached, but the scaler element might be implemented as several chips, as eluded to in FIG. 2, in the multiple references 202 through 210, or as portion of a larger chip, as will be discussed later. So without narrowing the scope of this disclosure, in many examples a scaler component will be one-to-one with a physical integrated circuit chip, plus some attached DRAM. Because scaler components can be daisy-chained together, in some examples a collection of scaler components may be referred to as a "scaler black box," where the logical element scaler may consist of more than one such black box.

Scaler Component Technical Details. Generally the input to an EMDS 105 is some form of rectangular, scan line by scan line sequence of pixel data, as defined above as the Video Input Raster. However, the type and format of data that the EMD proper consumes can be quite a bit different. In some embodiments, the EMD consumes a sequence of pseudo cone pixel data, usually interleaved so that multiple femto projectors can be displaying their native format of photon data. While nearly all existing Video Input Rasters (not compressed video data) are uniform in pixel density (though not always color density), pseudo cone pixels most certainly are not. Converting from the standard input formats to the desired output format is the job of one or more scaler components. These components dynamically re-sample and filter the original video data into re-scaled pixels that match the requirement for each output pseudo pixel. Indeed, in some embodiments, a portion of the scaler element internal data buffers is set aside as storage for a target descriptor for each pseudo cone pixel to be generated per frame.

How individual components and collections of components are assembled to form a scaler element can be similar to what occurs many times on the other side of the video interface: video cards. Many modern PC video cards have the option of driving two displays at the same time through two separate connectors on the same single card. However, there may be a maximum number of pixels for dual displays that is less per display than what the card can do when driving only a single display. To get higher performance, a user may prefer that a single graphics card drive only a single display, or as in several PC gaming cards now, two or even four graphics cards can drive just a single display, with not quite linear increases in delivered graphics performance. The situations for components and collections of components in the scaler element can have similar dependencies.

Let us define the smallest unit capable of performing the computation of a scaler element within a defined set of constraints a scaler component. In many, but not all cases, this may take the form of a single ASIC with other support chips attached, such as DRAM. The scaler element of an EMDS 105 is defined as the entire collection of one or more scaler components that perform all the scaler computations for the EMDS. How many scaler components will be needed to perform the scaler function for an EMDS will depend on the number of video inputs, the size in pixels and pixel data rate of each video stream, the form of scaler desired (e.g. projection onto a flat virtual screen vs. projection onto a cylindrical virtual screen), type of stereo processing desired, details of the EMDs being used, among other factors. In certain special cases no stand-alone scaler element is required at all, either because the function has been embedded into another device (such as a cell phone), or the interfacing device is capable of generating correct pseudo cone pixel data streams, such as a "pseudo cone pixel aware 3D graphics rendering engine."

From a user point of view, there will be one or more types of physical scaler black boxes available, each with one or more video inputs in one or more video formats. Multiple such units can be daisy-chained together, before connecting to the free-space or physical cable connection to the headpiece. These "black boxes" will be differentiated in the number and type of video inputs on the box, and the limits on the scaler computations that they can perform, as well as the physical power that they require. Even for a given unit, the amount of physical power that they consume may be variable, depending on the amount of work they are required to perform. Thus a box that needs to be plugged into a wall when working with a complex deskside computer system may only need a battery or power from a USB port when being used with a mobile laptop computer. To support such functionality, the ASIC (if that is the technology deployed) can have built in the capability to turn off sections of the internal processors when they are not needed, as well as slow down the clock to the powered computations. In this way, two expensive ASICS do not have to be constructed. One chip can perform in each special environment.

Scaler Component Architecture. There are many possible internal architectures for the scaler component. One approach is to use a custom microcodable VLIW SIMD fixed point vector processor. Power can be saved by powering off individual ones of the MD units, and/or lowering the clock frequency to the processor. The microcode is not fixed, but is downloaded at system initialization time. In this way additional features can be added, or support of newer model EMDs is possible.

Stereo Support. While the output display is stereo, for the maximum comfort of the viewer, in most of the cases described here the input video is mono, and the physical display device being emulated is flat. However, with little additional hardware, the systems described here can also support field sequential stereo or separate left and right eye video streams.

Rod Vision. While much of the discussion that follows will be cast in terms of controlling light to individual cones of the retina (or in the periphery, specific neighboring groups of cones), the same technology will also deliver photons to the more numerous rods of the eye. The techniques described below in terms of cones equally apply to rods, only so long as lower overall light intensities are involved. A specific example might be an eye mounted display that is meant to be used with the user's night vision. Here the display intensity would be kept low enough to only engage the scotopic rod vision, and would produce a black and white display. This in fact could just be a "night vision" intensity setting of an eye mounted display that can also produce brighter images for photopic "daylight" display. Even though there are several times more rods than cones (80 to 100 million rods vs. approximately 5 million cones), the rods tend to group together as larger effective pixel units, and the spatial frequency resolution of scotopic vision is considerably less that photopic vision. Thus, any eye mounted display that produces anywhere near close to enough spatial resolution for photopic (cone) vision, can also produce more than enough spatial resolution for scotopic (rod) vision.

Safety. EMDs can be see-through, partially see-through, or opaque. For safety reasons, in general and consumer applications, it is preferable that the eye mounted displays be see-through, so that normal vision is not seriously affected by the eye mounted display. If a truly immersive application is desired, one can put on black out shades. The overall range of brightness of display of the eye mounted display can also be an issue. With a see-through design, the eye mounted display has to compete in brightness (photon count) with the ordinary external world. In a dimly lit office or home environment, this is not a hard goal. In direct sunlight, eye mounted display intensities of 10,000 times greater would be needed. This is by no means technically impossible, but a competing safety goal of making it impossible for the eye mounted display to ever cause permanent retinal damage may require an artificially limited maximum brightness of an eye mounted display. Such a display can still be used quite easily in sunlight, for example by wearing fairly dark sunglasses, or, more generally, programmable density filters to the external world, similar to current variable sunglasses or welding mask window technology. This cuts the brightness of the sunlit scene considerably, while not affecting the eye mounted display intensity, because the eye mounted display is "behind" the sunglasses.

See-Through Constraints. Some EMD designs inherently allow for see-through of normal (standard contact lens corrected, if necessary) vision of the real-world. When the EMDS 105 is off (or showing just black), the EMD will function purely as a slightly darkening contact lens. Other EMD designs only work as non-see-through. In this instance, the effect is similar to wearing a non-see-through HMD. As the (variable density) see-through design is the more general, and can always emulate non-see through designs by the simple expedient of having the EMDS wearer don a pair of total blackout glasses or goggles, most of the discussion here will be of the see-through design.

Just because a design is see-through does not automatically mean that it is simple to simultaneously operate in the existing physical world (say a business office) as well as seeing one or more virtual displays generated by an EMDS 105. As discussed elsewhere, a given EMD design may not be bright enough to compete directly with the brightness of even a normal office environment. One possible compromise is to darken the variable density shade in the headpiece to view mostly the virtual displays, and then un-darken them when needing to interact with the more brightly lit physical world. The switching from one to the other can be controlled by the head and eye tracker 125, if necessary, as they know when one is looking at the virtual screens versus the physical world. Thus the switching is seamless. An additional enhancement to allow for virtual displays to be only as bright as the (partially shaded) physical world is to have a region of very dark material (such as black felt) attached to locations in the physical world corresponding to where the virtual displays are placed. Thus when looking at the virtual displays there is no competing light from the physical world, and when looking at the physical world there is no competing light from the virtual world.

III. Making Electronics Devices Eye Mounted Display "Aware"

Before describing specific product combinations, this section presents a number of different ways in which an electronic device may wish to employ EMDS technology. There are many ways in which sub-systems can be configured with an eye mounted display(s) to create embodiments of eye mounted display systems. Which is optimal depends on the application for the EMDS 105, changes in technology, etc. This disclosure will describe several embodiments, specifically including the one shown in FIG. 2. In this example, portions of the EMDS 105 are worn by a human 110. The overall EMDS 105 includes the following subsystems: a daisy-chainable video input re-sampler subsystem (scalers) 202 through 210, which accept the video inputs 205 through 208, and 212 through 215, respectively, and additional I/O (optional) can also be provided from the logical I/O 218 through 220; a head tracker subsystem comprised of two parts, 230 and 232; an eye tracker subsystem also comprised of two parts, 235 and 238, and a subsystem to transmit in free-space the display information from the headpiece to the two EMDs 245 and 248 (left and right eyes).

Portions of these subsystems may be external to the human 110, while other portions may be worn by the human 110. In this example, the human 110 wears a headpiece 222. Much of the data transferred between the sequential scalers 202 through 210 and the headpiece 222, and the headpiece to the EMDs 245 and 248 is the pseudo cone pixel data stream (PCPDS) 225, to be described in more detail later. The transfer of PCPDS from the last scaler 210 to the headpiece 222 can be wired or wireless. If wireless (e.g., the user is un-tethered), then an optional element, the PSPDST pseudo cone pixel data stream transceiver 228 is present.

While the primary application of EMDS 105 are to the human eye, and most of this patent application will assume this as the target user base, an EMDS can be made to work with animals other than man.

III.A. Simple Example: An Eye Mounted Display Aware Digital Still Camera

We start with a simplified example of a digital still camera to introduce the concept of EMDS awareness. More complex examples will be described in section IV.

Figure 12:
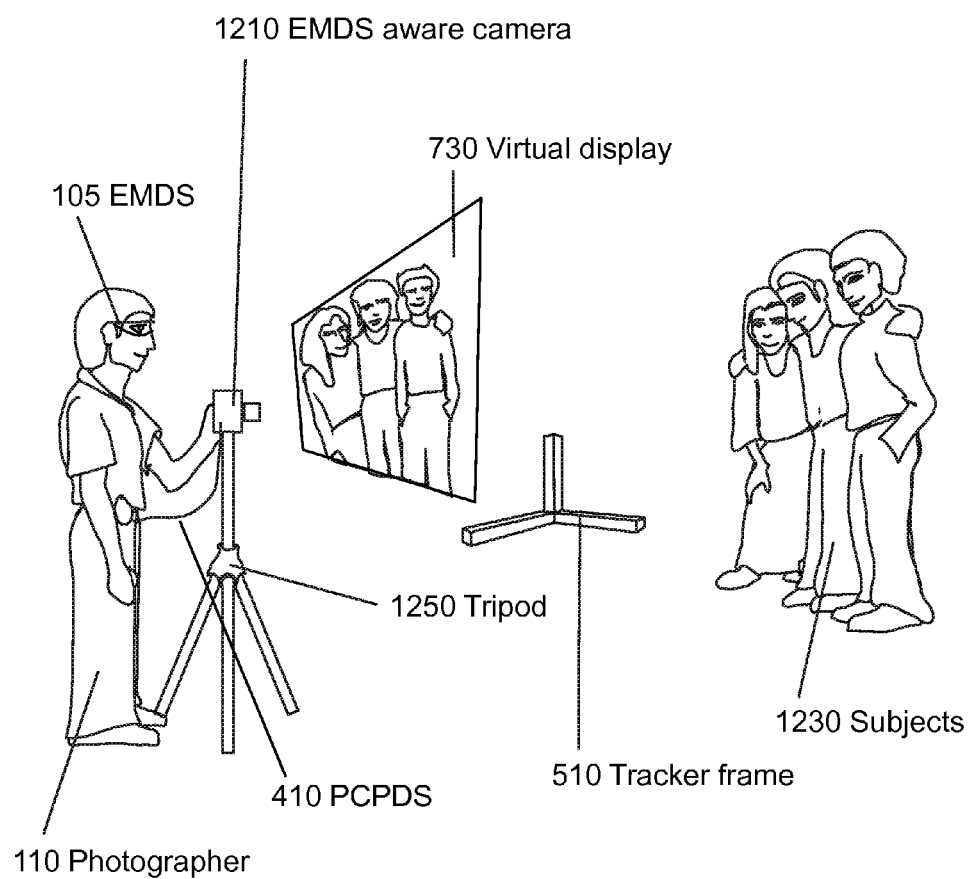
FIG. 12 shows a still camera using an EMDS as a viewfinder.

Most digital still cameras show a live but low resolution display of what the camera is looking at before the frame is acquired. This low resolution is due to using small, low resolution LCD (or other) display devices, typically fixed to the back of the camera. However, it is also due to the processing time it takes to convert what the camera's sensor sees (typically a Bayer array pattern) to an image that can be displayed in an RGB (or similar) format(s). However, a camera that is eye mounted display aware could be generating full camera resolution pixels for the small area where the camera user 110 is currently looking, and do less processing at higher visual eccentricities. This situation is shown in FIG. 12, reference 1200, where the photographer 110 wearing an EMDS 105 looks "through" the EMDS aware camera 1210 (a specific type of image generator 320) via the EMD's virtual display 1220, which is being used as a virtual viewfinder for the real-world subjects 1230. The display is thus also demounted from the camera body proper, allowing for a number of more flexible display effects.

Figure 14:
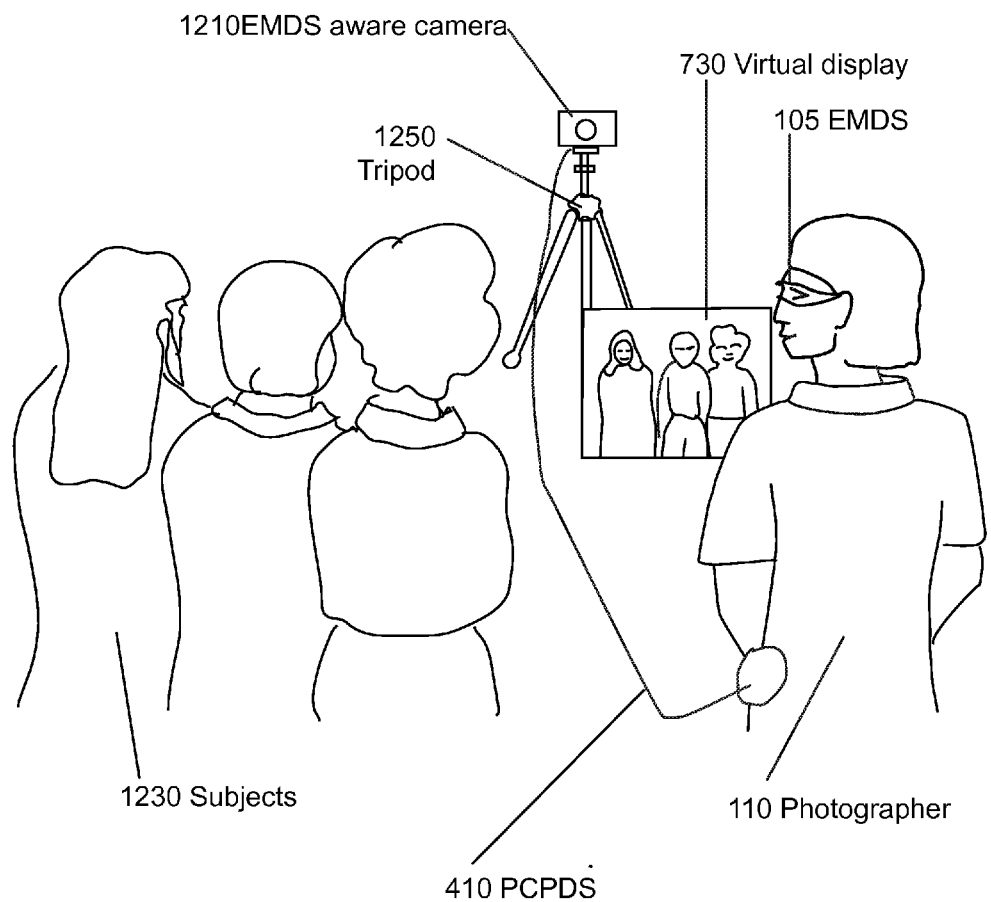
FIG. 14 shows a still camera using an EMDS as a viewfinder away from the camera.

One such situation in shown in FIG. 14, reference 1400, in which the camera operator 110 is remotely monitoring the shot through a virtual viewfinder 1220, via a physical cable, if necessary, to an EMDS 105 the operator is wearing, of a group pose of people 1420 that the camera operator 110 is in. Another option is for the camera operator to wear the camera on his head, or over one eye. Note that only minimal additional circuitry need be added to the camera's internal chip set, because in this special case, we know where not to process high resolution camera data. That is, camera data is processed at resolutions corresponding to the retinal regions where the data will be displayed. Similar functionality could also be applicable to digital video cameras.

III.B. Modifying the EMDS Scaler Hardware

In the previously described embodiments of eye mounted display systems, a scaler was described, whose input/output function was to take in one or more video streams, and convert them into a pseudo cone pixel stream for one or both eyes. This scaler had many possible extra features: seamless edge matching of multiple video streams, projecting onto a virtual display 1220 surface in the shape of a cylinder, proper seaming of one display image in front of another, etc.

For a lower power, lower weight, lower cost in a specific product that does not need all the functionality of a general purpose scaler computation, simplified scaler components can be designed, and in many cases could be placed directly on one of the special chips that the specific product already needed for its function.

A common simplification of the scaler computation is to assume the following: there is only a single video stream present; the virtual image of the video stream is flat in space; the maximum number of source pixels is known; and the minimum and maximum subtended field of view of the virtual image is known. These simplifications eliminate the need for supporting curved virtual images, the need for edge seeming or occlusion edges, the need for large image buffers beyond a fixed maximum, the need to triple buffer the image, and sometimes the replacement of the double buffer with a single buffer when this will not produce unacceptable image artifacts for the specific application. Furthermore, the bound on image size in pixels and extent in degrees places an upper bound on the computation rate that the scaler performs, which can allow for a lighter weight scaler sub-system, in some cases on one of the chips that was already needed for the primary functionality of the device. Because many low power, portable target devices already have a built in frame buffer, the primary addition to these devices may be the inclusion of the simplified scaler element. In some cases where the frame buffer size was arbitrarily limited by the pixel count of small physical LCD (or other) display devices, adding eye mounted display system awareness is also an opportunity to enlarge the internal frame buffer pixel count.

Figure 2:
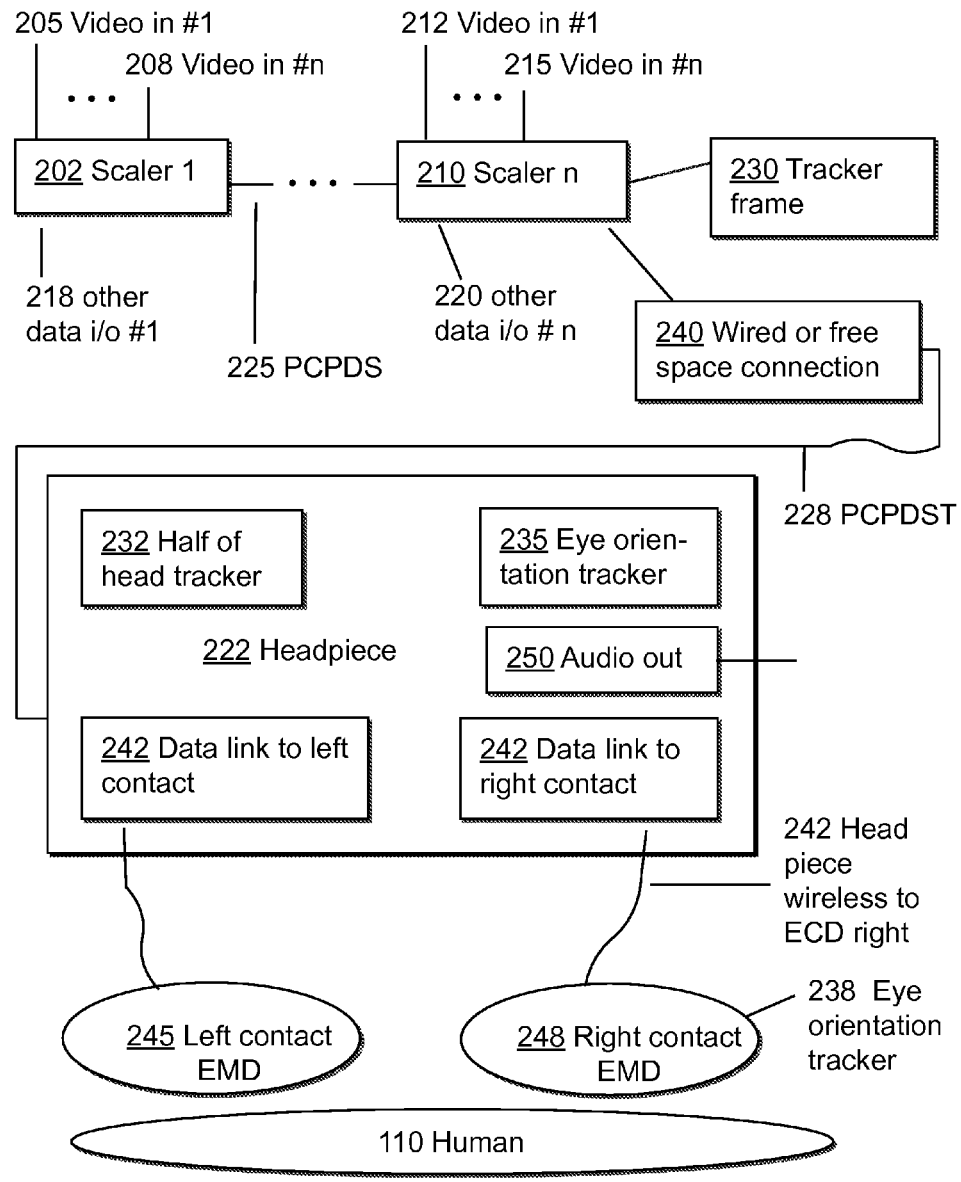
FIG. 2 shows one embodiment of a physical partitioning of an eye mounted display system.
Figure 13:
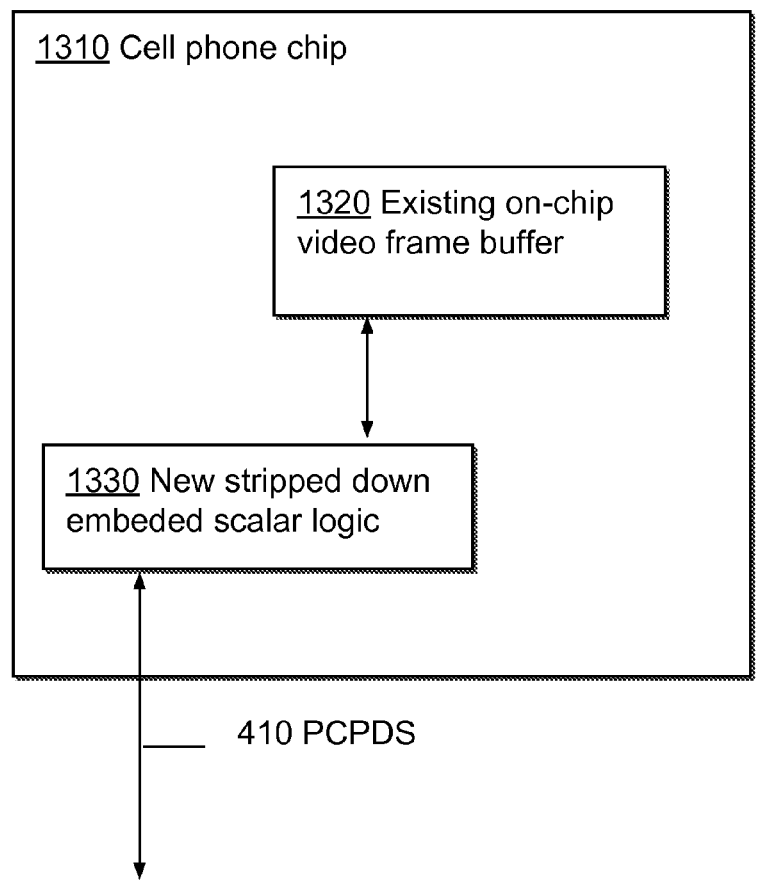
FIG. 13 shows how scaler functionality can be integrated with a cell phone chip.

This can be seen by comparing the on-cell phone chip scaler in FIG. 13, reference 1300, with FIG. 2. In FIG. 2, there are n full function scalers: scaler 202 through scaler 210. In FIG. 13, there is only one scaler 1330 using only a fraction of the die area on the cell phone chip 1310. Furthermore, rather than a separate (and perhaps off-chip) attached memory sub-system for containing a copy of the frame buffer within each scaler 202 through scaler 210, the scaler 1330 uses the existing frame buffer 1320 already present on the cell phone chip 1310. The output of the scaler 1330 is the PCPDS 225. A cell phone chip was used in this example, but the same approach can be used for many hand held battery powered devices that already present images to its human user 110: hand held games, hand held still and/or video cameras, PDAs, electronic books, etc. The existing chip and frame buffer can be used with only a small amount of additional circuitry for the scaler 1330 to make the device eye mounted display aware.

III. C. Eliminating the Head-Tracker

While in more general cases both head tracking and eye tracking may be performed, some applications may be adequately served without a head tracker 120.

One example could be cameras of all kinds. If the user 110 is holding the camera up to his eye(s), or the camera is attached to his head, then head tracking per-se is not required because the image input device has a fixed relationship to the user's physical head.

Other examples include cell phones and PDAs. While the advantages of the display appearing as a stabilized image in physical space might be desirable, for many simple tasks, having the display in a fixed portion of the user's 110 field of view can be sufficient.

III.D. EMD Awareness: Resolution

Many modern displays have a mechanism that allows sources of display outputs to determine what resolutions the display device supports. This information can be specific specifications sent over a serial identification protocol or it can be just the device identifying its make and model and the source can have an independently loaded table of information on this device. Nowadays, nearly all display technologies have a fixed pixel resolution for any specific product. This fixed resolution is called the "native" resolution of the display. It is measured in the number of pixels wide by the number of pixels high. In many cases the display refresh rate may not be continuous, but quantized into only a few or even just one update rate.

Note that most CRT's can accept video display signals well above the resolution that would make any difference in the quality of the image due to the way their analog interface works. With fixed pixel systems, such as LCD panels, extra computation is performed in real-time to down-scale video formats higher in resolution than the "native" resolution of the device. While there is some cost associated with including such circuitry, the legacy ability of CRTs to perform this task has meant that most fixed pixel displays include this feature. Also note that the reverse holds as well. Video inputs lower in resolution than the native resolution of the device are up-scaled and displayed. If the device has only one or a few native display refresh rate(s), again circuitry is usually added to emulate the continuous range of display update rates. Because the generators of video to the display devices are generally programmable in the display formats that they can generate, for the best "quality" display, it is common for the user to have the video circuitry generate as output the native resolution of the display device.

Because EMDS have a variable native display pixel size, the input video is usually re-scaled to match the more complex "raster" of the EMDS. Because the input video to an EMDS is (almost) always subject to processing by the scaler, the EMDS can accept a wide range of video resolutions. For the ones that it cannot, there are usually outboard devices that can convert the video signal into one that it can accept.

Looked at in one way, EMDS have no native video resolution. However when the effects of the real-time eye tracker are taken into account, it can be argued that an EMDS has a native resolution of its highest foveal pseudo cone pixels, and a very large number of pixels in width and height. This can be thought of as the first stage of "EMDS" awareness. Not only can nearly any video resolution be handled, but the virtual physical size of the display and distance to the display is programmable. In some of the simple cases to be described, the image generator just asserts that it is a display of a specific format, e.g. 1080p HDTV, or digital IMAX™.

III.E. EMD Awareness: Wide Field of View Aware

Most EMDs preferably support very wide fields of view (100° horizontally or more). Such capabilities are rarely found with other technologies. As described elsewhere, fields of view of 65° to 85° start to become very immersive. Thus devices can utilize the wide field of view for one or both of displaying a large amount of data, and causing immersion. The vertical fields of view are usually smaller, more likely 70° to 80° for full immersion, as described in the literature.

III.F. EMD Awareness: Stereo

Another level of awareness that an output device can have of an EMDS is to know that the EMDS supports stereo display. There have been two traditional ways to output the dual images per frame of stereo imagery to a display device. The first is known as "field sequential stereo." Here, for every frame of display, two fields of video are generated. This is a temporal multiplexing. The first field is a full frame of display for one eye (usually the left) and the second field is a full frame of display for the other eye. In an EMDS, the handling of stereo input is usually performed by the scaler. Normally, the scaler takes in a single field of video per frame, storing it (typically in attached DRAM), then later re-scaling it by separate left and right eye traversal channels.

To support field sequential stereo input, instead of storing one field per frame in a buffer, store two fields per frame in the frame buffer; then during output traversal, just point the left and right eye scaler elements at the two different buffers, rather than the same buffer.

The other common stereo video format is to have two separate (but synchronized in timing) video streams: one for the left eye and one for the right eye. Once again, this is relatively simple for the scaler to handle. The brute force solution is to have each video stream go to a different portion of the scaler, and then during pseudo cone pixel output, only start the left eye traversal in one portion and only start the right eye output in the other portion. However, if the scaler supports more than one video input per scaler "black box," then the two eye video streams can be consumed by one scaler on separate video input connectors, storing each port into a separate buffer and then performing the output processing identically to the method described for field sequential processing.

If the input video stream is too much for a single scaler "black box" to handle, then the work can be divided up between two or more scaler "black boxes" in the same manner as described before for high speed video inputs, but with the output pointing at the separate left and right eye buffers. This applies to both types of stereo input.

There are a number of less common stereo video formats: even and odd pixels are for the left and right eye, respectively; even and odd scan lines are for the left and right eye, respectively, etc. Additions to the video scaler sub-system can support these sorts of additional stereo video formats.

III.G. EMD Awareness: Head Tracking

There are two fundamentally different sources of stereo imagery that may be transmitted via stereo video formats. One is pre-computed or pre-photographed (film or digital, still or motion) left and right eye stereo images. With these, the stereo viewing matrices were bound at the time of acquiring/rendering the images and cannot be easily changed after the fact. Such stereo data generally cannot use real-time head tracking to produce different viewpoints into the stereo data.

The second type of stereo imagery is for example being computed in real-time by 3D graphics rendering card(s), or acquired in real-time by a remote set of telepresence cameras: either several fixed cameras (multi-channel stereo) or two cameras with their motion slaved to the motion of the remote viewer 110 (e.g., a fast robot head). This second type of stereo can take advantage of accurate head tracking information if it is available. Because in most configurations, an EMDS includes a high accuracy head tracker 120 portion, the solution reduces to an interface problem: how to get the head tracking data from some part of the EMDS to the image generating system. Simple interface formats such as USB™ are more than adequate to solve this problem but various forms of Ethernet, FireWire™, RS-232, RS-432, etc. also can work.

Let us further consider the case of a video source device that is rendering 3D graphics in real-time based on the continuously updated head tracking data provided by the EMDS 105. Such a system qualifies under most definitions as a "virtual reality system." Later this case will be split into different cases by the particular application involved.

If a video source device is capable of rendering stereo utilizing information provided by the head tracker component of the EMDS to create the left and right eye view matrices, then it qualifies as a "head tracked stereo" display.

III.H. EMD Awareness: Augmented Reality

For applications that employ some form of digital still or video camera (this includes film cameras that have an augmented video camera, and stereo or multi-channel cameras), if a view from this camera is displayed to the user 110 via an EMDS, but with the user still also able to see the real world in front of him, this describes the technology referred to as "Augmented Reality" (AR). The more physical and virtual camera parameters are aligned, usually the better. Therefore, ensuring that the video camera's field of view is matched to the field of view of the display on the EMDS is important. In one approach, the video camera is positioned just in front of the user's eye, blocking out all of the real world, but the camera's output will re-display the view via the EMDS. Such systems also work if the physical video camera is positioned above the user's eye, e.g., not blocking the normal physical view out of the user's eye. In another configuration, a video camera is worn on the user's head and points down to a 45° half silvered mirror in front of one of the user's eyes. Below the user's eye, there is a black material, so that the view not bounced off the half silvered mirror to the camera is essentially black. There are other ways to configure such a system beyond those simple ones described here, e.g., use of still rather than video cameras, stereo and multi-channel stereo cameras, other camera mounting points, other ways to achieve AR, etc.

Augmented reality awareness was presented in this section because many different applications can use the results of AR capability in their systems.

III.I. Eye Mounted Display Levels of Awareness: Virtual Reality

If one takes most any EMDS 105, and puts black-out shades over the eyes, e.g., the eye(s) are only perceiving photons generated by the EMD, and then uses real-time computer graphics rendering technology and techniques, and the graphics image generator "camera view matrix" is made to coincide with the head tracking data from the EMDS 105, then this describes the technology known as "Virtual Reality" (VR). The more the virtual world parameters are aligned with the physical world parameters (for example, how far down is the virtual floor depends on the height and head movement of the user 110), the higher the realism and generally the better the results (and reduction of "simulator sickness").

Virtual reality awareness was presented in this section because many different applications can use the results of VR capability in their systems.

III.J. EMD Awareness: Eye Tracking

Almost no systems in use today have the ability to take advantage of real-time extremely high resolution eye tracking data. Most systems that use eye tracking are specialty marketing advertisement evaluations, or for visual science research. To the extent that a more general purpose application might make use of eye tracking data, it can use it for focus of attention, but even this has caused glitches in the past where the intent of the user 110 was not always reflected in their eye orientation.

However, a graphics rendering system can take some advantage of knowing the location and orientation of both eyes without explicit knowledge or interface to the pseudo cone pixel data stream. Just knowing the general display resolution fall-off from the center of the eye for EMDS can allow a fixed density 3D rendering system still to obtain some performance advantage through a number of techniques: tessellating objects less in areas of low resolution, applying lower cost shaders in areas of low resolution, applying higher cost shaders in areas of high resolution, applying lower sampling density if possible in areas of low resolution, etc.

III.K EMD Awareness: Additional Object Tracking

Many other parts of the user's body and the physical world can be tracked than just the user's head and eyes. When using an EMD for head-tracked stereo display, it is convenient to have a 3D mouse. In the general case, such a mouse would track in xyz the position of a "wand tip" or other point relative to the coordinate frame of the 3D mouse. The 3D mouse would also track the (three axis) orientation of the 3D mouse body with respect to some coordinate system, usually the tracker frame physical coordinate frame. The 3D mouse would also have several buttons, etc. on it. For example, see Deering CACM "HoloSketch" for some details: Michael F. Deering. *The HoloSketch VR Sketching System. Communications of the ACM* 39(5), 54-61, 1996, which is incorporated herein by reference.

A more general tracking of the user would be to use a "data glove" (e.g., Scientific American, October 1987, which is incorporated herein by reference) where all the articulation of the user's finger joints are tracked, along with the xyz position and (three axis) orientation of the user's hand(s).

Another general tracking would be to use a "body suit." Now all of the user's significant joints are tracked, which is the equivalent to tracking all the xyz position and (3 axis) orientations of the major limbs and joints.

Tracking of objects other than the user's body can be performed, such as tracking additional users. Tracking beyond this can be useful for augmented reality, where the position and orientation of physical objects is made known to the controlling computer so as to allow the image generator to properly occlude virtual objects when they go behind real objects. One example application of this principle is "virtual sets" (The Virtual Studio: Technology and Techniques, Moshkovitz, Moshe, Focal Press, April 2000, incorporated herein by reference).

In many cases, the hardware and software already present within an EMDS supporting head and eye tracking may be used to support tracking of additional objects, such as a 3D mouse, or at least expended on in a compatible way to support more complex tracking such as a body suit.

III.L. EMD Awareness: Pseudo Cone Pixel Data Stream

At the opposite end of the spectrum of systems that treat EMDS 105 as if it were a simple flat LCD display, there are systems that are using the head and eye tracking data to render 3D data directly to individual resolution varying pseudo cone pixels. Such systems could typically be advanced virtual reality systems, or planetarium type displays. In both cases, the external rendering hardware image generator intersects rays from the viewpoints to the surface of a sphere, as opposed to the surface of a plane, as in most normal 3D graphics, or the surface of a cylinder, as one possible built-in mode of an EMDS scaler. Such image generators are not bound to use spherical rendering surfaces. Various polygonal (flat) piecewise approximations to a sphere will work as well. As one specific example, consider the case in which an image generator collection generates 48 channels of mono or stereo PCPDS onto a 48 triangle spherical approximation. The 48 triangles are placed as follows. First segment the sphere into eight equal parts by each of the three coordinate planes, e.g. eight octants, e.g. +x+y+z, +x−y+z, etc. Now segment each octant by the three planes defined by x=y, x=z, and y=z. This will generate six triangular facets per octant (and six times eight is 48). Now the image generators would use a standard flat image plane (e.g., not spherical image plane) to generate 48 PCPDS.

IV. Product Classes Combining Electronics Devices and EMDSs

Now that various "EMDS awareness" options have been presented, this section describes several classes of products that use EMDSs. The following is a rather long list, but it still is not exhaustive because EMDSs have the potential to replace nearly every existing category of display, as well as enabling many new ones.

IV.A. EMD Aware Digital and Film Still and Motion Cameras

Eye Mounted Display Aware: Stereo, Head Tracker, Eye-Tracker, Wide Field of View, Augmented Reality, Pseudo Cone Data Stream Many aspects of the consumer, prosumer, and professional categories of still and motion digital and film cameras, as well as motion digital and film television and movie motion cameras are shared. Most such cameras have a "viewfinder" of either a real world views (e.g., SLR cameras) or an image display (typically on small cameras, but also on SLR and other professional digital cameras). In motion picture applications, there may be more than one instance of the viewfinder. There may be an auxiliary LCD panel displaying the digital image for the director, while the cinematographer looks through the camera's primary viewfinder (typically optical).

To start with, a non traditional configuration of the camera and the user 110 can improve the camera interface. For example, the camera might be mounted on the head of the user, with one of the user's eyes covered by the camera and its lens, or covered by a tilted mirror reflecting light up to a heaver camera mounted on the user's head. By having the camera and the EMDS 105 display the camera foveal/peripheral pseudo cone pixels to the EMD behind the occluded eye, in a non-zoom mode the EMD image can look like a vignette image (by the camera's maximum field of view). Because the other eye is not covered, the vignetting will mostly disappear due to the stereo dominance of the uncovered eye. To show the user what will be photographed, a small border could be rendered on the occluded eye's EMD just outside the area of the camera's view. This will further indicate to the user where the camera will crop the scene when the user presses the shutter button and takes a picture or, in the case of a motion camera, will show where the continuous images are being shot. Various traditional displays of camera status (f-stop, speed, flash, etc) can possibly be displayed outside the active pixel area.

The previous example assumed a digital camera was present in the camera for previewing or continuous shooting. However, it is becoming more common for film cameras (still and motion) to use an additional output port (or the previous viewfinder port) to simultaneously shoot a digital image or motion sequence at the same time that film image(s) are being recorded. All of the description above applies to this case as well, and also applies to digital as well as to film.

Zoom can also possibly be added to such a head-worn camera system. For example, the rectangular area being displayed on the blocked eye's EMD can have its area shrunk to outline the correct narrow field of view of the zoom. Such an interface mode allows the user 110 to see normally, but the "capture" area will be smaller. This could be especially useful in applications where the outside context is important, such as sports or nature photography. Alternatively, the "insert" on the blocked eye can be kept at its full field of view size, but the contents replaced with the zoomed image. To reduce the effect of binocular rivalry, the non occluded eye can be closed or blocked. Many wide field of view lenses, so-called "fish-eye" lenses, have some amount of distortion towards the edges of the frame. EMDs do not inherently suffer from such distortions, but these distortions can be added to the displayed image to properly emulate what the fish-eye lenses lens is seeing or will produce.

If the EMD is bright enough (and the variable darkness filter in the headpiece can be darkened appropriately), it is possible to also display the rectangular outline of the camera's view, but in stereo. Using stereo allows for another intuitive way of setting camera features. The stereo depth of the rectangle can be made to be set at the current plane of focus. Thus, to focus the camera, one might adjust the focus ring, knob, in-out button, or other control, to move the rectangle representing the current plane of focus to "surround" (with respect to depth) the objects one wants in focus.

If the shutter open time is too long, the user 110 could use a "chin-rest" on top of a mono/tri-pod to ensure stability during the long exposure.

Even if the camera is not mounted on the user's 110 head, e.g. hand-held or on a tripod, a similar interface could be used with various restrictions (e.g., one or both eyes covered from the outside world. Alternatively, the camera's flat image might be presented as a rectangle floating in space. This has advantages compared to present optical viewfinders.

For video/motion picture applications, novel modes of "filming" may be enabled. Just as Steadicam allowed cameramen new, more flexible shooting opportunities, slaving a robotic arm held camera to an operator a short distance away could allow even more fluid and flexible shots, and with camera/lens systems that are two heavy for an operator to wear. Cameras being flown by wire across a valley or other terrain might have natural, real-time control of the camera by a remote operator.

Such a still camera in use can be illustrated by using FIG. 12, reference 1200 again. The photographer 110 is wearing an EMDS 105, and has set a physical coordinate frame on the ground near him. He has adjusted the tripod 1250 to raise the EMDS aware camera 1210 to eye height, and uses the EMDS to see what the camera sees, rather than using an optical or physical display viewfinder. Because the image displayed is eye tracked, the virtual viewfinder 730 could be made to appear at the same high resolution as the camera. In this stand-up position, he can change the zoom factor of the camera, change the focus of the camera, pan or tilt it, and change other settings such as aperture and shutter time. After a (high resolution) picture has been taken, he can examine the captured still frame, preferably at its full resolution, aiding the decision to keep the picture and/or take another shot.

Another possibility for novel camera control occurs when the camera also tracks the motion of the user's eye(s). In one case, a still and/or video camera could be placed directly on the eye mounted display worn on or in the user's eye(s). Such a camera would automatically track the motions of the user's eye because it is effectively part of the user's eye(s). While such a eye mounted camera could be folded within the EMD using some of the same optical folding techniques used in folding the display optics of the EMD, such a camera would be necessarily limited in resolution and features compared to an external camera. Another way to obtain almost the same effect, but with full camera features would be to mount the camera to the user's headpiece, and then use motors to pan and tilt the camera to point in the same direction as the user's eyes, using the direction information from the eye tracking subsystem. Such a camera greatly reduces the time and physical grabbing of an external camera when taking a picture; as an example a particularly gorgeous sunset can be photographed with something as simple as a quick glance and a double eye blink.

IV.B.EMD Aware Stereo and Multi-Channel Stereo Still and Motion Cameras

EMD Aware: Stereo, Head Tracker, Eye-Tracker, Wide Field of View, Pseudo Cone Data Stream, Augmented Reality The interface described in the previous section could possibly be mounted to a stereo camera (still or motion), in which case the pre-view image could be displayed in proper stereo (at least proper for the camera).

Figure 15:
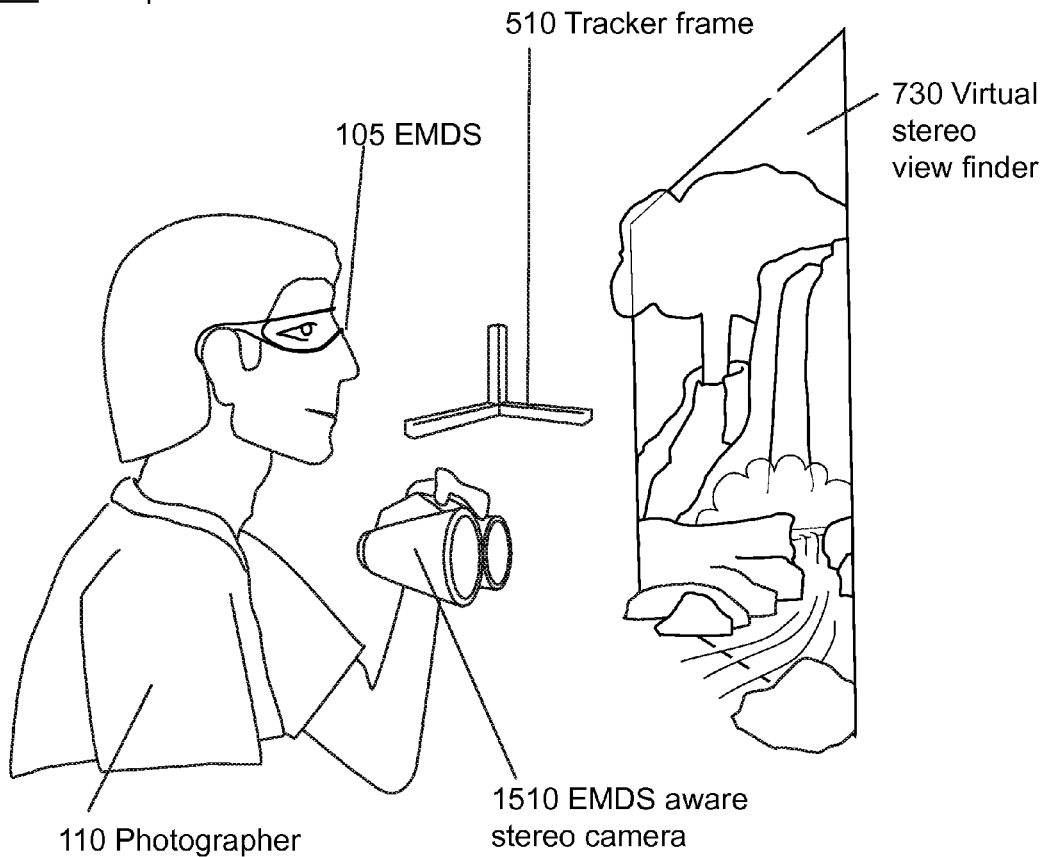
FIG. 15 shows a stereo camera using an EMDS as a viewfinder.

The interface preferably would include cameras covering each eye, but allowing enough situational awareness for a camera operator (consumer or professional) to walk around almost normally, snapping single or motion shows as desired. One example is shown in FIG. 15, reference 1500, where the photographer 110 wearing an EMDS 105 looks through a EMDS aware stereo camera 1510, with a virtual viewfinder 730 showing the scene 1520 awaiting capture.

Multi-channel (e.g., more than two cameras) can be controlled via the same user interface described above for two channel stereo. However, with a head tracker 120, intermediate interfaces that allow the photographer to look through the plethora of stereo images being imaged at the same time could be useful. For example, in the still shot case, this could be used to make sure none of the cameras are seeing something that they should not (e.g., a telephone pole, a close up leaf) that may not show up on the other channels.

As described previously, the "virtual frame" or "virtual viewfinder" (730) can be used to delineate the edges of what is being filmed/digitized.

One advantage of multi-channel video cameras is that they can be especially useful in remote situations where there is a significant lag between the array of cameras and the photographer. So long as all n cameras have transmitted a set of frames that can be examined in real-time by the remote photographer, then by moving his head, the photographer can get a good three-dimensional view of the remote location, even if the view is slightly out of date. This can be superior to telepresence robots in which the communications time lag is apparent to the photographer, e.g., move one's head, wait for images to catch up to the new head position, which can result in nausea and/or a poor understanding of the remote scene.

The above applies to most, if not all, approaches to "arraying" the remote cameras: n cameras in a linear line, n cameras along a sub-circle, n by m cameras in a two dimensional array, n by m by z cameras in a three dimensional array, etc.

IV.C. EMD Aware Cell Phones and PDAs.

EMD Aware: Modifying the EMDS Scale, Elimination of Half of Head-Tracker, Stereo, Pseudo Cone Data Stream While current cell phones and many PDA's allow one to access the web wirelessly from a small device, it is less web-surfing than web-pogo-sticking. This is due to the very tiny (usually LCD) displays present on these devices, which are tiny both to fit in the available space of a tiny device, and to keep cost and power consumption down.

However, if someone is wearing an EMDS 105, at a relatively small cost even a cell phone can have scaler sub-system circuitry added to send pseudo cone pixels to the EMDS, which virtual image will visually appear in size and functionality more like a full computer web-browser, or email application, spreadsheets, databases, maps and directions, still/video camera viewfinder, etc. As described earlier, cell phones, PDAs or other devices do not necessarily have to support the external head-tracking components, further simplifying the construction. The actual circuitry to make a cell-phone EMDS aware has mostly been described in the section titled "Modifying the EMDS Scaler Hardware" above. It is then up to only software layers to support a web browser with various features. As more and more (high end) cell phones (for example, the Apple iPhone™) have their runtime systems based on general purpose computer operating systems, this need not be an onerous task.

Figure 16:
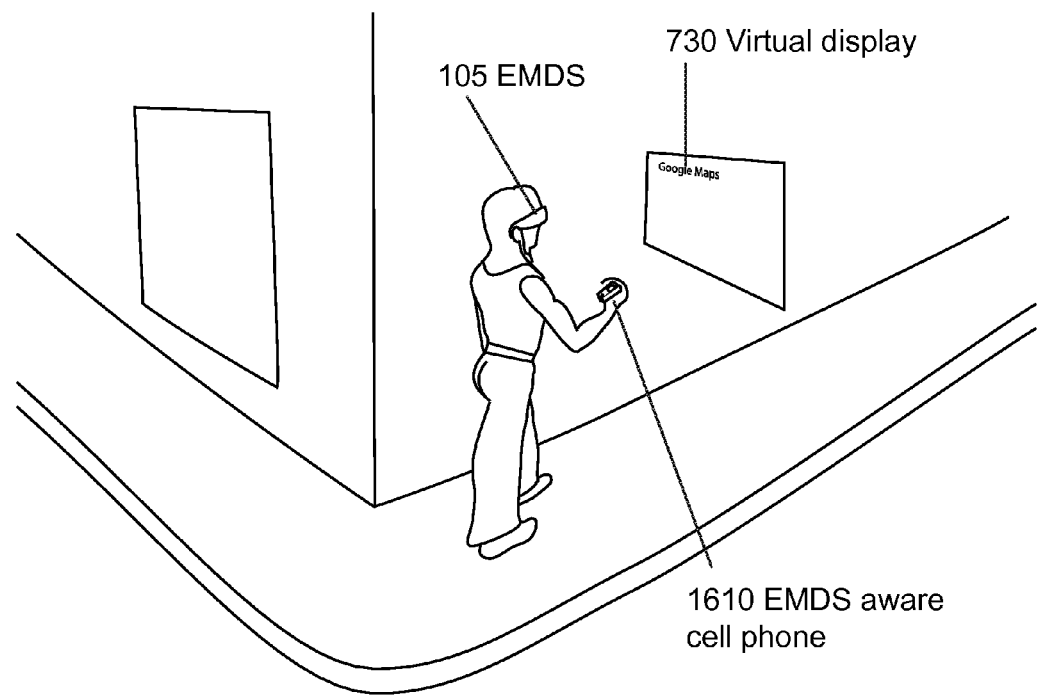
FIG. 16 shows an EMDS with an EMDS aware cell phone.

FIG. 16 reference 1600 shows a cell phone user 110 in public wearing an EMDS 105, holding an EMDS aware cell phone 1610. In this example, the actual virtual image that the cell phone causes the EMDS to display is a single two dimensional image in stereo (e.g., the same image in both eyes, but offset), apparently about six feet (or whatever distance is programmed) away, as seen in reference 1600. The number of pixels in the image preferably is at least minimum PC size (e.g., VGA, 800 by 600) or larger, and with the field of view of each pixel as large or larger than a pixel viewed on a PC display when viewed at normal reading distances (e.g., 80 dpi at 20 inches).

Figure 17:
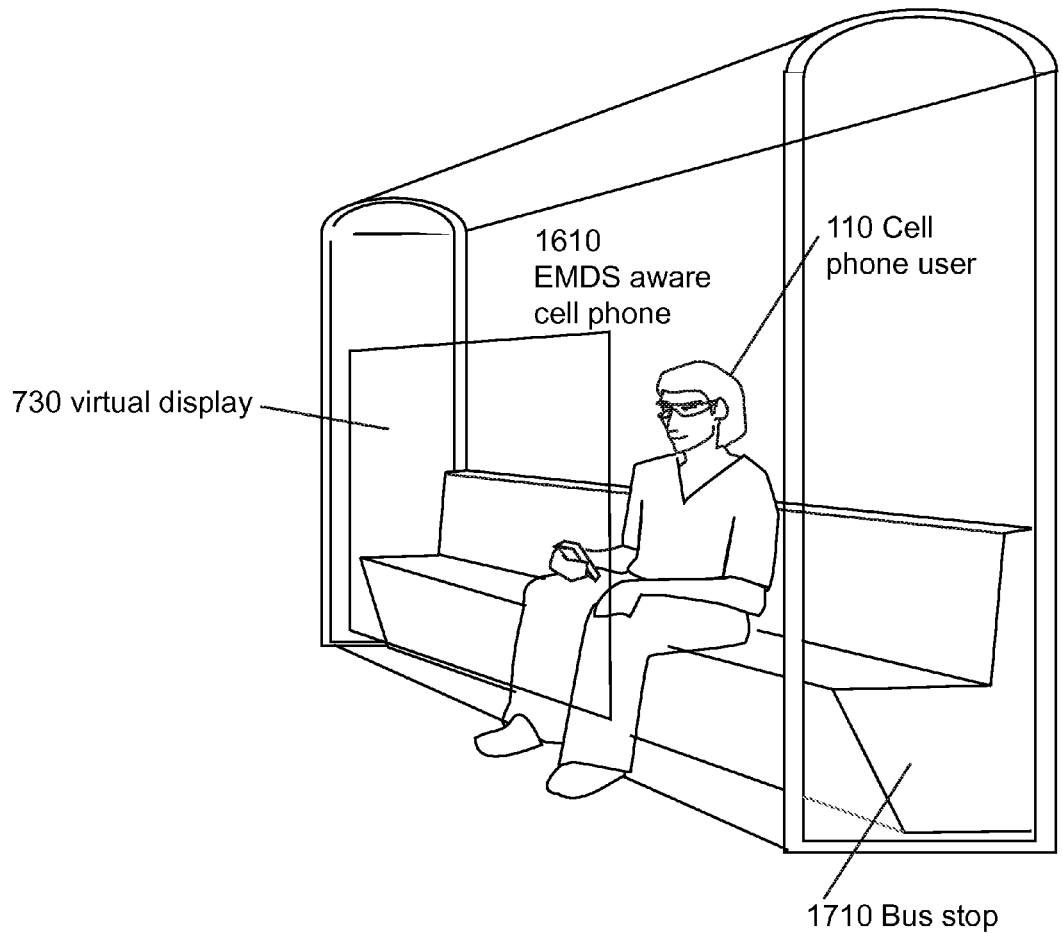
FIG. 17 shows the configuration of FIG. 16 being used for checking email and surfing the web while waiting at a bus stop.

FIG. 17 reference 1700 shows a cell phone user 110 in public wearing an EMDS 105, holding an EMDS aware cell phone 1610 sitting at a bus stop browsing the web and checking email.

IV.D. EMD Aware Heads Up Display

EMD Aware: Resolution, Wide Field of View, Stereo, Head-Tracker, Augment Reality A "heads up" display is generally a display superimposed on the exterior view, typically out of a vehicle, typically also displaying various vehicle instruments. The display usually is at optical infinity, so that a vehicle operator does not have to take the time to change from infinity focus to short distance focus on an interior to the vehicle display, and then refocus back out again to infinity. Historically, heads-up displays were deployed in expensive vehicles, e.g. fighter jets, but now can be found in cars. Conceptually, a heads-up display is simpler than a EMDS 105, as no eye or head tracking is required, and the effect is produced by projecting an image of the instruments of interest onto the interior of the window in front of the vehicle operator, corrected for infinity.

Figure 18:
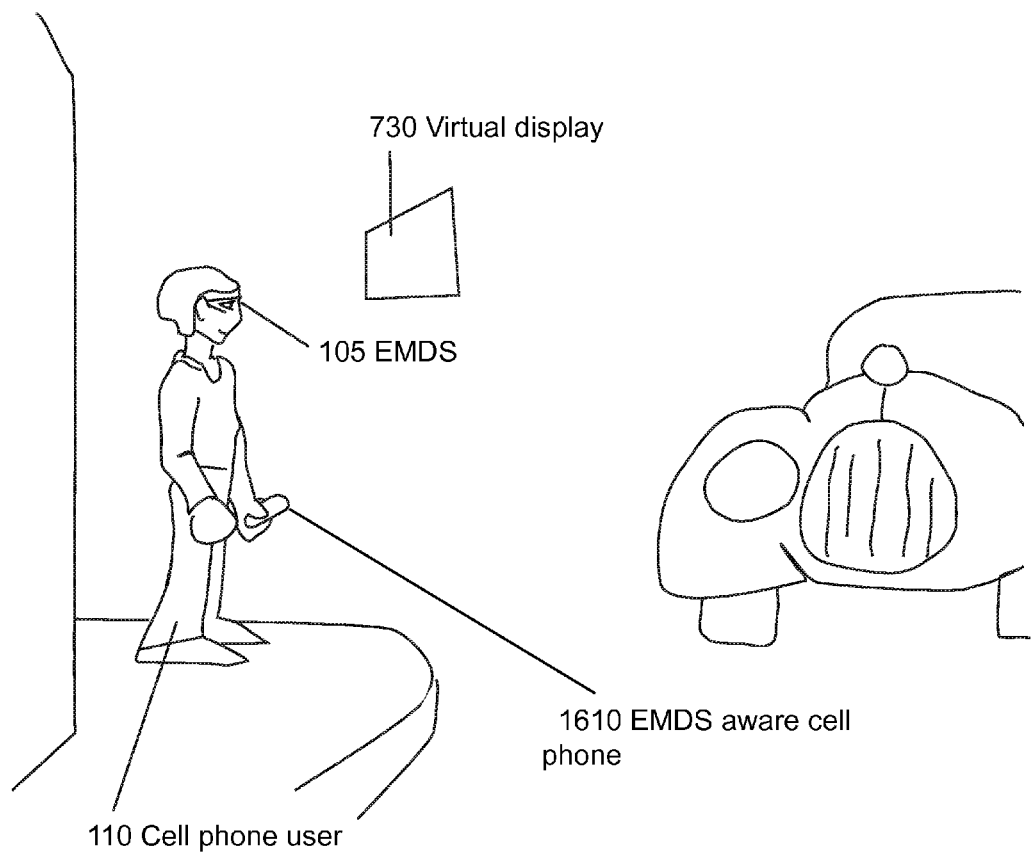
FIG. 18 shows a pedestrian wearing an EMDS cell phone accessing a virtual map.

However, a heads-up display is just another form of display, and could be emulated by an EMDS 105. Thus as EMDS become appropriate for various kinds of vehicles and their operators, the advantages of EMDSs could cause replacement of heads-up displays with EMDSs. Specifically, heads-up displays are a limited form of augmented reality. Having an EMDS instead could allow more sophisticated type of data to be presented, possibly in all directions. FIG. 18 reference 1800 shows a pedestrian 110 using an EMDS 105 and an EMDS aware cell phone 1610 to display in real-time directions from a web based mapping site. But also consider navigation systems when driving an automobile.

Figure 19:
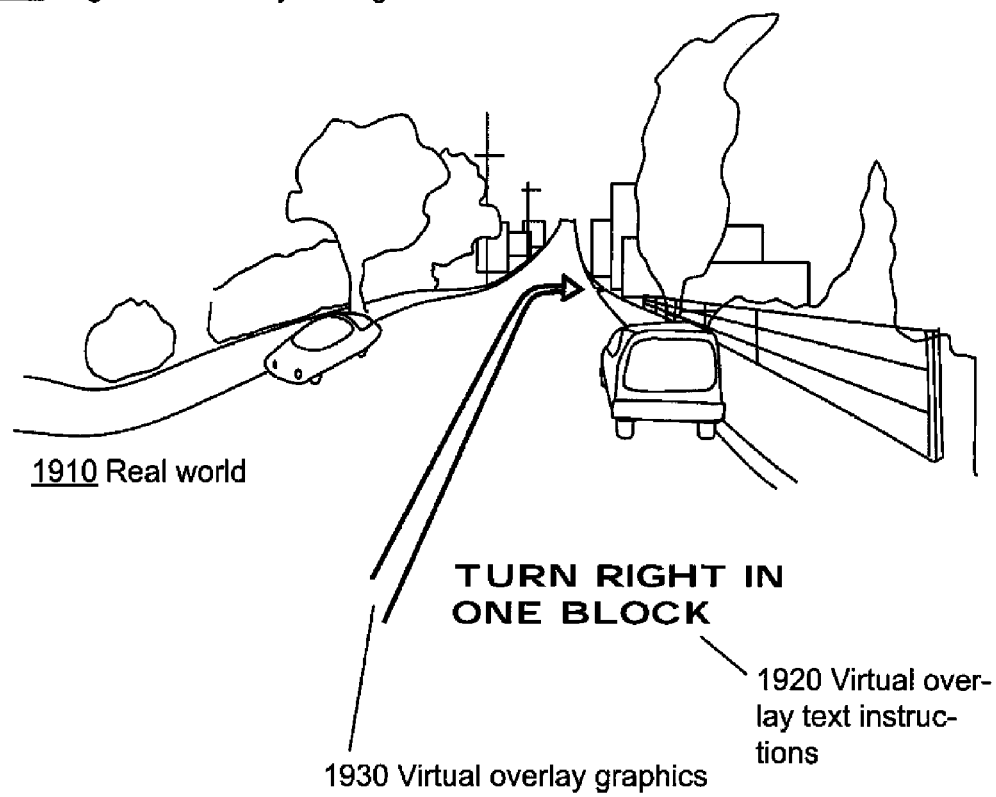
FIG. 19 shows an automobile driver wearing an EMDS cell phone accessing a virtual map.

FIG. 19, reference 1900, shows an augmented reality automotive navigation. Here the real world 1910 has a virtual overlay of text instructions 1920 and graphics 1930 showing the path ahead. If the EMDS is operating in stereo, then the graphics data, such as the curved arrow shown, will be correctly mapped in stereo to the apparent surface of the road. Of course, as with existing navigation systems, this may be further augmented by audio voice instructions. FIG. 19 only concerns the visual portion.

IV.E. EMD Aware Video Kiosks and Digital Signage

EMD Aware: Modifying the EMDS Scaler HW, Resolution, Wide Field of View, Stereo, Head-Tracker, Augmented Reality, Virtual Reality, Eye-Tracker, Pseudo Cone Pixel Data Stream Currently, more and more fixed signage used for advertising in shopping centers and stores is being replaced with digital signage. In yet another application, as a person with an EMDS 105 passes by stores, three dimensional images of wears can be displayed by free space connecting to an EMDS—in effect, a virtual store window.

Figure 20:
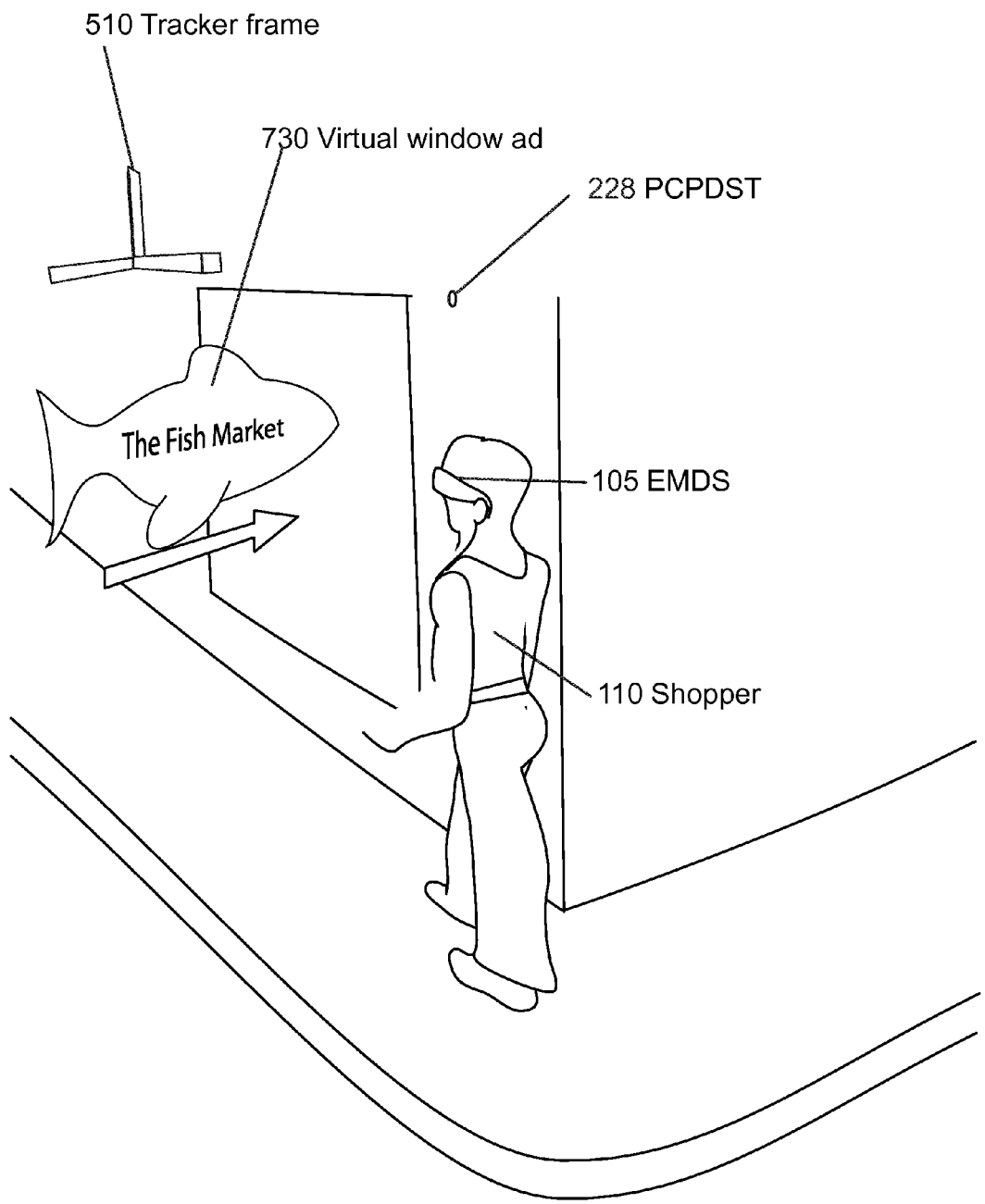
FIG. 20 shows a virtual storefront for passersby who are wearing an EMDS.

This is shown in FIG. 20, reference 2000, where a shopper 110 wearing a wireless EMDS 105 comes into range of the next store in a mall. Then a three dimensional view of the virtual store window 2010 inside the virtual display 730 is transmitted to the shopper. In this example, the store window contains a local tracker frame 230 and wireless pseudo cone pixel data stream transceiver 228. Some sort of standard interface to the EMDS is assumed so that the pseudo cone pixel data stream transceiver 228 can interface to the EMDS 105.

IV.F. EMD Aware Laptop and Palm-Top Computer

EMD Aware: Resolution

Figure 21:
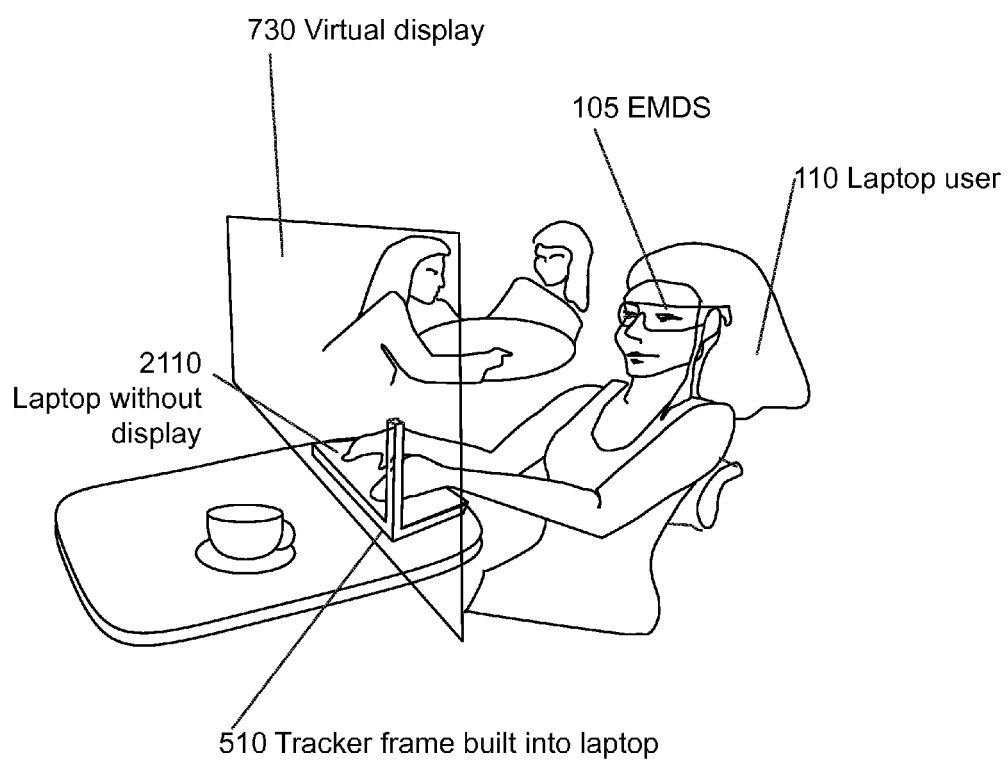
FIG. 21 shows a laptop computer using the virtual image of an EMDS as its display.

Many laptop computers have relatively large displays, but this comes at the cost of price, power, and weight. Also, the size of the pixels do not scale with the increase in pixel count, so the pixel density of relatively high resolution laptops is frequently wasted, unless attached to a larger external monitor. An EMDS 105 can emulate such a monitor, but in a portable and low power package. In the simplest case (for compatibility of the installed base), the EMDS's video input is plugged into the video output of the laptop; and a portable collapsible tracker frame 230 can be placed on (say) the espresso table next to the laptop. This situation is shown in FIG. 21, reference 2100, where a person wearing an EMDS 105 is viewing the video output of their laptop computer 2110 in a (relatively) large virtual display 730

The power for the electronics for the EMDS 105 could be external rechargeable batteries or powered by the laptop over USB, for example. This is not as onerous a requirement as it sounds; as when using the EMDS instead of the laptop's integral LCD display, the backlight and LCD driving of the integral display can be powered off, making the excess power available for the EMDS. While the best display is obtained by having the laptop output video at its highest native resolution, when a lower resolution is sufficient to the current task, incremental additional power can be saved by having the laptop output, and the EMDS process, a lower resolution image.

In an alternate approach, a laptop need not have a traditional integral display but could assume instead that an EMDS 105 will be used. Such a device could also have the tracker reference frame 230 built in, for example only requiring the Y axis portion of the frame to be extended in use. Such a laptop might also have an optional detachable traditional LCD screen available.

So called "palm tops" are full function computers, but with a physical size not much more than four or so times larger than a PDA. Such devices have tiny low resolution screens (though much better than cell phones and PDAs) and tiny keyboards. Dispensing with the tiny display and replacing it with an EMDS, a palm-top could have a much closer to full size keyboard fold out from the device, and have a relatively large image display thanks to the EMDS 105.

There are also "virtual keyboards" that use light to create a keyboard on any surface that the palm top projects to.

In addition, most laptops are plugged into the wall 95%+ of the time, even if it is an airline lounge, or on the newer airplanes with AC sockets at each seat. So long as an AC outlet is available, there is no problem powering the EMDS 105 with the larger and more power hungry scaler "black box", without affecting the laptop power.

There is another intrinsic advantage of EMDS 105 mounted to laptops: security. While some business travelers read or edit internal company documents or spreadsheets, in many cases this risks a breach of company confidentially, as other passengers can see the display too. This is not a problem for an EMDS since other passengers cannot see the virtual display of an EMDS.

While most current laptop use is mono, specialized stereo laptops do exist. When a two eye EMDS 105 is used with a laptop, the laptop can run applications in head tracked (or not) stereo display mode.

IV.G. EMD Aware Wearable Computer

EMD Aware: Modifying the EMDS Scaler HW, Elimination of Half of Head-Tracker, Stereo, Pseudo Cone Data Stream The biggest limit on wearable computers has been the limitations of previously wearable display technology. Weight is not an issue. Most people are wearing considerably more additional pounds of fat than the weight of a wearable computer configured, say, as a thick belt. EMDS 105 could be what wearable computer devices need as an enabling technology to make them a realistic alternative to more traditional fixed location computers. However, just as is the case for many other applications, for extra power the wearable computer does not have to know about the EMDS to still garner many of its advantages, but an overall better system design results when the EMDS is designed in from the ground up. The overall system can be similar to an EMDS aware laptop; indeed just placing such an aware laptop into a small backpack while wearing an EMDS is a sort of wearable computer, other than keyboard and pointing input function devices. Wearable alternatives to these exist (e.g., cord keyboards in pockets). It is making the large relatively high resolution display available that is most of what this market currently lacks.

An interesting alternative to a wearable computer is an office or lab environment in which many computers are connected together via conventional networks, but their video outputs are available to be placed out on a short range spread spectrum (or equitant free-space high data rate technology) transmission that couples to the worn EMDS 105. Keyboards and mice can still be used via the lower bandwidth back channel. In this case the computer is essentially "in the walls", and even which computer one connects to does not matter so long as it can access the user's 110 desired data (email, web, etc.).

IV.H. EMD Aware HDTV Display

EMD Aware: Resolution, Wide Field of View

While HDTV systems are coming down in price so that a much larger number of consumers can afford them, the low cost low end still have to make many quality compromises in video quality, video brightness, color fidelity, bulb life, and other features greatly desired by the home marketplace. Also, just the amount of electrical power and cost of replacement projection bulbs required for operation of these devices over their lifetime can exceed the initial cost of the device. Consumers desire 1920 by 1080 pixel resolution, with a refresh rate of at least 60 Hz. To avoid having to internally perform 3/2 pull-down (with its associated negative artifacts) on display of motion pictures originally shot at 24 frames per second, many displays are moving to 120 frames per second internal display rate, allowing each original $\frac{1}{24}^{th}$ of a second frame to be displayed an integral five times before the next frame is displayed. 72 Hz or 96 Hz display rates are other effective alternatives. The advantage of 120 Hz display is that the existing 60 Hz frame transport video formats can be used to move the frame from the playback device (HDTV sources) to the display.

Given that the average number of people sitting in front of an HDTV display at any given viewing time is approximately 1.1, a high quality EMDS 105 is a viable alternative for both higher quality display, and comparable price. It is also conceivable that, when two people are watching a video together, each sporting an EMDS of their own, the virtual image in space can be made to coincide so that the two viewers 110 can point to something in the display in sync in physical space with each other.

There are many advantages to EMDS 105 HDTV viewing. No large heavy folded rear-projector boxes need be set-up, nor front projectors on the ceiling along with drop down screens. One just jacks in (or connects to a free space transmission point) of the home video network, and sits back and watches a movie. If no one else is using the room, the lights can be dimmed. Otherwise the viewer 110 can darken the see-through input in any of the ways previously discussed. Better sound will still come from several external speakers (which anyone else in the room would have to put up with), but because the viewer is head-tracked, multi-channel audio headsets or ear inserts can provide a high quality three dimensional sonic experience, without bothering others in the room.

Figure 22:
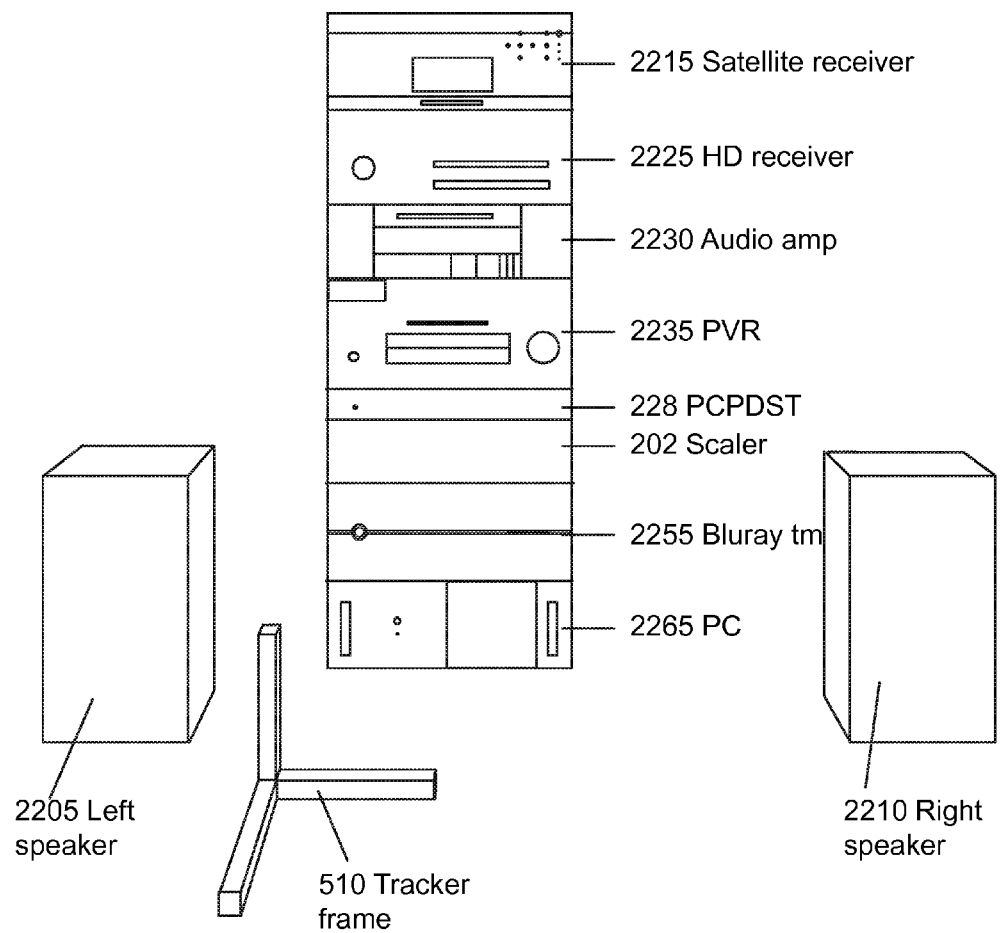
FIG. 22 shows a tracker frame, stereo speakers, and a rack of HDTV, audio, and EMDS equipment.

FIG. 22, reference 2200, shows a tracker frame 2260, left 2205 and right 2210 stereo speakers, and a rack full of HDTV and EMDS equipment. This is an example set-up suitable for most of the home entertainment examples to be described as follows. Although only two speakers are shown in this specific example, this is a stand-in for most any other audio environment, from headphones through 5.1 sound and 7.1 sound. 7.1 sound means speakers located at: the left, the center, the right, the left side, the right side, the left rear, the right rear, and one or more sub-woofers (the "0.1"). The components in this example rack include the following: a satellite dish HDTV TV receiver 2205, a cable TV HDTV receiver 2220, an over the air HDTV TV receiver 2225, an audio amplifier 2230 for the speakers, a personal video recorder (PVR) 2235 (could instead be built into one of the HDTV receivers), a pseudo cone pixel data stream transceiver 2240 (or a hardwired connection), a tracker frame 2245, an EMDS scaler unit 2250, a BluRay™ (or HDDVD™) (or just DVD) disc player 2255, a personal computer 2265 with an embedded image generator.

Figure 23:
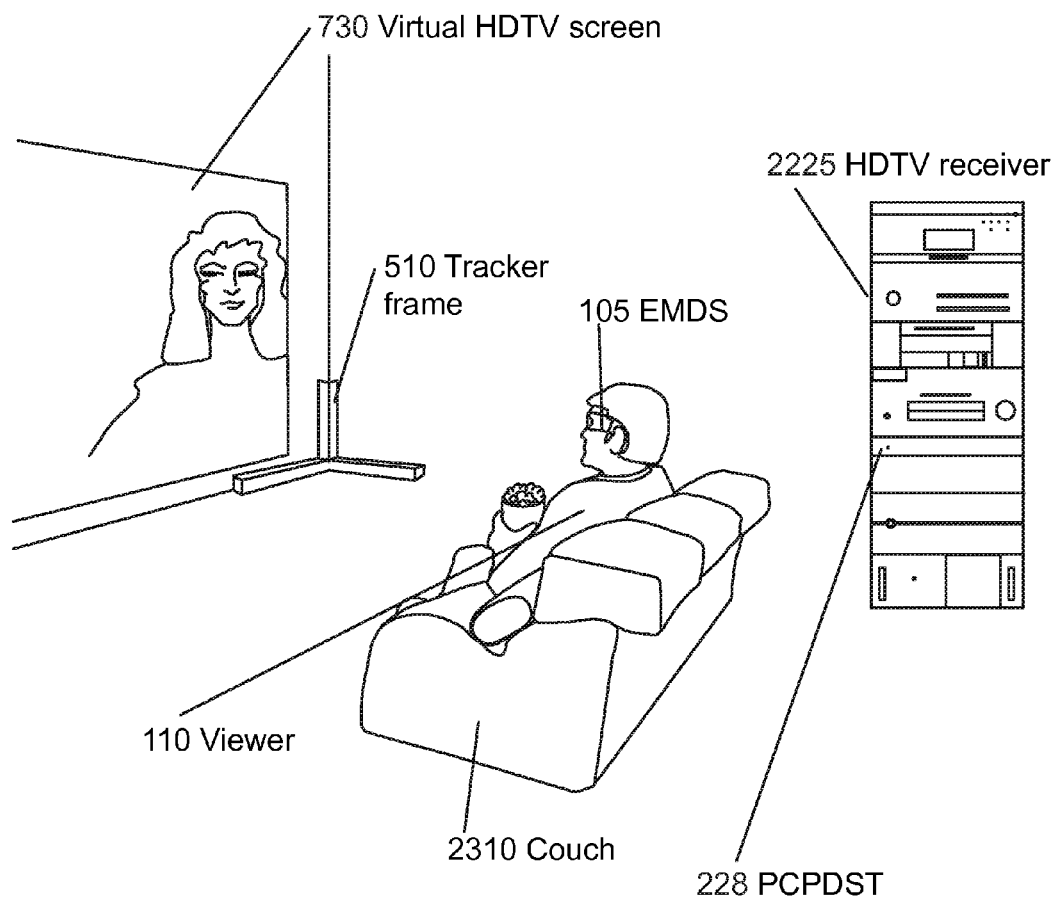
FIG. 23 shows a virtual HDTV display in a home.

FIG. 23 reference 2300 shows an at-home HDTV set-up, with the virtual display 730 aligned with the wall. A physical coordinate tracker frame 230 is shown as well. The viewer 110 is wearing an EMDS 105, which is free-space transmitter 228 attached to a HDTV output device 2210. A large number of such output devices are already in existence: HDTV over the air broadcasts, and/or satellite or cable HDTV, and/or HDTV PVR, HDTV playback device (Blu-Ray™ and/or HDDVD™), or HDTV switching devices connected to some or all of the above. Computers and game consoles can also be plugged in here as well, but detailed advantages of such connections will be presented in later sections. In the case of FIG. 23, the EMDS aware HDTV output device 2210 is a representative for all possible such devices. Note that none of the non-game HDTV devices need to be EMDS aware.

IV.I. EMD Aware Day of Release Motion Picture Display
EMD Aware: Resolution, Wide Field of View The movie industry's current business models are shifting. There is a significant segment that will wait for the DVD (or HDDVD™/Blu-Ray™) disk to come out, or to show in HBO™ or SHOWTIME™. Some movies are having their release on DVD occur the same day the movie starts in theaters. Just as many people have a better sound system at home that the Cineplex does, high end home HDTV or EMDS 105 can potentially provide higher quality images than those available at the Cineplex, especially after the film has been run through the projector several times. Many theaters are moving to digital displays, replacing film projectors, but consumer display technologies are out-stripping the more constrictive theater display.

As a concrete example, an EMDS has the potential to produce a higher quality image than IMAX™ displays, let alone a "mere" 35 mm or 70 mm print, or a 2048×1080 digital projector, which is the current main commercial theater digital projector standard. In one business model, on the day of release, encrypted versions of the movie are sent to households that paid for the privilege. They can see the movie opening night from the comfort of their homes, and since the video data can be encrypted as far as all the way to transmission to the EMD, the movie companies will have lessened piracy worries. If there is EMDS aware components in the provider electronics, one can charge not just a single pay-for-view price, but a pay-for-view price multiplied by the number of EMDS viewers 110 present.

Figure 24:
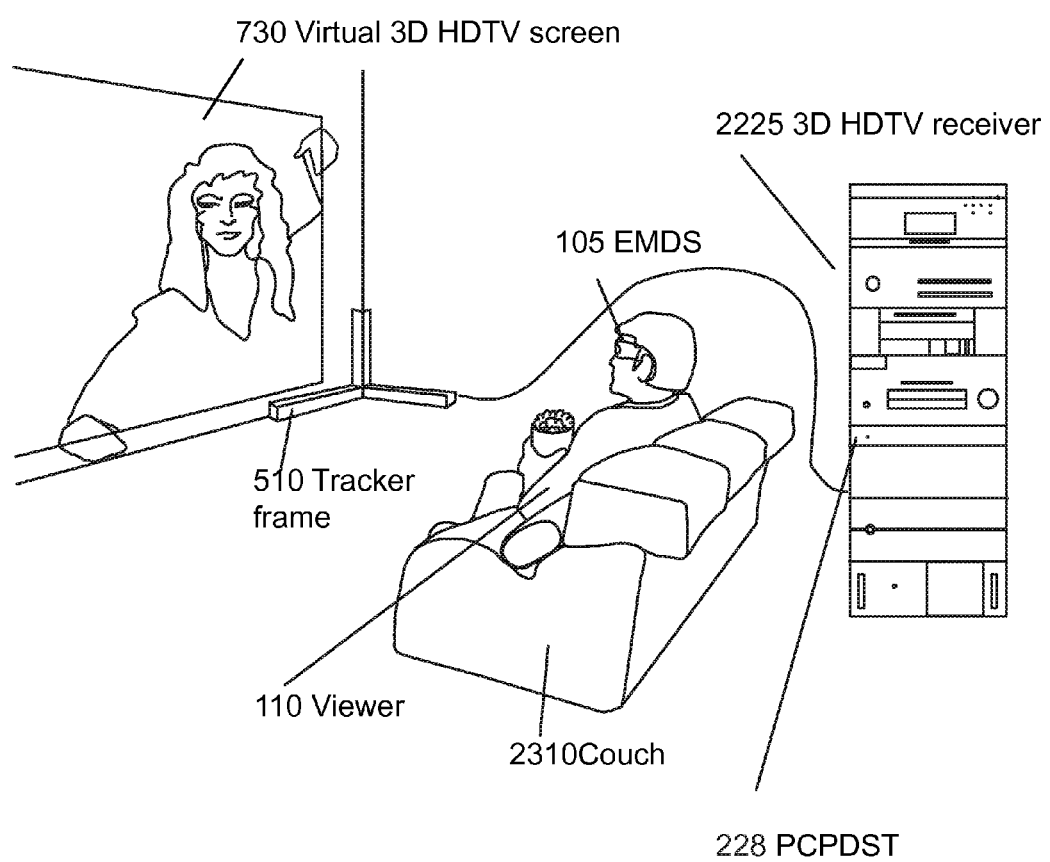
FIG. 24 shows a virtual stereo HDTV display in a home.

IV.J. EMD Aware 3D HDTV Display
EMD Aware: Resolution, Wide Field of View, Stereo The motion picture industry is also placing some emphasis on modern stereo camera shooting and theater displays. However, most EMDSs 105 (when used with two EMDs) are inherently stereo and can be higher resolution than film to boot. If 3D versions of films are released in a consumer format, the home EMDS can be used to display them. FIG. 24 is the same as the home HDTV theater of FIG. 23, except that different HDTV images are being presented to each eye of the viewer 110. The 2D virtual display 730 of FIG. 23 is replaced with a 3D virtual (stereo) display 730.

IV.K. EMD Aware Large Screen Format Display, and 3D Display
EMD Aware: Resolution, Wide Field of View, (Stereo)

As described above, an EMDS 105 can have greater field of view and pixel resolution than 15 perf 70 mm film, which is what is used to produce IMAX™ films. Many IMAX™ films are in 3D, but once again this is a natural format for EMDS. Commercial same day of release distribution of movies in IMAX™ or IMAX™ stereo format is another way to keep theatrical distribution revenues up. Just as in the more traditional motion picture case, an EMDS has the potential to produce superior displays than the traditional film or new (constant resolution) digital cinema projectors. Once again, a direct to consumer marketing model may become a viable distribution model for the movie business.

Figure 25:
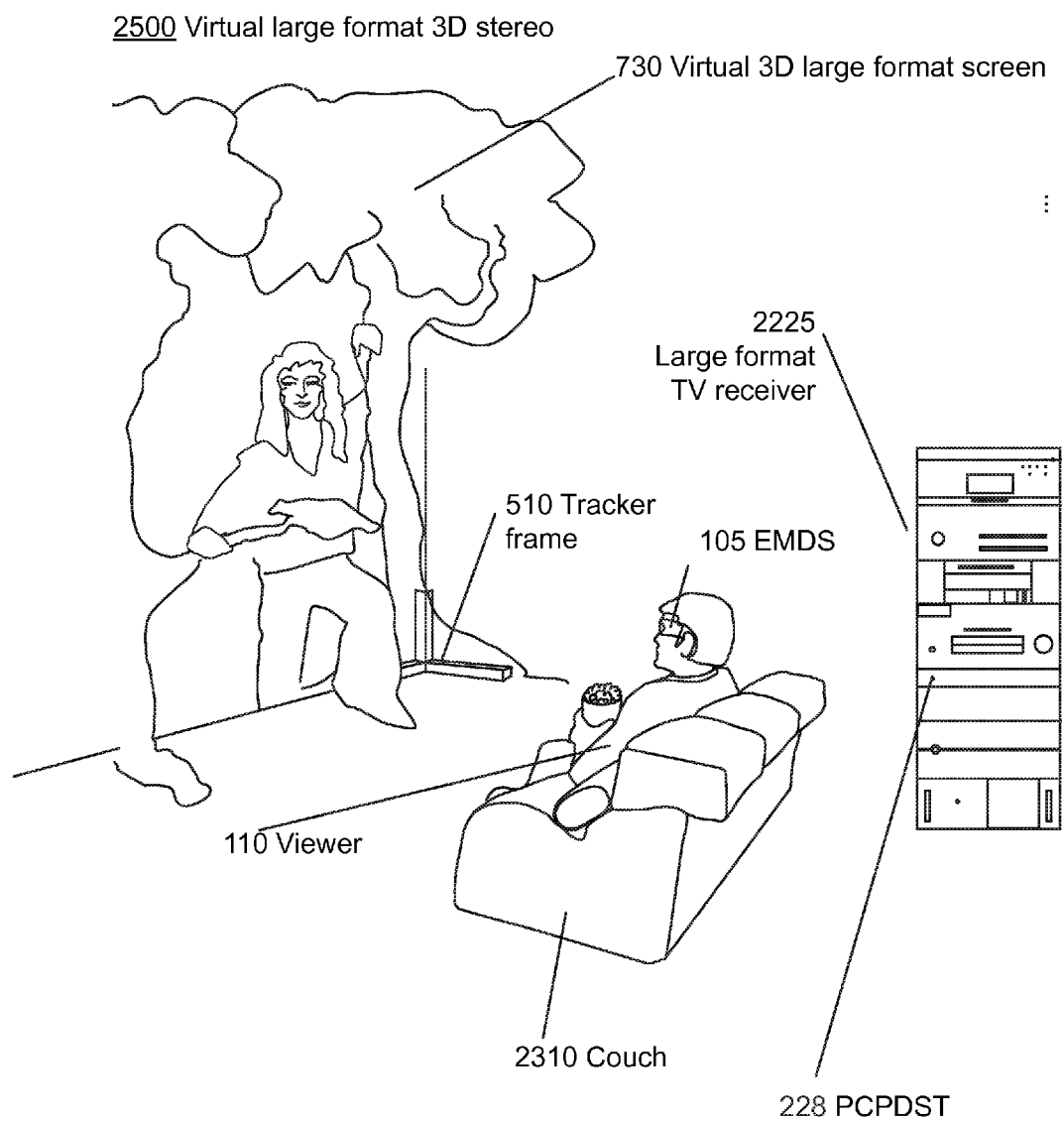
FIG. 25 shows a virtual large screen format 3D display in a home.

FIG. 25 reference 2500 shows an at-home HDTV set-up, with the virtual display 730 aligned with the space in front of the viewer 110. A physical coordinates tracker frame 230 is shown as well. The viewer 110 is wearing an EMDS 105, which free-space transmitter 228 attached to a large screen format stereo supporting output device 2510. Note that all this is similar to the home HDTV theater example of FIG. 23. The main difference is that the virtual display 730 covers more of the viewer's 110 field of view, and the content playback device 2510 has a higher resolution and assumed field of view than standard HDTV.

No matter how high the resolution of the input image, the daisy-chained pseudo cone pixel data stream has the same data rate (in one implementation). The typical problem with transferring much higher than normal input images has been addressed in a number of ways. The most common is to replicate the existing highest resolution interface. This type of high resolution input is supported in the scaler sub-system described above for a typical complete EMDS. Each scaler sub-sub system is happy to accept one $n^{th}$ of the input data, and output the correctly processed portion. This feature may be used to support display of "4K" and "8K" video formats and above. (The 4 and 8 refer to the width of the video frame format in pixels; the height of the frame depends on the aspect ratio of the format.)

IV.L. EMD Aware Sports Display
EMD Aware: Resolution, Wide Field of View

Figure 26:
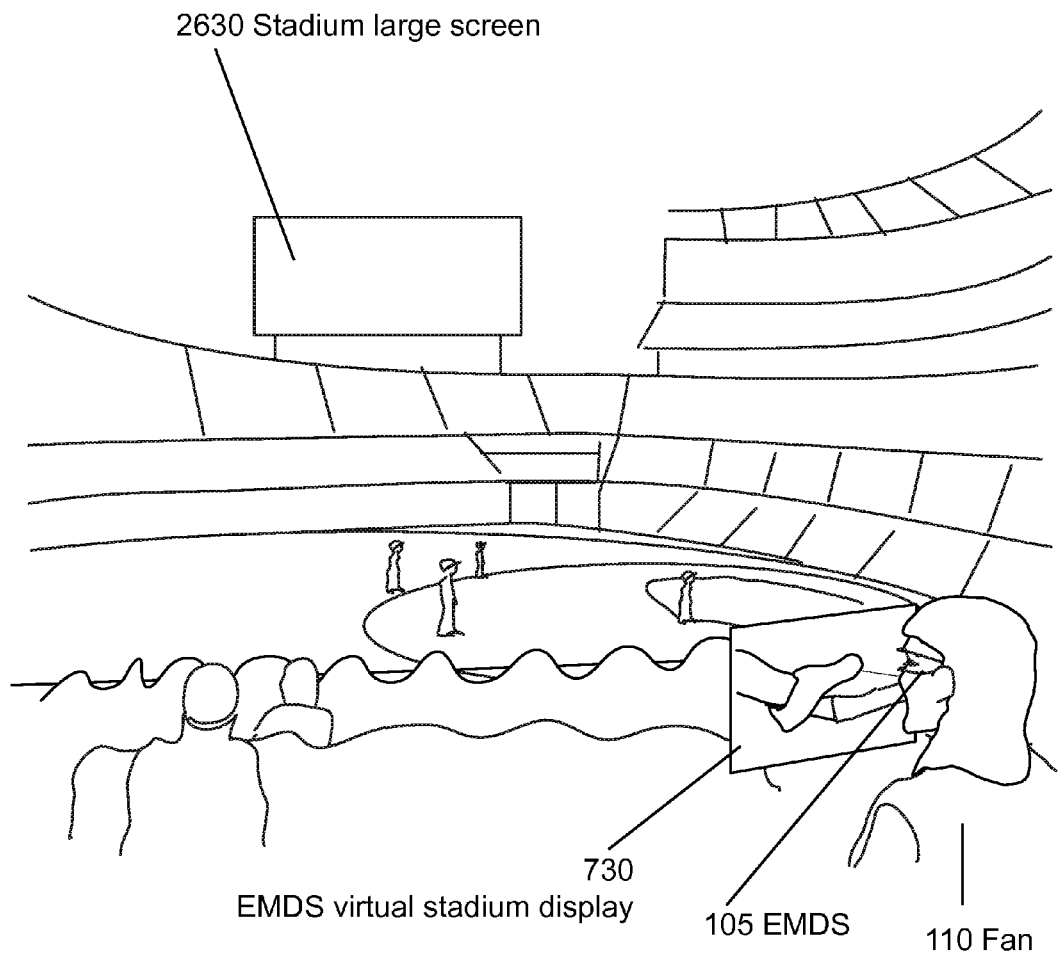
FIG. 26 shows a sports application of EMDS in a sporting stadium.

At sports stadiums, watching the game live can be inferior to watching it televised, because video cameras can get much closer to the action and can show instant re-plays. This is partially addressed in many sports stadiums by the presence of one or more very large, very bright displays (typically super-bright LED displays in newer installations), so that at least replays can be shown, as well as other official functions. As shown in FIG. 26 reference 2600, if a sports fan 2610 is wearing an EMDS 105, an in-stadium set of HDTV+ free-space stereo video channels can allow the attendee to switch from a live stereo view of the action from their seat (e.g., naked eyeballs), to zoomed in displays and stereo high-resolution replays 2620, as shown in the virtual display 730. Not shown in this figure are local physical coordinate frames 230 and free-space transmitters (or plug in jacks). Such displays can also be available at distant location pay per view sites.

IV.M. EMD Aware Immersive Virtual Reality Display
EMD Aware: Resolution, Wide Field of View, Stereo, Head-Tracker, Virtual Reality EMD non-aware virtual reality applications can make use of an EMDS 105 by rendering and displaying fixed (vs. variable) resolution images for each eye, with the view transformation matrices for rendering derived in part from the real-time head tracking offered by most EMDSs. Used thus, to the non-aware application, an EMDS looks like a high resolution form of a head mounted display (HMD), with integral head tracking. Thus EMDS can support "legacy" HMD applications and image generating devices.

Figure 27:
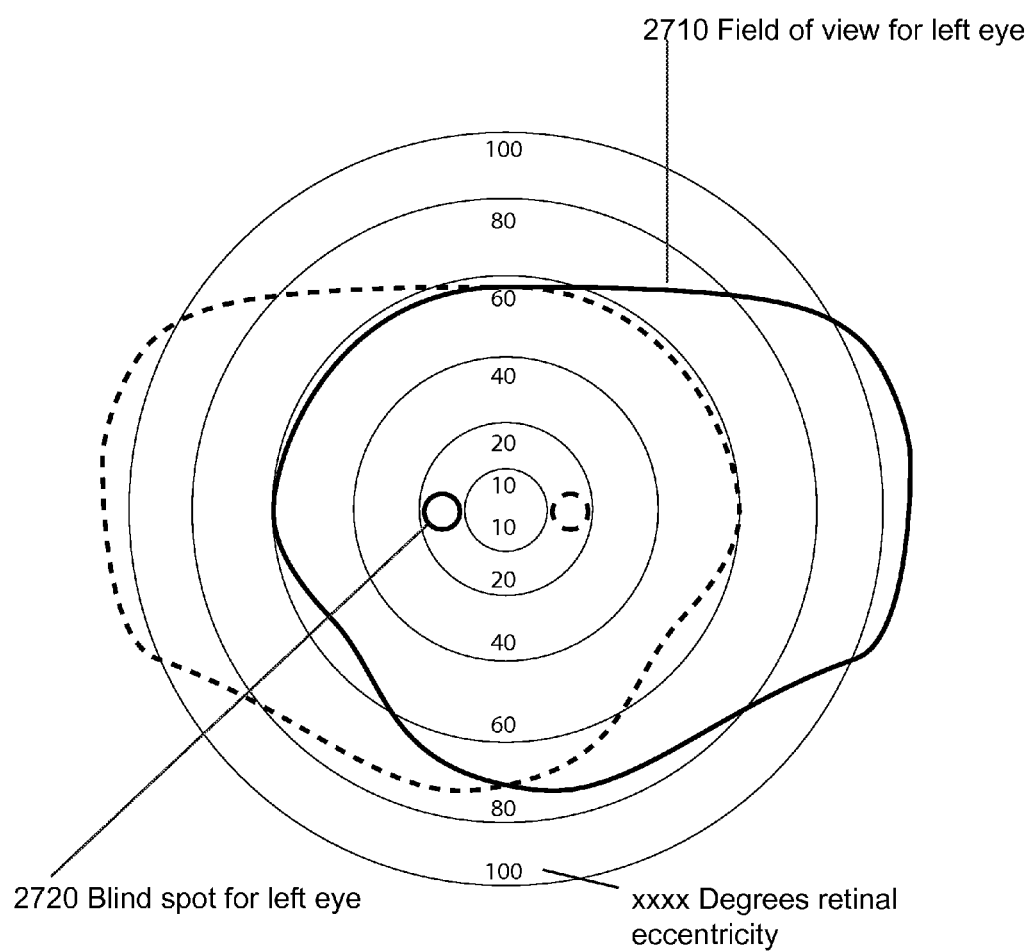
FIG. 27 (prior art) shows the limits on the field of view of the left eye.
Figure 28:
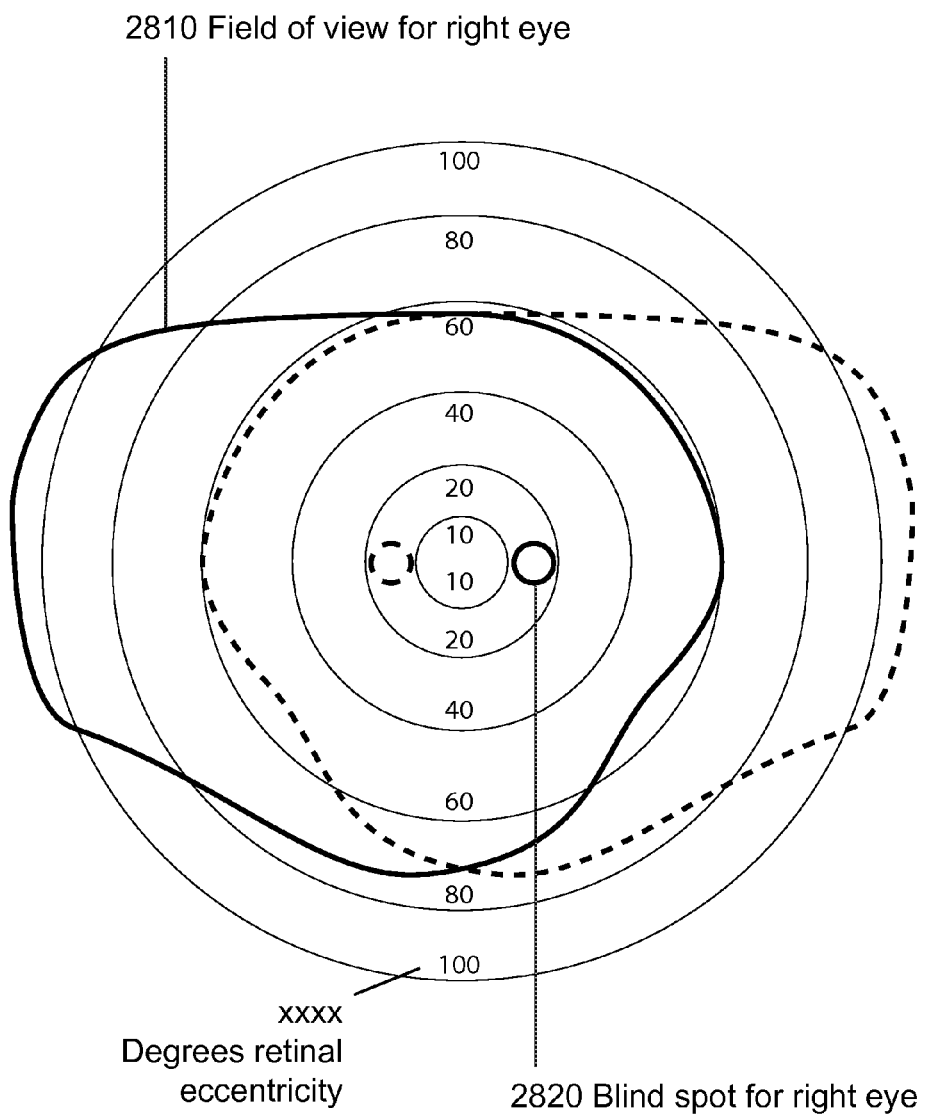
FIG. 28 (prior art) shows the limits on the field of view of the right eye.
Figure 29:
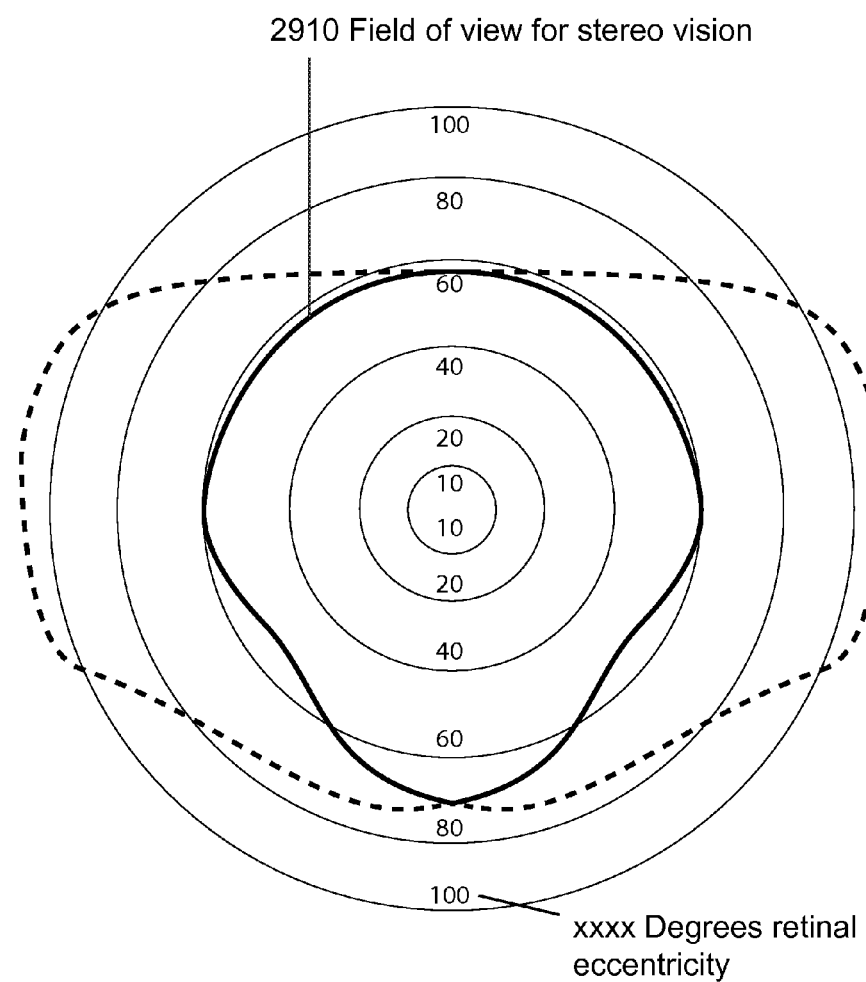
FIG. 29 (prior art) shows the limits on the field of view of stereo overlap.

To put some numbers on the human eyes fields of view are for help in understanding some of the following paragraphs, FIG. 27, FIG. 28, and FIG. 29 are included. FIG. 27, reference 2700, is a polar plot showing horizontal and vertical limits in degrees of what the left eye can see. The solid line 2710 is the limit of the vision of the left eye. The left eye's blind spot is 2720. The dashed line is the limit of the right eye for comparison. FIG. 28, reference 2800, is the same but for the right eye. The solid line 2810 delimits what the right eye can see and the right eye's blind spot is 2820. The dashed line is the limit of the left eye for comparison. In FIG. 29, reference 2900, the solid line 2910 shows the area of stereo overlap, i.e., the portion of visual space visible to both the left and right eyes. Note that viable displays do not need to cover these visual areas entirely. Many eye glasses and contact lenses artificially narrow the field of view available without notice by the human 110.

However, beyond legacy HMD emulation, it is also conceivable to construct 3D graphics rendering chip to take advantage of the variable resolution pseudo cone pixel array that is all that a particular eye needs for "full image resolution" for a given frame. The modifications are described in U.S. Pat. No. 6,525,723, "Graphics system which renders samples into a sample buffer and generates pixels in response to stored samples at different rates," which is incorporated herein by reference, but the result can be a reduced rendering load along with a very wide field of view.

"Visual immersion" is defined to start at a bare minimum of 65° field of view, with 85° being better. In theory, an EMDS 105 can present the same field of view that the real world does, e.g. limited nasally by the edge of the noise, and temporally by the temporal edge of the eye socket. This can be as high as 165° per eye, and 190° or more for both eyes. Practically, supporting a field of view out to the inner edge of the sunglasses like portion of the headpiece is sufficient, if present. The maximum vertical field of view is approximately 50° vertically from level both up and down, e.g. 100° full field vertical field of view. Sunglasses typically afford approximately 100° horizontal field of view per eye, and considerably less vertically.

However, many types of eyewear that have somewhat limited through view, still leave a lot of peripheral vision "outside the frame". EMDs can work the same way. Most designs do not artificially block vision from angles larger than the display can generate. But while this is OK for HUD and some augmented reality displays, it is not OK for immersive and many augmented reality displays. Effectively having some portions of "reality" vanish at an angle at which the real world is still visible is not good. For these applications, the simplest way to prevent this is to close off all physical world view angles anywhere where the EMDS cannot display an image also. Effectively this means dark sides (and tops and bottoms) to the portion of the headpiece worn over the eyes. Similar examples can be found in welding goggles and more extreme sunglasses, all for the same reason. Only the portions of the visible world seen through the main lens can be allowed into the eyes. So long as the overall field of view is fairly wide (e.g., horizontally 85° to 100°) then the user 110 is not likely to even notice the narrowing of the field of view. One reason for this is that the eyeball can rotate in its socket only so much. The field of view that one can point one's fovea at is well less than 165°. In fact it is not much more than 100°. The rest of the view is low resolution peripheral vision. The portion of the horizontal field of view that can be perceived in stereo, e.g. areas that both eyes can foveate on, is even less, approximately 60°. As another example, most prescription eyewear does not correct for vision much wider than 100° for this very reason. Another important point is that the "shutter glasses" stereo eyewear that is used in nearly all immersive projective display environments (CAVE™s, Virtual Portals, etc.) have only a 100° horizontal field of view, and yet very strong immersive effects are induced. The far periphery vision of the human eye is actually one of the easier for an EMD to display to (very low resolution, short projection throw distance or equitant). However, the reality is that if the EMD is wide enough to not induce "tunnel vision," then the user will not feel that anything is missing. Of course, there are situations, such as certain simulator training, where even peripheral vision is important to the task, and EMDs that cover the full 160° width of the field of vision are mandated The "presence" or realism of current technology virtual reality displays has had as a primary (but not only) limit the resolution and field of view of the display systems. EMDS 105 could surmount this main obstacle, and also provide higher quality head tracking data than low cost VR systems. While VR is not the main initial market for EMDS, low cost widely available EMDS could greatly affect the VR marketplace, possibly enabling a number of new or previously unattainable applications, as well as greatly improving the effectiveness of the few existing markets.

Figure 30:
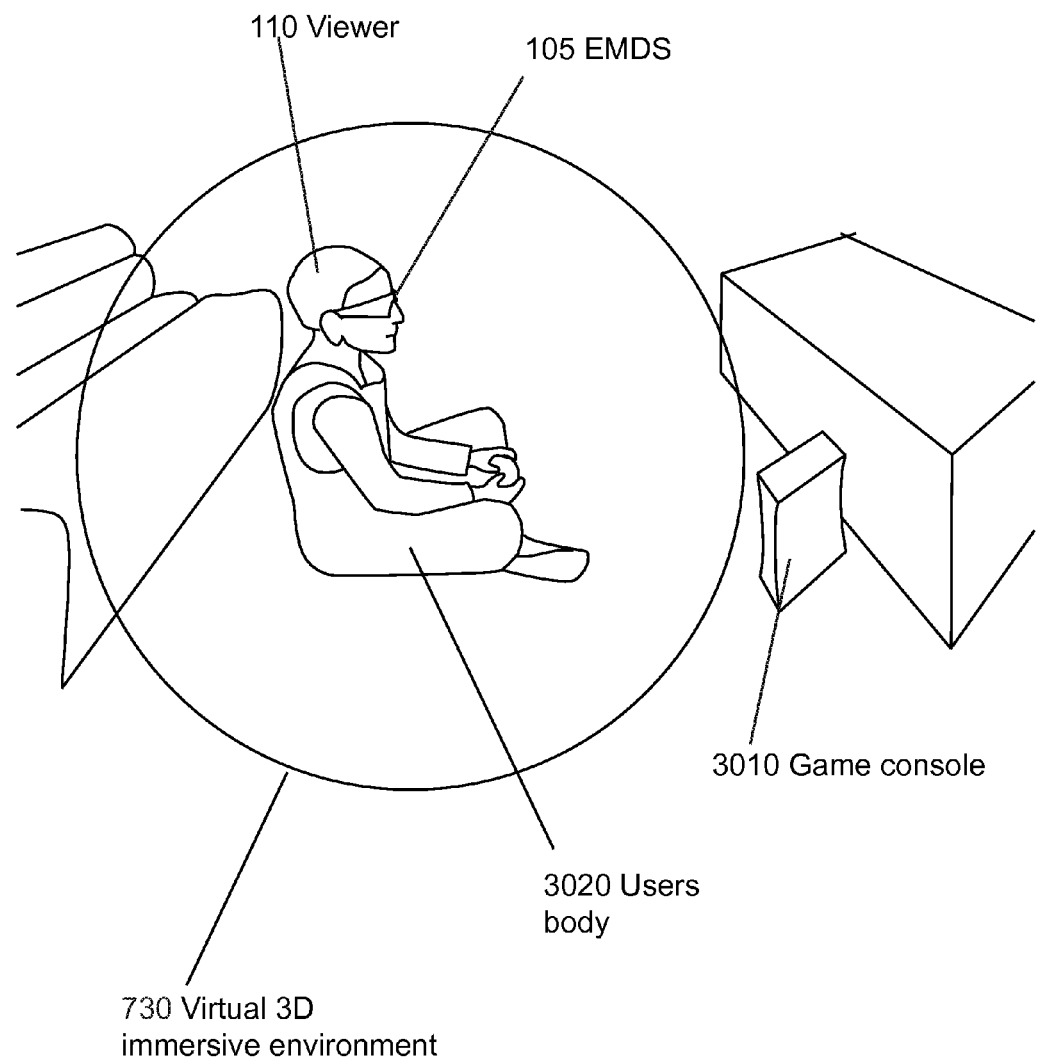
FIG. 30 shows a full spherical immersion 3D display driven by a game console.

Another example of full immersion virtual reality is shown in FIG. 30 reference 3000. Here a viewer 110 is completely immersed on all sides and directions of view by a spherical stereo virtual display 730. The viewer would usually be wearing black shades so that only the virtual world enters his/her field of view. In fact, unless it was also modeled in virtual space, the viewer's 110 body 3020 would not be visible to the viewer 110. The 3D graphics imagery is generated by a graphics rendering device 3010 (the game console).

However in order for a system to render at maximum foveal resolution across the entire field of view offered by EMDS, this would mean rendering as many as half a billion pixels per frame. Thus to take advantage of the wide field of view offered by EMDS 105, as described before, the rendering device 3010 preferably is pseudo cone pixel aware; e.g. capable of variable pixel density rendering, directly rendering pseudo cone pixels. Such a system would not need the standard black box scaler device. That computation could be built into the graphics rendering device.

IV.N. EMD Aware Augmented Reality Display

EMD Aware: Resolution, Wide Field of View, Stereo, Head-Tracker, Augmented Reality Many instances of EMDS 105 are inherently see-through. This allows them to function as augment reality (AR) displays. For some augmented reality applications, only a small amount of low resolution graphics is needed and could possibly be provided by current off-the-shelf rendering systems. However, for other applications, the augmented reality display may have to be five times or more brighter than the physical environment as viewed from the inside of the headpiece. The reason for this is that at intensities less than this multiple, the real-world corrupts or bleeds through the virtual display. Colors in particular are easily corrupted by different colors in the environment. Thus if the color of virtual objects is important in an augmented reality task, then the brightness threshold is important.

Figure 32:
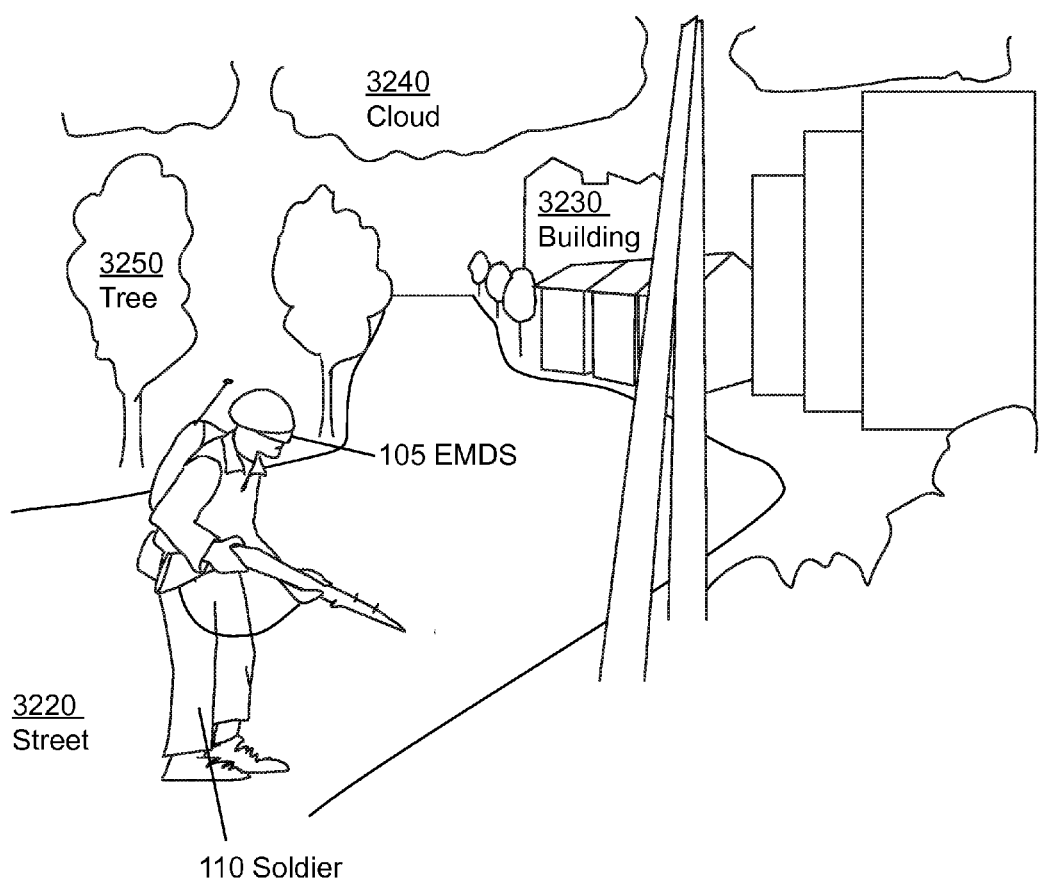
FIG. 32 shows a soldier training in a virtual environment.
Figure 33:
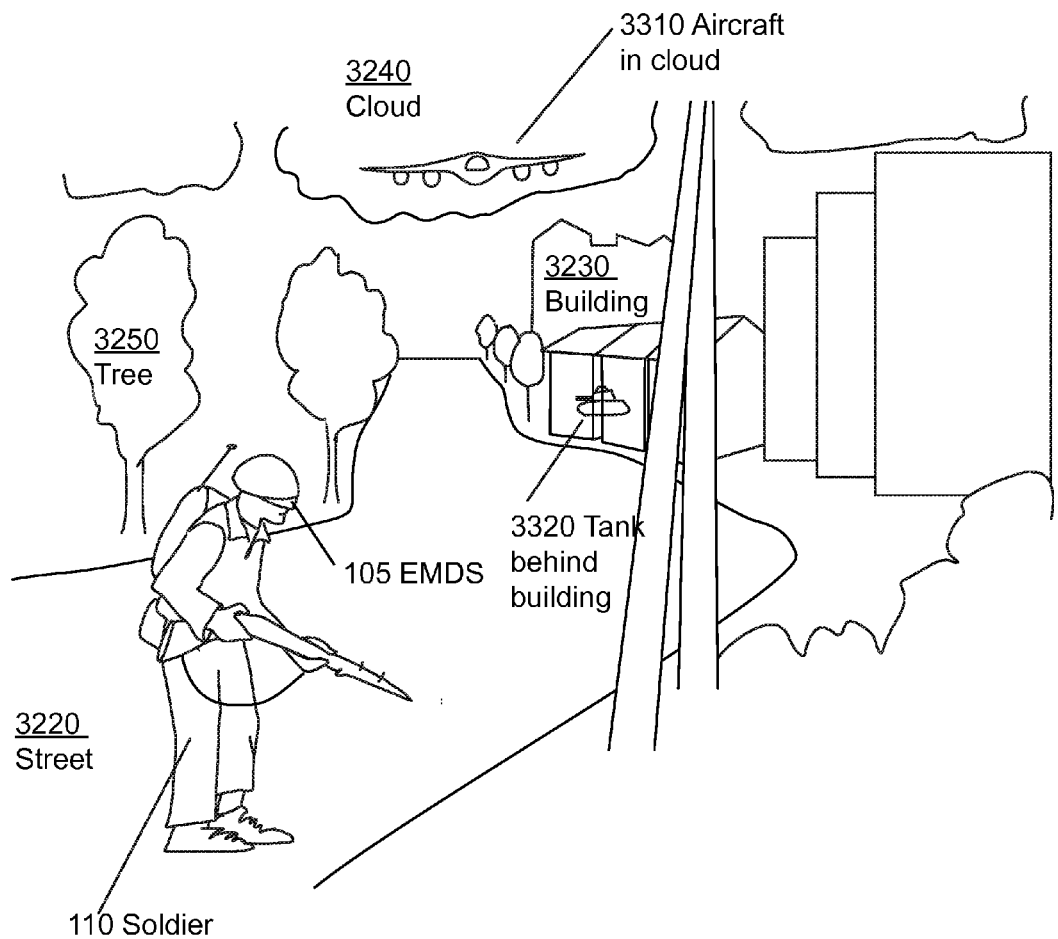
FIG. 33 shows a soldier training in an EMDS-enhanced environment.

An example of augmented reality can be found in FIG. 32 and FIG. 33. FIG. 32 is a street scene with a soldier 110 looking around. FIG. 33 is the same street scene, but with objects that were hidden drawn onto the EMD as augmented reality. The drawn objects include an aircraft 3310 that was hidden by the clouds and a tank 3320 that was hidden by a building.

There are several other ways to merge the real and virtual world. As described in Michael F. Deering. *High Resolution Virtual Reality. Proc. SIGGRAPH* '92, pages 195-202, 1992 and U.S. Pat. No. 5,446,834 "Method and apparatus for high resolution virtual reality systems using head tracked display," which are both incorporated herein by reference, if it is possible to allow through a varying amount of the real world light on a pseudo cone pixel by pseudo cone pixel basis, including full black-out, then the virtual display need only be as bright as the see-through environment. Another method is to use high resolution video cameras mounted just in front of the user's 110 eyes, to capture real-time video images of the real world. Then the virtual world and the physical world can be mixed in video space, and the results sent to the EMDS 105. Finally, with accurate enough cameras and other sensors, it is conceivable for the system to reconstruct the local physical world as a computer graphics data base. Now the virtual world database can be merged with this, and then both can be rendered together. This can lead to better integration of the physical and virtual worlds. Shadows of real-world objects fall correctly on virtual objects, and visa-versa. Physical transparent objects can layer in front of virtual objects correctly.

IV.O. EMD Aware Video Game Software Running on an EMD Non-Aware Video Game Platform EMD Aware: Stereo, Head Tracking, Wide Field of View For the purposes of this section, we will refer to all EMD non-aware game platforms as just "the game platform." Thus this term refers to all present and many future PC gaming platforms, home console gaming platforms, hand-held portable gaming platforms, portable gaming platforms, and any other device (including cell-phones) with some form of standard or non-standard video output, where video games have or will be able to be played, but without EMD awareness.

So long as there is reasonable speed input to the gaming platform (USB, or special formats, etc.) then accurate real-time head position can be obtained by new "head tracked aware" software on old non-aware devices. The existing video output of the game platform would be plugged into one of the video inputs of the EMDS 105, and the head-tracking data output stream would be connected to an appropriate pre-existing data input port on the gaming platform (possibly with a format changer/decrypter black box). Now the new video game software can take rendered frames of the video game with computer graphics viewing transforms that take into account orientation and some position information, as well as the wide field of view. While this will work well for games in which most objects are relatively far away, it may be possible for the new software to let the EMDS 105 know when left vs. right eye video frames are being output, making the game stereo (even if the gaming platform did not already support stereo display). It is also possible to have a game that is now (or was already) in stereo, but not head-tracked.

Figure 31:
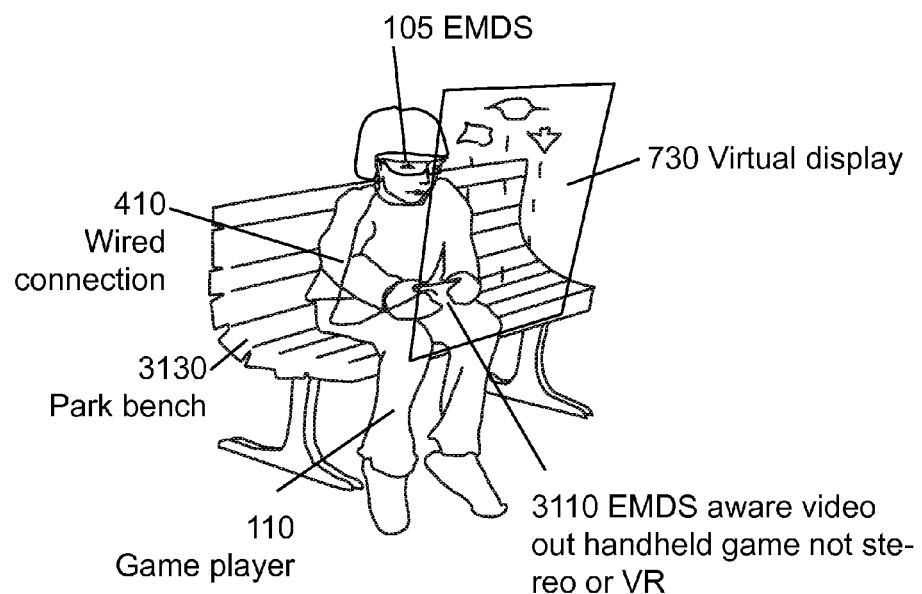
FIG. 31 shows a hand-held gaming device working with an EMDS.

An example of an EMDS non-aware video game being played on a hand-held EMDS aware game device 3110 is shown in FIG. 31 reference 3100. In this case, is it assumed that the EMDS 105 includes a battery powered scaler (not shown). The video out from the game device 3110 in the low end is wired in this example, with this physical connection 3120 including a quick disconnect cabling interface (e.g., two magnets) that passes through this scaler and to the rest of the EMDS. The hand held game device 3110 is assumed to have been retrofitted with a physical reference frame device. The game player 110 seated on the park bench 3130 plays existing and new games on a visually wide angle virtual display 730. In this situation the head tracking could be used to stabilize the virtual display 730; but not to produce any head-tracked stereo display effects on the gaming device 3110.

IV.P. EMD Aware Hardware and Software Video Games on Various Platforms: Hand Held Portable, Portable, Console, Deskside PC EMD Aware: Modifying the EMDS Scaler HW, Resolution, Wide Field of View, Stereo, Head-Tracker, Virtual Reality, Eye-Tracker, Pseudo Cone Pixel Data Stream If a gaming platform is aware of all of the aspects of an EMDS 105, it can utilize a variable resolution 3D rendering device, and directly generate pseudo cone pixels on a spherical or nearly spherical background. To a first approximation there is no difference between such a video game platform and virtual reality display. The differences are, as usual, game applications can cheat in ways not always possible with more general purpose display systems. The "simplifications" that a gaming platform might make include: always completely blocking out light from the physical world, rendering 3D graphics at less than the full available (variable) resolution, pre-computing graphics simplifications (e.g., pre-lit radiosity), not rendering distant parts of the environment if the render load gets too high, using custom shaders to fake more complex lighting and shading effects, etc.

Also to a first approximation, deskside PCs and non hand-held gaming consoles can be considered the same once a game is running. In both cases, to take advantage of EMDSs 105 the 3D graphics renderer preferably directly renders pseudo cone pixels, with a low data rate link into the system to accept and process the head and eye tracking data. The game software preferably takes advantage of the display capabilities, and keeps a high enough reality factor to minimize or eliminate "simulator sickness."

Portable gaming platforms are usually just luggable versions of console game systems, and as such can utilize the EMDS 105 in the same manor. However, some are battery powered, and then the power consumption of the EMDS can be a factor. In the lowest battery power environment, such as hand-held game devices, the EMDS might have a simplified and low power scaler sub-system; not unlike the sub-system that goes into cell phones. In a higher battery power environment, the scaler module might be completely eliminated, so long as the 3D graphics component is capable of directly generating pseudo cone pixel streams.

One example is to re-consider FIG. 31 in which the hand held battery powered game device 3110 is now EMDS aware. It would still display video images the EMDS 105. But now, also there would be a physical world tracker frame 230 built into the game device 3110. The virtual display 730 is a frame floating in front of the player 110. The game content would now be full head tracked stereo.

IV.Q. EMD Aware Simulation Systems: Flight, Tank, Dismounted Infantry, Homeland Defense, Firefighting, Etc.

EMD Aware: Modifying the EMDS Scaler HW, Resolution, Wide Field of View, Stereo, Head-Tracker, Augmented Reality, Virtual Reality, Eye-Tracker, Pseudo Cone Pixel Data Stream Historically, military simulators have traditionally used multiple video projectors and rendering units, to provide the resolution and 3D graphics performance required to meet their needs. HMDs have usually not had the resolution or field of view necessary for the simulation tasks at hand.

However, EMDSs 105 have the potential to alter this. Mounted with 3D rendering systems with variable resolution rendering capacities so that they can directly render to the pseudo cone pixels, EMDSs could provide better resolution and field of view than existing simulators.

If, for example, a physically real cockpit is present in a simulator, with computer generated imagery visible only outside the windows in the cockpit, then the EMDS 105 could match a display image in space from a given image generator to a particular window. Other simulators may only have the controls built in the physical world, and place all the rest of the vehicle being simulated in the virtual world.

FIG. 32 reference 3200 shows an individual dismounted infantry soldier trainee 110 wearing a wireless EMDS 105 in a completely immersive virtual environment. In this case, the virtual environment 730 includes a street 3220, buildings 3230, trees 3250, and clouds 3240 in the air. In this environment, many different training tasks could be simulated, possibly including linking in of multiple other dismounted infantry soldiers, tank simulators, aircraft simulators, CCC (Command, Control, and Communications), etc.

FIG. 33 reference 3300 is similar to FIG. 32, except in this training scenario, simulation of augmented reality display of tactical data is included: an aircraft 3310 that was hidden by the clouds, and a tank 3320 that was hidden by a building. Other possible uses of augmented reality are less direct. Three dimensional terrain maps can float in space in front of the soldier 110 with various points of interest marked. Location blips of the other soldiers in his/her platoon can be marked, as well as any civilians or enemy soldiers sighted. The EMDS 105 does not find the hidden enemy. It just allows the display of this tactical information in a readably useable way.

Figure 34:
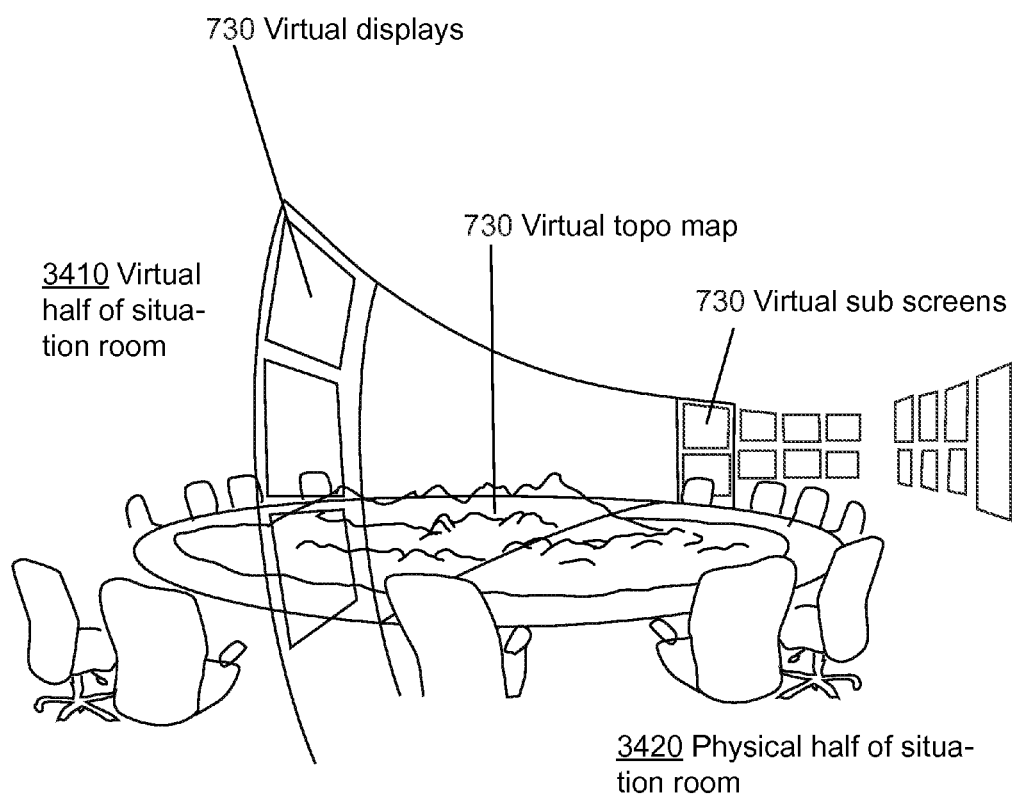
FIG. 34 shows a virtual command, control, and communications room.

FIG. 34, reference 3400, is an example of a virtual Command, Control, and Communications (CCC) center. The displays on the walls are not physical, but virtual screens 3010. The three dimensional topographic map 3020 hovering above the table is also a purely virtual object. Only personnel 3030 wearing EMDS 105 see the data 3020 being presented.

Training systems for firemen and police could use a similar physical set-up as described above.

IV.R. EMD Aware Real World Systems: Flight, Tank, Dismounted Infantry, Homeland Defense, Firefighting, Etc.

EMD Aware: Modifying the EMDS Scaler HW, Resolution, Wide Field of View, Stereo, Head-Tracker, Augmented Reality, Virtual Reality, Eye-Tracker, Pseudo Cone Pixel Data Stream Because of their inherent small size and power requirements, EMDS 105 should be of interest in a variety of military tasks in the field. EMDS could allow large, highly detailed maps to be brought up for display, with active icons representing pertinent objects and areas. In some applications, the best map may be a three dimensional augmented reality map, showing objects directly. While high cost fighter jets have had complex heads-up displays for years, such complex see-through displays have been too expensive or cumbersome for use with lower cost vehicles, let alone individual dismounted soldiers. EMDSs have the potential to alter this, and along with the ever shrinking cost, weight, and power requirements of portable computational and communication elements, much higher functionality displays might be deployed at all levels of military tasking. This also applies to expensive, heavy "situation" rooms. With an EMDS per officer, as much situation can be displayed in a linked system as is desired. This allows such situation rooms to be deployed much more quickly and closer to the front.

As an example, FIG. 32 can now be reinterpreted as a soldier 110 in a real street in a real town; and FIG. 33 can be reinterpreted as showing augmented reality tactical overlays showing the hidden presence of a real aircraft and a real tank. Firefighting and police action could also have dynamic overlays of things that they cannot see directly, because of smoke, or because the police are hunkered down in a safe position. Remote cameras can show them what is happening in the danger area.

IV.S. EMD Aware Real World Systems: Command, Control, and Communications (CCC) Center.

Military and civilian Command, Control, and Communications (CCC) applications traditionally have been large rooms with multiple large displays covering most of one large wall. Currently, these displays typically are short folded depth rear screen video projectors. EMDS have the potential to emulate almost any display environment, including this one.

Each wall display is displaying the results of an image generator video feed. With an EMDS, each would feed into a scaler (e.g., per viewer), and this display could be re-arranged in apparent real space position, size, and orientation as desired. Such a "virtual CCC" has the advantage of being very quick to set up, allowing military applications to move CCC physical locations closer to the action. FIG. 34, reference 3400 shows a hybrid display. All the wall displays 730 are virtual displays, but half of the room is "virtual", representing another distant CCC center. On the tabletop shared between the two rooms, a 3D topological/map 730 display is shown.

IV.T. EMD Aware Full Scale Industrial Design Display

EMD Aware: Resolution, Wide Field of View, Stereo, Head-Tracker

In automotive body design, size matters. A half scale clay replica of a potential automobile body will not allow proper decisions to be made. The prototype must be visually full scale. Presently this is accomplished in a large dedicated room with multiple panels of rear screen video projectors, many-times in head tracked stereo. If stereo display with active head tracking is used, the display system becomes a very expensive single user system. A larger audience can view stereo objects in the room with active or passive glasses, but with incorrect stereo viewpoints. With EMDS 105 technology, any designer, engineer, marketer, or executive can potentially use their personal EMDS to review life size designs together or alone whenever they like.

Figure 35:
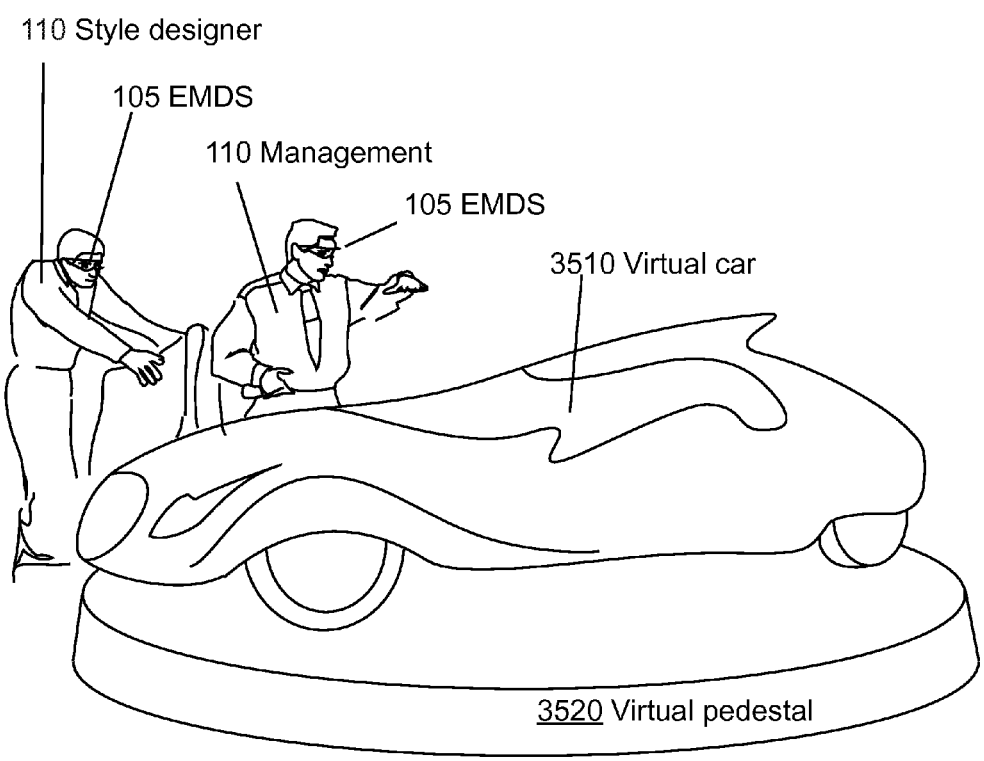
FIG. 35 shows a virtual automobile.

An example of such a system is shown in FIG. 35, reference 3500. Here the virtual automobile 3510 appears on a rotating (or not) circular pedestal 3520 to the engineer 110 and the executive 110 through their EMDS 105 and private pseudo cone pixel data stream 225 corresponding to their unique position and orientation with respect to the virtual car. The same would hold if the room was filled with additional viewers.

The previous example used automotive body design as just one example of where EMDSs 105 can be of use. Similar scenarios can be applied to any design, from bicycles to jumbo jets, from ski-boots to kitchen appliances, and include not just the exterior look, but the design of the internal working parts.

Figure 36:
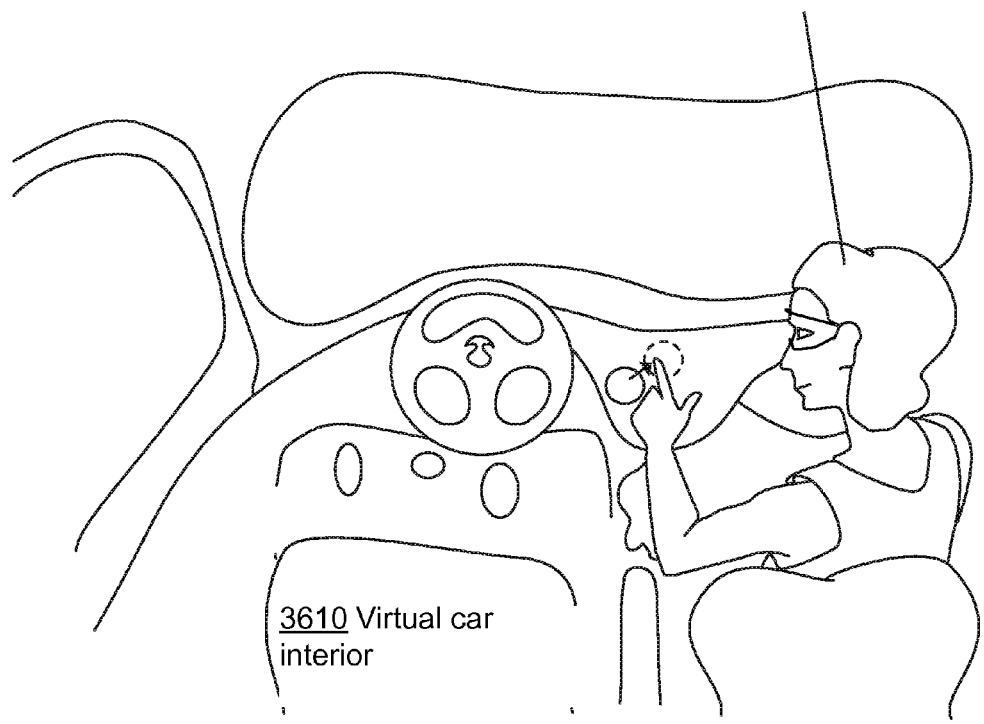
FIG. 36 shows the interior of a virtual automobile.

One can also design objects at full scale from the inside. FIG. 36 shows a designer 110 designing the virtual interior 3610 of a car from the inside.

IV.U. EMD Aware Industrial Design Display

Figure 37:
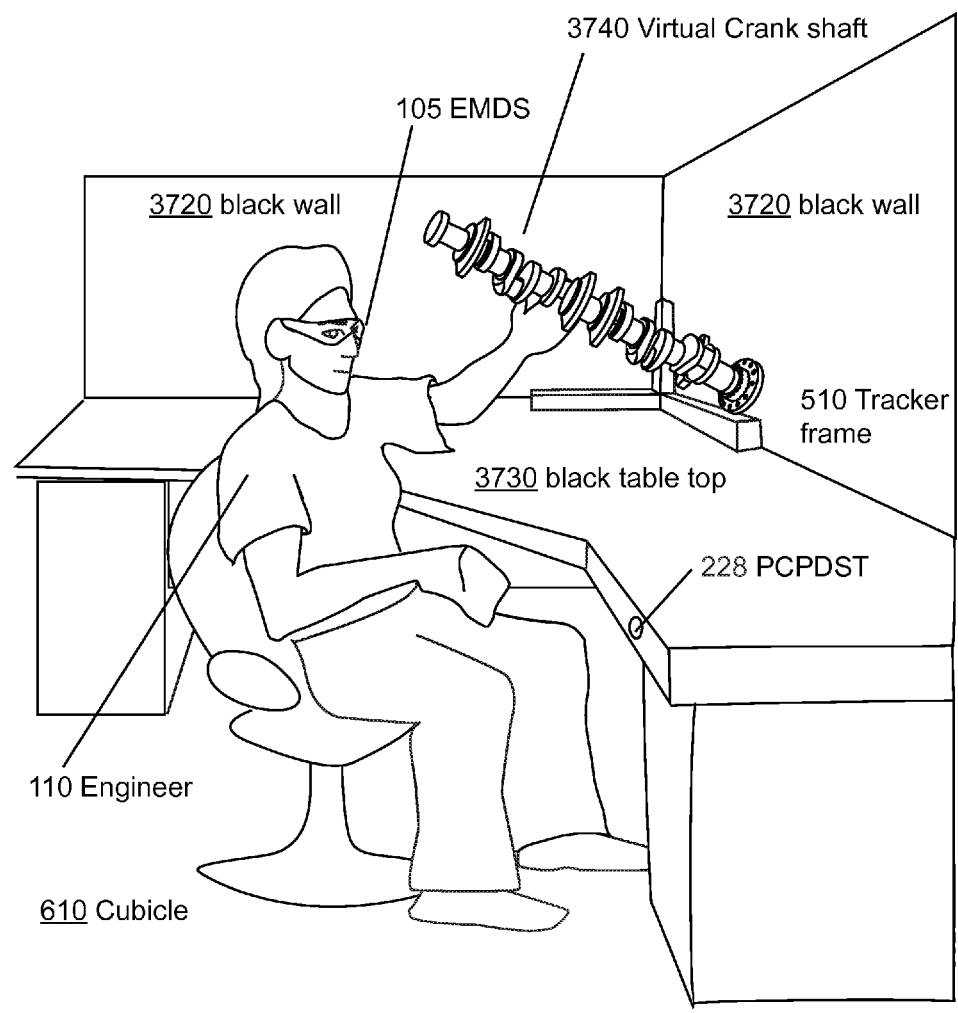
FIG. 37 shows an engineer designing a crank shaft using EMDS-based desktop virtual reality.

Such a workspace for virtual parts design is shown in FIG. 37, reference 3700, where an engineer 110 in a cubicle 3710 is wearing an EMDS 105, and is visualizing and modifying the design of a crank shaft 3740. A tracker frame 230 and a wireless pseudo cone pixel data stream transceiver 228 are built into the upper portion of the cubicle 3710.

IV.V. EMD Aware Telepresence Display for Remote Teleconferencing

Figure 38:
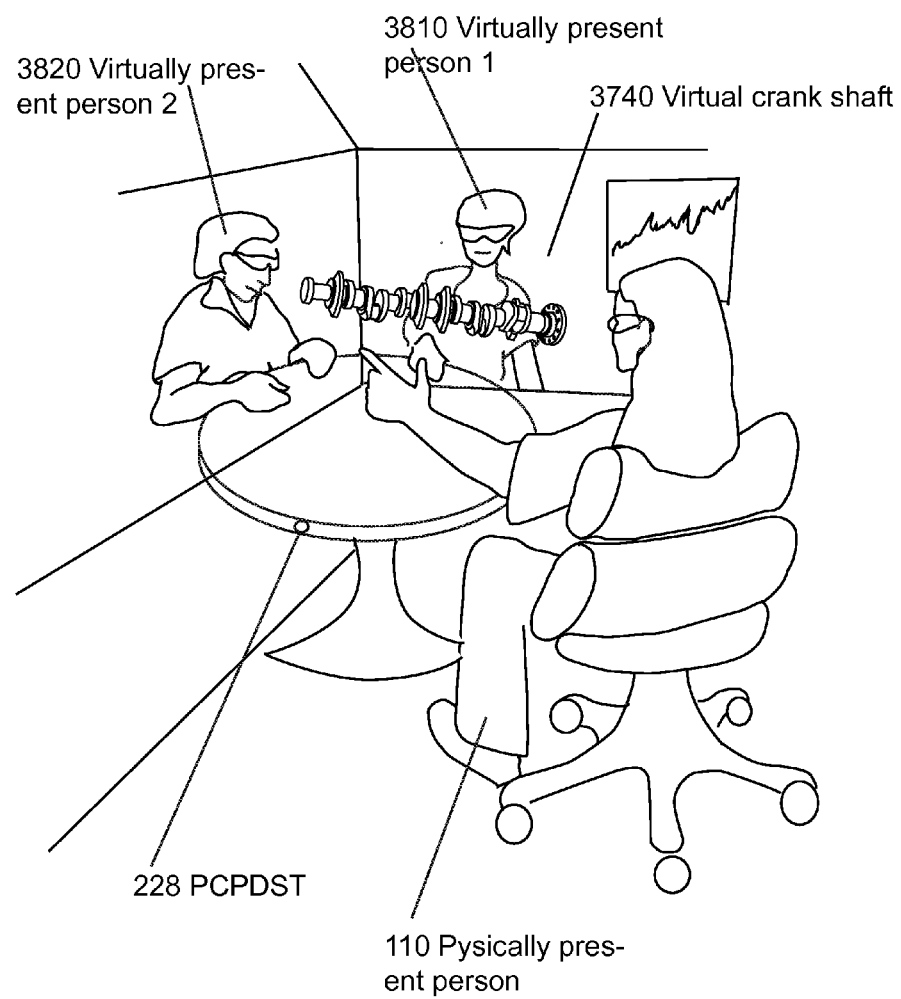
FIG. 38 shows a virtual 3-way teleconference

EMD Aware: Modifying the EMDS Scaler HW, Resolution, Wide Field of View, Stereo, Head-Tracker, Augmented Reality, Virtual Reality, Eye-Tracker, Pseudo Cone Pixel Data Stream Users wearing an EMDS 105 and in range of a network connected pseudo cone pixel data stream transceiver 228 (and tracker frame 230) can be part of a virtual teleconference. FIG. 38, reference 3800, shows the view from one physical participant 110 and two virtual participants, 3810 and 3820. Each is wearing an EMDS 105, and have the same three dimensional data about the object 3740 that is the topic of the teleconference.

IV.W. EMD Aware Augmented Display for Equipment Repair

Figure 39:
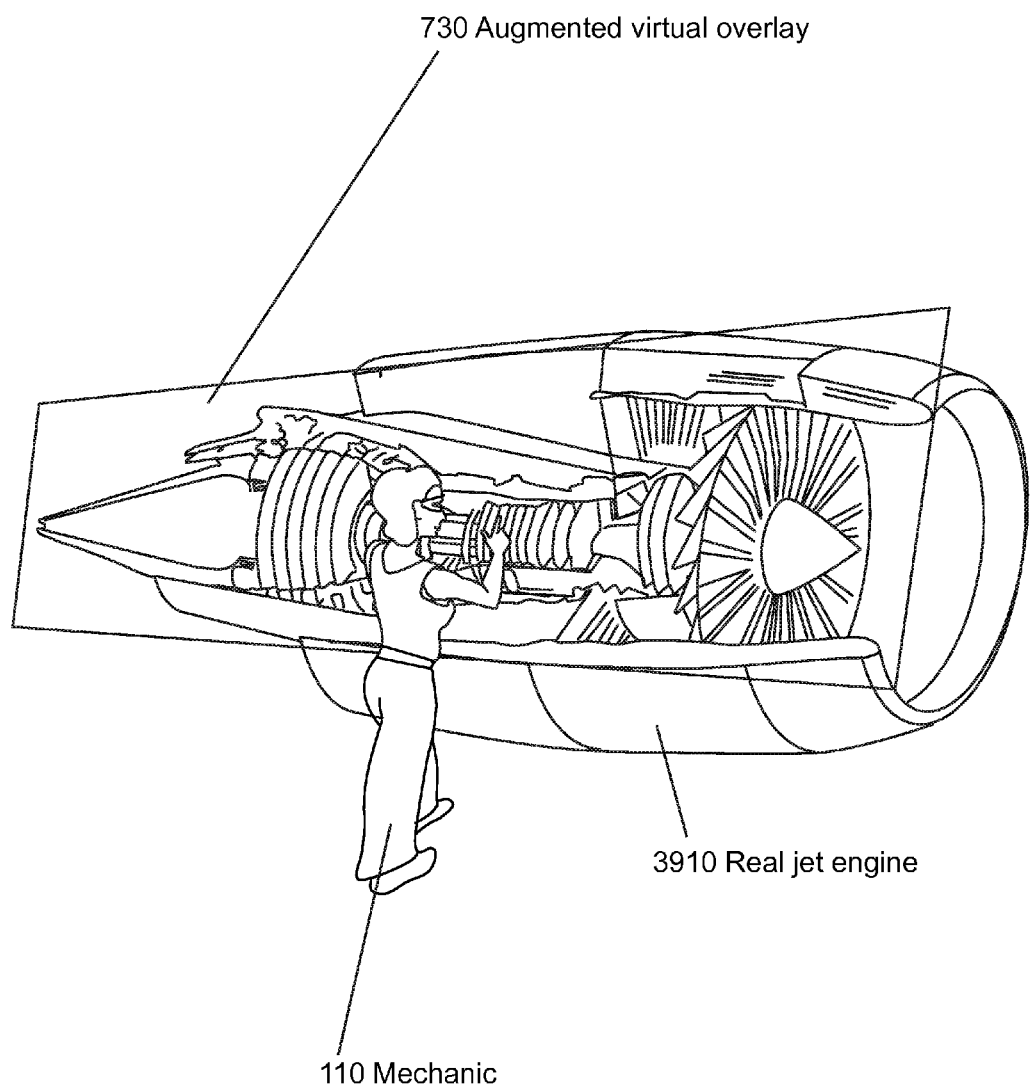
FIG. 39 shows a jet engine technician using an augmented reality repair application.

The prototypical example of using augmented reality for equipment repair is shown in FIG. 39, reference 3900. A technician 110 is half way immersed in a jet engine 3910 under repair, wearing an EMDS 105, and pulling up appropriate overlay schematics and instructions on a virtual display 730 aligned via a physical world tracker frame 230 bolted to a known part of the engine.

Figure 40:
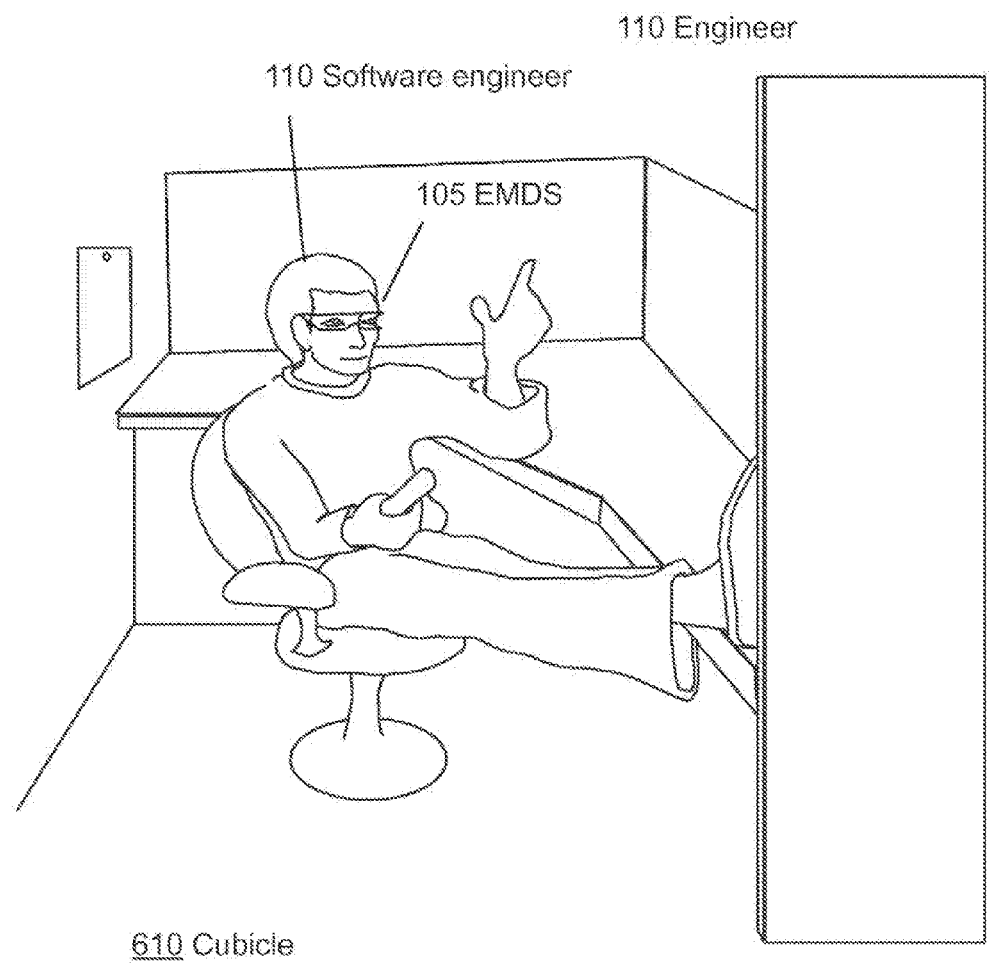
FIG. 40 shows a software engineer using an immersive EMDS.

IV.X. EMD Aware Industrial Virtual Reality Display for Software Development in a Cubicle Software engineers 110 can take advantage of EMDSs as well, even with no explicit 3D content. Such displays allow them to have multiple web pages, documentation pages, code pages, and a debugger display either as separate windows on a single cylinder virtual display 730 as seen in FIG. 40, reference 4000.

IV.Y. EMD Aware Industrial Immersive Virtual Reality Display in a Cubicle

Just because an employee is housed in a small cubicle, does not mean that they can not perform work on very large virtual spaces. A game developer can black out all real world light coming into his eyes by placing (or pulling down) blackout shades 4110 over the EMDS headpiece. Now a fully 3D stereo rendered world can be displayed wherever the game developer looks, otherwise using the same set-up as was shown in FIG. 40.

IV.Z. EMD Aware Telepresence Display for Remote Medicine, Robots, Land, Sea, and Air Vehicles, Space, Planetary Explorations (Moon, Mars, Etc.)

EMD Aware: Modifying the EMDS Scaler HW, Resolution, Wide Field of View, Stereo, Head-Tracker, Augmented Reality, Virtual Reality, Eye-Tracker, Pseudo Cone Pixel Data Stream EMDS 105 can be used as part of a "telepresence" system, where the viewer 110 and the object being viewed are separated by a (large) physical distance. Most existing telepresence systems are based on limited resolution non-stereo standard television systems, and are thus limited in their application. Assuming stereo or multiple cameras at the remote end, much more "real" remote viewing can be achieved utilizing EMDS as the display component. Also, if the time delay loop is short enough, then the camera systems at the remote end can have higher resolution "foveal" centers than the rest of the view. Then the eye (and head) tracking data from the EMDS can be used to point the remote foveal cameras in the appropriate direction so as to maximize the resolution sent back to the remote viewer 110.

Down to earth systems are remote robots where it is dangerous, impossible, or too time sensitive for a person to go, as well as systems just to lower travel costs and times such as remote medical applications.

Outside the earth, even if one has a nice Mars base and a nice crewed exploration vehicle, a (possibly tethered) robot with stereo telepresence cameras can still be a better "crew member" to go outside and investigate some interesting rocks. Limiting the number of occasions that the human crew has to "suit up" and enter the hostile off-earth environments reduces the risks of accidents and increases productivity, not to mention that the robot can see in many spectrums that the un-aided human eyeball cannot.

Figure 41:
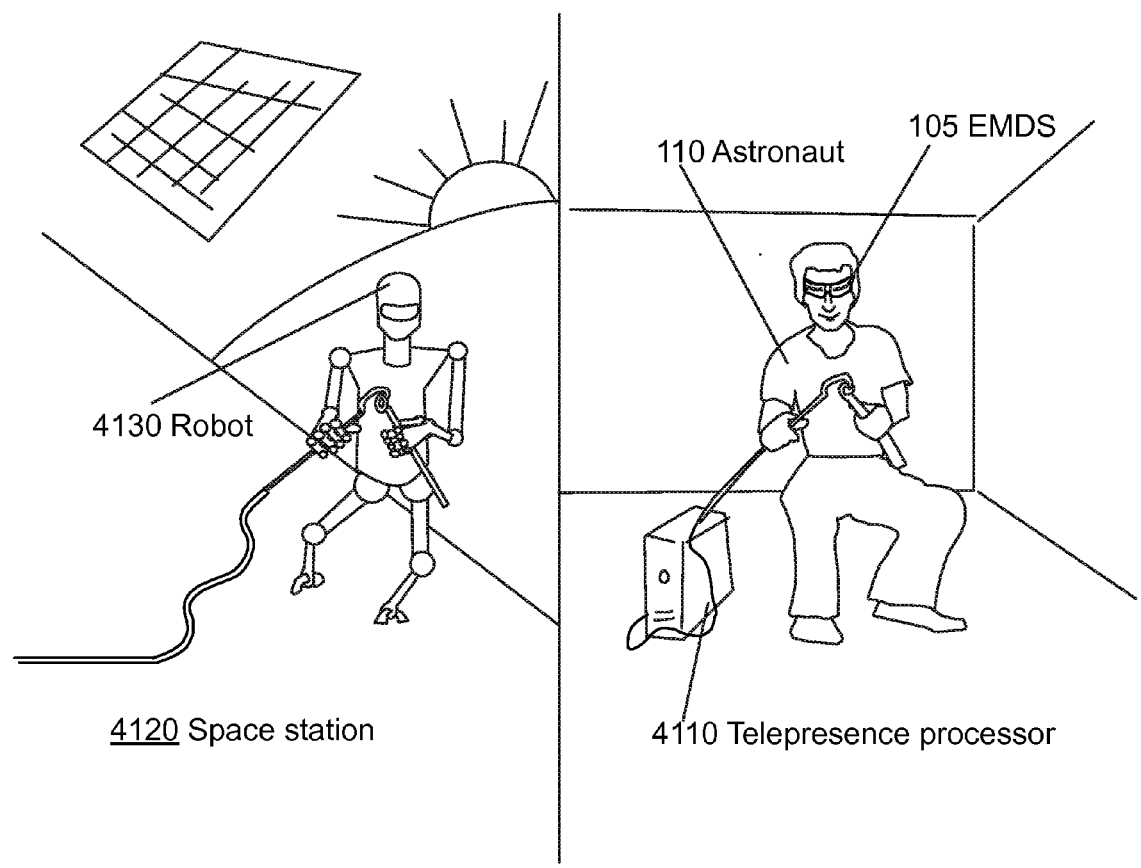
FIG. 41 shows space telepresence control of an external robot.

FIG. 41, reference 4100, shows a similar example for an EMDS 105 wearing astronaut 110 working in a short sleeves environment inside a space station 4120 is controlling via telepresence a robot 4130 working at some physical task out in the vacuum beyond the station's walls.

V. Eye Mounted Displays and Eye Mounted Display Systems

V.A. Optical Basis for Eye Mounted Displays

The following discussions use the wavefront interpretation of light. Specifically, most natural objects (and most traditional displays), from a light propagation point of view, consist of physical surfaces where at large numbers of different positions on the physical surface point sources of light exist generating spherical wavefronts of light. The optical frequencies (i.e., wavelengths) of this reflected light correspond to the optical frequency of illumination light hitting the physical surface in a region containing the point source. This description is a simplified model sufficient to illustrate the points to be made. More detailed models can include additional effects such as subsurface scattering, polarization, frequency shifting, etc.

Figure 11A:
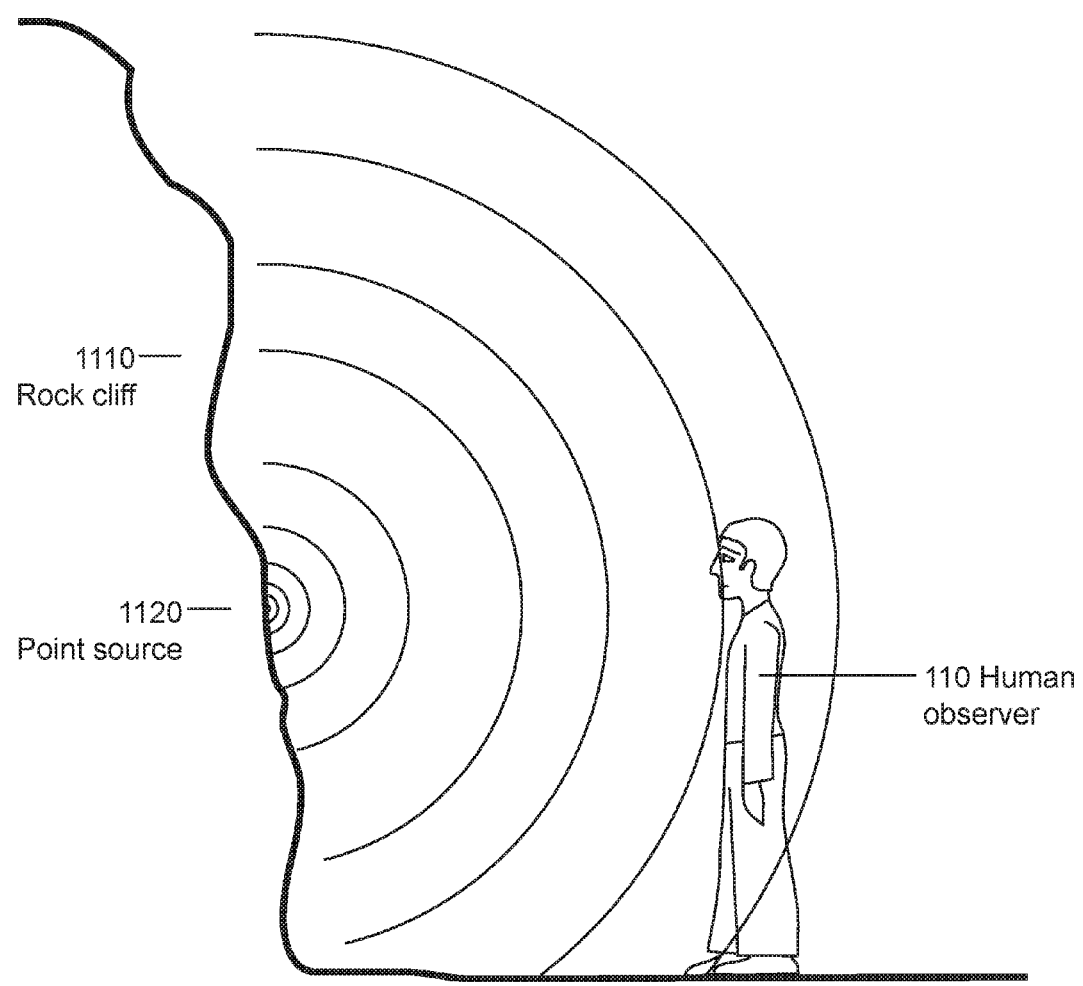
FIG. 11A (prior art) shows how photons in the natural physical environment can result in visual perception: photons from the sun reflect off a point somewhere on a rock cliff and possibly into a human 110 observer's eyes.

FIG. 11A shows an example two-dimensional cross section of a surface, such as the face of a rock cliff wall 1110, with only one point source of reflected/scattered light 1120 and its expanding wavefronts drawn, along with a human observer 110. In the natural and built environment, most such point sources are not self-emissive, but reflections of a small portion of a larger illumination source, such as the sun, moon, fires, artificial lighting, etc. There are only a few other natural self-emissive light sources, such as bioluminescence. The expanding wavefronts of light, such as from point source 1120, are what the human eye is designed to convert into images on the surface of the retina, as will be described later. But first, a description of how existing display technologies form similar sets of wavefronts of light will be considered.

Figure 11B:
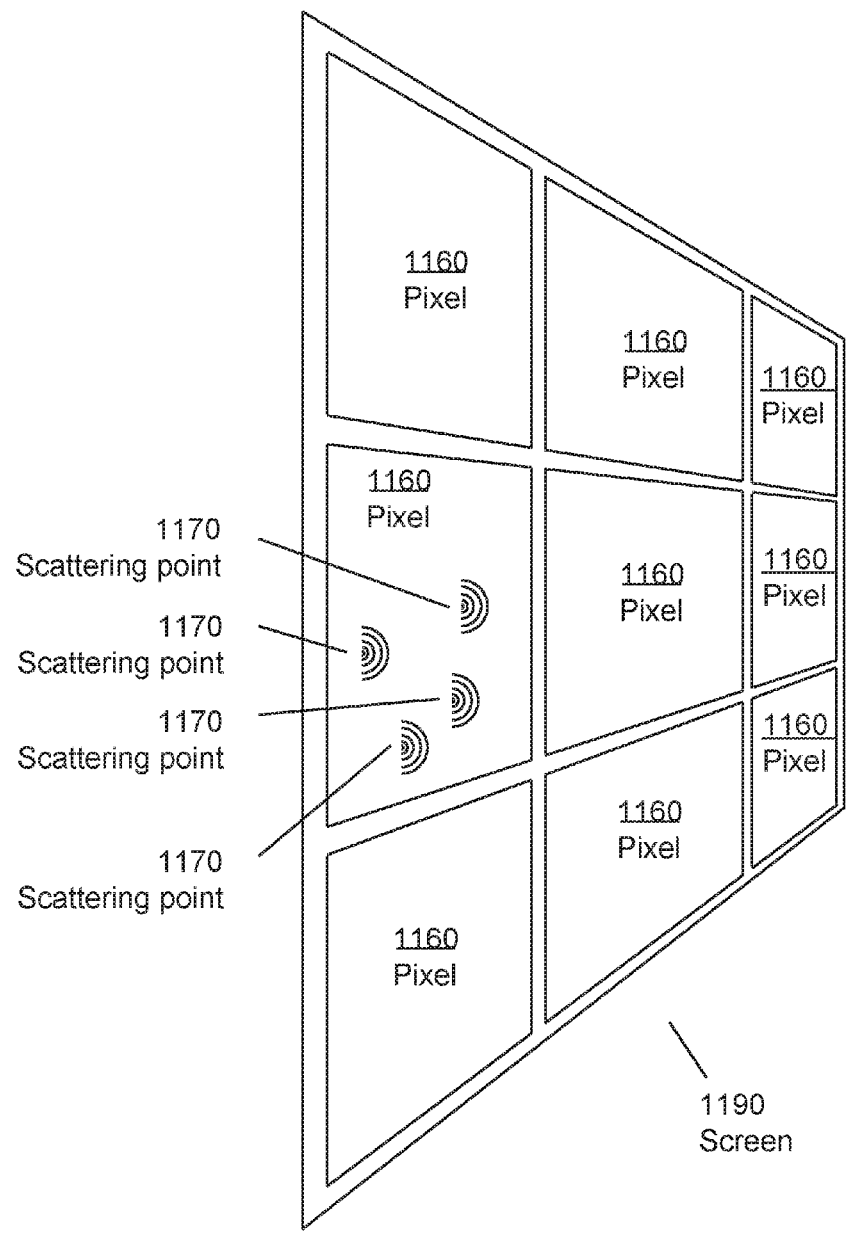
FIG. 11B (prior art) is a small section of a projection screen where a single incoming wavefront of light may produce many more possible reflected point sources that will propagate out from the screen.

In contrast to the natural environment, most direct view display technologies are self-emissive, including direct view CRTs, most LCDs, plasma, LEDs, OLEDs, etc. The few exceptions include reflective displays that emit no light themselves, but selectively reflect external illumination sources. Projection displays are a specialized type of illumination sources, where at an external in-focus image plane (i.e., the screen), different small areas of the screen (individual pixels 1160, or similar objects) are each illuminated by an independently controllable intensity (gross number of photons per time period) and one or more of specific spectral profiles (colors). This is achieved by the projector emitting collapsing spherical wavefronts in a different propagation direction per "pixel" (or similar object). The optics are set up such that at a specific distance from the projector, all of these contracting wavefronts have contracted to very close to their minimum size, preferably each non-overlapping each other, except for multiple spectral contributions (for example, red, green, and blue pixel components all on collapsing to the same small area) forming a two dimensional array of these concentrated wavefronts. Almost all the probability of each original truncated spherical wavefront emitted from the projector has been concentrated into these individual small areas, concentrating the probability of the wavefront eventually collapsing into a photon to each individual small area. Only some wavefronts collapse into photons at the screen; these are absorbed by atoms in the screen, and are generally converted to heat. But in most cases the contracting wavefront is reflected or scattered (sometimes several times) by atoms in the screen, thus changing the incoming collapsing wavefront into multiple new point sources of expanding spherical waves from different points 1170 within the macroscopically small area, as shown in FIG. 11B. This collection of expanding wavefronts from the screen surface approximate the collection of expanding wavefronts produced in natural conditions, and as will be described in a later sections, allow the natural function of the human eye to perceive these artificially generated collections of expanding wavefronts as images.

Figure 86:
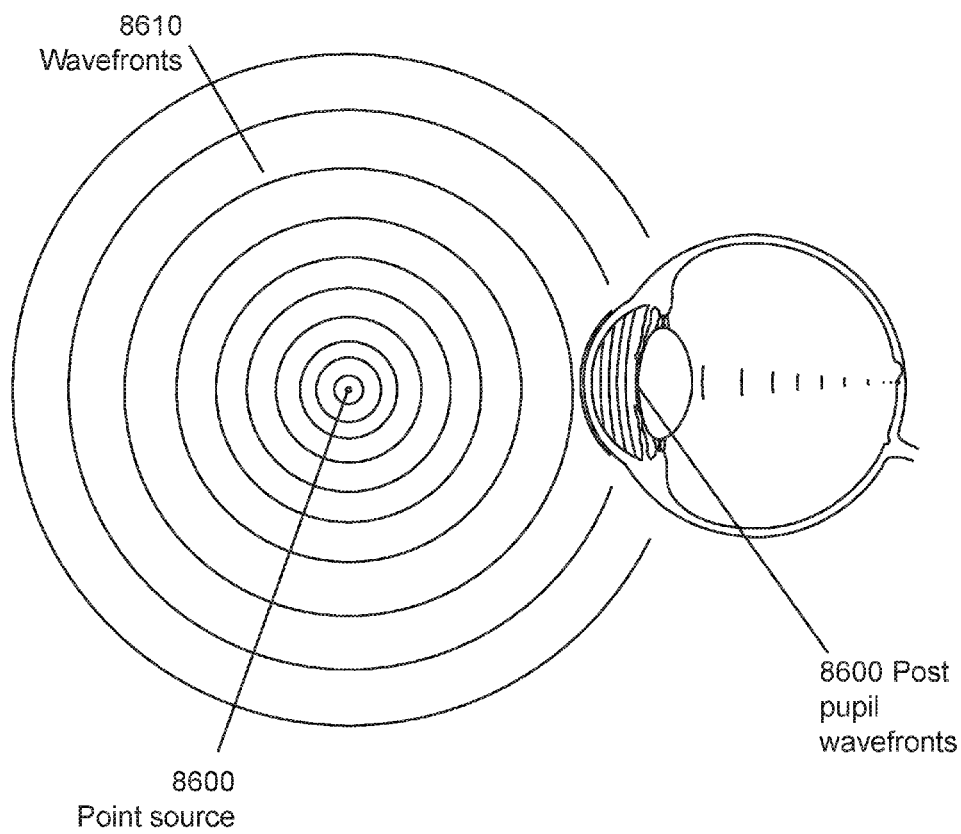
FIG. 86 shows a point source emitting spherical wavefronts of visible frequency electromagnetic radiation, and what happens to the portions of the wavefronts that encounters the human eye.

FIG. 86 shows multiple wavefronts 8610 emitted by the point source 8600. While the wavefronts are initially spherical, in FIG. 86 the wavefronts 8610 are eventually truncated to show only those portions that will pass near the human eye. As can be seen in FIG. 86, only those portions of the wavefronts 8610 that intersect with the cornea will enter the eye (ignoring reflections off the cheeks, etc.). As the wavefronts 8610 pass through the cornea, their shape will be changed. The exact nature of the change in wavefronts 8610 shape is a function of corneal shape, the shape of the wavefronts 8610 as they encounters the cornea (usually portions of spherical wavefronts of a given radius), and the specific optical frequency of the emitted wavefront 8610. This function can be simulated by computer programs. See, for example, U.S. patent application Ser. No. 11/341,091, "Photon-Based Modeling of the Human Eye and Visual Perception," filed Jan. 26, 2006 by Michael F. Deering, which is incorporated herein by reference.

Figure 87:
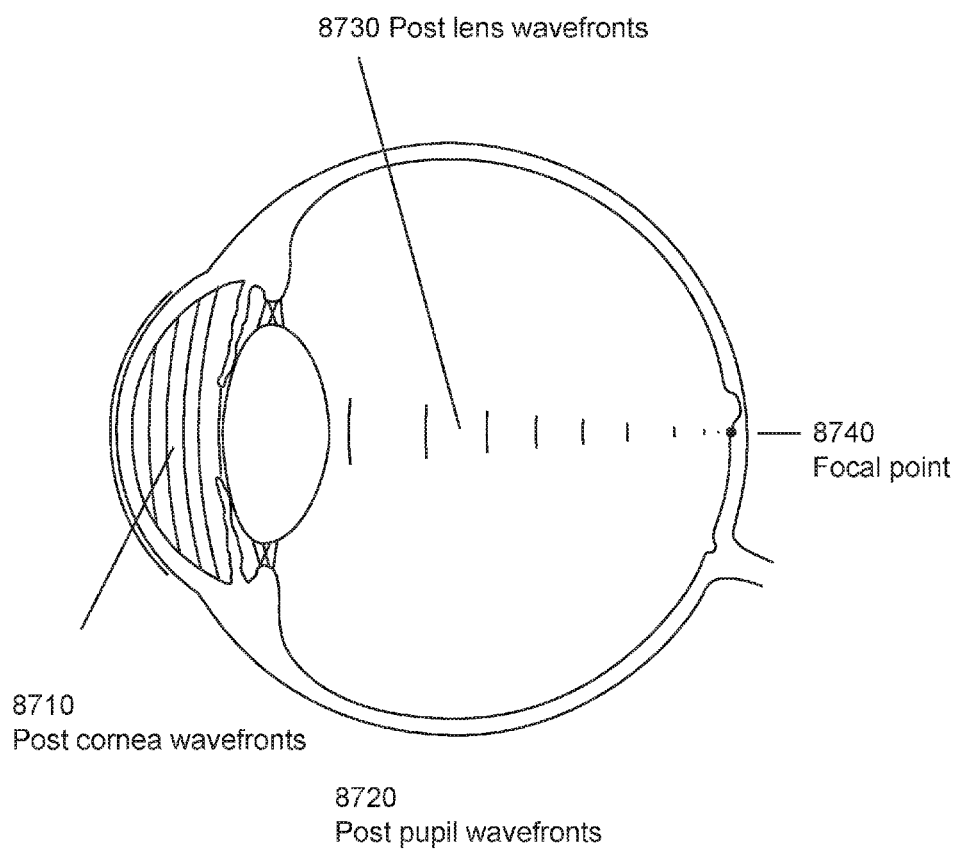
FIG. 87 shows more detail on wavefront changes inside the eye of FIG. 86.

In general, though, the wavefront modification caused by the cornea is to change the wavefronts 8610 from expanding wavefronts to contracting wavefronts. As seen in more detail in FIG. 87, the modified wavefronts are post corneal wavefronts 8710. These wavefronts propagate through the aqueous humor until they encounter the (variable size and distance) iris. Only those portions of the wavefronts that intersect with the hole in the iris will pass through the pupil and enter the lens. These wavefronts are the post pupil wavefronts 8720, which are a truncation of the post corneal wavefronts 8710. The lens will perform additional modifications to the wavefront 8720 to produce the post lens wavefronts 8730. The wavefront shape change performed by the lens is again a function of present shape of the variable shape lens, the incoming post pupil wavefronts 8720 shape, and the specific optical frequency of the point source 8600. This function can also be simulated by computer programs. See U.S. patent application Ser. No. 11/341,091, cited above. In general, though, the wavefront modifications caused by the lens are to further reduce the radius of contraction and direction of propagation of the post corneal wavefronts 8710. These wavefronts 8710 propagate through the vitreous humor until they encounter the photosensitive retinal surface.

Formally, the result is a probability distribution on the retina that is the point spread function of the image of the point source 8600 on the photosensitive retinal surface. While the tail of these functions can extend quite far, normally only a sub-portion of the retina that contains a large majority (say 95%) of the probabilities is identified as the illuminated photosensitive retinal surface portion (for optical frequency of the point source 8600). If the distance from the point source 8600 to the eye at the optical frequency of point source 8600 is "in focus" at the photosensitive retinal surface, then the portion of the probability of any point on the wavefront collapsing to a photon will be focused on a particular small portion of the photosensitive retinal surface.

In the fovea, the point spread function of the focused wavefront on a particular point on the photosensitive retinal surface will be determined by a combination of the quality of the cornea and the lens as optical elements, and the diffraction effects generated by the size of the pupil. Within the region of the fovea, this point spread function can have the majority of its probability contained within an area not much larger than a single thin foveal cone, but the higher the retinal eccentricity the larger the point spread function will get, due mostly to the imperfect nature of the human eye's optical elements.

Considering together all these operations, it can be seen that two different point sources of light, positioned at different angles in space, will concentrate different photon collapse probabilities to specific different illuminated photosensitive retinal surface portions. A first point source will be imaged on the retina at one retinal image point a second different point source will be imaged on the retina at a second different retinal image point. By adding more and more angularly separated points, one can see how the human eye produces an (inverted) projected two dimensional image of the three dimensional environment around it onto the (approximately spherical) photosensitive retinal surface.

FIGS. 86 through 91 and 42 through 48 illustrate optical properties of the human eye that will be later used to enable the construction of eye mounted displays. In these examples, a point source generates a wavefront, a portion of which passes through the cornea and is imaged onto the retina. The wavefront changes as it passes through the eye. This function can be simulated by computer programs. See, for example, U.S. patent application Ser. No. 11/341,091, "Photon-Based Modeling of the Human Eye and Visual Perception," filed Jan. 26, 2006 by Michael F. Deering, which is incorporated herein by reference.

Figure 88:
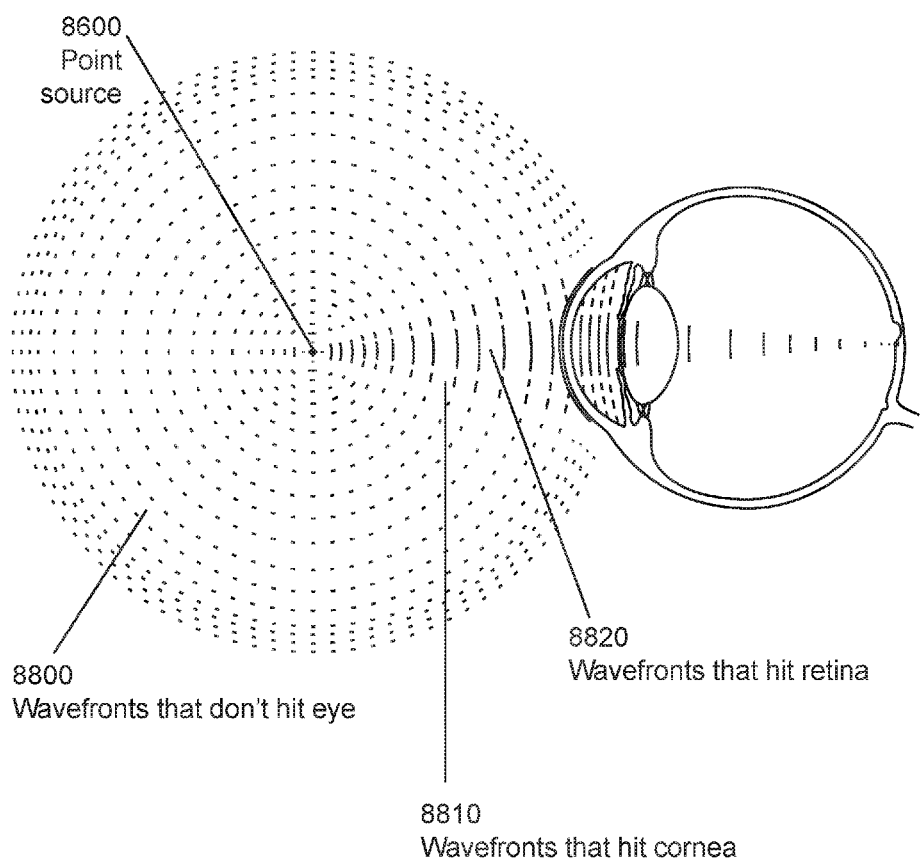
FIG. 88 is a modification of FIG. 86, in which wavefront portions are drawn as dotted, dashed, or solid, depending on how their future encounter with the human eye will go.

FIG. 86 was described above. FIGS. 88 through 91 are modifications of FIG. 86. In FIG. 88, the portions of the wavefront 8610 that will not encounter the cornea are drawn as dotted lines 8800; the portions of the wavefront 8610 that will have their shape modified by the cornea to the wave front 8710 but will not encounter the pupil are drawn as dashed lines 8810; and the portions of the wavefronts 8610 that will make it all the way to the photosensitive retinal surface and produce illumination on the photosensitive retinal surface portion are drawn as solid lines 8820.

Figure 89:
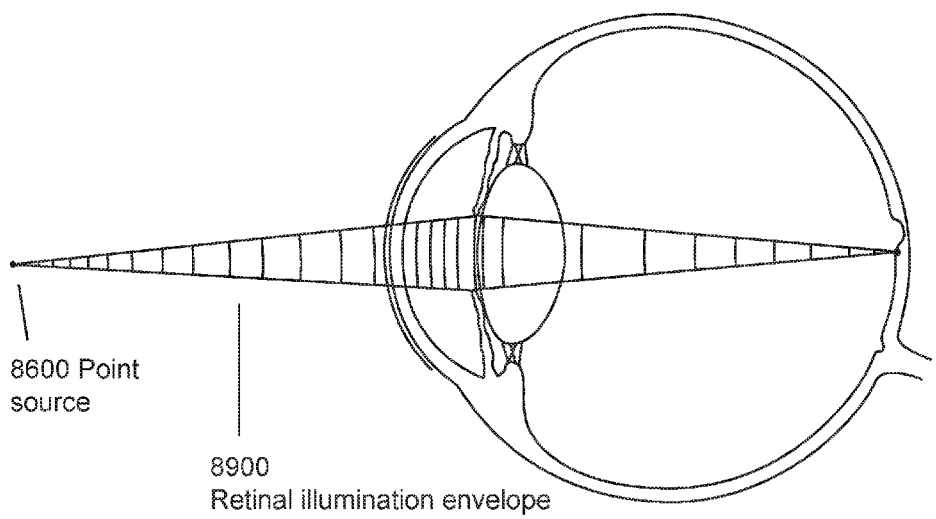
FIG. 89 is a modification of FIG. 86, in which only the portions of the wavefronts that will make it to the retina (the solid portions of FIG. 88) are shown, along with a thicker line outline showing the envelope of this truncated set of wavefronts.

In FIG. 89, only the portions of the wavefront that will make it to the photosensitive retinal surface (the solid portions of FIG. 88) and produce illumination on the photosensitive retinal surface portion are shown, along with a thicker line outline showing the (one dimensional cross section of the) envelope of this truncated wavefront. The fully three dimensional envelope is the optical aperture of a retinal area 8900, which looks like a three dimensional ellipsoidal cone with some bends in it. In FIG. 89, only the two dimensional cross section of this three dimensional object is shown. Both are identified as reference 8900.

Figure 90:
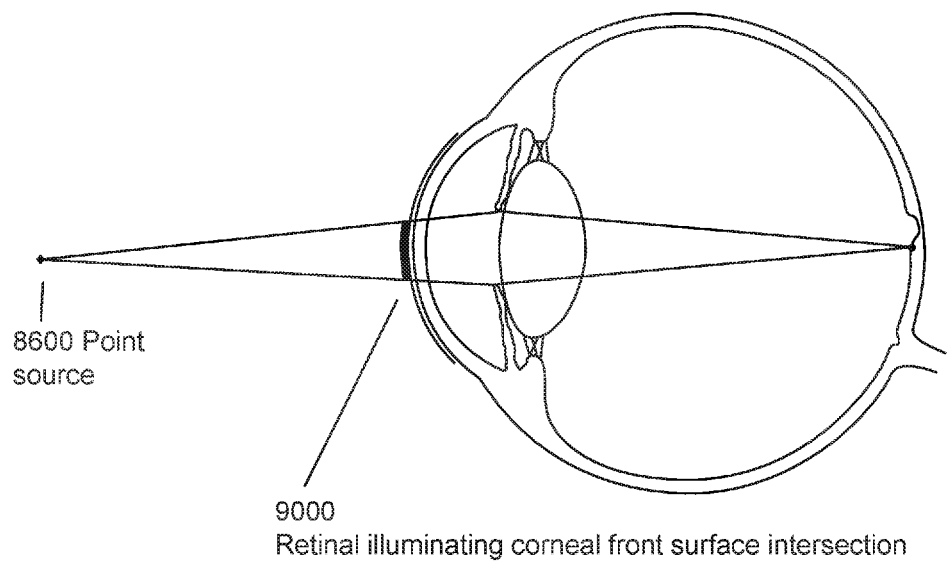
FIG. 90 is a modification of FIG. 89, in which the portions of circular arcs representing the wavefronts at different locations are no longer drawn, leaving only the envelope to show the limits of all the wavefronts (of FIG. 89).

In FIG. 90, the portions of circular arcs representing the wavefront at different locations are no longer drawn, leaving only the (two dimensional cross-section) optical aperture of a retinal illumination envelope 8900 to show the boundaries of the wavefront that will make it to a retina area and produce illumination on the photosensitive retinal surface portion. The portion of the front surface of the cornea that is within the optical aperture of the illuminated photosensitive retinal surface portion is indicated by drawing that portion of the front surface of the cornea as a thicker line 9000 than the rest of the front surface of the cornea. The retinal illuminating corneal sub-surface 9000 is formed by the intersection of the optical aperture of the illuminated photosensitive retinal surface portion with the surface of the cornea. The prefix "sub" in "corneal sub-surface" refers to the fact that this area is a subset of the full corneal surface and does not imply that this is necessarily below the corneal surface. In general, its edge shape resembles an ellipse cut out of the roughly parabolic surface of the cornea. The two dimensional cross section of this sub-surface is reference 9000 in FIG. 90.

This illustrates an important aspect of EMDs. Conventional displays generate wavefronts of light that cover at least the entire cornea and nearly always much more. However, to illuminate a particular small portion of the photosensitive retinal surface, one does not need to generate relatively large area wavefronts of light, as is done in conventional displays, where the wavefront area has been at a minimum the size of the eye, or much larger. Instead, it has been shown here that for a display positioned outside the cornea, one need only generate wavefronts that cover the respective retinal illuminating corneal sub-surface, whose area is considerably smaller than the entire corneal area. That is, the pupil acts as an aperture. The projection of a particular photosensitive retinal surface portion through the pupil onto the cornea defines (at least to first order) an area on the cornea that will be referred to as the retinal illuminating corneal sub-surface, or simply the corneal aperture, for that particular portion of the retina. This effectively is the projection of the optical aperture onto the cornea. Wavefront portions (of the correct wavefront shape) that fall within the corneal aperture will propagate on to the corresponding photosensitive retinal surface portion. Wavefront portions that fall outside of the corneal aperture will be blocked, for example by opaque portions of the iris.

Note that any wavefront that is smaller than but still within this retinal illuminating corneal sub-surface (and with the correct wavefront shape) will also illuminate the same photosensitive retinal surface portion. This situation will be referred to as an underfilled corneal aperture. Note that the pupil will also be underfilled in this case. One drawback of wavefront portions that do not fill the corneal sub-surface is that the diffraction effects are larger, but outside the fovea region this is rarely the resolution limiting effect.

Figure 42:
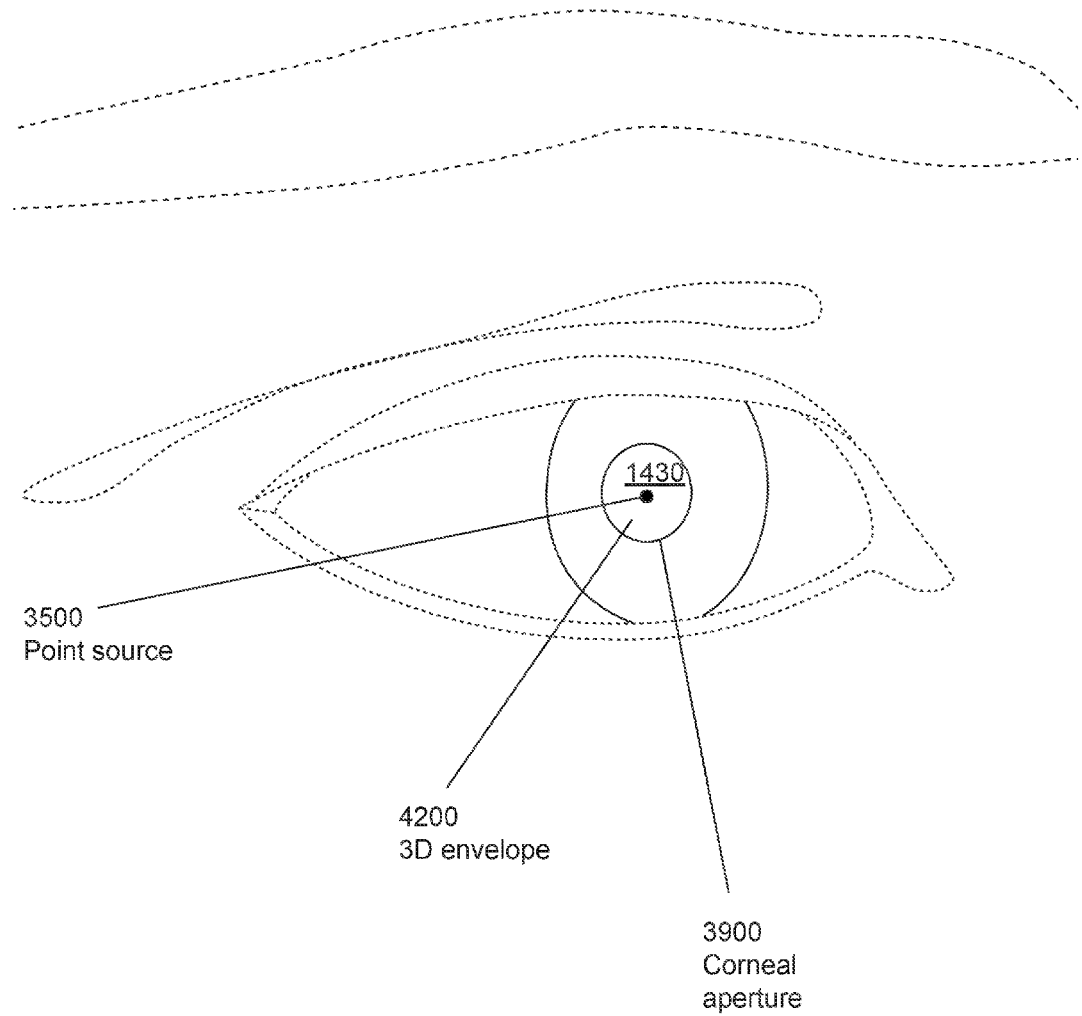
FIG. 42 is a perspective drawing depicting imaging of a point source onto the retina, as seen from the point of view of the point source.
Figure 43:
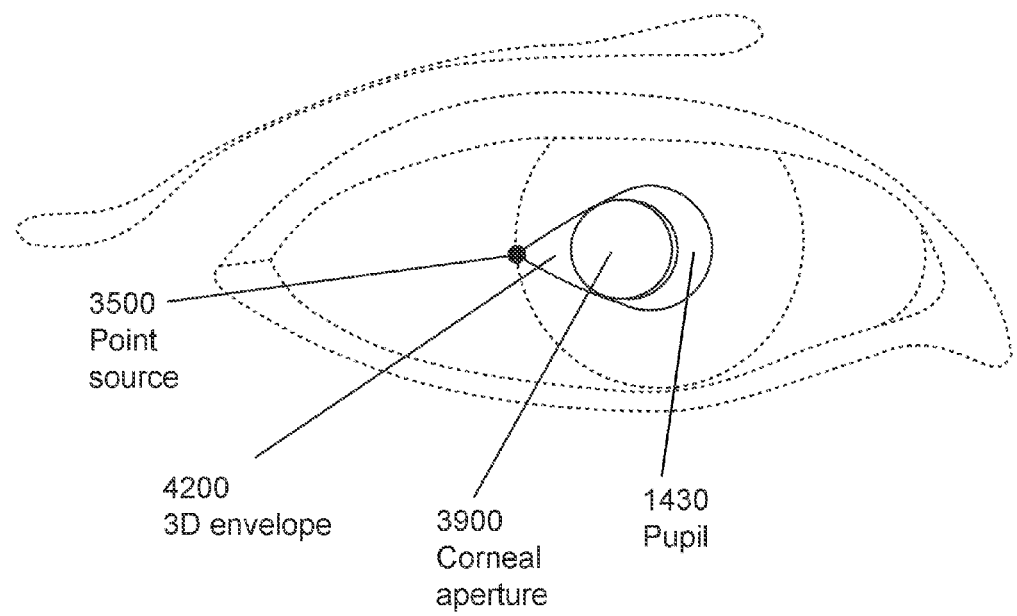
FIG. 43 shows the same situation as FIG. 42, except from a point of view rotated half way from the location of the point source and head-on to the face.
Figure 44:
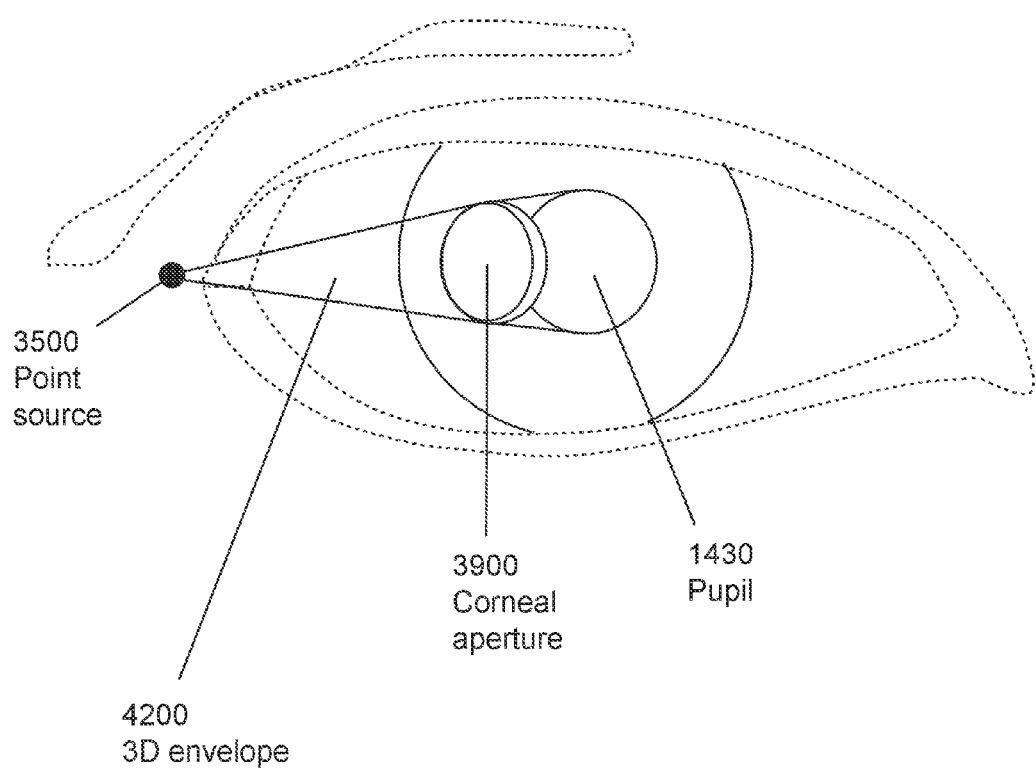
FIG. 44 shows the same situation as FIG. 42, except from a point of view now looking head-on to the face.

FIGS. 42 through 44 are three dimensional illustration of the points made above. In these Figures, the eye is the right eye and the point source 3500 is assumed to be off to the right of the person. Features of the face are shown in order to better show the changing three dimensional perspectives. In FIG. 42, the point of view is from the point source 3500 looking straight at the pupil 1430.

In FIG. 43, the point of view is half way between the point of view of FIG. 42 and a point of view that is head-on to the face. We now see in three dimensions the corneal aperture 3900 from this different angle.

FIG. 44 is from a point of view now looking head-on to the face. We now see the corneal aperture 3900 from more fully as the intersection of a cone with the cornea at an even larger angle in three dimensions.

Using a three dimensional model of the optics of (truncated) wavefronts of light from a point source of light in the external environment propagating through the optical elements of the eye, it has been shown that only a truncated wavefront covering only a small portion of the cornea 3900 will be the only external wavefronts that will eventually reach the small portion of the photosensitive retinal surface that images that point source (for reasonably focused conditions of the eye's optics relative to the external point source).

In turn, this proves that an eye mounted display need only generate wavefronts from a particular direction of propagation whose envelopes intersect a subset of the corneal aperture 3900 for each small region on the photosensitive retinal surface that the display wishes to form a pixel or similar object on, and still have the ability to form arbitrary images on the photosensitive retinal surface. Using these smaller corneal regions for display results in many advantages. As will be described in more detail later, miniature display devices that are sub-parts of an EMD can be made considerably simpler and smaller than previous art displays that had to generate a significant portion of the entire image to be presented to the user's eye. As one example, they in fact can be made so small as to fit within a modified contact lens. In other examples, the display can be placed within the eye itself. Another advantage is a significant reduction in the amount of light that must be generated to form reasonably bright photopic images to a human 110 viewer. Many other advantages are described elsewhere in this document.

For a given eye, with a given radius pupil, and given lens accommodation, for a given receptive field center (the desired illuminated photosensitive retinal surface portion), there exists a unique corneal aperture 3900 that will "address" this receptive field center. The job of an eye mounted display external to the cornea is to generate the properly shaped optical wavefronts and entry regions of the cornea to produce regions of photosensitive retinal surface illumination whose point spread functions are close in size to the size of the receptive field centers that are in the location of the photosensitive retinal surface (or smaller in some cases).

It should be noted that in nature, in the high resolution foveal region, it is not possible to produce spots of retinal illumination that enter only a single cone. Point sources of light outside the eye will generate spots of illumination that at a minimum will also enter the first layer of cones surrounding any specific cone, though at reduced brightness. It should also be noted that such small spots as were just described correspond to 20/10 vision, which only a small portion of the population have. The more typical resolution of the general population is in the range of 20/18 to 20/30. In terms of eye mounted displays, this means that the resolution limit for most of the population can be reached by displays whose smallest point spread functions generatable could be as large as four foveal cones (assuming the smallest cones of persons with 20/10 vision—most people have cones that are 2× or more larger at their smallest, or have equitant resolution limits in their eye's optical path). This larger limit will become important when discussing manufacturability of embodiments of specific designs of eye mounted displays.

The same analysis can be performed for the larger receptive fields of rods; but because in most ways such an analysis would be a sub-set of that performed for cones (except for dealing with significantly lower levels of light), and from the teachings given here, is easily derived by one skilled in the art, an analysis of the equitant for rods need not be expressly presented here.

The same analysis can be performed for eye mounted displays that produce optical wavefronts at locations within the human eye's optical path other than above the cornea. From the teachings given here, these alternative displacements can be derived by one skilled in the art. Accordingly, an analysis for all the other possible locations of light emission will not be presented here.

The layers of neurons between the output of the photoreceptor cones and output of the eye, the optic nerve, perform a plethora of different processing computations on the cone output data. For the purposes of this disclosure, a simplified model of most of the data output from the eye, cone retinal receptive fields, is sufficient. Accurate models of cone retinal receptive fields are important to eye mounted displays in two ways. First, they change in size and their size as determined by both retinal eccentricity and co-latitude establishes the maximum resolution in a particular sub-region of the retina that the eye mounted display needs to generate for that sub-region if maximum resolution is to be achieved. Second, an eye mounted display does not have to precisely duplicate the illumination pattern on the retina as what natural world produces for a similar visual scene. The more important goal is through illumination of the retina to cause the retinal circuitry to as closely as possible replicate the computed output signal generated by the cone retinal receptive fields.

An abstract model of a retinal receptive field includes two different retinal receptive field sub-fields: the retinal receptive field center and the retinal receptive field surround. Three mechanisms cause the retinal receptive field center (eye pixels) to vary in area. First, the head-on area of cone cells is the smallest at the very center of the fovea. At one degree of visual eccentricity away (the edge of the fovea), the area of cone cells may have doubled or tripled. The area of the cone cells continues to increase with greater visual eccentricity (with some additional variation in visual co-latitude) all the way out to the ora serrata (though the rate of growth greatly slows at about half way to this edge). The area between cone cells, which hardly exists in the packed center of the fovea, also grows with greater visual eccentricity as smaller rod cells start intermingling between the cone cells. The other cause of increase in retinal receptive field centers area are due to the change in nature of the retinal receptive field centers from being just a single cone cell at the center of the fovea, to the retinal receptive field centers being formed by larger and larger groupings of cone cells at increasing eccentricity.

Figure 91:
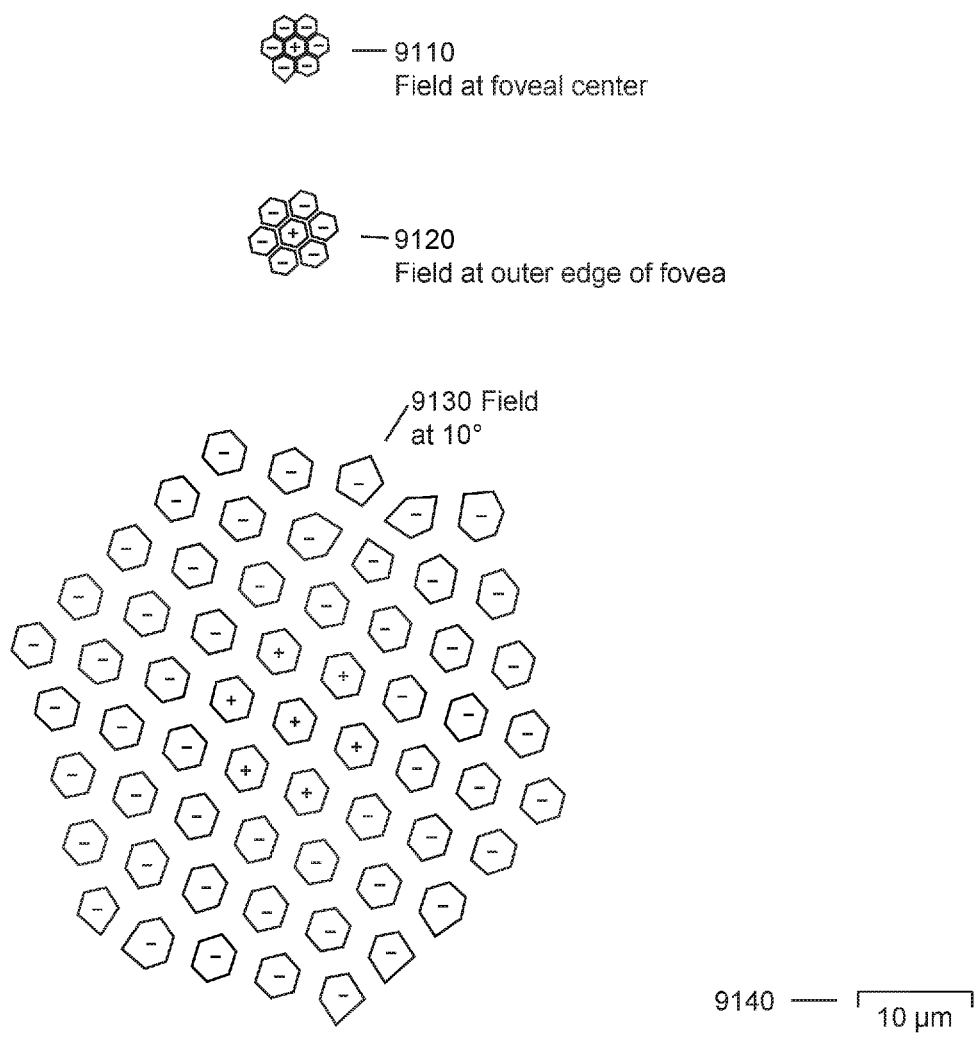
FIG. 91 (prior art) shows how cone retinal receptive field duals are formed from cone cells at 0° (reference 9110), 0.9° (reference 9120), and 10° (reference 9130) of retinal eccentricity.

All three of these effects are shown in FIG. 91, reference 9100. Reference 9110 shows how retinal receptive fields are formed from cone cells 9110 at 0° of retinal eccentricity (the center of the fovea). Reference 9120 shows how retinal receptive fields are formed at 0.9° (outer edge of fovea, and edge of the region where the center is a single cone). Reference 9130 shows at 9° (example of center being comprised of multiple cones). All three fields are drawn using the same physical scale, with element 9140 showing ten microns for reference. These are all "center on" fields. The symmetrical "center off" fields exist at the same location (generally) using the same cones, but with inverted signals before summation and thresholding before transmission out of the optic nerve.

Because the optics of the eye degrade at larger and larger visual eccentricity, the actual area of a cone cell is not so important. What is important is the density of cone cells at a particular visual eccentricity (and co-latitude). Conventionally this density is measured in units of number of cone cells per square millimeter (with the eye radius normalization convention discussed earlier).

Thus if a designer of an EMD wants to know what size "eye pixel" would give the best resolution in a specific region of the retina, he can look up the retinal cone density for that region, invert the density to estimate the average area of a cone cell and its share of the area between cone cells within that region, and then multiply that area times the number of cone cells that comprise the retinal receptive field centers within that region. He can convert between retinal area and visual angle as needed for other uses. These location specific cone cell density numbers are available from a number of sources in the literature. For example, see Curcio, C.; Sloan, K.; Kalina, R.; and Hendrickson, A.; "Human Photoreceptor Topography," *J. Comparative Neurology* 292, 497-523 (1990); Tyler, C., "Analysis of Human Receptor Density," in *Basic and Clinical Applications of Vision Science*, Ed. V. Kluwer Academic Publishers, 63-71 (1997); and as in U.S. patent application Ser. No. 11/341, 091, "Photon-Based Modeling of the Human Eye and Visual Perception," filed Jan. 26, 2006 by Michael F. Deering; all of which are incorporated by reference herein. The number of cone cells that are grouped together in the retinal receptive field centers for the can be estimated from spatial frequency studies of the region in question.

The size of the receptive field components at greater eccentricities grow in size even faster than the distance between cones grows. This explains why although the human eye contains more than five million cone cells, it only contains 800,000 retinal receptor fields and as half of those are duals of each other. Thus, there are only 400,000 unique retinal receptive field locations for the entire retina. This spatial variable resolution by eccentricities has been confirmed by many different experiments, including physiological experiments (eye tests at different eccentricities). Thus an eye mounted display need only control light aimed at these 400,000 unique retinal receptive field centers, which becomes a progressively easier job outside the fovea, as the size of the receptive field centers become fairly large.

It can be noted that the 800,000 unique retinal receptive fields per eye is supported by the fact that the optic nerve (leaving the back of the eye into the rest of the brain) is comprised of only one million neural fibers and at least 200,000 of them are doing other things than transmitting retinal receptive fields results. It can also be noted that the number of display pixels needed to form the highest natural resolution image on the retina (and thus the cones) is not necessarily one-to-one. Better to perfect coupling between the display and the unique retinal receptive field centers can require that the display pixel count is larger by a small multiple. However there is a diminishing return in perceivable quality to the human viewer with increased pixel density too much past the retinal receptive field centers density. Other factors, such as optical blur and chromatic aberration of the eye's optical elements, coupled with diffraction effects sets the limits in display pixel density. For simplicity, most of this document assumes a particular sub-set of EMDs in which the two densities are the same but this is not intended to limit the scope of this work.

V.B A New Approach for Display Technologies

Nearly all previous existing display technologies emulate optical reality at a level some distance away from the cornea. They generate spherical wavefronts with diameters at observation covering anywhere from several thousand feet (in a sports stadium display), to a dozen feet (home HDTV screen), to less than an inch, for the special case of instruments with a narrow entrance pupil for the observer's eye (e.g. a microscope or telescope eyepiece, and most head mounted displays). The vast majority of computer and television displays in use today are within the tight range of a foot to a few feet wide. At normal viewing distances, the radii of the spherical light wavefronts generated are approximately on the same order of size.

In contrast to existing display technologies, the display technology described below reduces the light emitted for a given pixel (or equitant object) to the retinal illuminating cornealsub-surface 3900, or a workable subset of this area (i.e., an underfilled corneal aperture). In theory, a display device generating a wavefront that covers the corneal aperture 3900 for every retinal center-surround receptive field center area in the eye, would be able to match the eye's perception of almost any physical world scene. The device would be able to synthesize nearly any image at the same resolution that the eye can perceive.

An eye mounted display constructed to generate a number of wavefronts directed to different corneal apertures 3900, whose point spread function on the photosensitive retinal surface is at the approximate size, density, and shape as the retinal receptive field centers in the local vicinity of the addressed portion of the retina, but perhaps not exactly matched to the individual retinal receptive field centers of a specific eye, can generate a high quality and large field of view display. In fact, because the display is not locked to any specific retinal optical reception areas, a number of real-time corrections (warping, etc.) to the image can match other parameters (such as accommodation, or slip in coupling) changing. Also, consider that due to drifts, in the real world point sources of light are rarely imaged by a single cone. Instead a slightly blurred retinal image is spread across and sensed by two or more retinal center-surround receptive fields.

Consider a display device that generates, for a given desired distribution of spot sizes and locations on the photosensitive retinal surface, the corresponding full corneal apertures 3900. Then if one draws the outlines for all these apertures, they would overlap to greater or lesser extents a large number of other nearby apertures and there would be no way to partition the apertures into disjoint groups. In some embodiments, this is not a problem, and the appropriate radius expanding wavefronts of light from the appropriate directions are generated by and EMD truncated into all the appropriate corneal apertures 3900.

However, for other embodiments, it is more convenient if the corneal apertures 3900 generated can be partitioned into different non-overlapping groups. This is not possible if one wishes to fill each entire aperture. However, it is possible if one accepts a little more resolution loss due to diffraction. If in place of the full area corneal apertures 3900, instead (for example) a quarter area aperture of each corneal aperture 3900 is generated, such disjoint partitioning is possible. In other words, the pupil is underfilled. In this case, the less than full corneal aperture will be referred to as a corneal subaperture or an underfilled corneal aperture.

To see how a disjoint partitioning is possible, first note that the corneal quarter-aperture (i.e., a subaperture that is a quarter of the area of the full aperture) can be placed anywhere within the full aperture 3900 and still generate a spot of light at the same position on the photosensitive retinal surface. Next, note that if the position of the quarter-apertures can be biased toward one side of the corresponding corneal full-aperture 3900 in the direction of a local center point, then when all the quarter-apertures are drawn on the cornea, they can form disjoint sets around each local "center" point.

Figure 45:
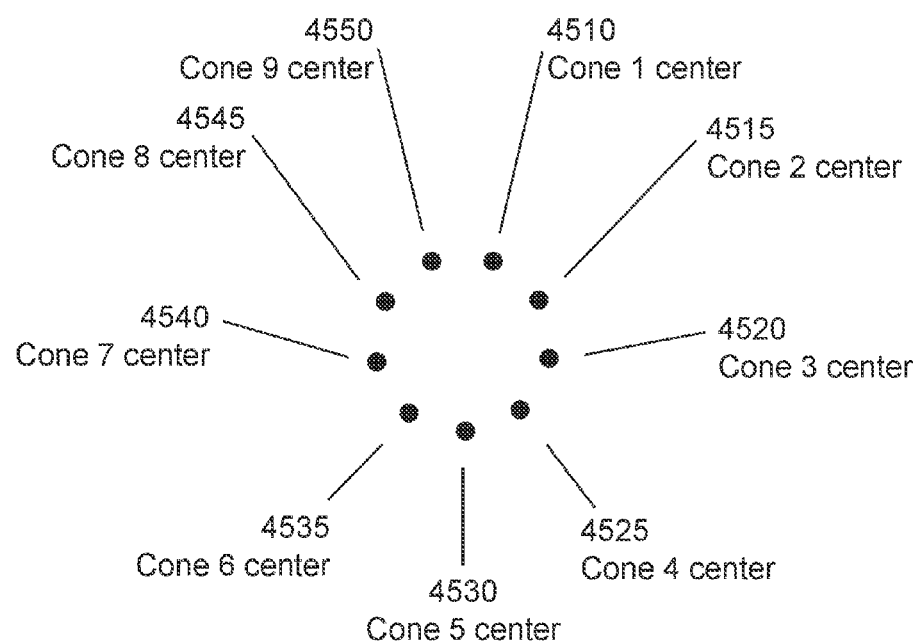
FIG. 45 is a nine cone retina, to be used as a simplified example.

As a vastly simplified example to illustrate the point of the last paragraph, consider a retina that only has nine cones. FIG. 45, reference 4500, shows a diagram of the cornea for this simplified eye. Element 4505 is the outer extent of the cornea, as seen by orthographic projection down the optical axis of the cornea. Each of the nine cones has a corresponding corneal aperture, which are represented by the references 4510 through 4550, respectively. The positions of 4510 through 4550 shown correspond to the center of each corneal aperture. A 3 mm virtual entrance pupil was used in this computation. The cones are at a visual angle of 26.6°, and equally spaced around 360° with 40° between each.

Figure 46:
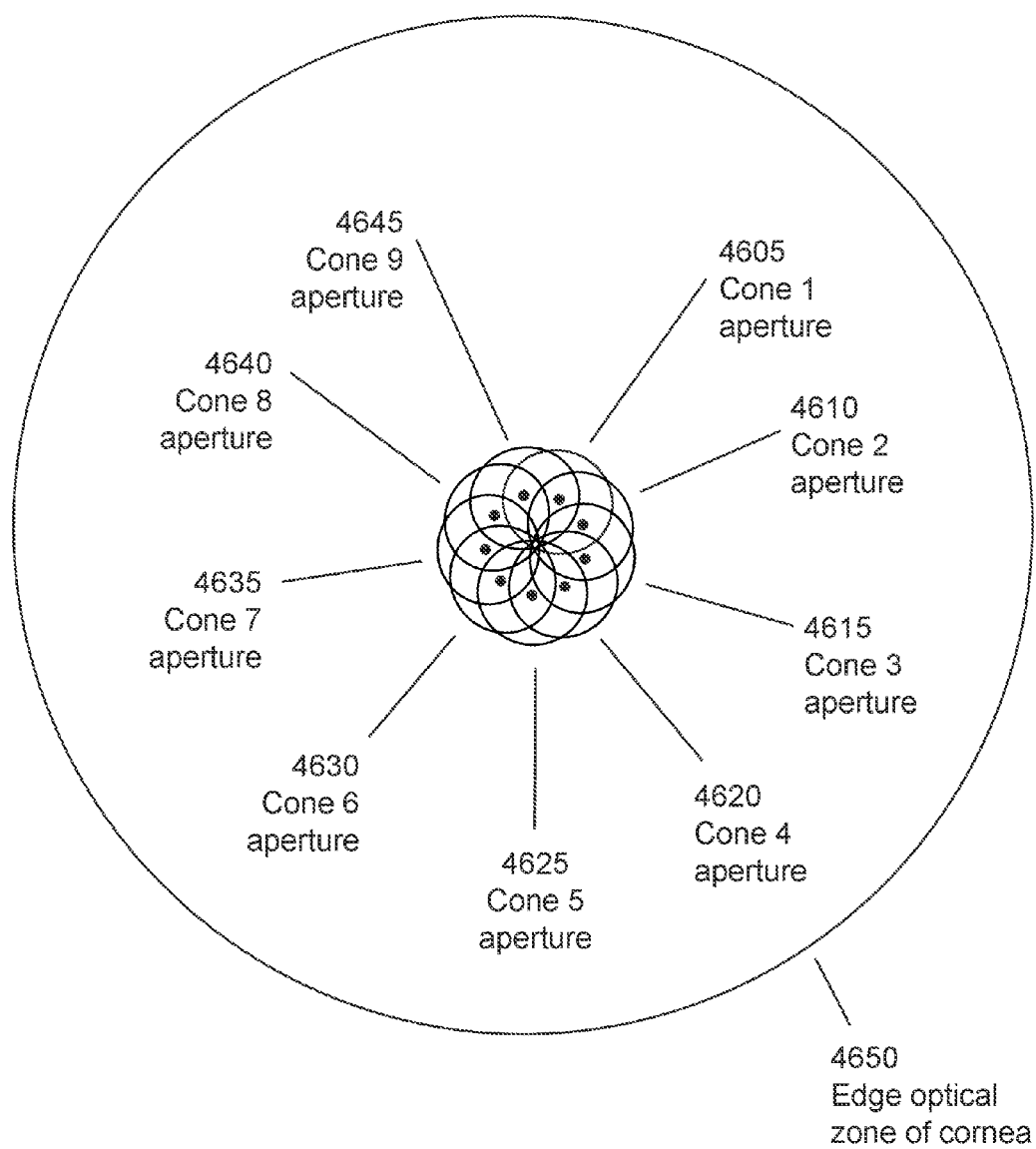
FIG. 46 shows the optical aperture at the surface of the cornea for each of the nine cones.
Figure 47:
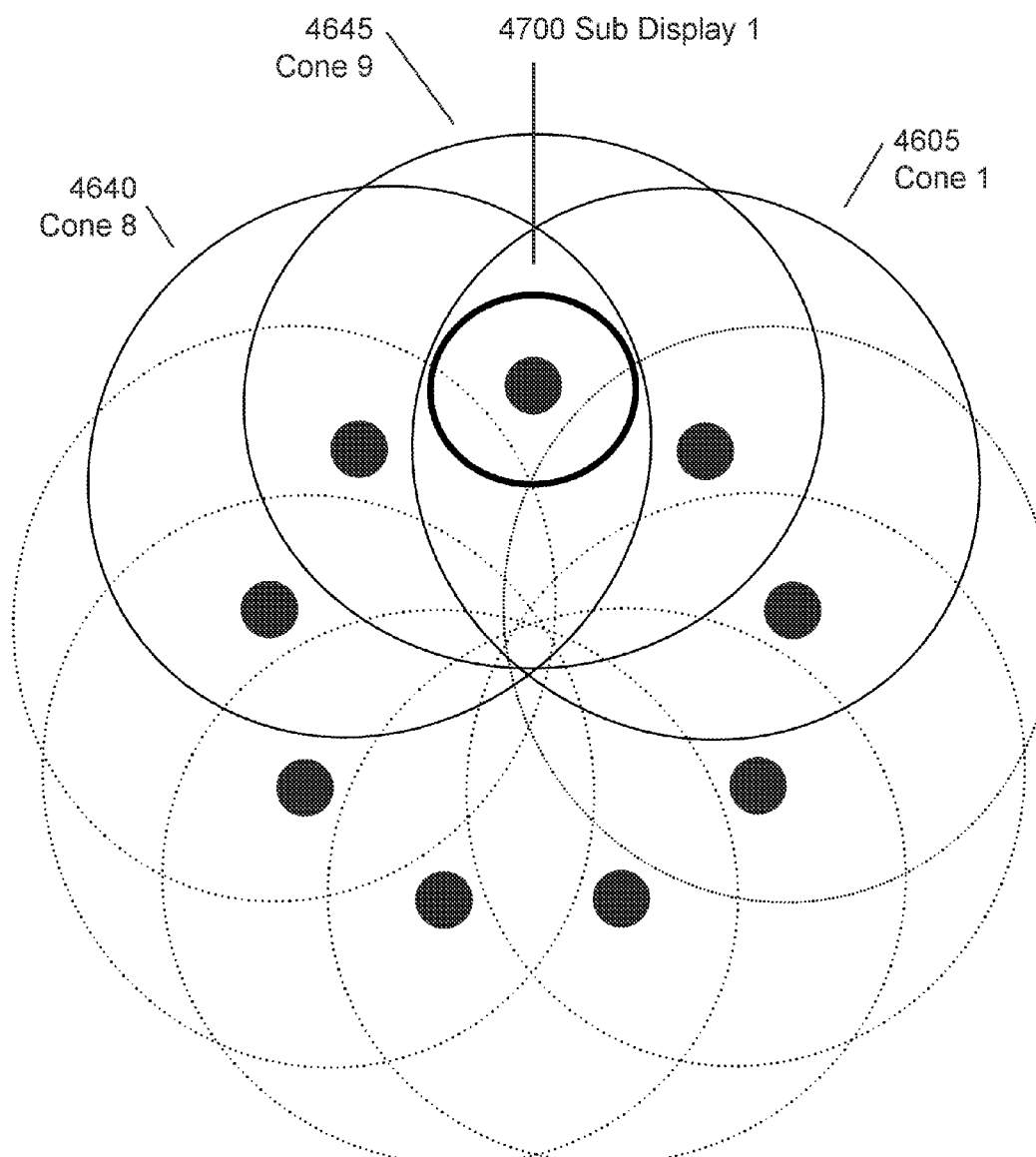
FIG. 47 shows how a single display can address three of the nine cones at the same time.
Figure 48:
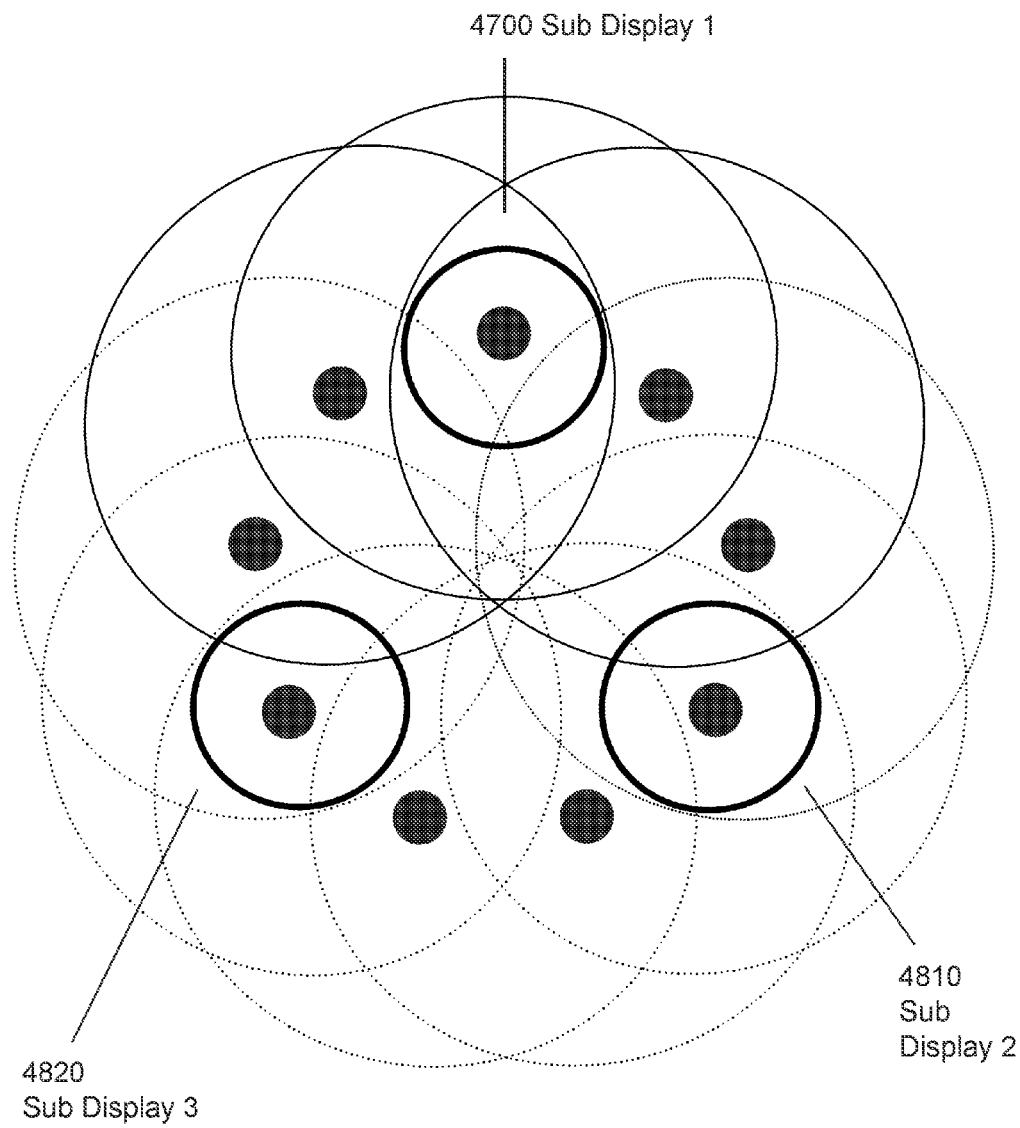
FIG. 48 shows how three displays can address all nine cones at the same time.

In FIG. 46, the edge of each corneal aperture has been added as the references 4605 through 4645, respectively. In other words, the corneal aperture for cone 1 is defined by the boundary 4605, which is centered at 4510. Note that even in this simplified example, the corneal apertures significantly overlap. However, as shown in FIG. 47, if one uses a display extent of less than the full aperture size, one sub-display 4700 can be used to address three separate cones whose corneal apertures are shown in solid lines: 4605, 4610, and 4615. The other six cones are shown in dashed lines for context. Note that even though the sub-display 4700 covers some of the corneal aperture of these other cones, no light will fall on any of these so long as the sub-display 4700 only generates wavefronts of light that focus on one of the targeted three cones. In FIG. 48, it is shown how three sub-displays 4700, 4810, and 4820 can address all nine cones.

Clearly we want a display that can address more than nine cones. But the optical properties for any number of cones operate in the same manner. Given a contiguous region of the retina for which one wants to generate a display, one can take the intersections of all the optical apertures at the retinal surface from all the cones in the region. So long as the region is convex, the same result can be achieved by taking the intersection for the cones on the boundary edge of the region. Furthermore, for the double truncated circular pie wedge (which is an advantageous shape to have a given sub-display display to), taking the intersection of the four cones at the four corners of the region can give the correct result. Given some quantization on the incremental size of a sub-display region by the receptor field center sizes, and any other desired constraints, exhaustive computer simulations of all possible numbers of, positions of, and sizes of, sub-display can be simulated, allowing one to optimize the design of sub-displays of an EMD to any desired constraints (so long as a solution exists).

One such constraint could be that the addressed portions of the retina by each sub-display slightly overlap all its neighbors. The overlaps can be "feathered" together, employing any of several techniques that have been used in the past with (much larger!) multiple projector displays.

In one embodiment, these sub-displays would be femto displays.

It is important to note that diffraction effects of employing a quarter (or other partial) corneal aperture verses a full area corneal aperture correspond to the diffraction limits of approximately 20/20 vision vs. 20/10 vision. As most people have closer to 20/20 vision, and relatively few are close to 20/10, the quarter area compromise will cause only a minor reduction in resolution over the best that they can perceive. This is an acceptable trade-off for many embodiments of EMDs.

We have now described at a high level the physical effects used to build many different embodiments of eye mounted displays. There are many embodiments for devices to produce multiple specified radius expanding spherical wavefronts of light of a specific frequency (or frequency spectra), propagating in a specific direction, and entering the corneal surface within a specific truncated outline (i.e., partial corneal aperture). One class of such examples is embodiments of femto displays as previously defined. This particular class of sub-display embodiments will later be used to describe more details of a complete EMD and EMDS 105. From this description it can be seen how such devices can be built with other embodiments of the sub-displays, or possibly using just one display.

V.C Sub-Displays

The function of a sub-display is to generate the appropriate optical wavefronts for the corresponding retinal region. Typically, the sub-display will be able to generate many approximately spherical wavefronts, at slightly different directions of propagation, in one embodiment, all truncated by approximately the same outline within and smaller in area than the full area corneal aperture for the directions of propagation. In the case of spherical wavefronts, the radius of the spherical wavefronts produced could be controlled per wavefront or, in a simpler embodiment; they could all have the same pre-set radius. Such fixed radii would produce images that are in focus only for one focus distance of the crystalline lens (but which is also a fixed parameter for older people with presbyopia). A slight difference between the fixed radii of the sub-displays allows the surface of focus to be flat, cylindrical, spherical, etc. The collection of wavefronts produced from a particular direction over a time frame (for example, the time of one frame of display) has a statistically controllable intensity, as well as a statistically controllable mix of optical frequencies (color). If the sub-display embodiment is not much larger than the outline within the area where wavefronts of light are produced, this could allow a significant amount of normal external physical world produced light to pass through the cornea normally, thus producing a "see-through" display. In addition, if partially silvered front surface mirrors are used for the final optical element of the sub-display (as described later), then external light can come in throughout the EMD, just at a reduced intensity (which is desirable for limited output intensity EMDs).

So far the discussion has concentrated on embodiments of EMDs that produce light wavefronts outside the cornea, with an air gap between the EMD and the cornea, or an air gap between the EMD and a corrective lens that may be coupled to the cornea by tear fluid. This was done to make explicit the direct match between wavefronts of light in the physical world and the wavefronts of light produced by the new display technology. However, the definition of EMDs includes those in which the display can be placed on and/or in multiple locations within the eye. For these cases, the same sort of backward examination of modified light wavefronts from where the display elements are placed, on and/or within the eye, to the world outside, will describe the modified wavefronts of light that the display must produce to match how light wavefronts from the physical world would be modified at that point(s) on and/or within the eye. One simple example is an EMD in which the EMD is placed in a modified contact lens, with an air gap below the display and the posterior surface of the corrective contact lens. Now the matching task is to match the wavefronts that the contact lens, rather than the cornea, would normally "see" from the outside physical world. In other embodiments of EMDs placed further within the eye, the principle of "matching" wavefronts would be the same, but the wavefronts produced by the display can be quite different.

The description of all the parameters to be taken into account in order to produce each wavefront from the EMD that nearly exactly emulates a specified point source in the outside physical world can be fairly straight forward. In embodiments that only emulate fixed distances of focus, the position of the eye's lens will be known due to eye tracker 125 and/or head tracker 120. With near cone accuracy tracking of the orientation of the cornea relative to the head (or some other known coordinate frame) by the combination of eye-tracking and head tracking devices, the small target area of the retina that each wavefront (truncated to or within the appropriate outline) will be know, and can be used to determine what intensities and colors should be displayed by each separate wavefront generator (i.e., each sub-display).

V.D Embodiments of Contact Lens Mounted Displays

One sub-class of eye mounted displays is cornea mounted displays (CMDs). One sub-class of cornea mounted displays is contact lens mounted displays (CLMDs). One sub-class of contact lens mounted displays (CLMDs) is modern sclera contact lens mounted displays (SCLMD). The discussion below will use a particular embodiment of SCLMDs as a concrete example of a complete instance of an EMD, but will also discuss more general CLMD issues.

When a contact lens is worn, most of the light bending now occurs in the contact lens, and now very little light bending occurs in the cornea. The proper wavefronts for the sub-displays to generate are now those expected at the surface of the contact lens, not at the surface of the cornea. This assumes that the contact lens is coupled to the cornea by tear fluid, and the sub-display has an air gap between its posterior and the anterior of the optical zone of contact lens. In some cases the optical zone of the contact lens is smaller than the field of view of the eye. In this case a vignetting of the eye's view will occur. This is a property of the contact lens. A contact lens with a suitably large optical zone will not have this limitation.

A relativity new type of contact lens is a hybrid of a soft large sclera lens for contact with the eye, and a small hard lens in the optical zone for vision correction. The sclera lens has a large amount of tear fluid beneath it. This reduces the physical contact of the appliance with the sensitive cornea and also allows the natural nutrients and waste products to be carried as normal by the tear fluid, which has a means for ingress and egress from the sclera contact lens. Because the sclera lens is large, it is possible for it to be quite thick (1.2 mm or more) in the center of the contact lens. Because the change in thickness is gradual, the only part of the eye that might notice the extra bulge, the eye lid, usually is not bothered by this. In the thick center of the soft sclera lens a cylindrical hole of soft lens material is removed, and a small hard contact lens is placed in. Because with the tear fluid there is little change of index of refraction from the bottom of the hard lens past through the cornea, the primary optical bending take place at the air—hard lens boundary on the front of the hybrid contact lens. Because the corneal lens effectively does not contribute to the optical function, any astigmatism (due to toroidal deformations of the eye extending to the cornea) can be effectively eliminated. The large sclera lens also does not move or rotate much, unlike more traditional contact lenses that can move up and down by their entire diameter during eye blinks to allow an exchange of tear layer to take place.

One embodiment of a CLMD is as a modified form of a modified sclera contact lens (SCLMD). The idea is to place a display device (or set of sub-display devices) in the cylindrical hole where the hard contact lens had been, and optionally also place a thinner hard contact lens under the display if ophthalmological correction is needed. It is usually important that there is an air interface between the bottom of the display device and the top of the hard contact lens (if present) for proper functioning of the hard lens.

In one approach, as described above, the display task can be sub-divided to a number of sub-displays, each emitting a number of spherical wavefronts into their own particular partial corneal aperture. Many practical solutions to the multiple non-overlapping projector placement problem results in approximately 40 to 80 sub-displays using the same number of disjoint partial corneal apertures on the surface of the cornea or contact lens. These input regions will only cover about one fourth of the total surface area of the cornea or contact lens (or less), so the resulting optical system can have high quality see-through vision of the natural world. For the present purposes, for now let us assume that the embodiments of the sub-displays are as femto projectors, and we will call the individual wavefront generating regions pixels. Now turn to the details of implementing such femto projectors.

First a word about the pixels. In many embodiments it is more efficient to use hexagonal rather than rectangular shaped pixels, but many other shapes are possible. Also, like most direct view displays, rather than build multi-color pixels, it is easier to assign each pixel to a single color primary. However, unlike most direct view displays, the color primaries do not have to be equally represented or repeated. If three color primaries are used, targeting the optimal sensing frequency of the long, medium, and short wavelength cones, the three primaries would be just a variation of red, green, and blue. However, because the blue cones represent a ninth or less of the cones in the retina (and none in the central most portion of the fovea), only one out of every nine "pixels" could be blue. Measurements of the ratio of red to green cones in the human eye have varied from 2:1 to 1:2. Thus, in one embodiment, the remaining eight ninths of the pixels are equally split between red and green cones (four out of nine each).

Figure 49:
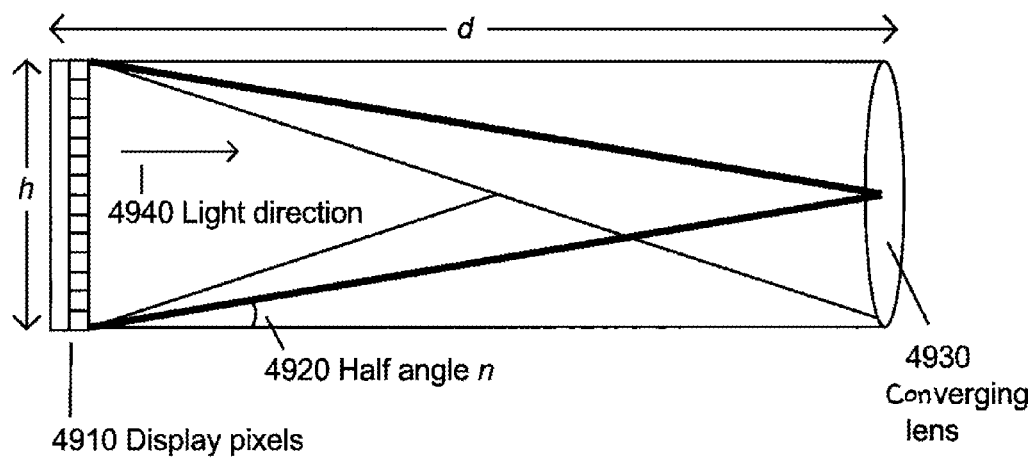
FIG. 49 shows how to generate the desired point source relative angles, and then use a converging lens to convert them to natural expanding spherical wavefronts for reception by the eye/contact lens.

The abstract optical path for a femto projector can be simple. Place a 128×128 (or so) image plane of pixels far enough away from a lens to cause the angle of each pixel relative to the lens to correspond to the input wavefront angles desired over a particular patch of cones. Let this angle be 2*n. The lens is a simple converging lens (positive optical power). It causes spherical wavefronts whose radius is only a few millimeters to appear to have a radius of (say) six feet. A simplified two dimensional vertical cross section of such a femto display 4900 is shown in FIG. 49, with the light direction indicated by reference 4940. The display source (array of pixels) is reference 4910. The half-angle 4920 that a pixel makes with the lens is n. Let the distance from these display pixels (multiple point emitters of photons within the pixel active region) to the converging lens 4930 be d. Let the height of the display pixels be h. For this femto projector to produce light wavefronts subtending a half-angle of n the relationship between h and d is:

$$d = \frac{h}{2*\tan(n)} \quad (1)$$

In many implementations, d will be fixed, as will be n by definition for a given sub-region of the retina to be addressed, so for a particular femto-projector h will then be fixed. As an example, a femto display with height h equal to 0.5 mm high and a desired spread angle n equal to 10° yields a separation distance d of 2.9 mm.

Figure 50:
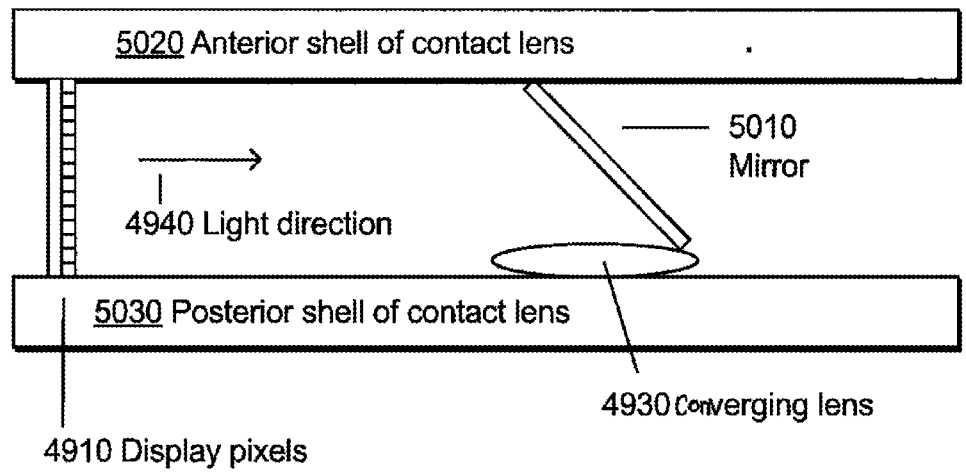
FIG. 50 shows a mirror angled at 45 degrees to fold the display of FIG. 49 flat, so as to better fit within the narrow confines of many types of EMDs, e.g. contact lens based EMDs, intraocular lens based EMDs, etc.; and also shows a simple converging lens.

Unfortunately, in the allotted space for the set of femto-displays, on the order of a millimeter thick, there is not enough distance to place the pixel displays directly in line with their converging lens. So we fold the optics. As shown in FIG. 50, a two dimensional vertical cross section of a different femto display 5000, a 45° mirror 5010 allows one to use lateral space on the display body to optically back up the pixel displays far enough from their corresponding lenses to obtain the desired geometry. This figure shows the anterior 5020 and posterior 5030 outsides of the contact lens capsule.

Figure 51:
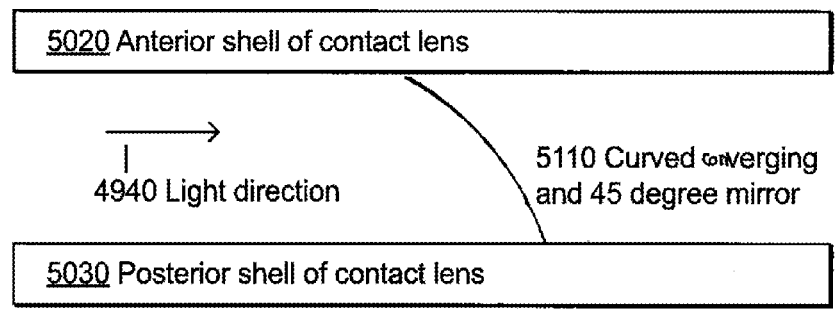
FIG. 51 shows a single front surface curved mirror that can provide both the function of the 45°-angled mirror and the converging lens of FIG. 50, also eliminating chromatic aberration and fitting into a shorter space.
Figure 52:
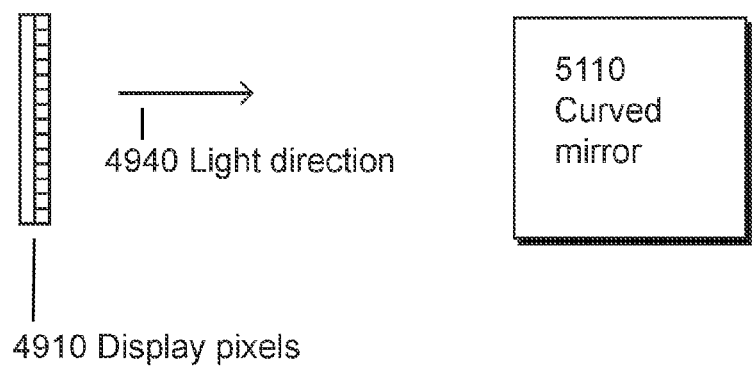
FIG. 52 shows an overhead view of the optical components of FIG. 50.
Figure 53:
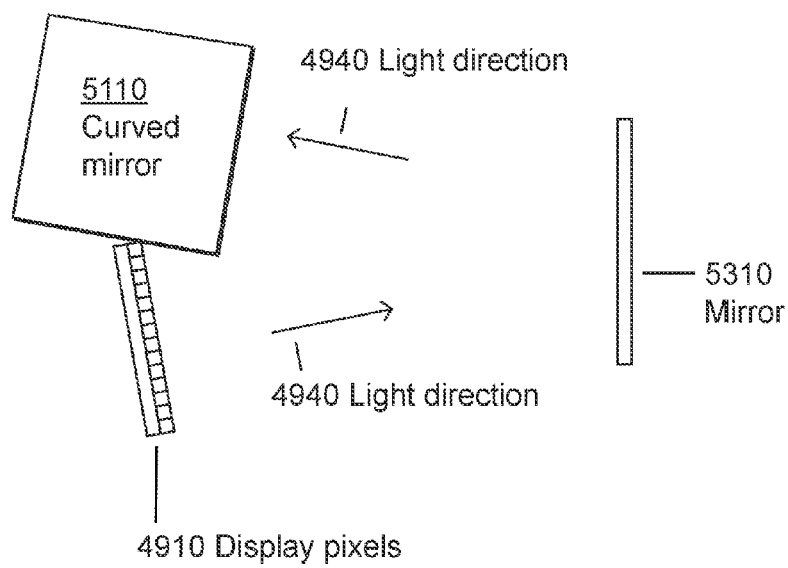
FIG. 53 shows an overhead view of a variation of the optical pipeline of the last two figures, but folding the projection path with a front surface mirror.
Figure 54:
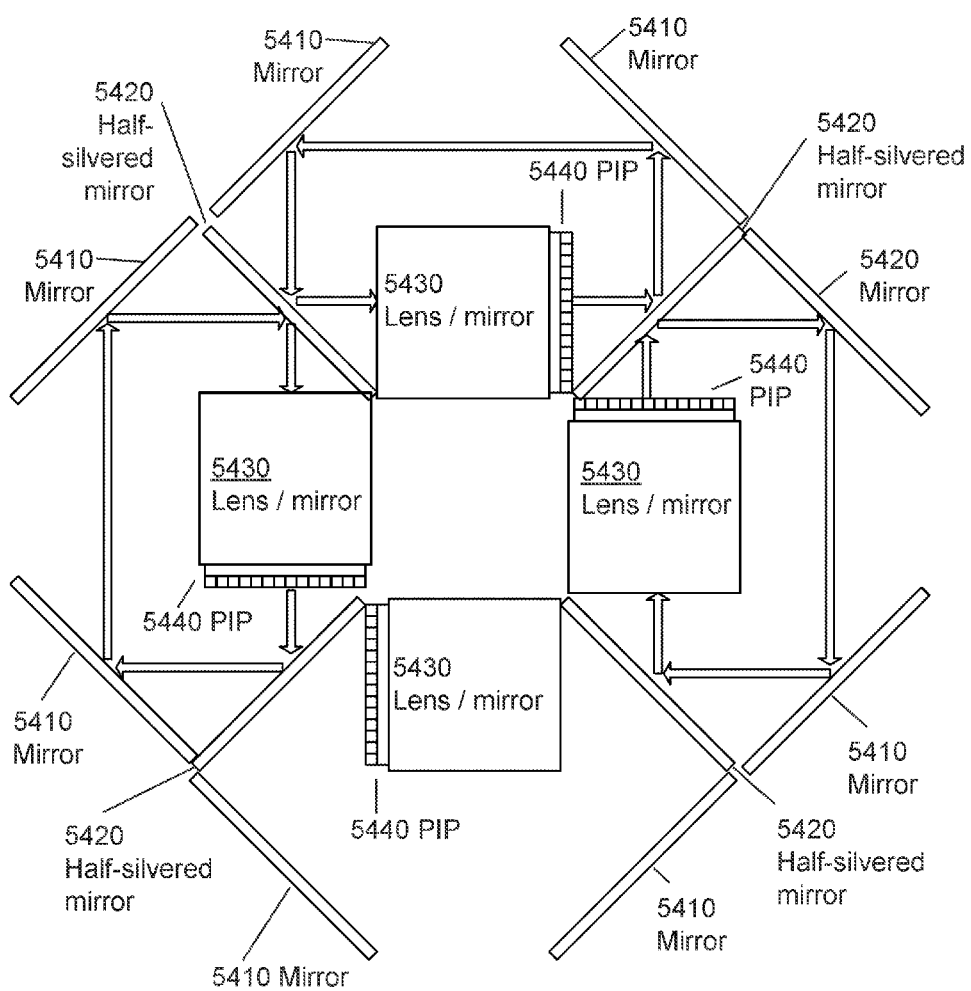
FIG. 54 shows how four femto-displays can form a four times larger area synthetic aperture.

FIG. 50 shows the folded light path for one femto display. In a typical eye mounted display, there may be 40-80 femto-displays, each with its own folded light path. There are many different ways to let these different light paths cross through each other, and pack properly into the desired volume. As shown in FIG. 51, it is also possible to combine the lens and 45° turning mirror into one achromatic optical element 5110 by reshaping the 45° flat mirror into a curved optical mirror that performs both functions, creating a femto display 5100. FIG. 52 is an overhead view of the femto projector shown in FIG. 51. FIG. 53 shows an overhead view of another femto display created by folding the femto-display of FIGS. 51 and 52 in any of several different ways using an additional folding mirror 5310. FIG. 54 shows how four femto-displays can form a four times larger area synthetic aperture, making use of several mirrors 5410, half-silvered mirrors 5420, 45 degree mirror and converging lens 5430, and pixel display 5440.

Figure 55:
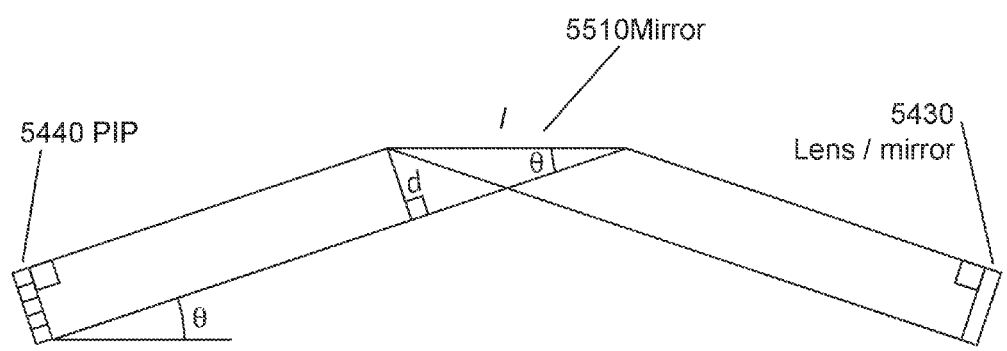
FIG. 55 shows how an overhead mirror can make a long femto projector more compactly fit into the area between two parabolic surfaces (such as within a contact lens).
Figure 56:
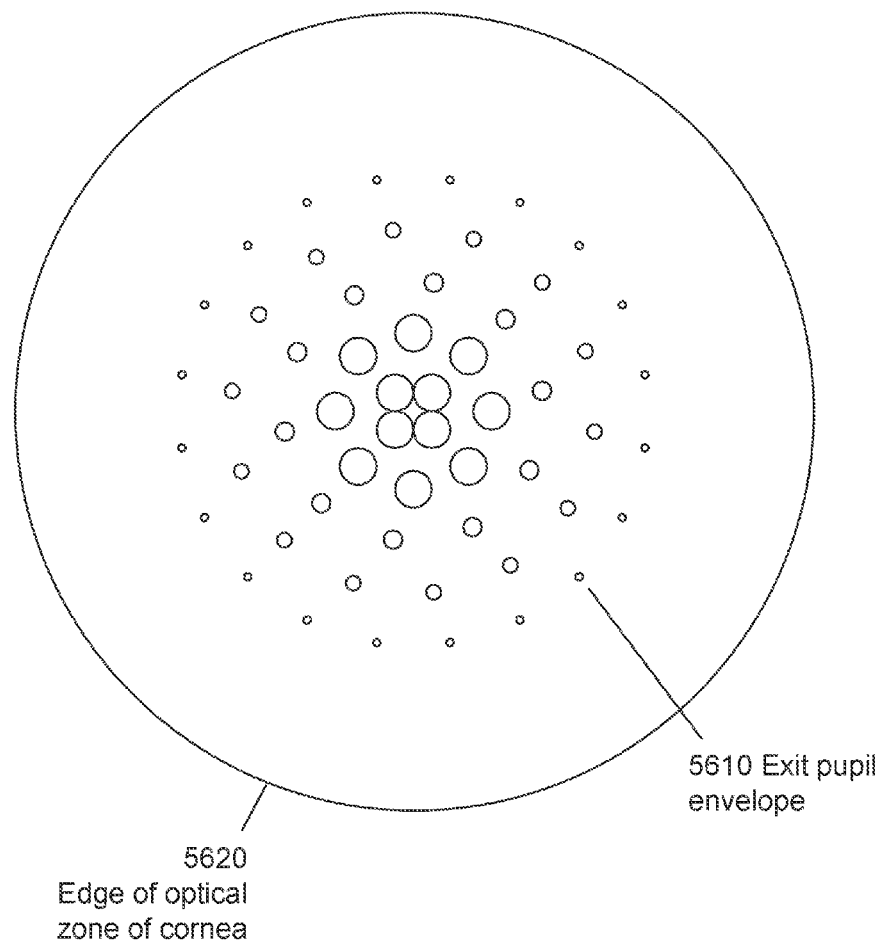
FIG. 56 shows an overhead view of an array of femto displays, tiling the retina to be able to produce a complete eye field of view display.
Figure 57:
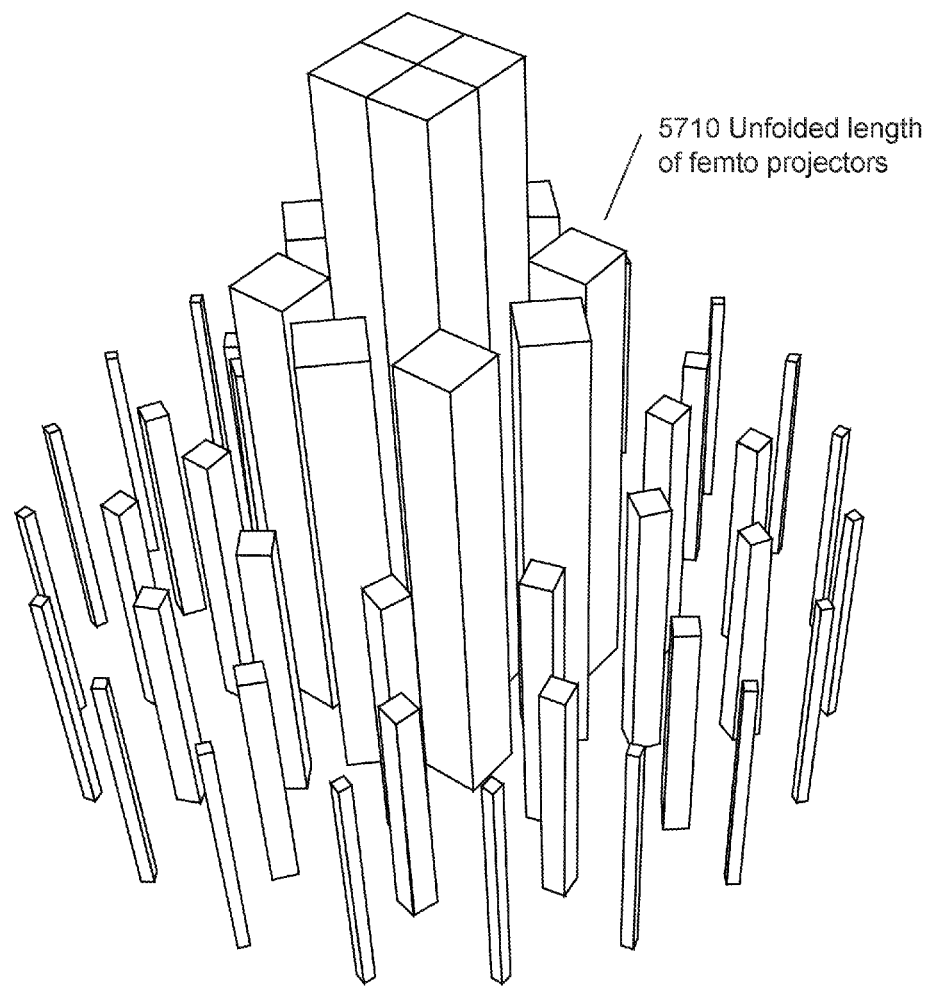
FIG. 57 shows the unfolded lengths of the projection paths.

FIG. 55 shows how an overhead mirror 5510 can make a long femto projector more compactly fit into the area between two parabolic surfaces (such as within a contact lens), with the pixel display 5440 one the left end and the 45 degree mirror and converging lens 5430 on the right hand side.

FIG. 58 shows a human eye optically modeled in the commercial optical package ZMAX. It contains a standard optical model lens 5810 equivalent to the human eye cornea, a standard optical model lens 5820 equivalent to the human eye lens and a standard optical model surface 5830 equivalent to the human eye retina. FIG xx shows the results from ZMAX computing retinal spot sizes of this combined lens/surface system. The sport sizes shown are comparable in size to the smallest human eye foveal cones, so the optics has met its design goal.

Figure 81:
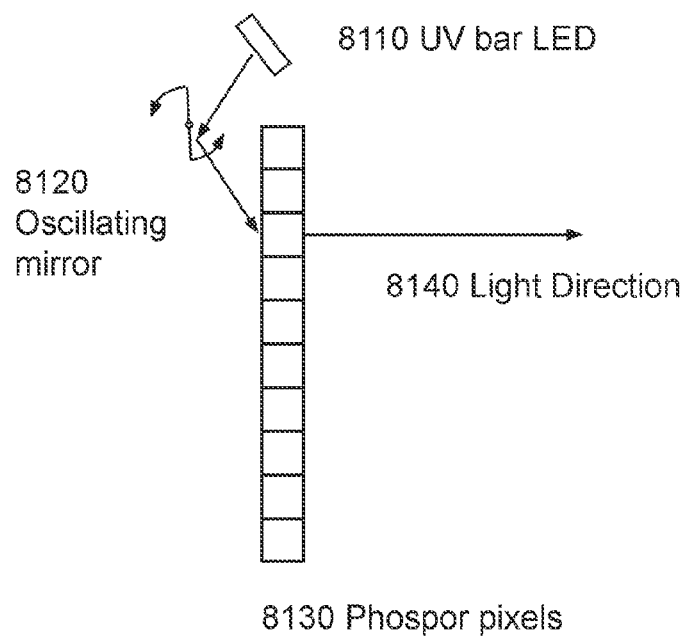
FIG. 81 shows a horizontal cross section of the light creation portion of a femto projector, in this case the phosphor is illuminated from behind.
Figure 82:
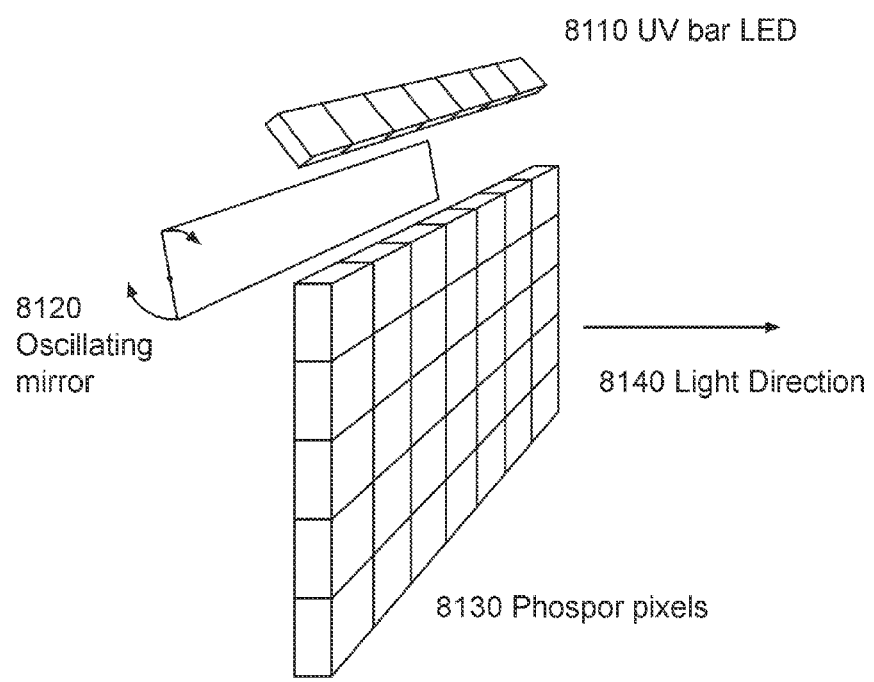
FIG. 82 shows a three dimensional perspective view of the light creation portion of a femto projector, in this case the phosphor is illuminated from behind.

FIG. 81 shows a vertical cross section of one example of a femto-projector. A 128×1 pixel bar of individually addressable ultraviolet LEDs 8110 shines onto a MEMS oscillating UV mirror 8120, which reflects the line of UV pixels up and down across a 128×128 array of thin visible light phosphor pixels 8130. The output light direction is shown by arrow 8140. The relative placement of the elements is a simplified example. Many optimizations to the scanning are possible. FIG. 82, reference 8200, shows a perspective view of the display of FIG. 81. While thin phosphor coatings can be illuminated by UV light from behind (conventional CRT's are "lit from behind" phosphors), femto displays can also use phosphors lit from the front, as seen in horizontal cross section in FIG. 83, reference 8300, and in 3D perspective in FIG. 84, reference 8400.

Figure 65:
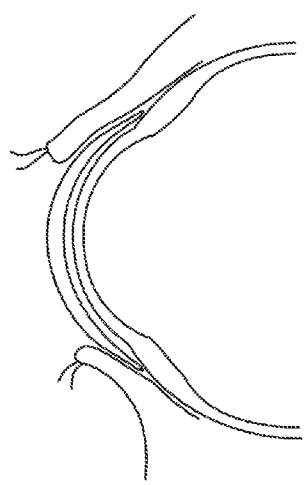
FIG. 65 shows a horizontal slice view of six time steps of an eye blinking over a sclera contact lens based EMD.
Figure 65:
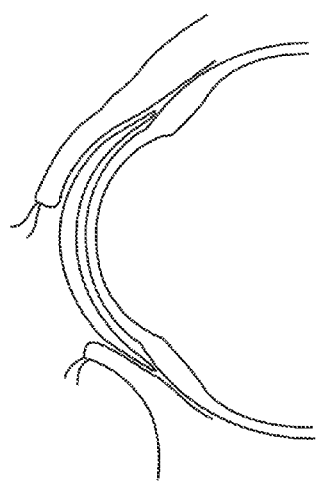
Figure 65:
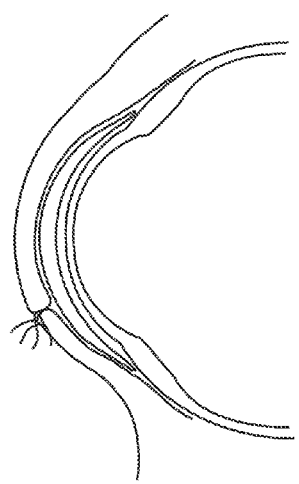
Figure 65:
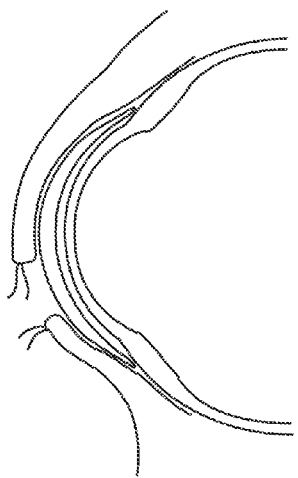
Figure 65:
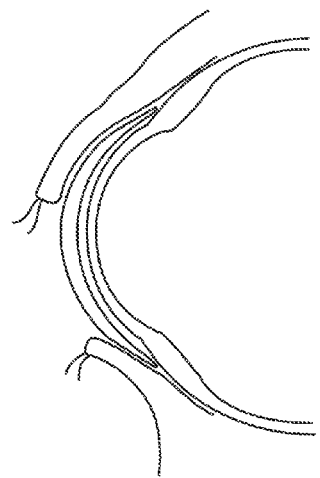
Figure 65:
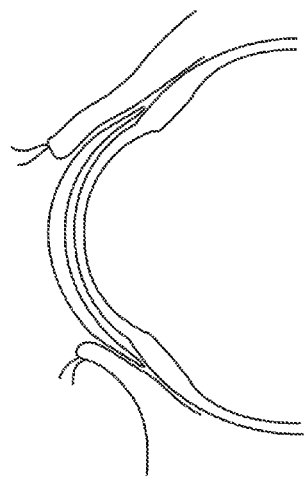

To fit within the rest of the constraints, the shape of the hard contact lens containing the femto displays is thin (approximately 1.0 mm to 2.0 mm in height) with spherical or parabolically curved outward top and inward bottom. We will call this the display capsule. In this design, the top of the display capsule forms a continuous surface with the top of the hybrid sclera contact lens, allowing the eye lids and eye lashes to smoothly pass over the surface, as shown in FIG. 65, reference 6500, in six time steps referenced from opened to closed to opened again: 6510, 6520, 6530, 6540, 6550, and 6560.

Figure 78:
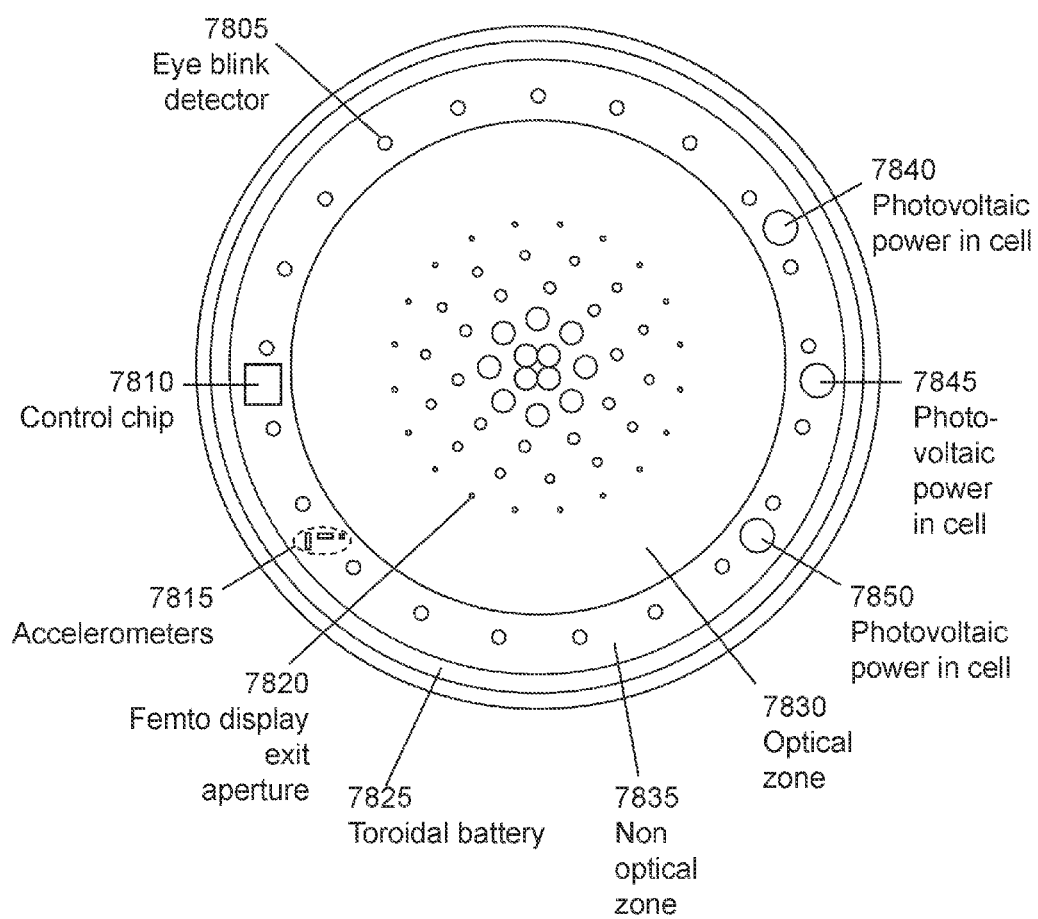
FIG. 78 shows an overhead view of an example of electronics contained in a contact lens display capsule.

The bottom is concave to keep the posterior surface at a near constant distance from the cornea, and to allow an air gap between an ophthalmological hard contact lens (if any) below the display capsule. The functional width of the display capsule preferably is at least the size of the optical zone of the underlying hard contact lens, which hopefully is at least as large as the primary optical zone of the front index of refraction modified cornea. The full width of the display capsule can be larger and the edges of the display capsule can be a good place for holding system component elements that do not emit light for transmission to the eye. This specifically includes the possibilities of EMD controller chip(s), batteries, camera chips and corresponding optics, accelerometers, eye blink detectors, input power and/or signal photodiodes, output signal transmission components from the EMD to the headpiece, etc., as is shown in FIG. 78.

The outside shell of the display capsule should be as thin as possible, to keep from introducing optical effects of its own, but also hard enough to withstand the normal forces that any contact lens is expected to take. There are several possible materials that can meet this requirement. One of them is vapor deposited diamond onto a mold. This technology is presently used to produce inexpensive heat sinks, and to coat the working tip of various cutting tools. A diamond display capsule could be made in two halves. The rest of the active components placed in between the two halves, and then the two halves of the diamond capsule would be hermetically sealed. There are also several special plastic materials now available that can be formed very accurately by molding. These have advantages over vapor deposited diamond. Both sides of each side of the display capsule can be formed, and the rough inner side of the vapor deposited diamond does not have to be optically polished (at a great cost). In some cases it may be possible to form parts of the optical paths directly via the mold surface itself (e.g., though silver depositing for mirrors may still be required) but most likely the inner sides to the two display capsule molds will instead provide points of attachment and calibration for separate optical and other components.

Figure 60:
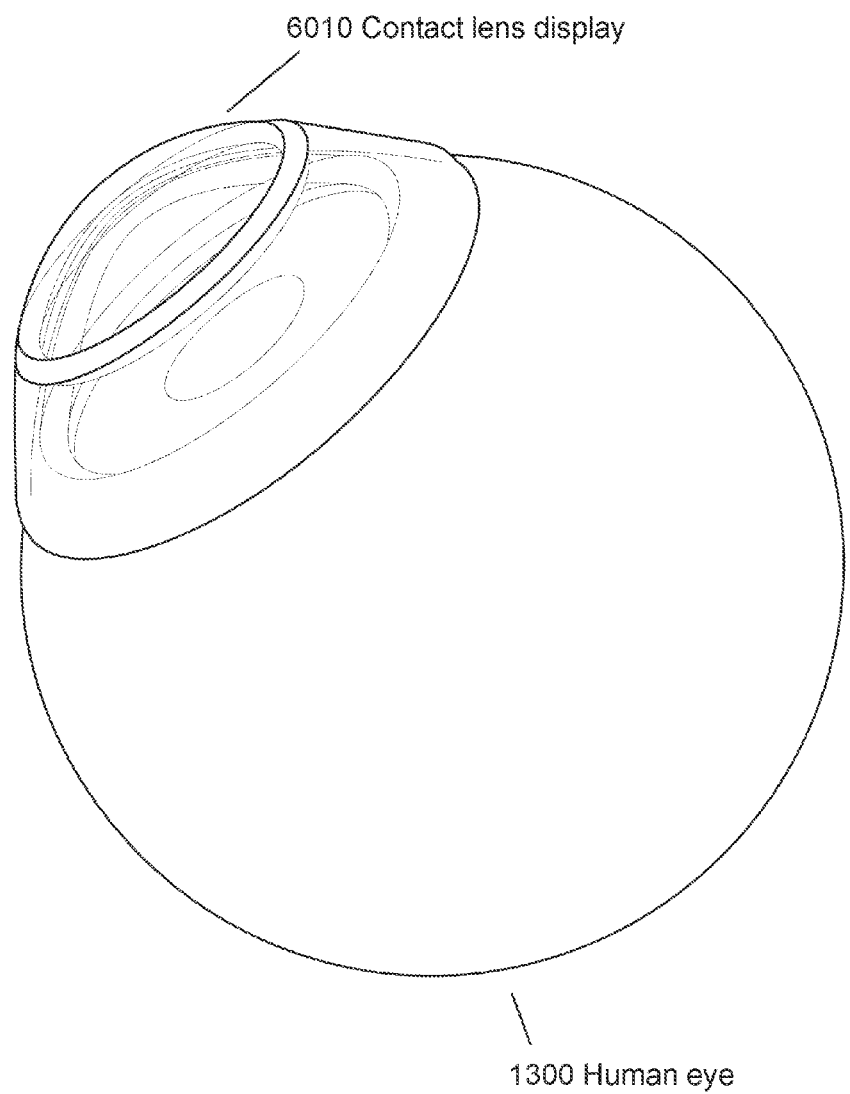
FIG. 60 shows a 3D perspective of an assembled contact lens display.
Figure 61:
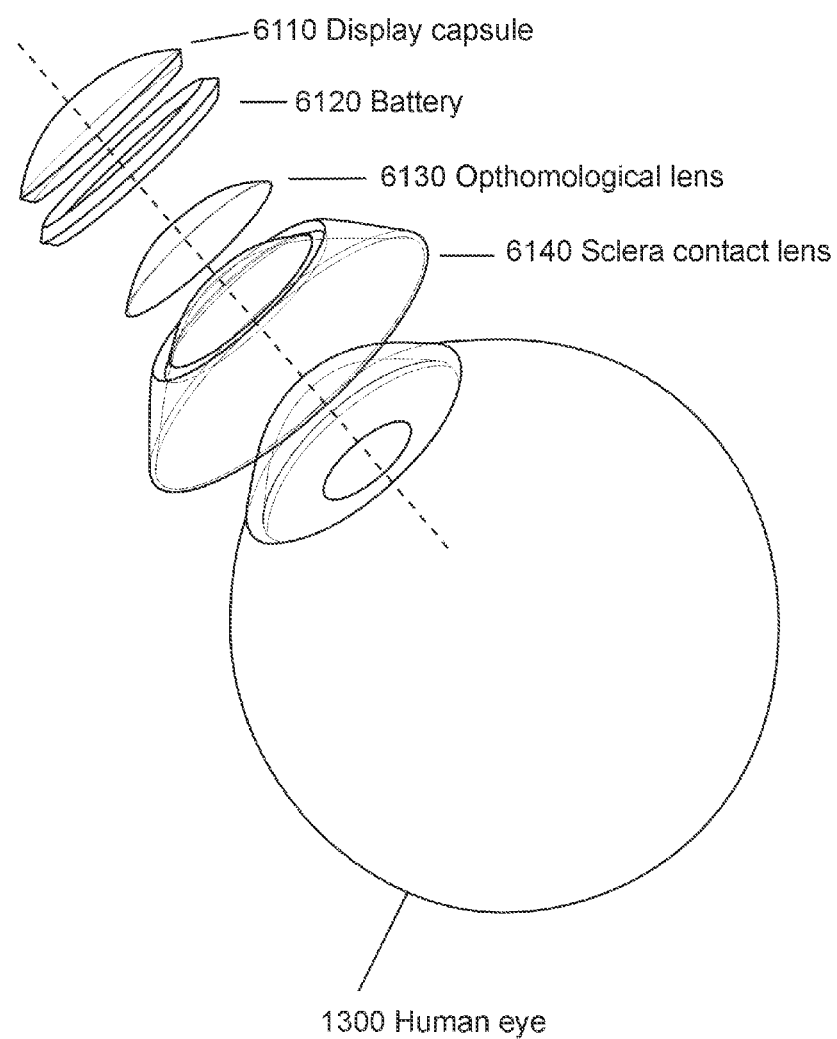
FIG. 61 shows an exploded view of a contact lens display.

In FIG. 60, reference 6000, a perspective view of a complete assembled contact lens display is shown attached to the human eye. In FIG. 61, an exploded view of the same contact lens display is shown as element 6100, containing the display capsule 6110, the battery 6120, and the scleral contact lens body 6140.

Figure 62:
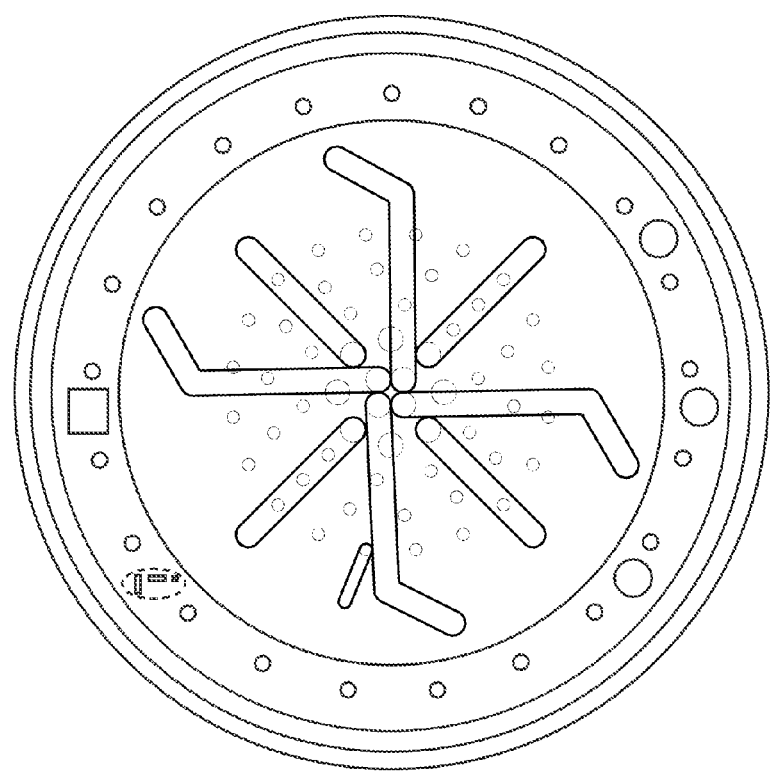
FIG. 62 shows one layer of optical routing.
Figure 63:
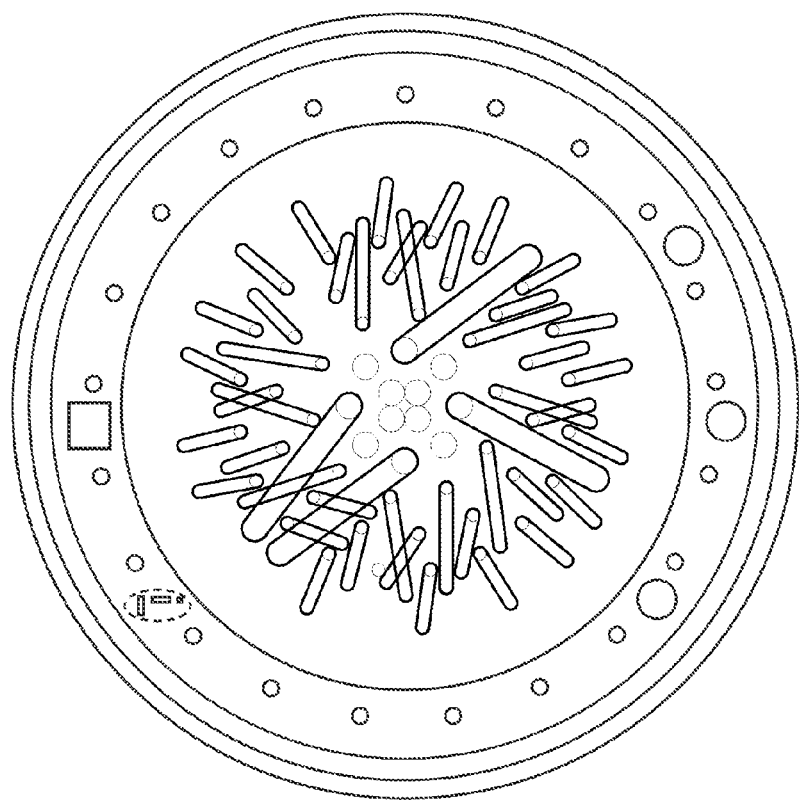
FIG. 63 shows a second layer of optical routing.
Figure 64:
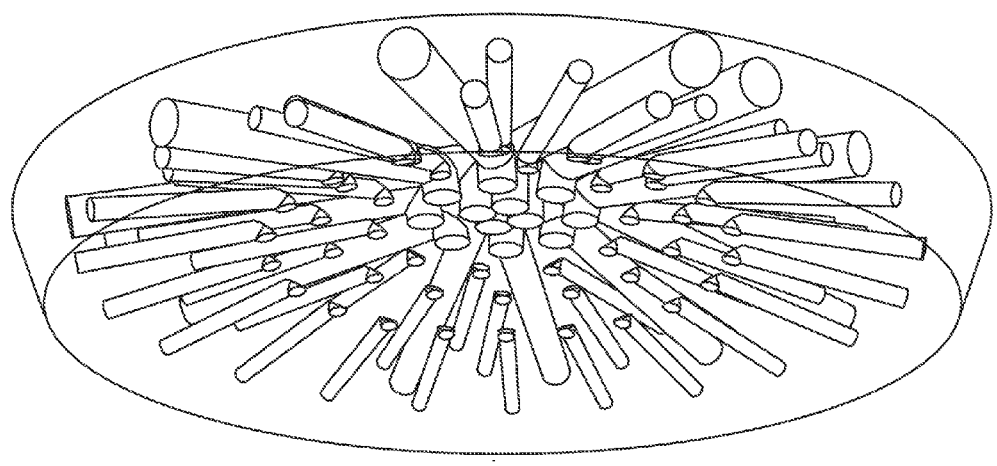
FIG. 64 shows a contact lens mounded display 3D perspective view from below.

FIG. 62, reference 6200, shows one layer of femto projector light paths within the display capsule. FIG. 63, reference 6300, shows a second layer of femto projector light paths within the display capsule. These two layers allow all femto projectors blockage-free light paths from their phosphors to the corresponding fold mirrors that redirect the light down through the contact lens and into the cornea. This is further demonstrated in FIG. 64, reference 6400, a 3D perspective view of the contact lens femto-projector light paths as viewed from under the lens.

As mentioned before, eye mounted displays can be placed anywhere within the optical path of the eye. The next several figures illustrate several such different places. More that one of these may be used at the same time. For example, an additional structure closer to the outside of the eye may be used for eye tracking purposes.

Figure 66:
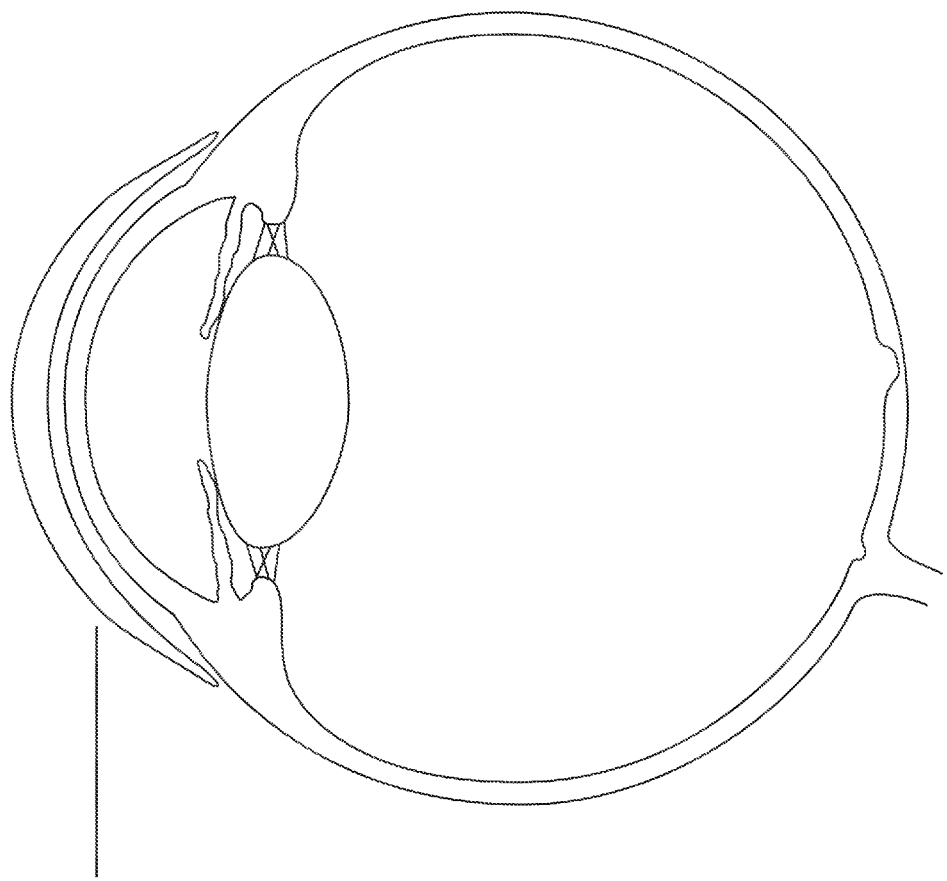
FIG. 66 shows a horizontal slice view of a contact lens based eye mounted display located on top of the cornea.

FIG. 66, reference 6600, shows a horizontal slice view of a contact lens based eye mounted display 6610 in its natural environment—placed on top of the eye's cornea.

Figure 67:
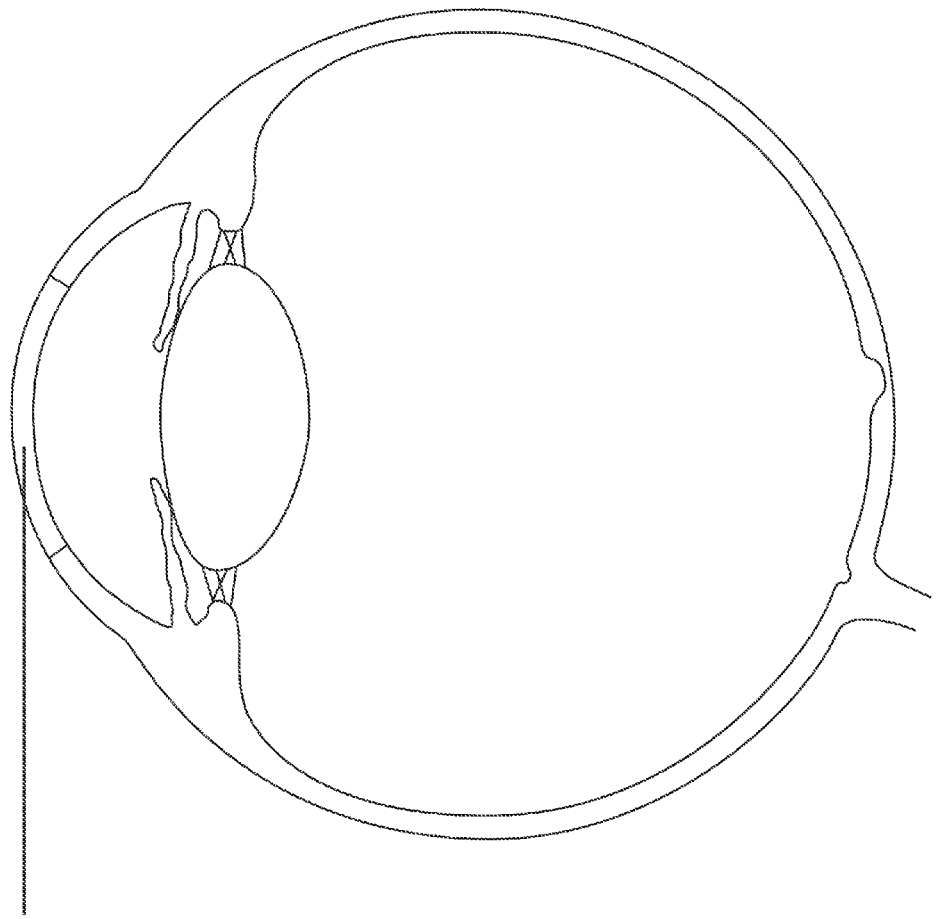
FIG. 67 shows a horizontal slice view of an eye mounted display located within the cornea.

FIG. 67, reference 6700, shows a horizontal slice view of an eye mounted display in which a display capsule 6710 is placed inside of or in place of the cornea.

Figure 68:
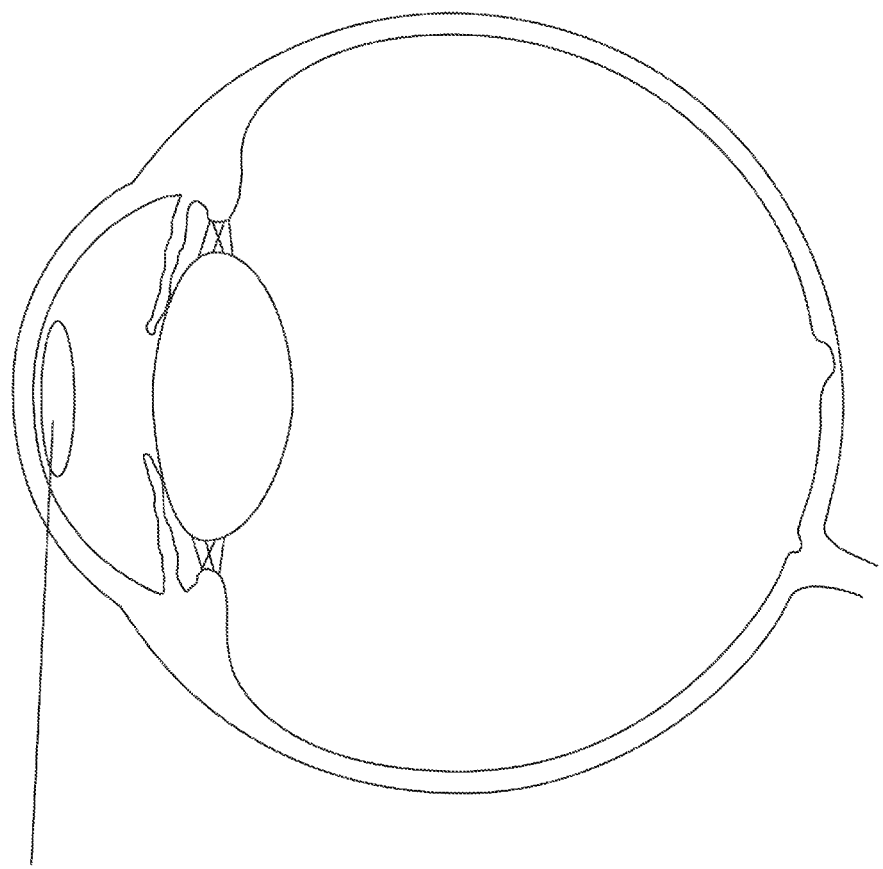
FIG. 68 shows a horizontal slice view of an eye mounted display located on the posterior of the cornea.

FIG. 68, reference 6800, shows a horizontal slice view of an eye mounted display in which a display capsule 6810 has been placed on the posterior (rear) surface of the cornea.

Figure 69:
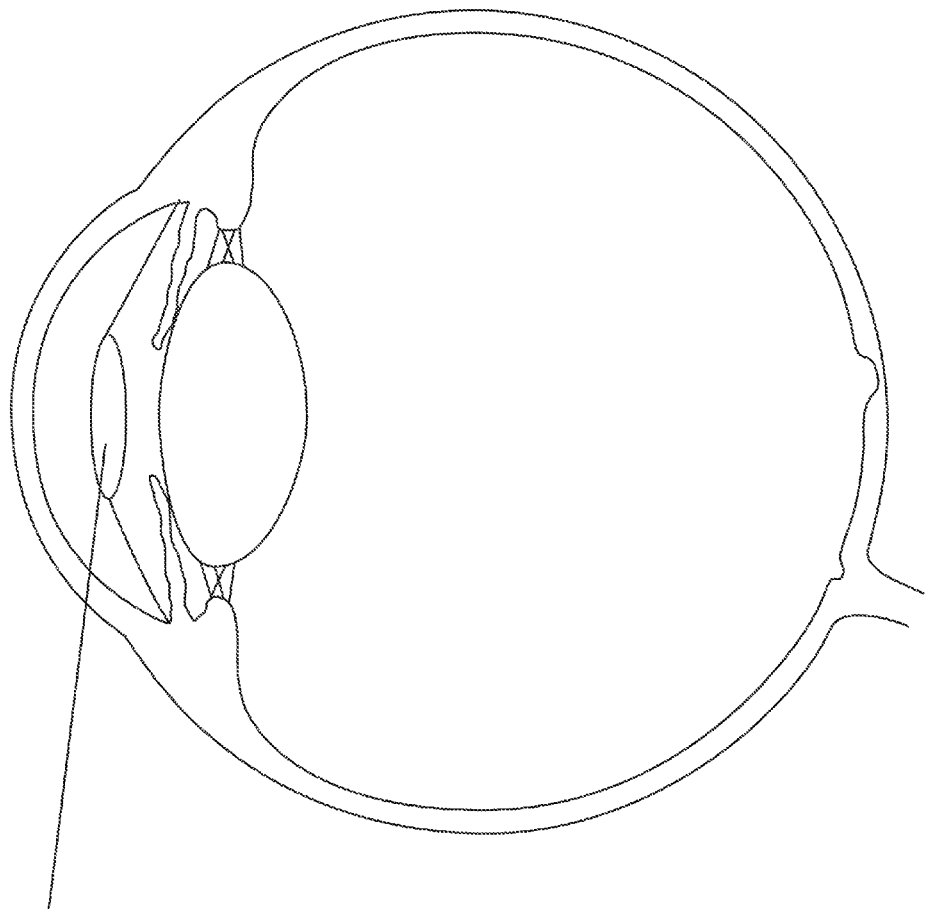
FIG. 69 shows a horizontal slice view of an intraocular lens based eye mounted display implanted within the eye between the cornea and the lens.

FIG. 69, reference 6900, shows in horizontal cross section a configuration in which a display capsule 6910 is part of an intraocular lens, placed between the cornea and the lens within the anterior chamber. This technique has several advantages over a contact lens display. No contact lens need be put in and out of the eye. Ocular correction can be performed "traditionally," either using exterior glasses, contact lenses, or various forms of cornea surgery (e.g. wavefront LASIK) (or just via natural clear vision). In addition, the display is positionally stable with respect to the eye and retina.

FIG. 70, reference 7000, shows in horizontal cross section a configuration in which a display capsule 7010 has been placed on the anterior (front) surface of the lens.

Figure 71:
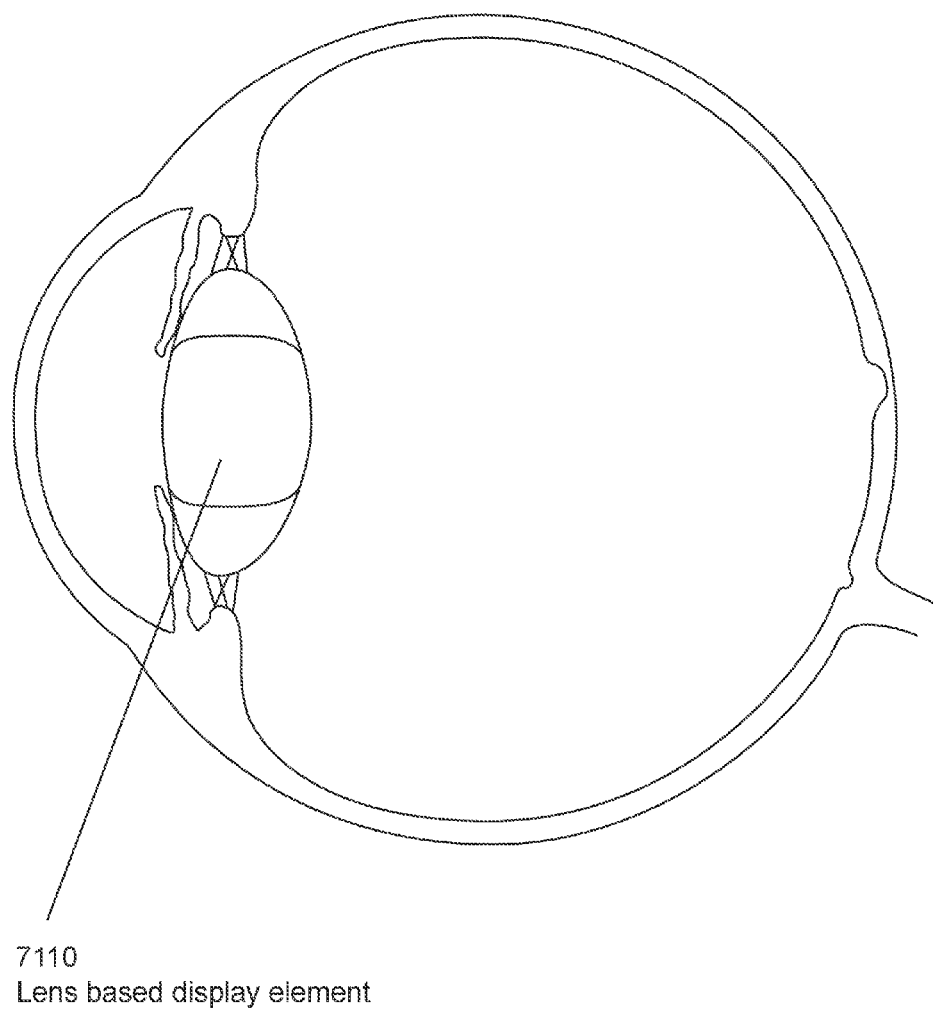
FIG. 71 shows a horizontal slice view of an eye mounted display attached within the lens.

FIG. 71, reference 7100, shows in horizontal cross section a configuration in which a display capsule 7110 has been placed inside of or in place of the lens.

Figure 72:
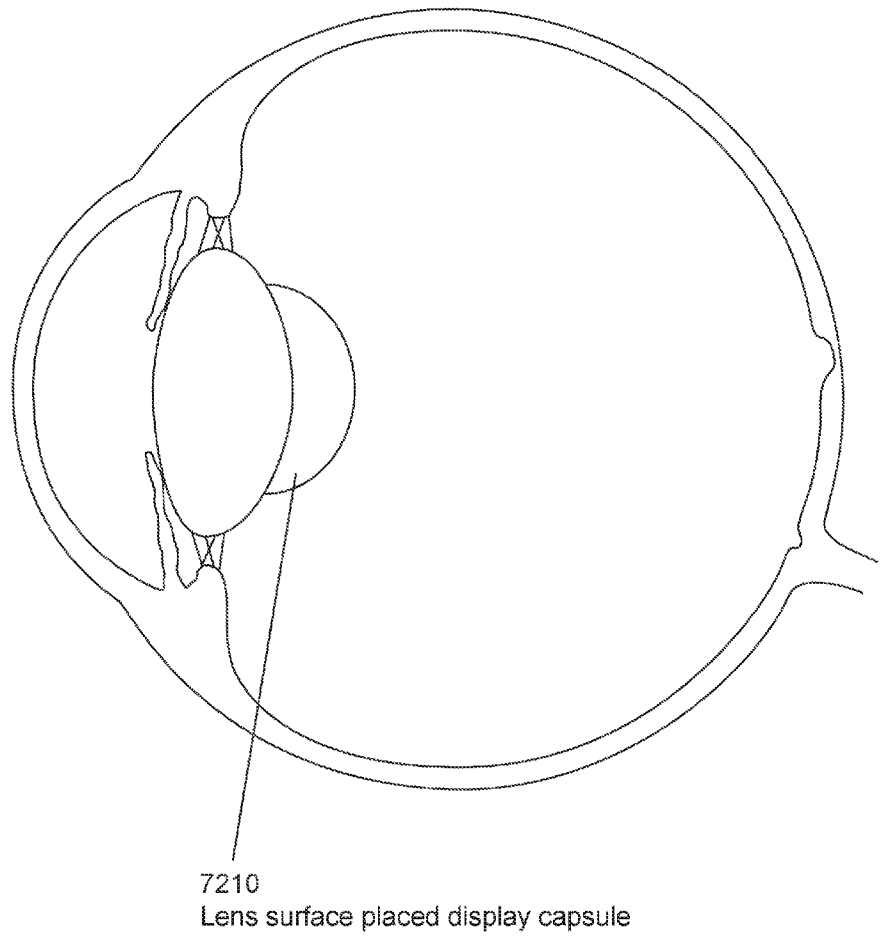
FIG. 72 shows a horizontal slice view of an eye mounted display attached to the posterior of the lens.

FIG. 72, reference 7200, shows in horizontal cross section a configuration in which a display capsule 7210 has been placed on the posterior (rear) surface of the lens.

Figure 73:
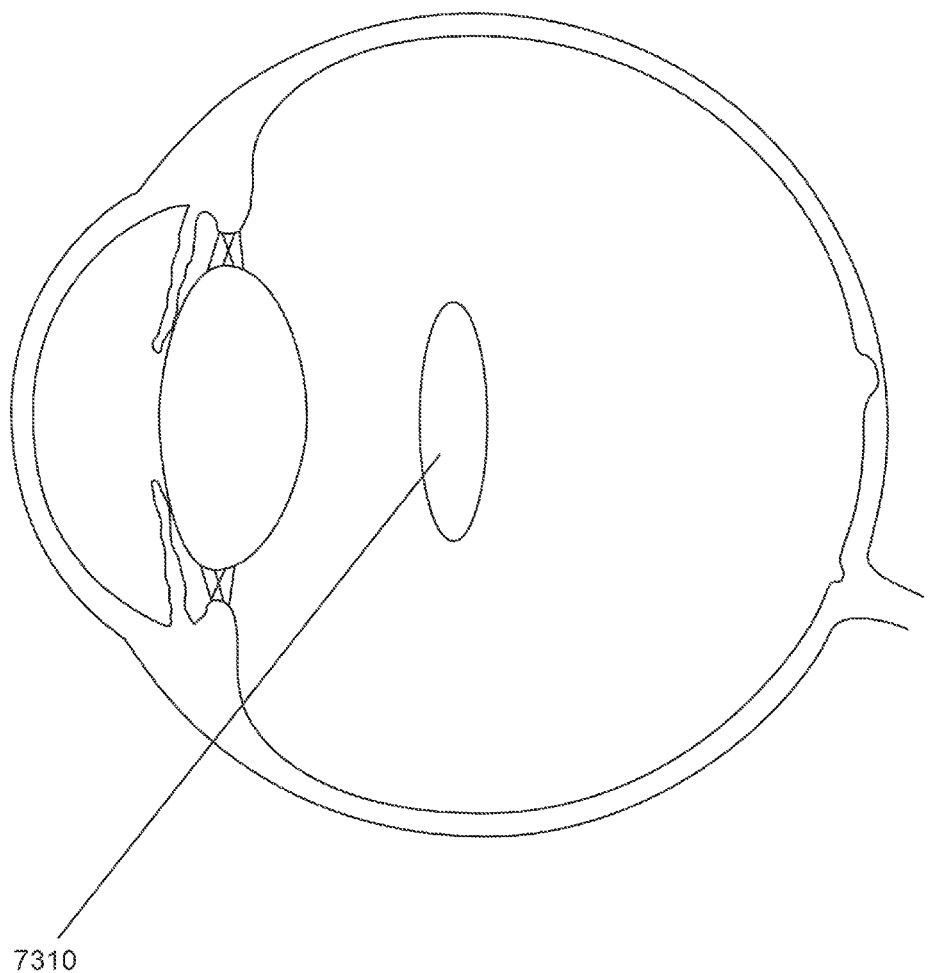
FIG. 73 shows a horizontal slice view of an eye mounted display placed within the posterior chamber between the lens and the retina.

FIG. 73, reference 7300, shows in horizontal cross section a configuration in which a display capsule 7310 has been placed within the posterior chamber, between the lens and the retina.

Figure 74:
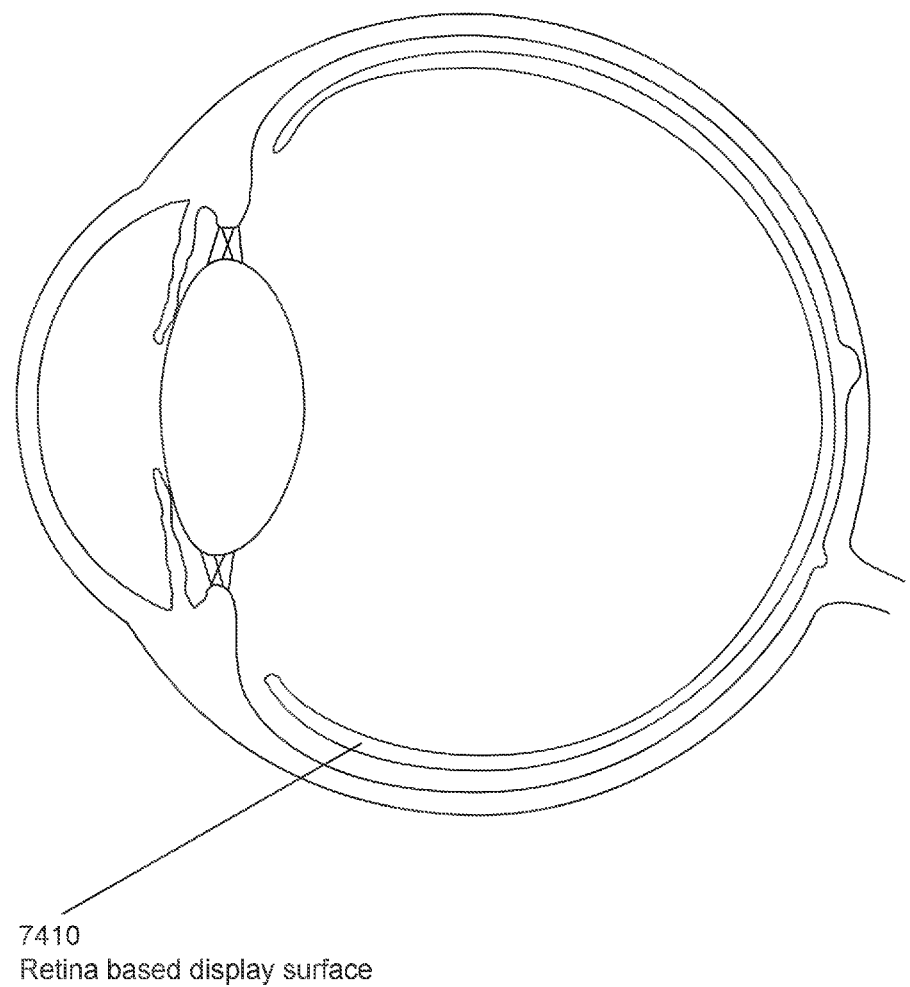
FIG. 74 shows a horizontal slice view of an eye mounted display attached to the retinal surface.

FIG. 74, reference 7400, shows in horizontal cross section a configuration in which a display capsule 7410 has been placed close to or directly on the surface of the retina.

All of these examples simply represent single points among a continuum of possible ways of infiltrating artificial displays into the optical pathways of the human eye. So far all of these techniques have only described simple cases in which a display capsule was placed at a particular point within the optical path of the eye. This is not meant to preclude situations in which multiple artificial elements are introduced to the eye (not necessarily into the optical path). One specific example is the situation in which calibration marks for eye tracking have been made directly on the surface of the scalia for a reader that is tucked inside the eye orbit (and thus is cosmetically acceptable since nothing shows externally).

V.E Internal Electronics of Eye Mounted Display Systems

Figure 75:
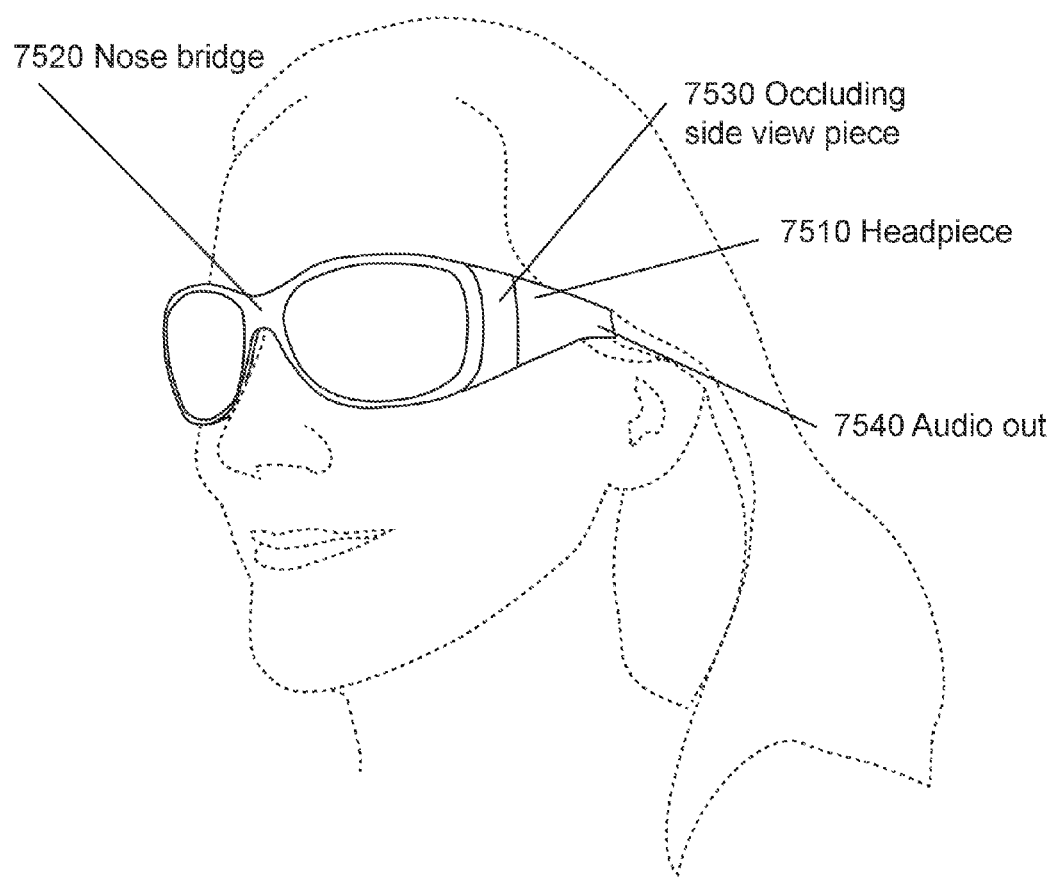
FIG. 75 shows an example headpiece.

FIG. 75, reference 7500, shows one possible physical shape of a headpiece 7510, modeled after a pair of sunglasses. Also shown in FIG. 75 are the nose bridge 7520, the light occluding sides of the headpiece, and the left ear audio output 7540.

Figure 76:
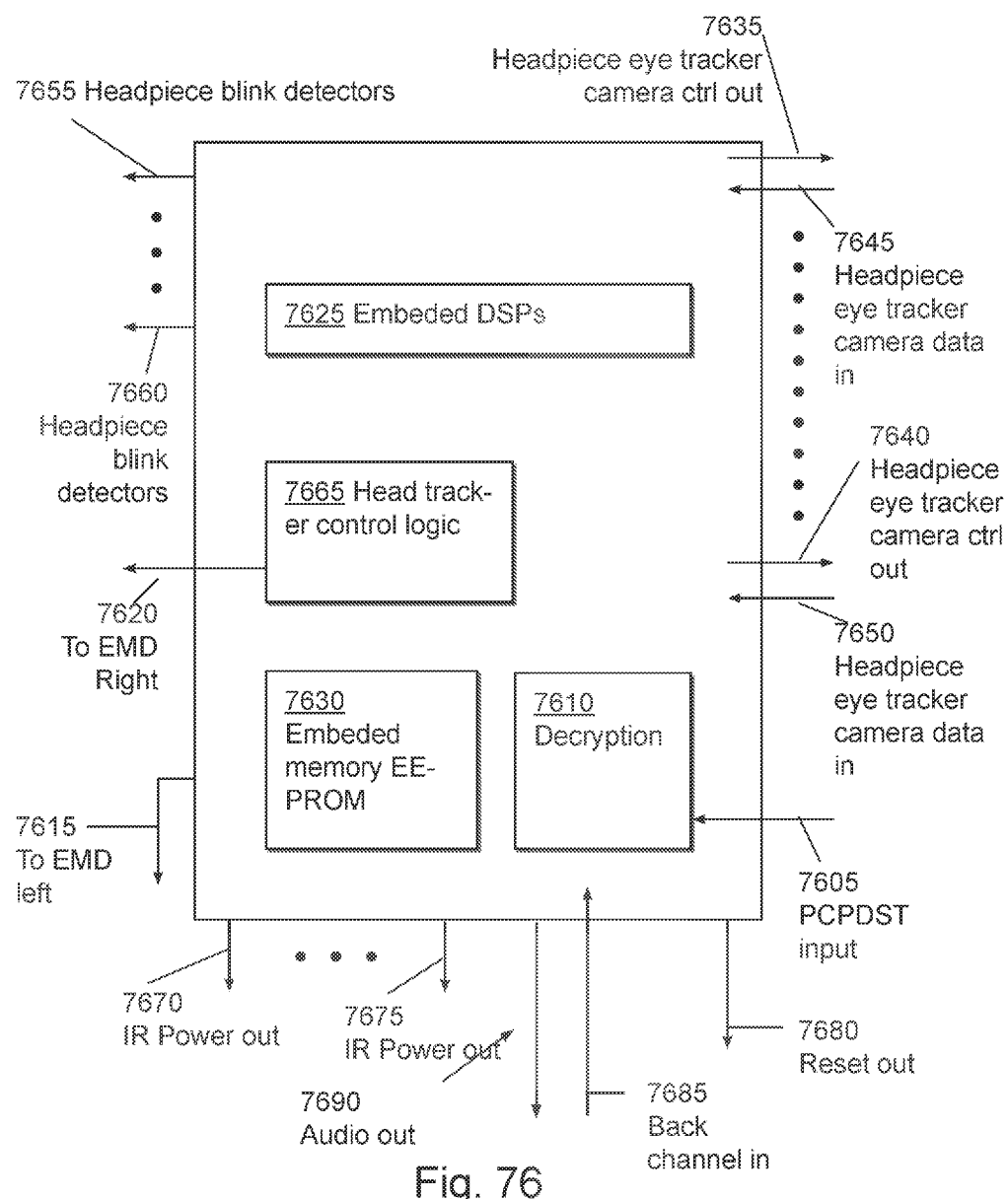
FIG. 76 shows an example of headpiece electronics at a logical level.

FIG. 76, reference 7600 shows a logical level example of the headpiece electronics. The pseudo cone pixel data stream 225 input is reference 7605. The rules for transmitting protected media content (like Blu-Ray™ or HD-DVD™ video discs) require specific encryption when full fidelity images are being transmitted. In all likelihood, the real-time variable resolution moving point of view pixel display frames will not be deemed to require encryption. However, the PCPDS information is preferably encrypted, and may be decrypted at this point by a specific decryption circuit 7610. Although most of the time, reference 225 is described as data flowing towards the eyes, in fact the channel 225 preferably is bidirectional, as calibration and other data can flow away from the eye, although probably with a lower bandwidth.

Reference 7615 and 7620 are the pseudo cone pixel data stream 225 signals going from the headpiece to the left and right EMD, respectively. These carry the pixel information for each frame of display. The data rate for this information channel preferably is high enough to carry single component pixel information for around 500,000 pixels every frame time, which can range from 50 Hz to 84 Hz or higher. Simple lossless compression techniques can be applied to this information flow, so long as the decompression algorithm requires only a small amount of computation. For relatively small field of view virtual screens within the very wide field of view display, there can be a lot of blank pixels that even simple run-length compression will easily handle. But also remember that the fovea, where 10% or more of the display pixels live, will be looking right at the small display, so the overall compression will be smaller than with a non variable resolution display. Slightly lossy compression algorithms may be acceptable in many cases, especially if it is "visually lossless." Fortunately "eye safe," water penetrating, mid infrared frequencies can easily handle the required data bandwidth, and at the safety-required low transmission powers. A portion of this infrared transmission can be picked up by one or more photo diodes 7840, 7845 or 7850 tuned to the same infrared frequency located just under the top of the display capsule, as is shown in FIG. 78, reference 7800. Because the eye rotation is tightly tracked, even lower power transmissions are possible if the transmission from the headpiece closely tracks where the closest display capsule photodiode is located.

Embedded DSP cores 7625 perform much of the data processing for the headpiece, and since they are programmed, in a re-programmable way. Which portions of which computations are in dedicated logic versus the DSP is an implementation dependent choice, but it the eye and head tracking algorithms do require some amount of programmable computational resource. The EEPROM 7630 (or some other storage medium) can contain all the code for the DSPs 7625, as well as specific calibration information for a particular pair of EMDs. This information is downloaded to the scaler subsystems 202 through 210 during system initialization. In this way, different people can plug into the same set of scalers (at different times).

The next set of signals relate to a specific class of optical based eye tracking algorithms. References 7635 through 7640 are control signals for a corresponding number of eye tracker camera and illumination sub-systems. References 7645 through 7650 are data signals back from these sub-systems, likely image pixel data to be processed in firmware by the DSPs.

FIG. 76 also shows eye blink detector inputs 7655 through 7660. Several simple schemes are possible, such as the change in IR spectral reflection between the open eye and the skin of the eye lid.

Reference 7665 represents dedicated (e.g., not programmed) control logic and state machines for wherever needed within the headpiece.

Ideally the power for the components in the display capsule could be brought in externally. So long as multiple interlocks have verified that the eye is covered by an EMD in its proper position, power via IR beams can be safely used to power the EMD wirelessly. References 7670 through 7675 are fixed position IR power emitters. These are powered up when the eye tracking system determines that one or more IR power receivers (FIG. 78, references 7840, 7845, and 7850) on the EMD are favorably aligned. Preferably an EMD would have a small internal battery (FIG. 78, reference 7825). It would be advantageous if the battery was capable of powering the EMD for an entire day and then recharge at night. Another possible power alternative included leaching power from the mechanical motion of the eye blinks. Other forms of electromagnetic, magnetic, sonic, or other radiation might be employed.

It is desirable for the headpiece to perform a "cold" reset of an EMD when necessary. A special IR input circuit, operating at a specific narrow frequency and pattern can be hardwired to a cold reset of the circuitry within an EMD. The IR signal generator that sends such a signal is reference 7680.

A low bandwidth back-channel free space communication of information from the display capsule to the external electronics attached to the headpiece is also desirable, reference 7685. In normal operation, the display capsule does not have much to communicate back to the rest of the system: perhaps "keep alive" pings, input FIFO fill status, capsule based blink detection, optional accelerometer data, or even very small calibration images of the retina. Also, when the CLMD is not being worn, it may reside in a containment case that possibly runs diagnostics. The back-channel itself can be a short burst low power infrared channel back to the headpiece electronics, but just as with the pixel input channel, other embodiments may use other communication techniques for the back-channel.

Many of the current video encoding formats also carry high fidelity audio. Such audio data could be passed along with the PCPDS, but separated out within the headpiece. Binaural audio could be brought out via a standard mini headphone or earbud jack 7690, but because the system in many cases will know the orientation of the head (and thus the ears) within the environment, a more sophisticated multi-channel audio to binaural audio conversion could be performed first, perhaps using individual HRTF (head related transfer function) data. Feed-back microphones in the earbuds would allow for computation of active noise suppression by the audio portion of the headpiece.

Figure 77:
FIG. 77 shows an example headpiece from the back side.

FIG. 77, reference 7700, shows an example headpiece from the back side. Here eye tracking camera nacelles 7710 through 7710 are shown, as well as the IR power out 7670 through 7675, and the cold reset out 7680.

It is usually desirable that as much electronics, processing, sensing, etc. be located external to the eye mounted display. However with today's electronics capability, several essential electronics and processing can be combined onto a single chip mounted within the display capsule, but outside the optical zone.

FIG. 78, reference 7800, shows an overhead view of the display capsule with the positions of several discrete components shown. Reference 7805 are the eye blink detectors. Reference 7810 is the main EMD control IC (or equivalent technology). Reference 7815 are accelerometers. Reference 7820 delineates the apertures for the femto projectors in this particular EMD. Reference 7825 shows one possible location outside the optical aperture for a (relatively) substantial rechargeable battery: a toroid around the outer edge of the display capsule. So long as external power is available, a considerably smaller battery would be more than sufficient; its size would likely be smaller than the controller IC. Reference 7830 delineates the optical zone limit for this particular EMD; the complement of this field is the non-optical zone 7835. Note that just as with any contact lens, the supported optical zone which defines limits on field of view of the eye does not have to be as large as the natural corneal optical zone equivalent field of view. Naturally as large as possible of optical zone is desirable (and supportable by EMD technologies), but people commonly use contact lenses and glasses that have limited optical zones. Possible infrared power in cells are shown as references 7840, 7845, and 7850.

Figure 79:
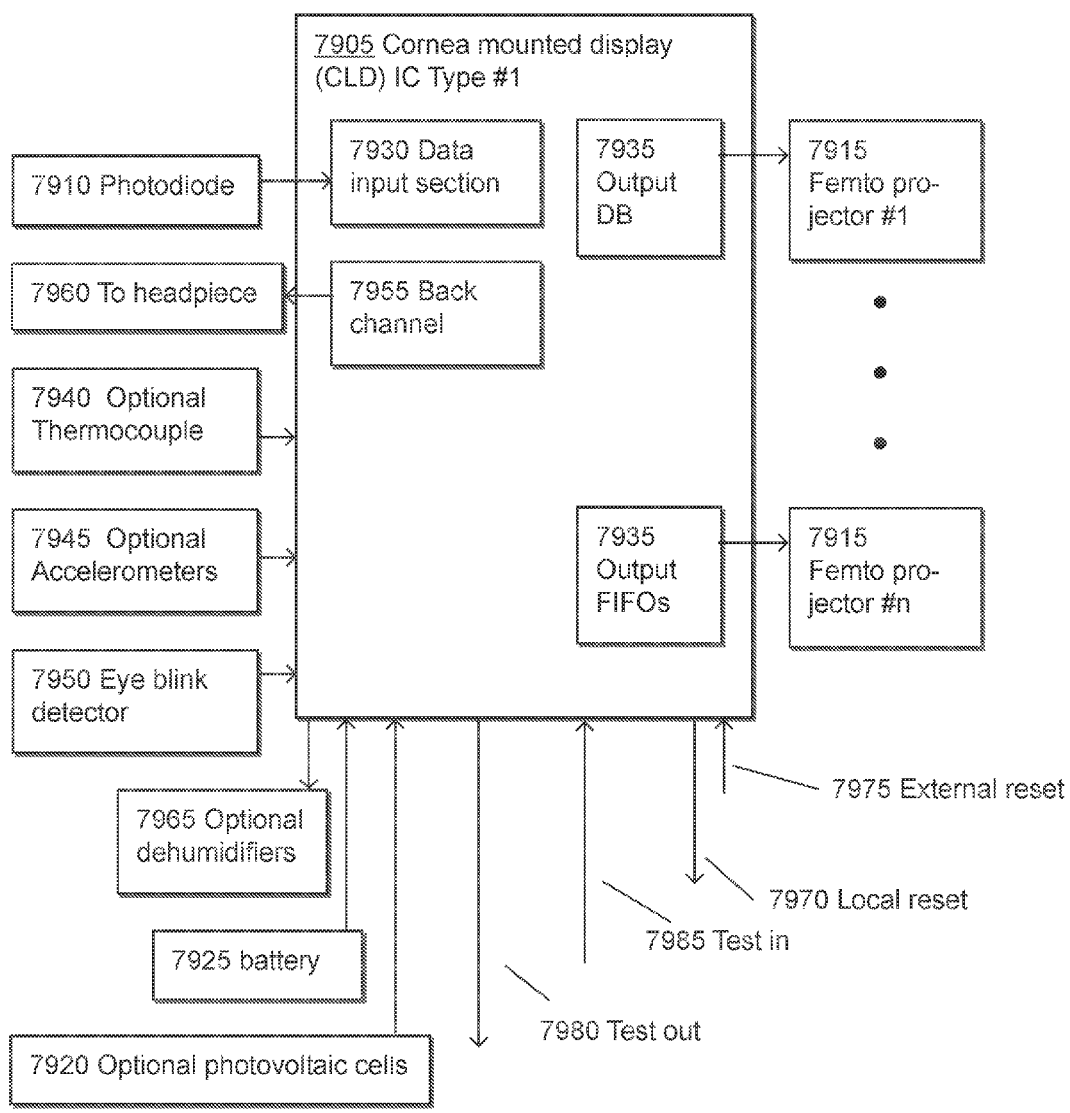
FIG. 79 shows a block diagram of an example IC internal to the contact lens display capsule.

FIG. 79 describes much of the internal function and operation of the electronics within the display capsule at a block diagram level. Digital data streams of pseudo cone pixels are captured by light (sent by the headpiece) to photo-diode 7910 (or some similar mechanism), and then sent to the controller chip 7905 data input section 7930. This data input section has several responsibilities. First is decoding the data fields from the carrier, e.g. start bits, ECC or other similar data correction technique, decrypted data fields, monitoring internal FIFO status and re-impedance matching either by increasing or decreasing internal pixel clock rates, and/or sending data rate run over/under status to the headpiece via the back-channel 7955, where there is space for much larger impedance matching FIFOs. In cases where a data block is too corrupted for correction, the input block may send a re-send request for the entire block to the headpiece.

After correct decoded data has been captured, it is routed to the proper internal FIFOs on the chip 7905; one for each femto projector 7915 on the EMD. At the correct timing, the pseudo cone pixel data (plus control data) will be sent to the femto projectors via the pseudo cone pixel output 7935.

The control chip has several optional additional monitors of the physical world. Temperature via the thermocouple 7940, rapid eye movement via the accelerometers 7945, blink detection via a special blink detection circuit 7950 (possibly a line of photo-diodes), etc.

One method for positioning a CMD is to dehydrate tear fluid at the edges of the contact lens when it is first put on the eye. Dehydrated tear-fluid is mostly comprised of sticky mucous, and thus the user's own natural body elements are used to create temporary glue. When it is time to take the CMD off, a small amount of water eye-dropped into the eyes will re-hydrate the tear fluid "glue," decoupling the CMD from the cornea for removal. One way for the CMD to de-hydrate a ring of tear fluid is to locally wick the water portion away. These wicks could be turned on and off by the controller chip 7905.

There are many mechanisms to build in high reliability, testability, and real-time resets of multiple chip based systems. Only a simple example will be given here. The "local reset" 7970 is an output of controller chip 7905. It resets all the internals of the femto projectors, but not the controller chip itself. It is possible that the femto projectors could be reset as often as once per frame, or otherwise as needed. The external reset 7975 is a low frequency signal sent by the headpiece to a separate circuit than the controller chip that allows the headpiece to perform a hard reset of the controller chip if it is not responding or behaving properly. It is possible that the controller chip could be reset as often as once per eye blink (~every 3 to 4 seconds), or otherwise as needed.

Finally, a test loop out 7980 and test loop in 7985 on the controller chip are present to allow the controller chip to test the femto projectors during any system test time, which could be as often as every eye blink. It is also possible that there will be a linear camera chip somewhere outside the utilized, but inside the generated, optical path of each femto display that allows for per pseudo cone pixel calibration.

Figure 80:
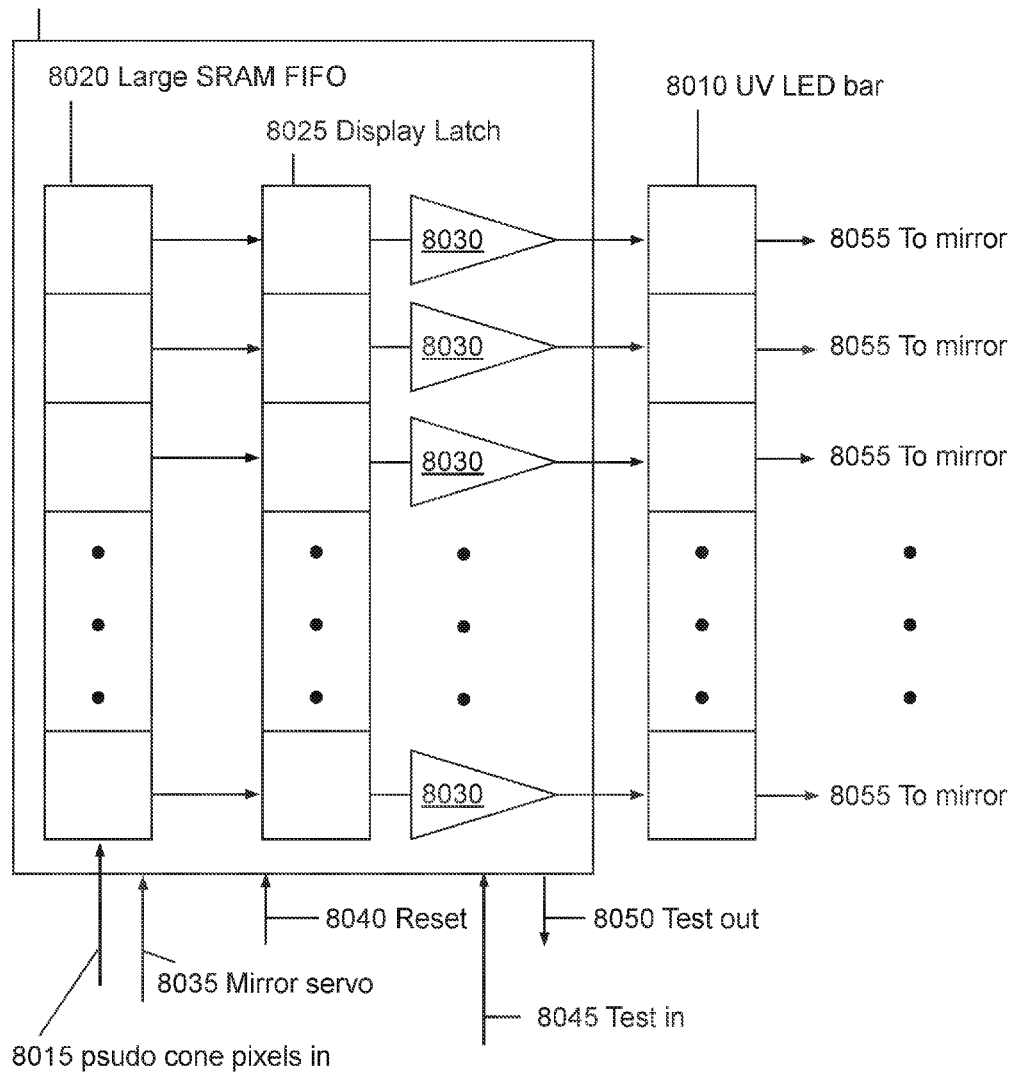
FIG. 80 shows an example driver chip for a UV-LED bar.

FIG. 80 shows a block diagram of the electronics portion 8000 of a femto display. It includes two chips: a logic chip 8005 with analog out control chip; and a gallium nitride chip 8010 with 128 UV LEDs arranged in a bar. The logic chip 8005 receives a stream of pseudo cone pixels from one of the outputs of the controller chip 7905. These are stored into an input FIFO 8020. After an entire new "scan line" of pseudo cone pixels have arrived in the input FIFO, the input FIFO transfers in parallel all of the pixels into a second FIFO, the output FIFO 8025. Each digital data value in the output FIFO is attached to an individual digital to analog converter circuit 8030, which analog outputs are wired one-to-one to analog inputs of the GaN UV LED chip. Thus the new line of values being transferred to the LEDs cause a new linear pixel array of UV light intensities to radiate out and reflect off the current orientation of the oscillating mirror 8120, and then strike the row of phosphors 8130 that the mirror 8120 is currently aiming at. In this way an entire frame of pseudo cone pixels is driven into the femto projector.

Because the individual logic chips 8005 have so little circuitry, if more FIFO space for data over/under run is needed within the CMD, it may make more sense to add several additional lines of pseudo cone pixels to the logic chip 8005 rather than n times more storage on the controller chip 7905, where n is equal to the number of individual femto projectors on the CMD, likely 40+. Also, along with each line of pseudo cone pixel data, several additional bits of control and state information can be loaded into the logic chips 8005 per line. This allows the controller chip 7905 to directly set the state machine(s) of the logic chip at will (think of this as "an instruction").

A sub-circuit reference 8035 to help synchronize the oscillating mirror 8120 to the desired frame and sub-frame rate is also present within the logic chip 8005. This is part of a larger circuit responsible for powering and controlling the MEMS (or other) mirror 8120.

For completeness, FIG. 80 also shows the local reset 8040, test data in 8045, and test data out 8050.

The physical two dimensional cross sectional view of a UV LED bar, oscillating mirror, and phosphor that comprise the light generating portion of a femto projector for the case of the mirror and UV LED bar positioned to illuminate the phosphor array from behind is shown in FIG. 81, reference 8100. The three dimensional perspective view of the same configuration is shown in FIG. 82, reference 8200.

Figure 83:
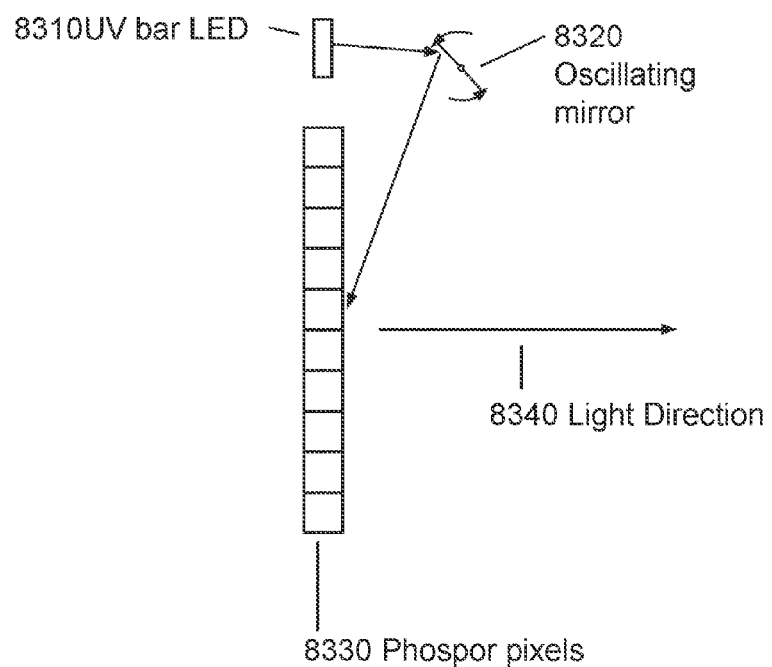
FIG. 83 shows a horizontal cross section of the light creation portion of a femto projector, in this case the phosphor is illuminated from the front.
Figure 84:
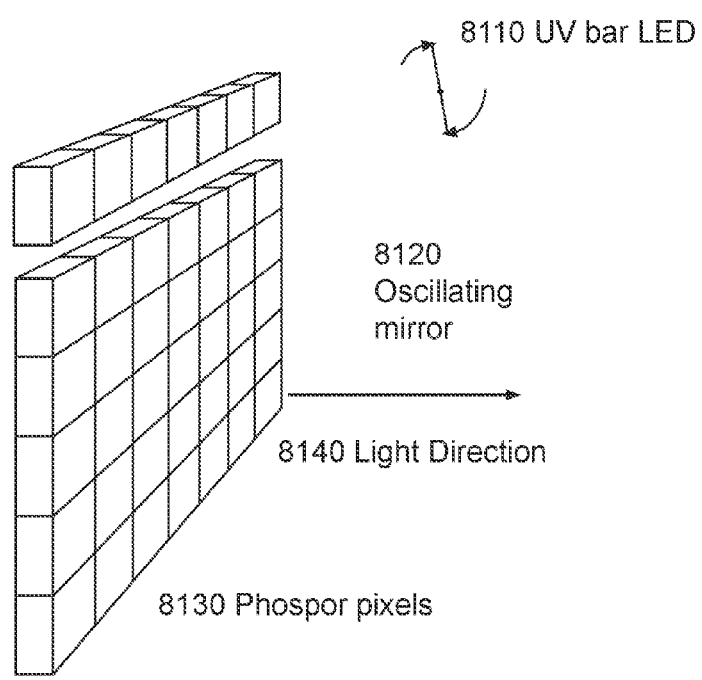
FIG. 84 shows a three dimensional perspective view of the light creation portion of a femto projector, in this case the phosphor is illuminated from the front.
Figure 85:
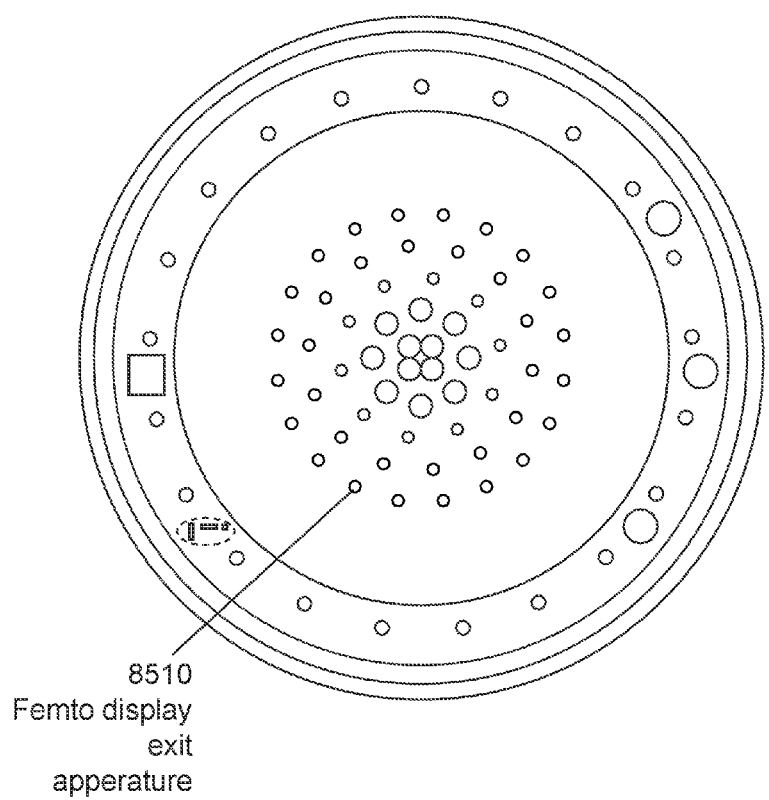
FIG. 85 shows an overhead view of a contact lens display with larger than minimal required exit apertures for the femto-displays.

The physical two dimensional cross sectional view of a UV LED bar, oscillating mirror, and phosphor that comprise the light generating portion of a femto projector in the case of the mirror and UV LED bar positioned to illuminate the phosphor array from in front is shown in FIG. 83, reference 8300. The three dimensional perspective view of the same configuration is shown in FIG. 84, reference 8400.

Turning now to power for the CMD, a totally internal solution is a toroidal battery that is recharged at night, but this is only possible if the total power needs of the CMD over a total work day can be met by the battery technology that can fit into the CMD somewhere outside the optical zone. Another possibility is using the eye lid blinks to skim some of the mechanical power to internal electrical power. A smaller battery and//or a large capacitor would be needed for buffering.

External solutions can be any of many forms of radiated energy: electrical, magnetic, acoustical, IR optical, visible light optical, UV light optical, etc. Some sufficiently energetic form of light based power could be used where the interlocks guarantee that the power beam originating from the headpiece will be turned on only when it is known to a extremely high degree of probability that the power beam will only hit the outer surface of the CMD, and will not pass into the eye because the CMD will block that frequency range from propagating through to the eye. A simple example would be an infrared power beam 7670 from the headpiece pointing at a photovoltaic cell 7920 on the surface of the CMD. Completely IR-blocking coatings on later layers of the CMD might ensure that no spill over will enter the eye. If contact with the CMD is lost for any reason, the power beam will be cut off until calibrated contact is re-established.

Many different tests and data can be used in various combinations to ensure that the CMD is positioned properly over an eye. One test is to make sure that the low bandwidth back-channel from the CMD is being received by some portion of the headpiece, and that the data received describes normal operation. One piece of such backchannel data is "blink" detectors on the CMD. In one embodiment this can basically be a few dozen photo diodes whose data values can be sent back to the headpiece for interpretation. Proper eye blinks is a good indication that the CMD is properly placed. If the CMD contains a square and/or linear camera, placed outside the functional optical path, but in a position to view some portion of the retinal surface, then the "retinal print" seen by the camera(s) can be used as yet another way to validate the proper positioning of the CMD. Another test is for the headpiece-based eye tracker 125 to be functioning properly, and check that the eye positions and movements are consistent with a properly placed CMD.

V.F Systems Aspects for Image Generators and Eye Mounted Displays

Moving now to EMDS systems aspects, when a headpiece is first connected to an EMDS and image generators, either physically or via free space, one or both sides can insist on digital signature verification before proceeding to normal operation.

Next, somewhere in the system, there may be calibration data for the individual left and right (or just one) CMDs. While such information could be stored somewhere in a networked environment, a convenient and logical place to place it is in some form of persistent storage in the headpiece. Once a connection is made between the headset and the rest of the EMDS, this calibration information can be copied down the link from the headpiece to the scaler components 202 through 210, where it is likely to be stored in the attached memory sub-system. This calibration information can be used to construct the sequential pseudo cone pixel descriptor list that is assessed during the variable resolution re-scaling operation.

There are many different methods for implementing head trackers, but a particular one will be used here as an example. Assume that infra-red (IR) LEDs are mounted on the outside of the headpiece, and are turned on briefly at a known set of times. The rest of the headtracker, the tracker frame 230, would contain three or more one dimensional or two dimensional infrared cameras. The sub-pixel accurate (via various techniques) location of the infrared LEDs captured by the cameras can be directly manipulated computationally to give an accurate position and orientation of the headpiece, and thus the position of human user's 110 eyes. To perform this task, there should be tight timing synchronization between the transmitters (IR LEDS) and the receivers (1D or 2D IR cameras) in the tracker frame 230. The tracker frame should also send the image data captured to a computational unit that can transform it into viewing matrices for image generators and matrix transforms for mapping the virtual screen to the EMDS. This computation could be performed anywhere within the system, but a good placement would be the headpiece that already will have a computational infrastructure for extracting eye orientation data. Note that the direction of information flow is from the scalers to the headpiece.

There are many different methods for implementing eye trackers, but for simplicity a particular example will be used here. In these cases, a contact lens display has special marks printed and/or embossed on or near its surface. These marks are illuminated by timed flashes of light from portions of the headpiece. Also on the headpiece are a number of linear or array cameras (likely infrared) that capture the interaction of the illumination bursts with the patterns. These cameras are advantageously placed as near the eye as possible. In this example, they are placed all around the inside rims of a pair of eyeglasses that form part of the headpiece. This way, no matter what direction an eye is looking, there will be several cameras able to obtain a good image of the pattern.

Because the illumination and the cameras are in this case part of the headpiece, it is advantageous to have the image processing performed on the camera outputs to determine the orientation of the eyes. This computation is simple enough that a custom image processor design is not needed. Existing DSP IP cores should be able to handle this job, and can also be handed the data from the head tracker cameras.

With the same DSP cores computing both the head and the eye tracking data, they are advantageously positioned to compute the transforms and other per-frame data that the scalers use to process the next frame, or in parallel frames, of video data. This information flow is from the headpiece to each scaler individually, as different virtual screens can use different data. As both the head and eye-tracking may be taking place at a higher rate than the video rate(s), the data for the scalers would be averaged (or more complexly) over several sub-frames, and only sent on to the scalers where the time was just before they need to start processing a new frame of data. Once they start, this completes the cycle.

V.G Meta-Window Systems for Eye Mounted Displays

Now consider how to configure the position, orientation, size, and curvature of the (multiple) virtual display image(s). Certainly one way is for the EMDS to come with a small controller to allow individuals to set such parameters, similar to how CRTs had controls for the horizontal and vertical height, the horizontal and vertical size, etc., but setting up objects in three dimensions literally adds another dimension to the problem.

A more likely solution is for an application running on one of the computers controlling one or more image generators to have a GUI to let virtual displays be placed, orientated, and sized; and curvature parameters set if that option is available. Most modern window systems allow for some number (at least 8) of separate image generators to become the "tiled" portions of what is otherwise a single larger window workspace. Moving the cursor off to one side of a display causes it to appear on the physically neighboring display, if there is one there. This covers two of the more common uses of a single computer with an EMDS: n×m image generator separate video outputs form either a single large flat window in space, or a single cylindrically curved window. It is usually important for the EMDS to know when two window edges are intended to seamlessly abut versus one being to the rear, or front, of the other. Such virtual window configurations preferably are persistent, e.g. do not require the user to set them over again every time the computer(s) are re-booted. This can be addressed by having the application on a computer that handled the creation of the virtual screen placement parameters insert a "window system start-up time" job that will re-send the configuration information whenever the window system is booted. Another option would be to write the virtual screen parameter information into electronically alterable storage within the EMDS. It only need be changed when the configuration application is run again.

The conventional method to support multiple computers running at the same time in a single display is to use a KVM: Keyboard, Video, and Mouse switcher. This is a box that for example, has one USB keyboard and one USB mouse input, as well as one video output (in some format, analog or digital), but has n USB keyboard and mice outputs, and n video inputs. The scaler component of an EMDS effectively already performs a more sophisticated control of n video inputs. What is left is control of keyboard and mice. If two USB inputs and two USB outputs are added to each scaler black box (or multiples for black boxes that support more than one video in), then the scalers can perform a conventional job as a KM (keyboard mouse) switch.

Conventional KVMs allow the user to dynamically specify which of the up to n computers is currently active for keyboard and mouse by means of an additional multiple button interface device. It would be preferable to avoid adding such additional physical user interface devices. One possible solution is to allow the software program that is dynamically controlling the virtual displays to also dynamically control the keyboard and mouse focus. There are other alternatives: a rapid double "wink" in one eye of the user could change the keyboard and mouse focus to the computer controlling the virtual display that the user is currently looking directly at (e.g., use they eye tracking and blink tracking data).

With respect to minimizing a virtual screen, rather than collapsing the screen to a label on the top or bottom menu bar; it is possible to collapse it to a "flat" video image within the EMDS display space. Because such "collapsed" video streams are below any active windows, there is (usually) scaler computational bandwidth to include (a perhaps frozen video image contents) display of these "stubby" virtual screens, perhaps with a text tag associated with it. This "tag" part could be the same as current window systems. A user control of some sort would allow "un-closing" of the video window at a future point in time. They would then revert to a "normal" virtual screen.

V.H Advantages of Eye Mounted Display Systems

The possible advantages of an eye mounted display system are numerous. One possible advantage is that keeping a display made up of variable resolution display elements coupled close to, or locked to, the variable resolution of the human eye's retinal receptive field centers, means that a device that meets or exceeds the resolution and field of view requirement of the human visual system can potentially be built.

In addition, just as one uses the same pair of glasses while at work, home, or other outside activities, another possible advantage of eye mounted display systems is that the same pair of eye mounted displays can be worn and thus replace many fixed displays at these locations. Thus even if an eye mounted display system costs more than any particular display, to be economical, it only has to cost less than all the other fixed displays it replaces.

A third potential advantage of eye mounted display systems is that because eye mounted display systems are inherently small and low in power consumption, they may be able to solve the display size and resolution limitations of current small portable electronic devices: cell phones, PDAs, handheld games, small still and video cameras, etc. In addition, the approach described here for eye mounted display systems is compatible with existing video display standards, and has the possible advantage that it can put more than one video input into the larger perceptual display space, without requiring the video sources to communicate with each other.

Another potential advantage is that for the specialized market where head mounted displays are used; an eye mounted display system provides orders of magnitude more perceptible display pixels, much lower weight and bulk, etc. With the combination of large field of view, high spatial resolution, integral head-tracking (on some models), see-through capabilities, and potentially low cost, the markets for immersive displays can expand to significant sections of the gaming and some of the other entertainment markets, while better serving the existing markets for head mounted displays in scientific visualization, virtual prototyping, simulators, etc.

Yet another possible advantage is because it is fairly natural to construct eye mounted displays that have similar variations in resolution as does the human eye, orders of magnitude fewer display elements ("pixels") can be used on a display fixed to the eye than for displays that do not know where the eye is looking, and thus must provide uniformly high resolution over the entire field of the display or for displays that cannot assume that only one human 110 observer is present and again thus must provide uniformly high resolution over the entire field of the display. As an example, an eye mounted display with only 400,000 physical pixels can produce imagery that an external display may need 100 million or more pixels to equal (a factor of 200 times less pixels). In principle, a variable resolution display also allows image generation or capture devices, whether computer graphics systems, high resolution image playback systems, still or video camera systems, etc., to only compute, decompress, transmit, or capture (for cameras) orders of magnitude fewer pixels than would be required for non eye resolution coupled systems.

Eye mounted displays also require vastly fewer photons compared to existing displays and, therefore, vastly lower power also. Eye mounted displays have several properties that most external display technologies cannot easily take advantage of. Because the display is coupled in space relatively close to the rotations of the eye, only the amount of light that actually will enter the eye (through the pupil) need be produced. These savings are substantial. For an eye mounted display to produce the equitant retinal illumination as a 2,000 lumen video projector viewed from 8 feet away, the eye mounted display need only produce one one thousandth or less of a lumen. This is a factor of one million times fewer photons (both eyes).

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention.

What is claimed is:

1. An eye mounted display system, comprising:
an eye mounted display mountable on an eye of a human user for forming a visual sensation of an image that spans a field of view of the user's eye, the eye mounted display comprising:
a contact lens; and
a plurality of sub-displays in the contact lens, the eye mounted display moving with the user's eye as the user's eye rotates in its socket, each of the sub-displays comprising:
a plurality of display pixels displaying a different portion of the image for each sub-display, and
display optics projecting light from the display pixels to a portion of the retina corresponding to the portion of the image displayed by that sub-display, wherein the portion of the retina is fixed as the user's eye rotates in its socket and thereby forming a visual sensation of the portion of the image displayed by that sub-display, each such projection of light propagating through a partial corneal aperture for that sub-display, different sub-displays projecting light to different portions of the retina, and the sub-displays in aggregate projecting light to portions of the retina that in aggregate span the field of view;

an eye tracker that detects an orientation of the eye; and a device that generates images from an image input, the images generated based on the orientation of the eye and generated in an output format suitable for use in the eye mounted display, the images in the output format including pixels of different resolutions within each image, and the eye mounted display projecting the images onto a retina of the eye.

2. The eye mounted display system of claim 1 wherein the images projected onto the retina of the eye appear to be stationary with respect to the user's surrounding environment.

3. The eye mounted display system of claim 2 wherein:
the image input comprises images in an input format with pixels of constant resolution within each image; and
the device converts the images from the input format to the output format, the output format including pixels of different resolutions within each image, the pixels of different resolutions including higher resolution pixels and lower resolution pixels, wherein which pixels in the input format are converted to higher resolution pixels or to lower resolution pixels in the output format depends on the orientation of the eye.

4. The eye mounted display system of claim 1 wherein the images in the output format include pseudo cone pixels, and the device generates the pseudo cone pixels from the image input.

5. The eye mounted display system of claim 1 wherein the eye tracker detects the orientation of the eye by tracking the eye directly.

6. The eye mounted display system of claim 1 wherein the eye tracker detects the orientation of the eye by tracking the eye mounted display.

7. The eye mounted display system of claim 1 wherein the device determines at least one of the following eye motion types based on the detected orientations of the eye over time: saccades, drifts, micro saccades, vergence motion and tremor motion.

8. The eye mounted display system of claim 1 wherein the device further simulates retinal motion blur based on the detected orientations of the eye over time; and the device generates images from the image input taking into account the simulated retinal motion blur.

9. The eye mounted display system of claim 1 wherein the device further detects eye blinks and/or saccades, and no images are projected onto the retina of the eye during detected eye blinks and saccades.

10. The eye mounted display system of claim 1 wherein the device further predicts a future orientation of the eye based on past detected orientations of the eye, and the device generates images from the image input based on the future predicted orientation of the eye.

11. The eye mounted display system of claim 1 wherein the eye tracker comprises a camera mounted outside the eye, the camera capturing images of the eye, the orientation of the eye determined based on the images captured by the camera.

12. The eye mounted display system of claim 1 wherein the eye tracker comprises a camera mounted on the eye, the camera capturing images from the eye looking outward, the orientation of the eye determined based on the images captured by the camera.

13. The eye mounted display system of claim 1 further comprising:
a head tracker that detects a position and/or orientation of a head of the human user, wherein the images are generated further based on the position and/or orientation of the head.

14. The eye mounted display system of claim 13 wherein the head tracker detects the position and/or orientation of the head by tracking the head directly.

15. The eye mounted display system of claim 13 wherein the head tracker detects the position and/or orientation of the head by tracking a component mounted to the head.

16. The eye mounted display system of claim 13 wherein the eye tracker and the head tracker together detect the orientation of the eye in at least two degrees of freedom and the position of the eye in at least three degrees of freedom.

17. The eye mounted display system of claim 13 wherein the head tracker detects the position of the head with an accuracy of 100 microns or better.

18. The eye mounted display system of claim 13 wherein the eye tracker and head tracker together determine a view frustum for the eye, and the device generates images from the image input based on the view frustum.

19. The eye mounted display system of claim 13 wherein the device further predicts a future position and/or orientation of the head based on past detected positions and/or orientations of the head; and the device generates images from the image input based on the future predicted positions and/or orientations of the head.

20. The eye mounted display system of claim 1 wherein the eye tracker comprises a camera mounted outside the eye, the camera capturing images of a tracker component mounted on the eye, the orientation of the eye determined based on the images captured by the camera.

* * * * *